US009996697B2

(12) United States Patent
Mahaffey et al.

(10) Patent No.: US 9,996,697 B2
(45) Date of Patent: *Jun. 12, 2018

(54) METHODS AND SYSTEMS FOR BLOCKING THE INSTALLATION OF AN APPLICATION TO IMPROVE THE FUNCTIONING OF A MOBILE COMMUNICATIONS DEVICE

(71) Applicant: LOOKOUT, INC., San Francisco, CA (US)

(72) Inventors: Kevin Patrick Mahaffey, San Francisco, CA (US); John Gunther Hering, San Francisco, CA (US); James David Burgess, Alameda, CA (US); Jonathan Pantera Grubb, Los Angeles, CA (US); David Golombek, Washington, DC (US); David Luke Richardson, San Francisco, CA (US); Anthony McKay Lineberry, Oakland, CA (US); Timothy Micheal Wyatt, Toronto (CA)

(73) Assignee: LOOKOUT, INC., San Francisco, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/687,395

(22) Filed: Aug. 25, 2017

(65) Prior Publication Data
US 2017/0357814 A1    Dec. 14, 2017

Related U.S. Application Data

(60) Continuation of application No. 15/393,089, filed on Dec. 28, 2016, now Pat. No. 9,779,253, which is a
(Continued)

(51) Int. Cl.
*H04L 29/06* (2006.01)
*G06F 21/57* (2013.01)
(Continued)

(52) U.S. Cl.
CPC .......... *G06F 21/577* (2013.01); *G06F 21/554* (2013.01)

(58) Field of Classification Search
None
See application file for complete search history.

(56) References Cited

U.S. PATENT DOCUMENTS 3,416,032 A    12/1968 Jahns et al.
4,553,257 A    11/1985 Mori et al.
(Continued)

FOREIGN PATENT DOCUMENTS

GB          2430588         3/2007
WO        2005101789       10/2005
(Continued)

OTHER PUBLICATIONS

PCT "International Search Report and Written Opinion of the International Searching Authority for PCT/US2013/027166", dated Jun. 19, 2013; received on Jun. 21, 2013.
(Continued)

*Primary Examiner* — Eric Chen
(74) *Attorney, Agent, or Firm* — Dergosits & Noah LLP

(57) ABSTRACT

Methods and systems are provided for sharing information and improving the functioning of devices by blocking the installation of an application based on an assessment. In the methods and systems disclosed, a server may receive data pertaining to an application from the mobile communications device. The server may process the data from the mobile communications device to determine an assessment of the application, where the assessment is based on an analysis using information shared by sources other than the mobile communications device. The server may then provide the assessment to the mobile communications device.

20 Claims, 73 Drawing Sheets

Related U.S. Application Data continuation of application No. 14/973,636, filed on Dec. 17, 2015, now Pat. No. 9,781,148, which is a continuation-in-part of application No. 14/473,917, filed on Aug. 29, 2014, now Pat. No. 9,245,119, which is a continuation of application No. 13/790,402, filed on Mar. 8, 2013, now Pat. No. 8,826,441, which is a continuation of application No. 13/267,731, filed on Oct. 6, 2011, now Pat. No. 8,510,843, which is a continuation of application No. 12/255,635, filed on Oct. 21, 2008, now Pat. No. 8,060,936, said application No. 14/973,636 is a continuation-in-part of application No. 14/634,115, filed on Feb. 27, 2015, now Pat. No. 9,407,640, which is a continuation of application No. 14/034,320, filed on Sep. 23, 2013, now Pat. No. 8,997,181, which is a continuation of application No. 13/742,110, filed on Jan. 15, 2013, now Pat. No. 8,561,144, which is a continuation of application No. 13/314,032, filed on Dec. 7, 2011, now Pat. No. 8,365,252, which is a continuation of application No. 12/255,632, filed on Oct. 21, 2008, now Pat. No. 8,087,067, said application No. 14/973,636 is a continuation-in-part of application No. 14/455,787, filed on Aug. 8, 2014, now Pat. No. 9,223,973, which is a continuation of application No. 13/741,988, filed on Jan. 15, 2013, now Pat. No. 8,881,292, which is a continuation of application No. 13/333,654, filed on Dec. 21, 2011, now Pat. No. 8,381,303, which is a continuation of application No. 12/255,621, filed on Oct. 21, 2008, now Pat. No. 8,108,933, said application No. 14/973,636 is a continuation-in-part of application No. 14/688,292, filed on Apr. 16, 2015, now Pat. No. 9,344,431, which is a continuation of application No. 13/958,434, filed on Aug. 2, 2013, now Pat. No. 9,100,389, which is a continuation of application No. 12/868,672, filed on Aug. 25, 2010, now Pat. No. 8,533,844, which is a continuation-in-part of application No. 12/255,621, filed on Oct. 21, 2008, now Pat. No. 8,108,933, said application No. 14/973,636 is a continuation-in-part of application No. 13/896,852, filed on May 17, 2013, now Pat. No. 9,740,852, which is a continuation of application No. 12/868,676, filed on Aug. 25, 2010, now Pat. No. 9,367,680, which is a continuation-in-part of application No. 12/255,621, filed on Oct. 21, 2008, now Pat. No. 8,108,933, and application No. 14/973,636, which is a continuation-in-part of application No. 14/611,063, filed on Jan. 30, 2015, now abandoned, which is a continuation of application No. 13/033,025, filed on Feb. 23, 2011, now Pat. No. 8,984,628, which is a continuation-in-part of application No. 12/868,669, filed on Aug. 25, 2010, now Pat. No. 8,347,386, which is a continuation-in-part of application No. 12/255,621, filed on Oct. 21, 2008, now Pat. No. 8,108,933, and application No. 14/973,636, which is a continuation-in-part of application No. 13/335,779, filed on Dec. 22, 2011, now Pat. No. 9,235,704, which is a continuation-in-part of application No. 12/868,676, filed on Aug. 25, 2010, now Pat. No. 9,367,680, which is a continuation-in-part of application No. 12/255,621, filed on Oct. 21, 2008, now Pat. No. 8,108,933, and application No. 14/973,636, which is a continuation-in-part of application No. 14/692,669, filed on Apr. 21, 2015, now Pat. No. 9,563,749, which is a division of application No. 13/484,132, filed on May 30, 2012, now Pat. No. 9,043,919, which is a continuation-in-part of application No. 12/868,672, filed on Aug. 25, 2010, now Pat. No. 8,533,844, which is a continuation-in-part of application No. 12/255,621, filed on Oct. 21, 2008, now Pat. No. 8,108,933.

(51) Int. Cl.
*G06F 21/55* (2013.01)
*G06F 11/00* (2006.01)
*G06F 12/14* (2006.01)
*G06F 12/16* (2006.01)

(56) References Cited

U.S. PATENT DOCUMENTS

| | | |
|---|---|---|
| 5,319,776 A | 6/1994 | Hile et al. |
| 5,574,775 A | 11/1996 | Miller, II et al. |
| 5,715,518 A | 2/1998 | Barrere et al. |
| 6,185,689 B1 | 2/2001 | Todd et al. |
| 6,269,456 B1 | 7/2001 | Hodges et al. |
| 6,272,353 B1 | 8/2001 | Dicker et al. |
| 6,301,668 B1 | 10/2001 | Gleichauf et al. |
| 6,453,345 B2 | 9/2002 | Trcka et al. |
| 6,529,143 B2 | 3/2003 | Mikkola et al. |
| 6,696,941 B2 | 2/2004 | Baker |
| 6,792,543 B2 | 9/2004 | Pak et al. |
| 6,892,225 B1 | 5/2005 | Tu et al. |
| 6,907,530 B2 | 6/2005 | Wang |
| 6,959,184 B1 | 10/2005 | Byers et al. |
| 7,020,895 B2 | 3/2006 | Albrecht |
| 7,023,383 B2 | 4/2006 | Stilp et al. |
| 7,069,589 B2 | 6/2006 | Schmall et al. |
| 7,096,368 B2 | 8/2006 | Kouznetsov et al. |
| 7,123,933 B2 | 10/2006 | Poor et al. |
| 7,127,455 B2 | 10/2006 | Carson et al. |
| 7,159,237 B2 | 1/2007 | Schneier et al. |
| 7,171,690 B2 | 1/2007 | Kouznetsov et al. |
| 7,178,166 B1 | 2/2007 | Taylor et al. |
| 7,181,252 B2 | 2/2007 | Komsi |
| 7,210,168 B2 | 4/2007 | Hursey et al. |
| 7,228,566 B2 | 6/2007 | Caceres et al. |
| 7,236,598 B2 | 6/2007 | Sheymov et al. |
| 7,237,264 B1 | 6/2007 | Graham et al. |
| 7,266,810 B2 | 9/2007 | Karkare et al. |
| 7,290,276 B2 | 10/2007 | Ogata |
| 7,304,570 B2 | 12/2007 | Thomas et al. |
| 7,305,245 B2 | 12/2007 | Alizadeh-Shabdiz |
| 7,308,256 B2 | 12/2007 | Morota et al. |
| 7,308,712 B2 | 12/2007 | Banzhof |
| 7,325,249 B2 | 1/2008 | Sutton et al. |
| 7,356,835 B2 | 4/2008 | Gancarcik et al. |
| 7,376,969 B1 | 5/2008 | Njemanze et al. |
| 7,386,297 B2 | 6/2008 | An |
| 7,392,043 B2 | 6/2008 | Kouznetsov et al. |
| 7,392,543 B2 | 6/2008 | Szor |
| 7,392,544 B1 | 6/2008 | Pavlyushchik |
| 7,397,424 B2 | 7/2008 | Houri |
| 7,397,434 B2 | 7/2008 | Mun et al. |
| 7,401,359 B2 | 7/2008 | Gartside et al. |
| 7,403,762 B2 | 7/2008 | Morgan et al. |
| 7,414,988 B2 | 8/2008 | Jones et al. |
| 7,415,270 B2 | 8/2008 | Wilhelmsson et al. |
| 7,433,694 B2 | 10/2008 | Morgan et al. |
| 7,467,206 B2 | 12/2008 | Moore et al. |
| 7,471,954 B2 | 12/2008 | Brachet et al. |
| 7,472,422 B1 | 12/2008 | Agbabian |
| 7,474,897 B2 | 1/2009 | Morgan et al. |
| 7,493,127 B2 | 2/2009 | Morgan et al. |
| 7,502,620 B2 | 3/2009 | Morgan et al. |
| 7,515,578 B2 | 4/2009 | Alizadeh-Shabdiz |
| 7,525,541 B2 | 4/2009 | Chun et al. |
| 7,551,579 B2 | 6/2009 | Alizadeh-Shabdiz |
| 7,551,929 B2 | 6/2009 | Alizadeh-Shabdiz |
| 7,634,800 B2 | 12/2009 | Ide et al. |
| 7,685,132 B2 | 3/2010 | Hyman |

(56) References Cited

U.S. PATENT DOCUMENTS

| | | | |
|---|---|---|---|
| 7,696,923 B2 | 4/2010 | Houri | |
| 7,739,682 B1 | 6/2010 | Badenell | |
| 7,768,963 B2 | 8/2010 | Alizadeh-Shabdiz | |
| 7,769,396 B2 | 8/2010 | Alizadeh-Shabdiz et al. | |
| 7,774,637 B1 | 8/2010 | Beddoe et al. | |
| 7,783,281 B1 | 8/2010 | Cook et al. | |
| 7,809,353 B2 | 10/2010 | Brown et al. | |
| 7,809,366 B2 | 10/2010 | Rao et al. | |
| 7,818,017 B2 | 10/2010 | Alizadeh-Shabdiz et al. | |
| 7,835,754 B2 | 11/2010 | Alizadeh-Shabdiz et al. | |
| 7,856,234 B2 | 12/2010 | Alizadeh-Shabdiz et al. | |
| 7,856,373 B2 | 12/2010 | Ullah | |
| 7,861,303 B2 | 12/2010 | Kouznetsov et al. | |
| 7,907,966 B1 | 3/2011 | Mammen | |
| 7,916,661 B2 | 3/2011 | Alizadeh-Shabdiz et al. | |
| 7,991,854 B2 | 8/2011 | Bahl | |
| 7,992,135 B1 | 8/2011 | Wong et al. | |
| 7,999,742 B2 | 8/2011 | Alizadeh-Shabdiz et al. | |
| 8,014,788 B2 | 9/2011 | Alizadeh-Shabdiz et al. | |
| 8,019,357 B2 | 9/2011 | Alizadeh-Shabdiz et al. | |
| 8,031,657 B2 | 10/2011 | Jones et al. | |
| 8,054,219 B2 | 11/2011 | Alizadeh-Shabdiz | |
| 8,087,082 B2 | 12/2011 | Bloch et al. | |
| 8,089,398 B2 | 1/2012 | Alizadeh-Shabdiz | |
| 8,089,399 B2 | 1/2012 | Alizadeh-Shabdiz | |
| 8,090,386 B2 | 1/2012 | Alizadeh-Shabdiz | |
| 8,108,555 B2 | 1/2012 | Awadallah et al. | |
| 8,121,617 B1 | 2/2012 | LaGrotta et al. | |
| 8,126,456 B2 | 2/2012 | Lotter et al. | |
| 8,127,358 B1 | 2/2012 | Lee | |
| 8,135,395 B2 | 3/2012 | Cassett et al. | |
| 8,195,196 B2 | 6/2012 | Haran et al. | |
| 8,259,568 B2 | 9/2012 | Laudermilch et al. | |
| 8,261,351 B1 | 9/2012 | Thornewell et al. | |
| 8,266,288 B2 | 9/2012 | Banerjee et al. | |
| 8,266,324 B2 | 9/2012 | Baratakke et al. | |
| 8,346,860 B2 | 1/2013 | Berg et al. | |
| 8,356,080 B2 | 1/2013 | Luna et al. | |
| 8,364,785 B2 | 1/2013 | Plamondon | |
| 8,806,647 B1 | 8/2014 | Daswani | |
| 2001/0044339 A1 | 11/2001 | Cordero et al. | |
| 2002/0042886 A1 | 4/2002 | Lahti et al. | |
| 2002/0087483 A1 | 7/2002 | Harif | |
| 2002/0108058 A1 | 8/2002 | Iwamura | |
| 2002/0131404 A1* | 9/2002 | Mehta | G06F 8/61 370/352 |
| 2002/0178375 A1* | 11/2002 | Whittaker | G06F 21/52 726/22 |
| 2002/0183060 A1 | 12/2002 | Ko et al. | |
| 2002/0191018 A1 | 12/2002 | Broussard | |
| 2003/0028803 A1 | 2/2003 | Bunker et al. | |
| 2003/0046134 A1 | 3/2003 | Frolick et al. | |
| 2003/0079145 A1 | 4/2003 | Kouznetsov et al. | |
| 2003/0115485 A1 | 6/2003 | Milliken et al. | |
| 2003/0120951 A1 | 6/2003 | Gartside et al. | |
| 2003/0131148 A1 | 7/2003 | Kelley et al. | |
| 2003/0217109 A1 | 11/2003 | Ordille et al. | |
| 2004/0022258 A1 | 2/2004 | Tsukada et al. | |
| 2004/0025042 A1 | 2/2004 | Kouznetsov et al. | |
| 2004/0127196 A1* | 7/2004 | Dabbish | G06F 21/10 455/411 |
| 2004/0133624 A1 | 7/2004 | Park | |
| 2004/0158741 A1 | 8/2004 | Schneider | |
| 2004/0185900 A1 | 9/2004 | McElveen | |
| 2004/0209608 A1 | 10/2004 | Kouznetsov et al. | |
| 2004/0225887 A1 | 11/2004 | O'Neil et al. | |
| 2004/0259532 A1 | 12/2004 | Isomaki et al. | |
| 2005/0010821 A1 | 1/2005 | Cooper et al. | |
| 2005/0015443 A1 | 1/2005 | Levine et al. | |
| 2005/0074106 A1 | 4/2005 | Orlamunder et al. | |
| 2005/0075958 A1* | 4/2005 | Gonzalez | G06Q 20/1085 705/35 |
| 2005/0076246 A1 | 4/2005 | Singhal | |
| 2005/0091308 A1 | 4/2005 | Bookman et al. | |
| 2005/0125779 A1 | 6/2005 | Kelley et al. | |
| 2005/0130627 A1 | 6/2005 | Calmels et al. | |
| 2005/0138395 A1 | 6/2005 | Benco et al. | |
| 2005/0138413 A1 | 6/2005 | Lippmann et al. | |
| 2005/0138450 A1 | 6/2005 | Hsieh | |
| 2005/0154796 A1 | 7/2005 | Forsyth | |
| 2005/0177327 A1* | 8/2005 | Banginwar | G06F 1/3203 702/60 |
| 2005/0186954 A1 | 8/2005 | Kenney | |
| 2005/0197099 A1 | 9/2005 | Nehushtan | |
| 2005/0221800 A1 | 10/2005 | Jackson et al. | |
| 2005/0227669 A1 | 10/2005 | Hapamas | |
| 2005/0237970 A1 | 10/2005 | Inoue | |
| 2005/0240999 A1 | 10/2005 | Rubin et al. | |
| 2005/0254654 A1 | 11/2005 | Rockwell et al. | |
| 2005/0278777 A1 | 12/2005 | Loza | |
| 2005/0282533 A1 | 12/2005 | Draluk et al. | |
| 2006/0010497 A1 | 1/2006 | O'Brien et al. | |
| 2006/0026283 A1 | 2/2006 | Trueba | |
| 2006/0073820 A1 | 4/2006 | Craswell et al. | |
| 2006/0075388 A1 | 4/2006 | Kelley et al. | |
| 2006/0080680 A1 | 4/2006 | Anwar et al. | |
| 2006/0095454 A1 | 5/2006 | Shankar et al. | |
| 2006/0101518 A1 | 5/2006 | Schumaker et al. | |
| 2006/0130145 A1 | 6/2006 | Choi et al. | |
| 2006/0150238 A1 | 6/2006 | D'Agostino | |
| 2006/0150256 A1 | 7/2006 | Fanton et al. | |
| 2006/0174243 A1 | 8/2006 | Brewer et al. | |
| 2006/0179485 A1 | 8/2006 | Longsine et al. | |
| 2006/0217115 A1 | 9/2006 | Cassett et al. | |
| 2006/0218482 A1 | 9/2006 | Ralston et al. | |
| 2006/0224742 A1 | 10/2006 | Shahbazi | |
| 2006/0236325 A1 | 10/2006 | Rao et al. | |
| 2006/0253205 A1 | 11/2006 | Gardiner | |
| 2006/0253584 A1 | 11/2006 | Dixon et al. | |
| 2006/0272011 A1 | 11/2006 | Ide et al. | |
| 2006/0277408 A1 | 12/2006 | Bhat et al. | |
| 2006/0294582 A1 | 12/2006 | Linsley-Hood et al. | |
| 2007/0005327 A1 | 1/2007 | Ferris | |
| 2007/0011319 A1 | 1/2007 | Mcclure et al. | |
| 2007/0015519 A1 | 1/2007 | Casey | |
| 2007/0016953 A1 | 1/2007 | Morris et al. | |
| 2007/0016955 A1 | 1/2007 | Goldberg et al. | |
| 2007/0021112 A1 | 1/2007 | Byrne et al. | |
| 2007/0028095 A1 | 2/2007 | Allen et al. | |
| 2007/0028303 A1 | 2/2007 | Brennan | |
| 2007/0028304 A1 | 2/2007 | Brennan | |
| 2007/0038677 A1 | 2/2007 | Reasor et al. | |
| 2007/0050471 A1 | 3/2007 | Patel et al. | |
| 2007/0067325 A1* | 3/2007 | Weitzner | G06F 9/445 |
| 2007/0078939 A1 | 4/2007 | Kallen | |
| 2007/0086476 A1 | 4/2007 | Iglesias et al. | |
| 2007/0089165 A1 | 4/2007 | Wei et al. | |
| 2007/0090954 A1 | 4/2007 | Mahaffey | |
| 2007/0154014 A1 | 7/2007 | Aissi et al. | |
| 2007/0162975 A1 | 7/2007 | Overton et al. | |
| 2007/0174472 A1 | 7/2007 | Kulakowski | |
| 2007/0174490 A1 | 7/2007 | Choi et al. | |
| 2007/0174915 A1* | 7/2007 | Gribble | G06F 21/53 726/24 |
| 2007/0186282 A1 | 8/2007 | Jenkins | |
| 2007/0190995 A1 | 8/2007 | Wang et al. | |
| 2007/0199060 A1* | 8/2007 | Touboul | G06F 21/562 726/11 |
| 2007/0214504 A1 | 9/2007 | Milani Comparetti et al. | |
| 2007/0220608 A1 | 9/2007 | Lahti et al. | |
| 2007/0240127 A1 | 10/2007 | Rogues et al. | |
| 2007/0240218 A1 | 10/2007 | Tuvell et al. | |
| 2007/0240221 A1 | 10/2007 | Tuvell et al. | |
| 2007/0240222 A1 | 10/2007 | Tuvell et al. | |
| 2007/0248047 A1 | 10/2007 | Shorty et al. | |
| 2007/0250627 A1 | 10/2007 | May et al. | |
| 2007/0293263 A1 | 12/2007 | Eslambolchi et al. | |
| 2007/0297610 A1 | 12/2007 | Chen et al. | |
| 2008/0028470 A1 | 1/2008 | Remington et al. | |
| 2008/0046369 A1 | 2/2008 | Wood | |
| 2008/0046557 A1 | 2/2008 | Cheng | |
| 2008/0047007 A1 | 2/2008 | Satkunanathan et al. | |
| 2008/0049653 A1 | 2/2008 | Demirhan et al. | |
| 2008/0065507 A1 | 3/2008 | Morrison et al. | |

(56) References Cited

U.S. PATENT DOCUMENTS

| | | |
|---|---|---|
| 2008/0070495 A1 | 3/2008 | Stricklen et al. |
| 2008/0072329 A1 | 3/2008 | Herschaft et al. |
| 2008/0086773 A1 | 4/2008 | Tuvell et al. |
| 2008/0086776 A1 | 4/2008 | Tuvell et al. |
| 2008/0109871 A1 | 5/2008 | Jacobs |
| 2008/0120611 A1 | 5/2008 | Aaron |
| 2008/0127171 A1 | 5/2008 | Tarassov |
| 2008/0127179 A1 | 5/2008 | Moss et al. |
| 2008/0127334 A1 | 5/2008 | Gassoway |
| 2008/0127336 A1 | 5/2008 | Sun et al. |
| 2008/0132218 A1 | 6/2008 | Samson et al. |
| 2008/0134281 A1 | 6/2008 | Shinde et al. |
| 2008/0140767 A1 | 6/2008 | Rao et al. |
| 2008/0148381 A1 | 6/2008 | Aaron |
| 2008/0148407 A1* | 6/2008 | Katkar .................. G06F 21/566 726/24 |
| 2008/0172746 A1 | 7/2008 | Lotter et al. |
| 2008/0178294 A1 | 7/2008 | Hu et al. |
| 2008/0181116 A1 | 7/2008 | Kavanaugh et al. |
| 2008/0186162 A1 | 8/2008 | Rajan et al. |
| 2008/0195664 A1* | 8/2008 | Maharajh .......... G06F 17/30035 |
| 2008/0196104 A1 | 8/2008 | Tuvell et al. |
| 2008/0200160 A1 | 8/2008 | Fitzpatrick et al. |
| 2008/0208950 A1 | 8/2008 | Kim et al. |
| 2008/0209557 A1 | 8/2008 | Herley et al. |
| 2008/0209567 A1 | 8/2008 | Lockhart et al. |
| 2008/0235801 A1 | 9/2008 | Soderberg et al. |
| 2008/0276111 A1 | 11/2008 | Jacoby et al. |
| 2008/0293396 A1 | 11/2008 | Barnes et al. |
| 2008/0301231 A1* | 12/2008 | Mehta ....................... G06F 8/61 709/204 |
| 2008/0307243 A1 | 12/2008 | Lee |
| 2008/0318562 A1 | 12/2008 | Featherstone et al. |
| 2009/0172227 A1 | 7/2009 | Taylor et al. |
| 2009/0199298 A1 | 8/2009 | Miliefsky |
| 2009/0205016 A1 | 8/2009 | Milas |
| 2009/0205047 A1 | 8/2009 | Podjarny |
| 2009/0248623 A1 | 10/2009 | Adelman et al. |
| 2009/0293125 A1 | 11/2009 | Szor |
| 2010/0019731 A1 | 1/2010 | Connolly et al. |
| 2010/0064341 A1 | 3/2010 | Aldera |
| 2010/0097494 A1 | 4/2010 | Gum et al. |
| 2010/0100591 A1 | 4/2010 | Mahaffey et al. |
| 2010/0100939 A1 | 4/2010 | Mahaffey et al. |
| 2010/0100959 A1 | 4/2010 | Mahaffey |
| 2010/0100963 A1 | 4/2010 | Mahaffey et al. |
| 2010/0100964 A1 | 4/2010 | Mahaffey et al. |
| 2010/0154032 A1 | 6/2010 | Ollmann |
| 2010/0210240 A1 | 8/2010 | Mahaffey et al. |
| 2010/0240419 A1 | 9/2010 | Horino |
| 2010/0313270 A1 | 12/2010 | Kim et al. |
| 2010/0317324 A1 | 12/2010 | Brown et al. |
| 2010/0332593 A1 | 12/2010 | Barash et al. |
| 2011/0047033 A1 | 2/2011 | Barton et al. |
| 2011/0047594 A1 | 2/2011 | Mahaffey et al. |
| 2011/0047597 A1 | 2/2011 | Barton et al. |
| 2011/0047620 A1 | 2/2011 | Mahaffey et al. |
| 2011/0119765 A1 | 5/2011 | Burgess et al. |
| 2011/0145920 A1 | 6/2011 | Mahaffey et al. |
| 2011/0171923 A1 | 7/2011 | Daly et al. |
| 2011/0241872 A1 | 10/2011 | Mahaffey |
| 2011/0296510 A1 | 12/2011 | Hatlelid et al. |
| 2012/0042382 A1 | 2/2012 | Mahaffey |
| 2012/0060222 A1 | 3/2012 | Burgess et al. |
| 2012/0072569 A1 | 3/2012 | Xu |
| 2012/0084836 A1 | 4/2012 | Mahaffey et al. |
| 2012/0084864 A1 | 4/2012 | Mahaffey et al. |
| 2012/0096555 A1 | 4/2012 | Mahaffey |
| 2012/0110174 A1 | 5/2012 | Wootton et al. |
| 2012/0124239 A1 | 5/2012 | Shribman et al. |
| 2012/0179801 A1 | 7/2012 | Luna et al. |
| 2012/0179814 A1 | 7/2012 | Swildens et al. |
| 2012/0188064 A1 | 7/2012 | Mahaffey et al. |
| 2012/0196571 A1 | 8/2012 | Grkov et al. |
| 2012/0233695 A1 | 9/2012 | Mahaffey et al. |
| 2012/0259954 A1 | 10/2012 | McCarthy et al. |
| 2012/0303735 A1 | 11/2012 | Raciborski et al. |
| 2012/0317233 A1 | 12/2012 | Redpath |
| 2012/0324076 A1 | 12/2012 | Zerr et al. |
| 2012/0324094 A1 | 12/2012 | Wyatt et al. |
| 2012/0324568 A1 | 12/2012 | Wyatt et al. |
| 2013/0019311 A1 | 1/2013 | Swildens et al. |
| 2013/0023209 A1 | 1/2013 | Fisher et al. |
| 2013/0041974 A1 | 2/2013 | Luna et al. |
| 2013/0047034 A1 | 2/2013 | Salomon et al. |
| 2013/0086682 A1 | 4/2013 | Mahaffey et al. |
| 2017/0220782 A1* | 8/2017 | Alsanousi ............. G06F 21/105 |

FOREIGN PATENT DOCUMENTS

| | | |
|---|---|---|
| WO | 2006110181 | 10/2006 |
| WO | 2007081356 | 7/2007 |
| WO | 2008007111 | 1/2008 |
| WO | 2008057737 | 5/2008 |
| WO | 2010048218 | 4/2010 |
| WO | 2010048220 | 4/2010 |
| WO | 2012027588 | 1/2012 |

OTHER PUBLICATIONS

"Sprint—Report that your device is lost or stolen", web page downloaded Apr. 11, 2013 from http://support.sprint.com/support/article/Report_that_your_device_is_lost_or_stolen/case-ba416758-20090629-143222.

"Virgin Media—Phone Lost or Stolen?", web page downloaded Apr. 11, 2013 from http://www.virginmobile.com/vm/ukCoverage.do?contentId=insurance.howdoi.sm283.

PCT International Preliminary Report on Patentability for PCT/US2011/049182; dated Mar. 7, 2013; pp. 1-9.

Sprint Nextel, Mobile Locator, Internet Archive, Way Back Machine, available at http://web.archive.org/web/20080901070835/http://www.nextel.com/en/solutions/gps/mobile_locator.html, 2 pages, Retrieved Jan. 16, 2013.

Sprite Mobile, Sprite Backup, Internet Archive, Way Back Machine, available at http://web.archive.org/web/20080901220103/http://www.spritesoftware.com/?page_id=280, 4 pages, Retrieved Jan. 16, 2013.

Windows Update, Internet Archive, Way Back Machine, available at <http://web.archive.org/web/20071022193017/http://en.wikipedia.org/wiki/Windows_Update> Retrieved Feb. 23, 2011, 3 pages.

Virus Total, VT Community, www.virustotal.com/index.html; dated Dec. 16, 2011; 44 Pages.

Non-Final Office Action dated Dec. 26, 2012 for U.S. Appl. No. 13/160,382, filed Jun. 14, 2011; pp. 1-23.

Notice of Allowance dated Nov. 3, 2011 for U.S. Appl. No. 12/255,632, filed Oct. 21, 2008; pp. 1-5.

Non-Final Office Action dated Mar. 24, 2011 for U.S. Appl. No. 12/255,635, filed Oct. 21, 2008; pp. 1-17.

Final Office Action dated Feb. 1, 2011 for U.S. Appl. No. 12/255,626, filed Oct. 21, 2008; pp. 1-18.

Non-Final Office Action dated Apr. 13, 2011 for U.S. Appl. No. 12/255,621, filed Oct. 21, 2008; pp. 1-7.

Non-Final Office Action dated Apr. 14, 2011 for U.S. Appl. No. 12/255,614, filed Oct. 21, 2008; pp. 1-6.

Trillian, available at http://www.trillian.im/, retrieved on Sep. 14, 2011, published on Oct. 11, 2007, 24 pages.

Teh, Joe, "Norton 360 Version 3.0 Review, "Mar. 9, 2009, Available at <http://techielobang-com/blog/2009/03/09/norton-360-version-30-review/> Retrieved Feb. 23, 2011, 12 pages.

Simone, "Playing with ActiveMQ," Mostly Useless, available at http://www.mostly-useless.com/blog/2007/12/27/playing-with-activemq/, retrieved Mar. 30, 2012, published on Dec. 27, 2007, 6 pages.

Real world Computing, Jun. 16, 2008 (PC Pro), pp. 1-2.

Qualys, "Vulnerability Management," Internet Archive, Way Back Machine, available at <http://web.archive.org/web/20080611095201/www.qualys.com/solutions/vulnerability_management> Retrieved Feb. 24, 2011, 1 page.

(56) References Cited

OTHER PUBLICATIONS

Qualys, "Executive Dashboard," Internet Archive, Way back Machine, availble at <http://web.archive.org/web20080507161417/www.qualys.com/products/screens/?screen=Executive + Dashboard>, retrieved Feb. 23, 2011, 1 page.
Tedeschi, Bob, "In Choosing a New Phone, Online Research Goes Only So Far", The New York Times, Oct. 7, 2009; downloaded Jul. 13, 2013 from http://www.nytimes.com/2009/10/08/technology/personaltech/08smat.html?_r=0.
PCT, "International Search Report and Written Opinion of the International Searching Authority for PCT/US2011/049182", dated Dec. 23, 2011.
PCT "International Search Report and Written Opinion of the International Searching Authority for PCT/US2009/061372", dated Mar. 24, 2010; received on Mar. 29, 2010.
Reardon, Marguerite, "Mobile Phones That Track Your Buddies," Cnet, available at <http://news.cnet.com/Mobile-phones-that-track-your-buddies/2100-1039_3-6135209.html, retrieved Mar. 30, 2012, published on Nov. 14, 2006, 6 pages.
Fette, Ian "Understanding Phishing and Malware Protection in Google Chrome," The Chromium Blog, available at http://blog.chromium.org/2008_11_01_archive.html, retrieved on May 17, 2011, published on Nov. 14, 2008, 6 pages.
Fisher, Oliver, "Malware? We Don't Need No Stinking Malware!", Google, available at http://googlewebmastercentral.blogspot.com/2008/10/malware-we-dont-need-no-stinking.html, retrieved on Mar. 30, 2012, published on Oct. 24, 2008, 11 pages.
McAfee, Internet Archive, Way Back Machine, available at <http://web.archive.org/web/20080611095201/www.qualys.com/solutions/vulnerability_management>retrieved Feb. 24, 2011, 1 page.
Richardson, Alexis, "Introduction to RabbitMQ", Google UK, available at http://www.rabbitmq.com/resources/google-tech-talk-final/alexis-google-rabbitmq-talk.pdf, retrieved on Mar. 30, 2012, 33 pages, published on Sep. 25, 2008.
Diligenti, M., et al. Focused Crawling Using Context Graphs:, Proceedings of the 26th VLDB Conference, Cairo, Egypt, pp. 1-8, available at www.vldb.org/conf/2000/P257.pdf, retrieved on Oct. 21, 2008, published on Sep. 10, 2000.
Dashwire: Manage Your Cell Phone on the Web, News Blog, with Jessica Dolocourt, Oct. 29, 2007, 5:00am PDT <http://news.cnet.com/8301-10784_3-9805657-7.html> retrieved Jun. 15, 2009; pp. 1-3.
Kincaid, Jason "Urban Airship Brings Easy Push Notifications to Android," TechCrunch, available at http://techcrunch.com/2010/08/10/urban-airship-brings-easy-push-notifications-to-android/, retrieved on Jun. 16, 2011, published on Aug. 10, 2010, 5 pages.
Amazon.com: Mining the Web Discovering Knowledge from Hypertext Data (9781558607545): Soumen Chakrabarti: Books, Amazon available at http://www.amazon.com/exec/obidos/ASIN/1558607544/, retrieved on Jun. 7, 2012, published on Dec. 13, 2001, pp. 1-7.
"ZVeloDB URL Database," zVelo, available at https://zvelo.com/technology/zvelodb-url-database, retrieved Mar. 30, 2012, published on Jan. 21, 2012, 2 pages.
"Urban Airship: Powering Modern Mobile," available at http://urbanairship.com/products/, retrieved on Sep. 16, 2011, published on Feb. 19, 2010, 14 pages.
"Understanding Direct Push," Microsoft, Feb. 18, 2009, available at http://technet.microsoft.com/en-us/library/aa997252(v=exchg.80).aspx, retrieved on Mar. 30, 2012, published on Feb. 18, 2009, 3 pages.
"Twilio Cloud Communications Web Service API for Building Voice and SMS Applications," Twilio, available at http://www.twilio.com, retrieved Sep. 14, 2011, published on Jun. 5, 2008, 12 pages.
Pogue, David "Simplifying the Lives of Web Users," The New York Times, available at http://www.nytimes.com/2010/08/19/technology/personaltech/19pogue.html, retrieved May 17, 2011, Published on Aug. 18, 2010, 5 pages.

"Pidgin the Universal Chat Client," Pidign, available at http://www.pidgin.im/, retrieved Sep. 14, 2011, published on May 1, 2007, 14 pages.
Mytton, David "How to Build an Apple Push Notification Provider Server (Tutorial)," Server Density, available at http://blog.serverdensity.com/2009/07/10/how-to-build-an-apple-push-notification-provider-server-tutorial/, retrieved on Apr. 2, 2012, published on Jul. 10, 2009, 33 pages.
"Hooking—Wikipedia, the Free Encyclopedia," Wikipedia, available at http://web.archive.org/web/20100415154752/http://en.wikipedia.org/wiki/Hooking, retrieved Mar. 30, 2012, published on Apr. 15, 2010, 6 pages.
"Get the Physical Location of Wireless Router From its MAC Address (BSSID)," Coderrr, available at http://coderrr.wordpress.com/2008/09/10/get-the-physical-location-of-wireless-router-from-its-mac-address-bssid/, retrieved on Mar. 30, 2012, published on Sep. 12, 2008, 13 pages.
"ESoft unveils SiteFilter 3.0 for OEMs," Infosecurity, Mar. 23, 2010, available at http://www.infosecurity-magazine.com/view/8273/esoft-unveils-sitefilter-30-for-oems/, retrieved on Mar. 30, 2012, published on Mar. 23, 2010, 2 pages.
"BlackBerry Push Service Overview," available at http://us.blackberry.com/developers/platform/pushapi.sp#tab_tab_resources, retrieved on Sep. 14, 2011, published on Nov. 6, 2010, 21 pages.
"Android Cloud to Device Messaging Framework," Google Code Labs, available at http://code.google.com/android/c2dm/, retrieved on Sep. 14, 2011, published on Apr. 11, 2011, 9 pages.
Summerson, Cameron "5 Android Antivirus Apps Compared, Find Out Which Ones Are Worth Having!," Android Headlines, available at http://androidheadlines.com/2011/03/5-android-antivirus-apps-comapred-find-out-which-ones-are-worth-having.html, retrieved on Mar. 30, 2012, published on Mar. 8, 2011, 9 pages.
TippingPoint "TippingPoint Security Management System (SMS)", available at http://www.tippingpoint.com/products_sms.html, retrieved on Oct. 21, 2008, published on Mar. 31, 2005, 2 pages.
Symantec, "Symantec Mobile Security Suite for Windows Mobile, Data Sheet and Product Screen Shot", available at http://www.symantec.com/norton/smartphone_security, retrieved on Oct. 21, 2008, published on Mar. 1, 2008.
Keane, Justin K. "Using the Google Safe Browsing API from PHP," Mad Irish, Aug. 7, 2009, available at http://www.madirish.net/node/245, retrieved Mar. 30, 2012, published on Aug. 7, 2009, 5 pages.
Jefferies, Charles P. "Webroot AntiVirus 2010 With Spy Sweeper Review," Notebook Review, available at http://www.notebookreview.com/default.asp?newsID=5700&review=Webroot+AntiVirus+2010+With+Spy+Sweeper+Review, retrieved on May 18, 2011, published on Jun. 22, 2010, 3 pages.
Kaspersky "Kaspersky Mobile Security", available at http://usa.kaspersky.com/products-services/home-computer-security, published on Jan. 1, 2007, retrieved on Oct. 21, 2008.
U.S. Appl. No. 15/393,089, entitled "Methods and Systems for Sharing Risk Responses to Improve the Functioning of Mobile Communications Devices," filed Dec. 28, 2016, now U.S. Pat. No. 9,779,253.
U.S. Appl. No. 15/498,325, entitled "System and Method for Assessing Data Objects on Mobile Communications Devices," filed Apr. 26, 2017, now U.S. Pat. No. 9,860,263.
U.S. Appl. No. 14/973,636, entitled "Methods and Systems for Sharing Risk Responses Between Collections of Mobile Communications Devices," filed Dec. 17, 2015, now U.S. Pat. No. 9,781,148.
U.S. Appl. No. 14/473,917, entitled "Security Status Assessment Using Mobile Device Security Information Database," filed Aug. 29, 2014, now U.S. Pat. No. 9,245,119.
U.S. Appl. No. 13/790,402, entitled "Event-Based Security State Assessment and Display for Mobile Devices," filed Mar. 8, 2013, now U.S. Pat. No. 8,826,441.
U.S. Appl. No. 13/267,731, entitled "Security Status and Information Display System," filed Oct. 6, 2011, now U.S. Pat. No. 8,510,843.
U.S. Appl. No. 12/255,635, entitled "Security Status and Information Display System," filed Oct. 21, 2008, now U.S. Pat. No. 8,060,936.

(56) References Cited

OTHER PUBLICATIONS

U.S. Appl. No. 14/634,115, entitled "Assessing a Security State of a Mobile Communications Device to Determine Access to Specific Tasks," filed Feb. 27, 2015, now U.S. Pat. No. 9,407,640.
U.S. Appl. No. 14/034,320, entitled "Assessing the Security State of a Mobile Communication Device," filed Sep. 23, 2013, now U.S. Pat. No. 8,997,181.
U.S. Appl. No. 13/742,110, entitled "Enforcing Security Based on a Security State Assessment of a Mobile Device," filed Jan. 15, 2013, now U.S. Pat. No. 8,561,144.
U.S. Appl. No. 13/314,032, entitled "Providing Access Levels to Services Based on Mobile Device Security State," filed Dec. 7, 2011, now U.S. Pat. No. 8,365,252.
U.S. Appl. No. 12/255,632, entitled "Secure Mobile Platform System," filed Oct. 21, 2008, now U.S. Pat. No. 8,087,067.
U.S. Appl. No. 14/455,787, entitled "System and Method for Attack and Malware Prevention," filed Aug. 8, 2014, now U.S. Pat. No. 9,223,973.
U.S. Appl. No. 13/741,988, entitled "Evaluating Whether Data is Safe or Malicious," filed Jan. 15, 2013, now U.S. Pat. No. 8,881,292.
U.S. Appl. No. 13/333,654, entitled "System and Method for Attack and Malware Prevention," filed Dec. 21, 2011, now U.S. Pat. No. 8,381,303.
U.S. Appl. No. 12/255,621, entitled "System and Method for Attack and Malware Prevention," filed Oct. 21, 2008, now U.S. Pat. No. 8,108,933.
U.S. Appl. No. 14/318,450, entitled "System and Method for Creating and Applying Categorization-Based Policy to Secure a Mobile Communications Device From Access to Certain Data Objects," filed Jun. 27, 2014, now U.S. Pat. No. 9,294,500.
U.S. Appl. No. 13/689,588, entitled "System and Method for Preventing Malware on a Mobile Communication Device," filed Nov. 29, 2012, now U.S. Pat. No. 8,875,289.
U.S. Appl. No. 12/868,669, entitled "System and Method for Server-Coupled Malware Prevention," filed Aug. 25, 2010, now U.S. Pat. No. 8,347,386.
U.S. Appl. No. 14/688,292, entitled "System and Method for Assessing an Application Based on Data From Multiple Devices," filed Apr. 16, 2015, now U.S. Pat. No. 9,344,431.
U.S. Appl. No. 13/958,434, entitled "Assessing an Application Based on Application Data Associated With the Application," filed Aug. 2, 2013, now U.S. Pat. No. 9,100,389.
U.S. Appl. No. 12/868,672, entitled "System and Method for Security Data Collection and Analysis," filed Aug. 25, 2010, now U.S. Pat. No. 8,533,844.
U.S. Appl. No. 13/896,852, entitled "System and Method for Assessing an Application to Be Installed on a Mobile Communication Device," filed May 17, 2013, now U.S. Pat. No. 9,740,852.
U.S. Appl. No. 12/868,676, entitled "System and Method for Mobile Communication Device Application Advisement," filed Aug. 25, 2010, now U.S. Pat. No. 9,367,680.
U.S. Appl. No. 14/611,063, entitled "System and Method for Identifying a Mobile Application Likely to Adversely Affect Network Performance," filed Jan. 30, 2015.
U.S. Appl. No. 13/033,025, entitled "System and Method for Adverse Mobile Application Identification," filed Feb. 23, 2011, now U.S. Pat. No. 8,984,628.
U.S. Appl. No. 13/335,779, entitled "System and Method for a Scanning API," filed Dec. 22, 2011, now U.S. Pat. No. 9,235,704.
U.S. Appl. No. 14/692,669, entitled "Comparing Applications and Assessing Differences," filed Apr. 21, 2015, now U.S. Pat. No. 9,563,749.
U.S. Appl. No. 13/484,132, entitled "Crawling Multiple Markets and Correlating," filed May 30, 2012, now U.S. Pat. No. 9,043,919.
U.S. Appl. No. 13/313,937, entitled "System and Method for a Mobile Cross-Platform Software System," filed Dec. 7, 2011, now U.S. Pat. No. 8,271,608.
U.S. Appl. No. 12/255,626, entitled "System and Method for a Mobile Cross-Platform Software System," filed Oct. 21, 2008, now U.S. Pat. No. 8,099,472.
U.S. Appl. No. 13/742,173, entitled "Server-Assisted Analysis of Data for a Mobile Device," filed Jan. 15, 2013, now U.S. Pat. No. 8,683,593.
U.S. Appl. No. 13/284,248, entitled "System and Method for Monitoring and Analyzing Multiple Interfaces and Multiple Protocols," filed Oct. 28, 2011, now U.S. Pat. No. 8,505,095.
U.S. Appl. No. 13/919,901, entitled "Analyzing Data Gathered Through Different Protocols," filed Jun. 17, 2013, now U.S. Pat. No. 9,065,846.
U.S. Appl. No. 12/255,614, entitled "System and Method for Monitoring and Analyzing Multiple Interfaces and Multiple Protocols," filed Oct. 21, 2008, now U.S. Pat. No. 8,051,480.
U.S. Appl. No. 13/461,984, entitled "System and Method for Server-Coupled Application Re-Analysis to Obtain Trust, Distribution and Ratings Assessment," filed May 2, 2012, now U.S. Pat. No. 8,752,176.
U.S. Appl. No. 13/461,054, entitled "System and Method for Server-Coupled Application Re-Analysis to Obtain Characterization Assessment," filed May 1, 2012, now U.S. Pat. No. 8,745,739.
U.S. Appl. No. 13/460,549, entitled "System and Method for Server-Coupled Application Re-Analysis," filed Apr. 30, 2012, now U.S. Pat. No. 8,544,095.

\* cited by examiner

| From: | Flexilis [team@flexilis.com] | | Sent: | Tue 10/7/2008 8:36 PM |
| To: | | | | |
| Cc: | | | | |
| Subject: | Daily Security Update | | | |

Your Daily Update
As of Tuesday, October 07 @ 08:36 PM

✦ flexilis

Your device: 621 — (323) 393-5555

⊠ Check Your Protection! —611
ⓘ Attack Protection is disabled.

Data protected: 623 — 338 items
25.6 MB

615
⊠ Flexilis handled 14 security events

Go to my home page
625

📄 Virus scan complete: Scanned 4878 files(s), found 0 infected file(s), quarantined 0 file(s). — 617

✉ You received 1 message. — 619

You are receiving this email to keep you updated on your device's security. You can change your email preferences by logging into your account.

Measure similarity between first metadata describing first application and second metadata describing second application
6210

If the similarity is within a threshold degree of similarity, compare the first application with the second application to identify differences between the applications
6215

Identify at least one difference between the first and second application
6220

Based on the identified at least one difference and the degree of similarity, determine that one of the first or second applications is a counterfeit of the other first or second applications
6225

FIG. 62

METHODS AND SYSTEMS FOR BLOCKING THE INSTALLATION OF AN APPLICATION TO IMPROVE THE FUNCTIONING OF A MOBILE COMMUNICATIONS DEVICE

CROSS-REFERENCE TO RELATED APPLICATIONS

The present application is a continuation of U.S. patent application Ser. No. 15/393,089, entitled "METHODS AND SYSTEMS FOR SHARING RISK RESPONSES TO IMPROVE THE FUNCTIONING OF MOBILE COMMUNICATIONS DEVICES," filed on Dec. 28, 2016, which is a continuation of U.S. patent application Ser. No. 14/973,636, entitled "METHODS AND SYSTEMS FOR SHARING RISK RESPONSES BETWEEN COLLECTIONS OF MOBILE COMMUNICATIONS DEVICES," filed on Dec. 17, 2015, which are all incorporated by reference in their entirety.

U.S. patent application Ser. No. 14/973,636, entitled "METHODS AND SYSTEMS FOR SHARING RISK RESPONSES BETWEEN COLLECTIONS OF MOBILE COMMUNICATIONS DEVICES," filed on Dec. 17, 2015, is a continuation-in-part of: U.S. patent application Ser. No. 14/473,917, entitled "SECURITY STATUS ASSESSMENT USING MOBILE DEVICE SECURITY INFORMATION DATABASE," filed on Aug. 29, 2014, now U.S. Pat. No. 9,245,119, which is a continuation of U.S. patent application Ser. No. 13/790,402, entitled "EVENT-BASED SECURITY STATE ASSESSMENT AND DISPLAY FOR MOBILE DEVICES," filed on Mar. 8, 2013, now U.S. Pat. No. 8,826,441, which is a continuation of U.S. patent application Ser. No. 13/267,731, entitled "SECURITY STATUS AND INFORMATION DISPLAY SYSTEM," filed on Oct. 6, 2011, now U.S. Pat. No. 8,510,843, which is a continuation of U.S. patent application Ser. No. 12/255,635, entitled "SECURITY STATUS AND INFORMATION DISPLAY SYSTEM," filed on Oct. 21, 2008, now U.S. Pat. No. 8,060,936, which are all incorporated by reference in their entirety. U.S. patent application Ser. No. 14/973,636, entitled "METHODS AND SYSTEMS FOR SHARING RISK RESPONSES BETWEEN COLLECTIONS OF MOBILE COMMUNICATIONS DEVICES," filed on Dec. 17, 2015, is also a continuation-in-part of U.S. patent application Ser. No. 14/634,115, entitled "ASSESSING A SECURITY STATE OF A MOBILE COMMUNICATIONS DEVICE TO DETERMINE ACCESS TO SPECIFIC TASKS," filed on Feb. 27, 2015, now U.S. Pat. No. 9,407,640, which is a continuation of U.S. patent application Ser. No. 14/034,320, entitled "ASSESSING THE SECURITY STATE OF A MOBILE COMMUNICATION DEVICE," filed on Sep. 23, 2013, now U.S. Pat. No. 8,997,181, which is a continuation of U.S. patent application Ser. No. 13/742,110, entitled "ENFORCING SECURITY BASED ON A SECURITY STATE ASSESSMENT OF A MOBILE DEVICE," filed on Jan. 15, 2013, now U.S. Pat. No. 8,561,144, which is a continuation of U.S. patent application Ser. No. 13/314,032, entitled "PROVIDING ACCESS LEVELS TO SERVICES BASED ON MOBILE DEVICE SECURITY STATE," filed on Dec. 7, 2011, now U.S. Pat. No. 8,365,252, which is a continuation of U.S. patent application Ser. No. 12/255,632, entitled "SECURE MOBILE PLATFORM SYSTEM," filed on Oct. 21, 2008, now U.S. Pat. No. 8,087,067, which are all incorporated by reference in their entirety. U.S. patent application Ser. No. 14/973,636, entitled "METHODS AND SYSTEMS FOR SHARING RISK RESPONSES BETWEEN COLLECTIONS OF MOBILE COMMUNICATIONS DEVICES," filed on Dec. 17, 2015, is also a continuation-in-part of U.S. patent application Ser. No. 14/455,787, entitled "SYSTEM AND METHOD FOR ATTACK AND MALWARE PREVENTION," filed on Aug. 8, 2014, now U.S. Pat. No. 9,223,973, which is a continuation of U.S. patent application Ser. No. 13/741,988, entitled "EVALUATING WHETHER DATA IS SAFE OR MALICIOUS," filed on Jan. 15, 2013, now U.S. Pat. No. 8,881,292, which is a continuation of U.S. patent application Ser. No. 13/333,654, entitled "SYSTEM AND METHOD FOR ATTACK AND MALWARE PREVENTION," filed on Dec. 21, 2011, now U.S. Pat. No. 8,381,303, which is a continuation of U.S. patent application Ser. No. 12/255,621, entitled "SYSTEM AND METHOD FOR ATTACK AND MALWARE PREVENTION," filed on Oct. 21, 2008, now U.S. Pat. No. 8,108,933, which are all incorporated by reference in their entirety. U.S. patent application Ser. No. 14/973,636, entitled "METHODS AND SYSTEMS FOR SHARING RISK RESPONSES BETWEEN COLLECTIONS OF MOBILE COMMUNICATIONS DEVICES," filed on Dec. 17, 2015, is also a continuation-in-part of U.S. patent application Ser. No. 14/318,450, entitled "SYSTEM AND METHOD FOR CREATING AND APPLYING CATEGORIZATION-BASED POLICY TO SECURE A MOBILE COMMUNICATIONS DEVICE FROM ACCESS TO CERTAIN DATA OBJECTS," filed on Jun. 27, 2014, now U.S. Pat. No. 9,294,500, which is a continuation of U.S. patent application Ser. No. 13/689,588, entitled "SYSTEM AND METHOD FOR PREVENTING MALWARE ON A MOBILE COMMUNICATION DEVICE," filed on Nov. 29, 2012, now U.S. Pat. No. 8,875,289, which is a continuation of U.S. patent application Ser. No. 12/868,669, entitled "SYSTEM AND METHOD FOR SERVER-COUPLED MALWARE PREVENTION," filed on Aug. 25, 2010, now U.S. Pat. No. 8,347,386, which is a continuation-in-part of U.S. patent application Ser. No. 12/255,621, entitled "SYSTEM AND METHOD FOR ATTACK AND MALWARE PREVENTION," filed on Oct. 21, 2008, now U.S. Pat. No. 8,108,933, which are all incorporated by reference in their entirety. U.S. patent application Ser. No. 14/973,636, entitled "METHODS AND SYSTEMS FOR SHARING RISK RESPONSES BETWEEN COLLECTIONS OF MOBILE COMMUNICATIONS DEVICES," filed on Dec. 17, 2015, is also a continuation-in-part of U.S. patent application Ser. No. 14/688,292, entitled "SYSTEM AND METHOD FOR ASSESSING AN APPLICATION BASED ON DATA FROM MULTIPLE DEVICES," filed on Apr. 16, 2015, now U.S. Pat. No. 9,344,431, which is a continuation of U.S. patent application Ser. No. 13/958,434, entitled "ASSESSING AN APPLICATION BASED ON APPLICATION DATA ASSOCIATED WITH THE APPLICATION," filed on Aug. 2, 2013, now U.S. Pat. No. 9,100,389, which is a continuation of U.S. patent application Ser. No. 12/868,672, entitled "SYSTEM AND METHOD FOR SECURITY DATA COLLECTION AND ANALYSIS," filed on Aug. 25, 2010, now U.S. Pat. No. 8,533,844, which is a continuation-in-part of U.S. patent application Ser. No. 12/255,621, entitled "SYSTEM AND METHOD FOR ATTACK AND MALWARE PREVENTION," filed on Oct. 21, 2008, now U.S. Pat. No. 8,108,933, which are all incorporated by reference in their entirety. U.S. patent application Ser. No. 14/973,636, entitled "METHODS AND SYSTEMS FOR SHARING RISK RESPONSES BETWEEN COLLECTIONS OF MOBILE COMMUNICATIONS DEVICES," filed on Dec. 17, 2015, is also a continuation-in-part of U.S. patent application Ser. No. 13/896,852, entitled "SYSTEM AND METHOD FOR ASSESSING AN APPLICATION TO BE INSTALLED ON A MOBILE COMMUNICATION DEVICE," filed on May 17, 2013, which is a continuation of U.S. patent application Ser. No. 12/868,676, entitled "SYSTEM AND METHOD FOR MOBILE COMMUNICATION DEVICE APPLICATION ADVISEMENT," filed on Aug. 25, 2010, now U.S. Pat. No. 9,367,680, which is a continuation-in-part of U.S. patent application Ser. No. 12/255,621, entitled "SYSTEM AND METHOD FOR ATTACK AND MALWARE PREVENTION," filed on Oct. 21, 2008, now U.S. Pat. No. 8,108,933, which are all incorporated by reference in their entirety. U.S. patent application Ser. No. 14/973,636, entitled "METHODS AND SYSTEMS FOR SHARING RISK RESPONSES BETWEEN COLLECTIONS OF MOBILE COMMUNICATIONS DEVICES," filed on Dec. 17, 2015, is also a continuation-in-part of U.S. patent application Ser. No. 14/611,063, entitled "SYSTEM AND METHOD FOR IDENTIFYING A MOBILE APPLICATION LIKELY TO ADVERSELY AFFECT NETWORK PERFORMANCE," filed on Jan. 30, 2015, which is a continuation of U.S. patent application Ser. No. 13/033,025, entitled "SYSTEM AND METHOD FOR ADVERSE MOBILE APPLICATION IDENTIFICATION," filed on Feb. 23, 2011, now U.S. Pat. No. 8,984,628, which is a continuation-in-part of U.S. patent application Ser. No. 12/868,669, entitled "SYSTEM AND METHOD FOR SERVER-COUPLED MALWARE PREVENTION," filed on Aug. 25, 2010, now U.S. Pat. No. 8,347,386, which is a continuation-in-part of U.S. patent application Ser. No. 12/255,621, entitled "SYSTEM AND METHOD FOR ATTACK AND MALWARE PREVENTION," filed on Oct. 21, 2008, now U.S. Pat. No. 8,108,933, which are all incorporated by reference in their entirety. U.S. patent application Ser. No. 14/973,636, entitled "METHODS AND SYSTEMS FOR SHARING RISK RESPONSES BETWEEN COLLECTIONS OF MOBILE COMMUNICATIONS DEVICES," filed on Dec. 17, 2015, is also a continuation-in-part of U.S. patent application Ser. No. 13/335,779, entitled "SYSTEM AND METHOD FOR A SCANNING API," filed on Dec. 22, 2011, now U.S. Pat. No. 9,235,704, which is a continuation-in-part of U.S. patent application Ser. No. 12/868,676, entitled "SYSTEM AND METHOD FOR MOBILE COMMUNICATION DEVICE APPLICATION ADVISEMENT," filed on Aug. 25, 2010, now U.S. Pat. No. 9,367,680, which is a continuation-in-part of U.S. patent application Ser. No. 12/255,621, entitled "SYSTEM AND METHOD FOR ATTACK AND MALWARE PREVENTION," filed on Oct. 21, 2008, now U.S. Pat. No. 8,108,933, which are all incorporated by reference in their entirety. U.S. patent application Ser. No. 14/973,636, entitled "METHODS AND SYSTEMS FOR SHARING RISK RESPONSES BETWEEN COLLECTIONS OF MOBILE COMMUNICATIONS DEVICES," filed on Dec. 17, 2015, is also a continuation-in-part of U.S. patent application Ser. No. 14/692,669, entitled "COMPARING APPLICATIONS AND ASSESSING DIFFERENCES," filed on Apr. 21, 2015, which is a divisional of U.S. application Ser. No. 13/484,132, entitled "CRAWLING MULTIPLE MARKETS AND CORRELATING," filed on May 30, 2012, now U.S. Pat. No. 9,043,919, which is a continuation-in-part of U.S. patent application Ser. No. 12/868,672, entitled "SYSTEM AND METHOD FOR SECURITY DATA COLLECTION AND ANALYSIS," filed on Aug. 25, 2010, now U.S. Pat. No. 8,533,844, which is a continuation-in-part of U.S. patent application Ser. No. 12/255,621, entitled "SYSTEM AND METHOD FOR ATTACK AND MALWARE PREVENTION," filed on Oct. 21, 2008, now U.S. Pat. No. 8,108,933, which are all incorporated by reference in their entirety.

The present application is related to the following U.S. patent applications: U.S. patent application Ser. No. 15/498,325, entitled "SYSTEM AND METHOD FOR ASSESSING DATA OBJECTS ON MOBILE COMMUNICATIONS DEVICES," filed on Apr. 26, 2017; U.S. patent application Ser. No. 13/313,937, entitled "SYSTEM AND METHOD FOR A MOBILE CROSS-PLATFORM SOFTWARE SYSTEM," filed on Dec. 7, 2011, now U.S. Pat. No. 8,271,608, which is a continuation of U.S. patent application Ser. No. 12/255,626, entitled "SYSTEM AND METHOD FOR A MOBILE CROSS-PLATFORM SOFTWARE SYSTEM," filed on Oct. 21, 2008, now U.S. Pat. No. 8,099,472; U.S. patent application Ser. No. 13/742,173, entitled "SERVER-ASSISTED ANALYSIS OF DATA FOR A MOBILE DEVICE," filed on Jan. 15, 2013, now U.S. Pat. No. 8,683,593; U.S. patent application Ser. No. 13/284,248, entitled "SYSTEM AND METHOD FOR MONITORING AND ANALYZING MULTIPLE INTERFACES AND MULTIPLE PROTOCOLS," filed on Oct. 28, 2011, now U.S. Pat. No. 8,505,095; U.S. patent application Ser. No. 13/919,901, entitled "ANALYZING DATA GATHERED THROUGH DIFFERENT PROTOCOLS," filed on Jun. 17, 2013, now U.S. Pat. No. 9,065,846, which is a continuation of U.S. patent application Ser. No. 12/255,614, entitled "SYSTEM AND METHOD FOR MONITORING AND ANALYZING MULTIPLE INTERFACES AND MULTIPLE PROTOCOLS," filed on Oct. 21, 2008, now U.S. Pat. No. 8,051,480; U.S. patent application Ser. No. 13/461,984, entitled "SYSTEM AND METHOD FOR SERVER-COUPLED APPLICATION RE-ANALYSIS TO OBTAIN TRUST, DISTRIBUTION AND RATINGS ASSESSMENT," filed on May 2, 2012, now U.S. Pat. No. 8,752,176; U.S. patent application Ser. No. 13/461,054, entitled "SYSTEM AND METHOD FOR SERVER-COUPLED APPLICATION RE-ANALYSIS TO OBTAIN CHARACTERIZATION ASSESSMENT," filed on May 1, 2012, now U.S. Pat. No. 8,745,739; and U.S. patent application Ser. No. 13/460,549, entitled "SYSTEM AND METHOD FOR SERVER-COUPLED APPLICATION RE-ANALYSIS," filed on Apr. 30, 2012, now U.S. Pat. No. 8,544,095; which are all incorporated by reference in their entirety.

TECHNICAL FIELD

This disclosure relates generally to network security, and more specifically, to the sharing of risk information and to evaluating the origins of access requests.

BACKGROUND OF THE INVENTION

Mobile devices such as cell phones and personal digital assistants (PDAs) can be attacked by exploits or viruses that are specifically adapted for the mobile environment. Exploits can take advantage of security vulnerabilities associated with a mobile device in order to execute malicious code or perform undesired actions on the device. Potentially, exploits can bypass permissions or policies set by the user, manufacturer, operating system, or mobile operator and give the attacker complete control of the device. Mobile viruses are typically spread by downloading infected programs or files. Some viruses only become active if the recipient chooses to accept the virus file and run it on the mobile device. Other viruses, when combined with exploits, are self-propagating worms that may not need user intervention in order to spread, potentially creating a very severe and widespread security problem.

Devices may be compromised by viruses and exploits over wide area networks, such as the Internet or a cellular network, and local wireless networks, such as Wi-Fi or Bluetooth. For example, some devices which are equipped with Bluetooth allow other nearby Bluetooth-enabled devices to transfer files or other data such as contact information. Bluetooth-enabled devices that are infected with viruses often search for nearby devices that are in "discoverable" mode. When an infected device discovers a target, it may send a virus disguised as a security update or another item designed to fool the target device's user into accepting the transfer and executing the virus. If a virus were to utilize an exploit instead of disguising itself in order to get a target user to accept the file transfer, a device which is in "discoverable" mode could become infected without the user being able to intervene.

In addition to being able to propagate viruses, exploits may be able to directly perform malicious actions on vulnerable devices. Such exploits may be used by attackers to steal information, charge money to the target device's phone bill, or prevent a device from functioning properly. Although vulnerabilities which take advantage of exploits may be fixed if the software vendor responsible for the vulnerability provides a patch or firmware upgrade, such fixes are often costly and time consuming to release and difficult for users or IT organizations to apply.

It is important that both individual users and IT organization be able to verify that their security protection is functioning properly and be aware of the security state of their devices so as to be able to remediate or investigate issues as early as possible. If a device or group of devices has a security problem or has recently been attacked, the user or administrator responsible may not immediately know because mobile devices and existing solutions may not continuously present security status information and attempt to push important events to users and administrators.

What is needed is a system and method for identifying, reporting, and preventing mobile security problems and for providing security information concerning the state of a mobile device or group of mobile devices to a user or administrator. The system and method should keep users or administrators continuously aware of security status, recent security-related events, and potential security threats without requiring them to repeatedly seek out security-related information.

Because of inherent security concerns, mobile communications devices such as mobile phones, PDAs, and smartphones have yet to provide the same breadth of trusted connectivity found on desktop and laptop computer platforms. For example, mobile device users are less likely to access confidential information and/or perform financial transactions with a mobile communications device because such devices are not sufficiently secure. Similarly, service providers such as banks, online payment services and providers of confidential information are less likely to offer access to their services through mobile communications devices. As a result, mobile communications device users are limited by the types and availability of many online services. This is because present methods for securing mobile communications devices do not contemplate many ways users may wish to access online services and online service providers, and are therefore inadequate for providing a secure platform for access to and from online services or service providers.

Previous methods for securing mobile communications devices focus on an all-or-nothing approach. Access to or from the mobile device is either granted or not granted based upon whether the device meets certain standards, possesses certain configurations, or adheres to certain policy rules. If the device passes these standards, access is granted. If the device is deficient in any way, access is denied. Such an approach does not consider the types or levels of access required by certain service providers, nor does this approach contemplate the security and repair capabilities of the device itself. Indeed, prior art security systems and methods ignore the recent activity of the mobile device in relation to its overall security state. Furthermore, prior art security systems are typically limited to authorizing access to a given network, making them unsuitable for controlling access and access levels to services and service providers based on a device's security state.

What is therefore needed is a system and method for providing security for mobile communications devices that considers the security state of the device and provides a platform for integrating with services and service providers.

The mobile market has grown significantly in the last few years. As new mobile communications devices come to market, each offers new sets of hardware features that are attractive and useful to consumers. Unfortunately, software development for mobile communications devices has not kept pace with hardware development. This is because each mobile communications device will often use a different operating system, software platform, or set of application program interfaces ("APIs"), even if each mobile communications device is made from the same manufacturer. Additionally, each mobile communications service provider or carrier will often customize the performance, configuration, and interface for each device that it services. As a result, there is wide divergence between the software platforms and software development for mobile communications devices.

In order to unify the different software platforms available for mobile communications devices in a market where there are numerous manufacturers and providers, there has been some effort to develop cross-platform solutions. Cross-platform refers to operating systems or software applications that are designed to work on multiple platforms without requiring significant changes to the underlying software code. In general, cross-platform architecture is more common and more easily implemented on desktop computing platforms due to the availability of memory and processing resources and the standardization of interfaces on each type of platform. Desktop cross-platform systems do not transfer well to mobile devices that lack these resources. Instead, cross-platform developers will sacrifice or adopt different methodologies in order to provide a system that is powerful enough to handle different applications across as many platforms as possible, while maintaining a low memory footprint.

The typical cross-platform system will comprise a component or module that is platform-independent, a component or module that is platform-specific, and an abstraction layer that may be utilized by either of the other components. These components or modules are generally software-based, but are designed to incorporate the commonalities and unique differences of the hardware upon which they are installed. Each component will communicate with others using its own API. This presents a problem in not having a uniform API for developers to use. In order to provide compatibility on as many devices as possible, developers will abstract the underlying platform such that the various differences are not apparent. For example, the abstraction layer's API is often designed to be general and non-specific to the platform upon which it operates or the functionality it is being used to implement. Additionally or alternatively, the cross-platform system may incorporate a powerful all-inclusive abstraction layer that provides some functionality that is duplicated between platforms, thereby implementing a general, multi-purpose layer. As such, the "powerful" abstraction layer is designed to account for all of the different features and desired functionalities implemented by utilizing that layer. While in theory, this provides some cross-platform features for arbitrary types of software, in reality, low-level features that require full integration with a device's operating system are ignored, since this type of abstraction layer design tends to isolate platform-specific and platform-independent components. Further, building such an all-inclusive abstraction layer requires a large body of software code, which can be difficult to manage when maintaining platform abstraction layers for different platforms. What is therefore needed is a way to develop and build a cross-platform system that provides both high and low-level mobile device integration without taxing mobile device resources. What is further needed is a cross-platform system that may be implemented on any mobile communications device, regardless of manufacturer or service provider. What is also needed is a more lightweight abstraction layer that does not compromise power or functionality.

Because of the design of previous cross-platform systems and methods, the testing or quality assurance ("QA") of these systems is tedious and difficult. Each platform-specific component must be tested. Changes to the code for the different components require writing new testing code to evaluate these new changes. What is therefore needed is a more efficient way to test the cross-platform system.

Currently, there are multiple mobile device operating systems that each cannot run software built for other operating systems. As such, developers must build software specifically for a mobile device operating system, and therefore the mobile software market is said to be "fragmented." Recently, there has been some effort to create common operating system environments for emerging mobile communications devices. For example, Google® and the Mobile Handset Alliance. have developed a mobile communications device platform and operating system called Android™. Other common operating systems such as Windows Mobile®, Apple iPhone™, Research in Motion's Blackberry®, and Symbian® also exist. While using a common operating system is an effective solution to reduce fragmentation, it is unlikely to eliminate the problem. As long as there are multiple platforms that have significant market-share, software applications will need to run on the multiple platforms in order to achieve market penetration.

Some developers endorse virtualization as a possible solution. For example, Java® ME has been proposed as a viable cross-platform for mobile communications devices. However, it is well-known that running a virtual machine on a mobile communications device will typically tax its resources to the point of significant performance degradation. Further, virtual machine architecture is designed to be generic and therefore offers little to no access to the particular device running the virtual machine software. As such, running a virtual machine on a mobile communications device is not a desirable solution for highly-integrated software, such as security software, drivers and other software that significantly interfaces with the device's operating system.

Another cross-platform solution for mobile communications devices is the adoption of a common binary runtime environment, such as Qualcomm's BREW®. However, BREW is proprietary and limited to devices built upon or approved by Qualcomm®. As such, there are significant limitations as to the type, scope and breadth of applications allowable on BREW. Additionally, developers are restricted from accessing the low-level (operating system) features of the mobile communications device, which limits the amount of customization and integration available.

While these early efforts provide some cross-platform functionality, they are not adequate for highly-integrated software. What is therefore needed is a more efficient way for creating, developing and testing a cross-platform system for mobile communications devices that is easy to manage, implement and update.

There are many ways for protecting computing assets from the harmful effects of viruses, malware, adware, exploits, and other computer contaminants (also known collectively as "attacks"). Desktop, laptop and server computers enjoy numerous antivirus, network, and similar security software products that are able to detect security threats such as exploits, viruses, and malware. The detection of known viruses and malware often involves identifying the software code signatures or definitions of known viruses and malware, storing these signatures or definitions in a database on the computer, and comparing data with these signatures or definitions in order to determine whether or not the data contains a virus or malware. Detecting previously unknown viruses and malware may often involves analyzing data for certain characteristics or emulating the execution of data to determine what it would do if allowed to run on the host system. Identifying new attacks is a matter of updating a virus definition or virus signature database on the computer or modifying the rules associated with an unknown virus/malware detection system. This is feasible since computers have the hardware, software and memory resources to store and manage vast virus signature databases, as well as the processing resources to perform complicated analyses and emulate an execution environment. The detection of exploits or other attacks that can compromise a computer via a network often involves identifying the signatures of known exploits or attack, storing a database of signatures on the computer being protected, and comparing network data to these signatures in order to determine if the data contains a security threat. Like virus and malware signatures, network attack signatures can be updated in order to detect new security threats. As mentioned previously, such a system is made possible because computers have the computational and storage resources available to manage large attack signature databases and compare network data to many signatures before approving it.

Mobile communications devices lack the same power as computers, though they are often designed to provide some of the same functionalities as computers in a portable form. In order to provide these functionalities, mobile communications devices often retain a mobile or portable version of a desktop computer operating system or system architecture, such as Windows Mobile®, Apple OS X iPhone™ or Java® ME. As a result, some attacks directed to a traditional computer can easily translate or be modified to harm a mobile communications device. Additionally, the number and types of attacks specifically directed to the mobile communications device platform is growing.

Detecting attacks on a mobile communications device presents challenges not found on traditional computing platforms. As previously mentioned, mobile communications devices lack the hardware, software and memory resources of a traditional computer. As such, storing vast signature databases on the mobile communications device is not feasible, and running complicated analysis systems strains the device's memory, battery, and CPU. Other security solutions have been found unsuccessful at detecting attacks specifically directed to a mobile communications device, since mobile communications devices provide functionalities not found on traditional computers. For example, a mobile communications device may be attacked via network data, files, or executables received over various network interfaces such as Bluetooth, Wi-Fi, infrared, or cellular networks.

The lack of robust antivirus and attack preventative measures on mobile communications devices has serious security implications. Mobile devices are part of a critical infrastructure: as people depend on such devices to communicate, transmit and receive data, and access Internet and intranet websites, it becomes more important that these devices remain secure. If not protected, a significant portion of mobile devices may be vulnerable to criminal or cyber-terrorist attacks that could disrupt the normal functioning of both commerce and government. One skilled in the art could easily disrupt vital communications, use mobile communications devices to hack into supposedly secure servers storing confidential information, steal money via mobile payment mechanisms, or perform a host of other malicious and nefarious acts.

What is therefore needed is a way to prevent attacks and protect mobile communications devices without sacrificing device performance.

Mobile communications devices such as cell phones, smartphones, and PDAs, have advanced well beyond devices that simply carry voice communications. Today's mobile communications devices are frequently used to receive and transmit data as well, including files, email and SMS or text messages. This data may be received through one or more device "entry points," such as over the cellular network, a data network, Wi-Fi, Bluetooth or others. These device entry points are also known as "network interfaces" because they each provide an interface to a different network. As people rely upon their mobile communications devices to transmit and receive data through these network interfaces, it becomes important to ensure that these network interfaces are secure. Each new network interface corresponds to a different communications protocol, allowing hackers and cyber-terrorists additional ways to discover and exploit vulnerabilities in the different protocols and/or network interfaces.

Since many mobile communications devices are designed to mimic the functionality of traditional desktop and laptop computing platforms, the methods used to protect these traditional platforms are often appropriated for the mobile communications device. However, traditional desktop, laptop and even server computers do not share the same network interface issues found in modern mobile communications devices. This is because traditional platforms typically use a single network interface, such as an Ethernet interface. This network interface typically uses a limited number of communications protocols, such as TCP/IP or other IP-based protocols. As such, protecting that network interface is simply a matter of monitoring the data received by that interface. In other words, unlike a mobile communications device that may have multiple network interfaces, a computer may only be secured at a single network interface.

For those computers that have multiple network interfaces, such as Bluetooth or infrared in addition to Ethernet, present security methods still monitor transmitted and received data, but the data is funneled to single software component tied to the computer's operating system. This component will typically apply what is well-known as the "least common denominator" method to determine if the received data presents any risks or inconsistencies. In essence, however, these prior security methods treat all incoming data as if they are received at the Ethernet interface. More specifically, these prior art security methods treat all data as if they are transmitted using an IP-based communications protocol. Some mobile communications devices mimic this type of security system by monitoring TCP/IP traffic received by the mobile communications device. However, this type of security system ignores the mobile communications device's ability to receive non-TCP/IP traffic. This is illustrated in FIG. 31.

FIG. 31 shows various hardware-implemented network, communications or software-defined interfaces such as infrared transceiver 3101, Bluetooth radio 3102, Wi-Fi radio 3103, USB interface 3104, cellular radio receiver 3105 including cellular data connection 3106 and SMS 3107, and near field communication 3108. In addition, various software-implemented interfaces, services and communications protocols are shown, including infrared services 3111, Bluetooth services including SDP 3112, OBEX 3113, HFP/HSP 3114 and BNEP 3115, other network services and applications 3116, WAP 3122 and WAP services 3117, SIM toolkit 3118, text messaging 3119 and other SMS services 3120. Data received utilizing these network interfaces, services and protocols generally travels directly to the operating system subsystem that handles, manages or executes this data. For example, data received by the infrared receiver 3101 or data in the form of an infrared communications protocol 3131 is managed by the operating system's infrared subsystem 3131. Data received by the Wi-Fi radio 3103, USB interface 3104, Cellular data connection 3106, or BNEP 3115 is managed by the operating system's networking subsystem 3133, where it may be further directed through TCP/IP subsystem 3121 to network services and applications 3116. FIG. 31 illustrates that various communications pathways a mobile communications device may utilize a variety of network interfaces and communications protocols. However, in prior art mobile communications device security systems, only TCP/IP or other traditional network traffic is monitored and analyzed. In other words, prior art security systems only protect received data traveling through Operating system's networking subsystem TCP/IP subsystem 3121 and/or the mobile communications device operating system network subsystem 3133. FIG. 31 illustrates that not all data will be transmitted to a mobile communications device using these communications pathways and, as a result, there are a number of vulnerabilities that are ignored by prior art security methods.

FIG. 31 also illustrates that certain communications protocols may be layered. For example, the Bluetooth radio 3103 may receive data encoded using the Bluetooth communications protocol stack. As such, the data may be further layered using SDP 3112, OBEX 3113, HFP/HSP 3114, BNEP 3115, etc. Not only are prior art systems unable to monitor data received over the non-TCP/IP portions of the Bluetooth network interface, but prior art security systems lack the ability to identify, examine and track lower-level protocol layers for any security threats.

What is therefore needed is a way to monitor all of the different network interfaces and that also tracks all of the protocols used by these network interfaces on a mobile communications device.

Prior art security systems also tend to focus on data as it is received or is stored on the mobile communications device. This does not provide a complete picture of all of the data communications to and from a mobile communications device, and in particular, does not prevent attacks that do not come over TCP/IP and do not utilize the file system before compromising the device. For example, if a mobile communications device receives self-propagating malware such as a worm which uses an exploit to propagate, prior art security systems may not detect the exploit being used to install the malware. After the exploit compromises the system, it can disable any security functionality and be able to install the worm to the file system without hindrance. Further, prior art security systems will not likely prevent the worm from spreading because outbound data transmissions, especially over non TCP/IP networks, are not often monitored. As such, present mobile communications devices are vulnerable to a multitude of attacks, which could not only disrupt daily life, government, and commerce, but also provides a significant vehicle for large-scale cyber-terrorist or criminal attacks.

What is therefore needed is a way to monitor outbound data transmission from a mobile communications device and prevent attacks that compromise the system before passing through the operating system's networking subsystem.

Today's mobile communications devices, such as cellular telephones, smartphones, wireless-enabled personal data assistants, tablet PCs, netbooks, and the like, are becoming more common as platforms for various software applications. A mobile communications device user now has more freedom to choose and install different software applications, thereby customizing the mobile communications device experience. However, while there are many positive software applications available on the market, the ability to interact, install, and operate third party software inevitably leaves the mobile communications device susceptible to vulnerabilities, malware, and other harmful software applications. Unlike desktop computers and other less portable computing devices that can install and run antivirus software to protect against harmful software applications, mobile communications devices lack the processing power or resources for effectively running analogous software.

Third party applications have been developed that provide rudimentary scanning functions on a mobile communications device; however, these applications are often device, operating system, or application-specific. As such, a single universal platform-agnostic system for efficiently monitoring, scanning, remedying, and protecting mobile communications devices does not exist. It would be desirable to provide such a system that works on any mobile communications device, that is hardware and software agnostic, and that can be continuously updated to provide constant real-time protection. Moreover, it would be desirable to provide an adaptable system that can act and react to the demands and changes affecting a number of mobile communications devices, thereby providing intelligent malware protection.

One feature common to many mobile communications devices is the fact that they are constantly connected to a network. However, despite this common link, it is difficult to safeguard mobile communications devices fully at the mobile network level, as devices may connect to additional networks and utilize encrypted services, both of which often bypass network level protection. Rather than rely only on the processing and memory resources of each mobile communications device on the network, it would be desirable to provide a system that protects mobile communications devices remotely, providing malware prevention and analysis measures to multiple devices without the overhead of those measures running locally on each device.

One of the issues that make it difficult to protect mobile communications devices from undesirable applications is the many different types of data and applications that are available for such devices. While service providers are able to manage the network traffic in providing applications, there is no current way to effectively monitor the behavior of these applications after they have been installed on a user's mobile communications device. As a further result, it is difficult to identify new, previously unknown malicious applications by their behavior and to track and prevent the spread or dissemination of damaging applications and data once they have been released to the network. It would be desirable to provide a system that can actively monitor a group of mobile communications devices in order gather data about the installation and behavior of applications on mobile communications devices.

Once such a system is in place, it would be desirable to use data and information gained about mobile communications device applications to help users make more educated decisions about the applications they choose to run on their mobile communications devices and to allow administrators and network operators to take preventative measures to further secure both individual devices and the network as a whole. It would be further desirable to develop a way to anonymously collect data about mobile communications device behaviors and activities in order to promote the development of safer mobile applications.

Mobile app stores are experiencing astronomical growth. Analysts estimate that the total global mobile applications market is expected to be worth upwards of $25 billion in the next several years. Factors contributing to the growth include advancements in network technologies, the lowering of mobile data usage cost, and the growing adoption of smartphones. Application marketplaces such as the Android Market and Apple Apps Store have provided a new business model for developers, brands, device manufactures, advertisers, and many others.

With so many different applications coming to the market, it is becoming very difficult for marketplace owners to categorize the applications, identify which applications they would like to distribute, identify which applications they would like to not distribute, and generally, keep abreast of changes. While there are a great number of good applications, there is also a great number of bad or undesirable applications. It can be difficult to tell which is which.

Therefore, there is a need for systems and techniques to provide timely and up-to-date information on mobile application programs.

Today's portable electronic devices, such as cellular telephones, smartphones, wireless-enabled personal data assistants, tablet PCs, netbooks, and the like, are becoming more common as platforms for various software applications. There are literally hundreds of thousands of mobile applications covering categories such as games, entertainment, music, movies, business, news, productivity, and many more. These applications are made available to consumers through online marketplaces such as the Android Marketplace, Apple AppStore, Amazon AppStore, and many others. An application may be offered for free or require payment. Developers may be compensated through commissions, the placement of advertisements in the applications, or both.

However, while there are many positive software applications available on the market, the ability to interact, install, and operate third party software inevitably leaves the device susceptible to vulnerabilities, malware, and other harmful software applications. Unlike desktop computers and other less portable computing devices that can install and run antivirus software to protect against harmful software applications, portable electronic devices lack the processing power or resources for effectively running analogous software.

There exist many unscrupulous people who engage in software piracy and hacking. Many of the application marketplaces are flooded with unauthorized application copies or versions. Everybody suffers. The developer fails to receive compensation and may not have the resources to continue research and development on other products. The unauthorized version of the application may have been modified with a virus or other malware code. Thus, the consumer suffers.

Therefore, there is a need for improved techniques and systems for computer security, including mobile application security.

There is a strong desire for administrators (e.g., chief information security officers (CISOs) or network administrators) to have a way to actually measure the degree their system is at risk. That is, administrators desire a quantified measure of risk in their system. And such administrators desire not just the facile quantities, e.g., a percentage of devices on which a protection mechanism was deployed, but rather a way to capture the amount of risk in a system. Such a captured or quantified amount of risk might be considered an "absolute" risk score for a system. In addition to such a quantified amount, an administrator would find it valuable to know how the risk level of their system compares to the risk levels of peer systems—their risk level compared to other systems in the same industry. That is, an administrator may wish to know their risk level compared to that or their peers. Furthermore, the definition of "peer" to any particular administrator may be fluid or difficult. And the administrator may wish to remain anonymous or may not wish to divulge who they consider to be peers. As a result, the administrator may prefer to select a customized peer group rather than subscribe to a standard definition of a peer group or subscribe to another administrator's definition of a peer group. For example, a small bank may consider itself to be more similar to retailers than to large banks. And for that reason, a small bank administrator might elect to know how the amount of risk in their system compares to retailers, rather than how the amount of risk compares to large banks.

What is therefore needed is a system and method for providing administrators with risk information regarding other networks so that an administrator may evaluate their system's level of risk in the context of their industry or other chosen peer group. What is also needed is a system and method for sharing risk information between administrators so that the collective group may address a risk. What is also needed is a system and method for sharing risk response between administrators of networks so that one network may benefit from a response to a risk or risk event where the response originated from or was implemented on a different network.

The source of an access request may be difficult to determine. For example, an enterprise employee visiting London, England on vacation with a sudden, urgent business issue may use free Wi-Fi in a coffee shop to VPN from her iPhone into her enterprise computer, which she left up and running in California. The employee may use that VPN access to command the enterprise computer to access enterprise resources. Typically, the enterprise backend would not know that the enterprise computer is projecting its display and sending enterprise data all the way to London. The enterprise would also not know the security status of the Wi-Fi connection or the iPhone.

What is therefore needed is a method for determining whether to allow or deny an access request based on knowledge of the source of the access request and knowledge of the security of the computing devices and network infrastructure involved in the transmission of the access request.

Applications of MPTCP involve tying together multiple network interfaces to communicate with, for example, a single application. MPTCP presents some problems for security analysis and protection because security solutions that rely on observing or intercepting communications will fail when the security solution only gets to observe or intercept some of the packets involved in a communication. An enterprise may have security policies in place relating to communication security that a user would prefer did not apply to the user's personal business or activities. However, an enterprise may have to address devices (e.g., bring-your-own-devices (BYODs)) that are used for personal business or activities, and enterprise related activities, and potentially both simultaneously.

What is therefore needed is a way to control or monitor the multiple protocols of MPTCP for enterprise related activities, but not for personal activities.

BRIEF SUMMARY OF THE INVENTION

A crawler program collects and stores application programs including application binaries and associated metadata from any number of sources such as official application marketplaces and alternative application marketplaces. An analysis including comparisons and correlations are performed among the collected data in order to detect and warn users about pirated or maliciously modified applications.

In a specific implementation, there is a method for finding and collecting applications using a feedback loop where initial results determine future queries. The method includes retrieving, by an application collector program, a first application program and first metadata associated with the first application program from a source of application programs, storing the first application program and first metadata, parsing the first metadata to identify at least one keyword in the first metadata, submitting to the source of application programs a first query based on the at least one keyword in the first metadata, receiving a first search result responsive to the first query, where the first search result identifies a second application program related to the first application program, and retrieving the second application program and second metadata associated with the second application program from the source of application programs.

In another specific implementation, there is a method for determining which application is legitimate when two or more applications look the same and claim to do the same thing. In a specific implementation, a method for identifying counterfeit mobile application programs includes measuring, at a server, a degree of similarity between first metadata describing a first mobile application program and second metadata describing a second mobile application program. If the degree of similarity is within a threshold degree of similarity, comparing the first mobile application program with the second mobile application program to identify differences between the first and second mobile application programs, identifying at least one difference between the first and second mobile application programs, and based on the identified at least one difference, and the degree of similarity being within the threshold degree of similarity, determining that one of the first or second mobile application programs is a counterfeit of the other first or second mobile application programs.

In another specific implementation, there is a method for correlating applications and making assessments based on the correlation. In a specific implementation, a method includes analyzing, at a server, a first mobile application program, generating a first assessment of the first mobile application program, correlating a second mobile application program with the first mobile application program using a correlation criterion, and based on the first assessment of the first mobile application program and the correlation of the second mobile application program with the first mobile application, generating a second assessment of the second mobile application program.

In another specific implementation, there is a method for using multiple personalities to retrieve metadata and application binaries. In a specific implementation, a method includes providing to a first source of application programs, a first client personality indicating that a portable electronic device having the first client personality is requesting the application programs, receiving from the first source a first listing of application programs that the first source makes available to portable electronic devices having the first client personality, providing to the first source a second client personality, different from the first client personality, indicating that a portable electronic device having the second client personality is requesting the application programs, and receiving from the first source a second listing of application programs that the first source makes available to portable electronic devices having the second client personality. The first listing includes a first application program and does not include a second application program, and the second listing includes the second application program and does not include the first application program.

In other specific implementation, there is a method for ordered searching. In this specific implementation, a method includes examining a first entry in a list that identifies application programs available from a source of application programs, where entries in the list correspond to the application programs available from the source, and the entries are ordered by publication date of the corresponding application programs, determining that an application program corresponding to the first entry has been previously retrieved, upon determining that the application program corresponding to the first entry has been previously retrieved, updating an overlap counter variable, comparing the updated overlap counter variable with a threshold overlap value, and based on the comparison, examining a second entry in the list, next to the first entry, to determine whether an application program corresponding to the second entry has been retrieved, or determining that application programs corresponding to remaining entries in the list have been previously retrieved and not examining the remaining entries.

Other objects, features, and advantages of the embodiments will become apparent upon consideration of the following detailed description and the accompanying drawings, in which like reference designations represent like features throughout the figures.

BRIEF DESCRIPTION OF THE FIGURES

The disclosure is illustrated by way of example and not limitation in the figures of the accompanying drawings, in which like references indicate similar elements, and in which:

FIG. 8 is an exemplary e-mail summary of the mobile device security status.

FIG. 62 is an exemplary flow diagram illustrating the steps of an embodiment.

DETAILED DESCRIPTION

The disclosure is directed to a system and method for evaluating data on a mobile communications device to determine if it presents a security threat. An embodiment provides a mobile communications device with a mechanism for rejecting data that is immediately recognized to be an attack, and for allowing receipt of data recognized to be safe. In addition, the embodiment provides a way for the mobile communications device to evaluate data that is not immediately recognized as safe or malicious. The embodiment functions on a mobile communications device notwithstanding any hardware, software or memory constraints inherent in the device. As used herein, a "mobile communications device" may refer to a cell phone, handset, smartphone, PDA, and the like. A mobile communications device may primarily be used for voice communications, but may also be equipped to receive and transmit data, including email, text messages, video, and other data. This data may be received as packets or streams.

It should be appreciated that the claimed subject matter can be implemented in numerous ways, including as a process, an apparatus, a system, a device, a method, or a computer readable medium such as a computer readable storage medium comprising computer program instructions or a computer network wherein computer program instructions are sent over optical or electronic communication links. Applications, software programs or computer readable instructions may be referred to as components or modules. Applications may take the form of software executing on a general purpose computer or be hardwired or hard coded in hardware. In this specification, these implementations, or any other form that the embodiments may take, may be referred to as techniques. In general, the order of the steps of disclosed processes may be altered within the scope of the embodiments.

The disclosure is directed towards a system that displays the security status and security event information for a mobile device running security software. In an embodiment, the mobile device has a security system that runs on the mobile device which analyzes network data and files for security threats and determines the security state of the mobile device. The security system produces graphical displays indicating the security state of the mobile device and detailing the security events that have been detected and processed. In this embodiment, the mobile device may obtain periodic updates of mobile virus information from a server. The mobile device may also send the security information to a server for display on a computer to permit monitoring of security information relating to the mobile device.

Figure 1:
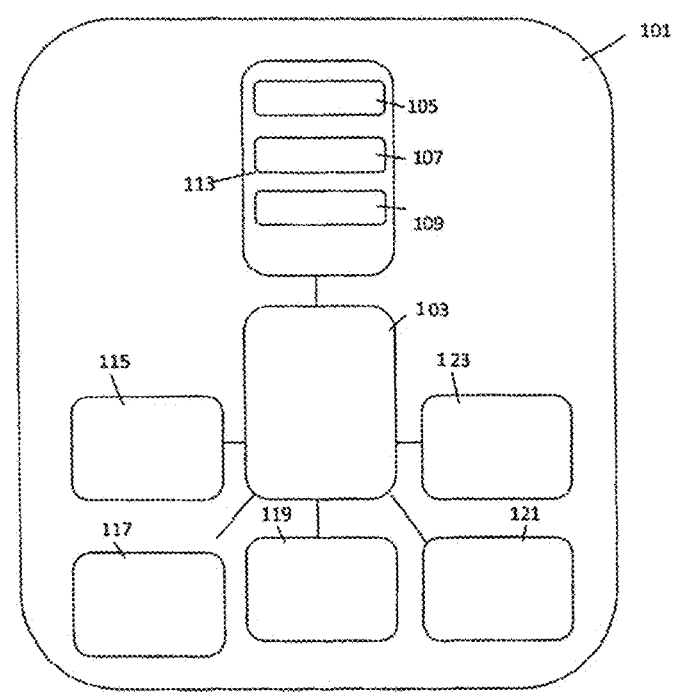
FIG. 1 is an exemplary block diagram depicting an embodiment of a mobile device which detects and processes security events.

With reference to FIG. 1, a block diagram of an embodiment of the mobile device 101 is illustrated. The mobile device 101 can include: an operating system 113, an input device 115, a radio frequency transceiver(s) 117, a visual display 121, database of security event information 123, and a battery or power supply 119. Each of these components can be coupled to a central processing unit (CPU) 103. The operating system 113 runs on the CPU 103 and provides an interface between security system application programs and the mobile device hardware.

The inventive system can receive data through an RF transceiver(s) 115 which may be able to communicate with various other electronic devices. The RF transceiver(s) 115 can transmit and receive data over various networks, for example: Bluetooth, local area networks such as Wi-Fi, and cellular networks such as GSM or CDMA. The RF transceiver(s) 115 can transmit and receive various types of data including voice, text, photos, video, SMS messages, applications, etc. All forms of data packets can be analyzed and processed by the inventive system. Additional details about the analysis and processing of data is described in U.S. application Ser. No. 12/255,614, filed Oct. 21, 2008, now U.S. Pat. No. 8,051,480, "System and Method for Monitoring and Analyzing Multiple Interfaces And Multiple Protocols."

In an embodiment, a local security component 105, an information gathering component 107 and a transport component 109, can be application programs that are downloaded and integrated with the mobile device operating system 113. Much of the source code for these security components can be re-used between various mobile device platforms by using a cross-platform software architecture. The local security component 105, an information gathering component 107 and a transport component 109 provide specific security status information which can include an overall security state and security event information. Additional details of the mobile platform system and the processing performed by the security components are disclosed in U.S. patent application Ser. No. 12/255,632, filed Oct. 21, 2008, "Secure Mobile Platform System" and U.S. patent application Ser. No. 12/255,621, filed Oct. 21, 2008, "System and Method For Attack And Malware Prevention."

Figure 10:
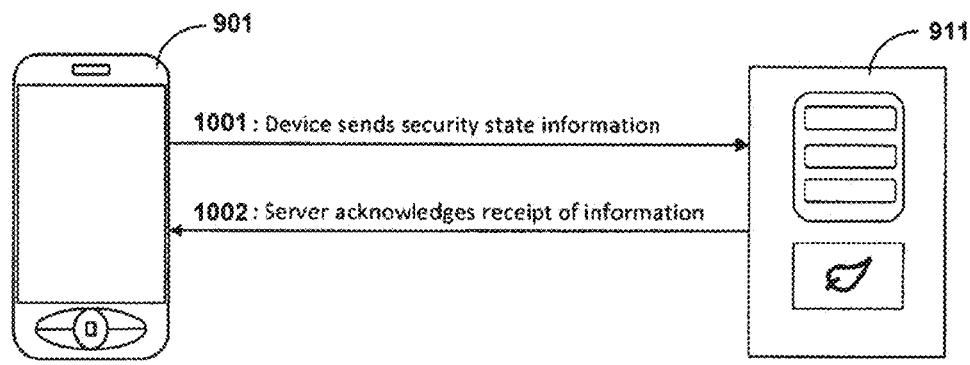
FIG. 10 is an exemplary messaging diagram illustrating the flow of communications according to an embodiment.

In an embodiment, a device's state may be sent to server 911 so that it has the most updated security information about the device. This security state information may also include the device's identifier, configuration, settings, information on recent security events, as well as the device's state. As shown in FIG. 10, mobile communications device 901 may send this security data to server 911 over the network (step 1001). In step 1002, server 911 may acknowledge receipt of the security data from device 901.

In an embodiment, the local security component on the mobile device can identify security events by analyzing files or data stored on the device, messages such as function or system calls between components on the device, or network data flowing into or out of the device for security events. The security events can include finding possible threats such as exploits, suspicious network traffic, viruses, malware, SMS message or phone call spam, suspicious system or function calls, authentication failures, etc. For example, virus detection can be performed using a list of virus signatures. The local security component 105 can examine the contents of the mobile device memory and compare those files against a database of known virus "signatures." In other embodiments, the local security component 105 may also utilize an algorithm that performs virus detection based on common virus behaviors or common virus characteristics. This alternative virus detection has the ability to detect viruses that do not have known virus signatures. Additional details regarding alternative attack and malware prevent systems are disclosed in U.S. patent application Ser. No. 12/255,621, filed Oct. 21, 2008, "System And Method For Attack And Malware Prevention."

In addition to the detection of viruses, the local security component 105 can also detect security threats facing the device over various network interfaces. In an embodiment, the local security component can analyze network data using any combination of a "known bad" network data detection component, a "known good" protocol content and statefulness analysis component, and a decision component. Upon examining the network data, the local security component 105 may identify security events including: a protocol length mismatch, a protocol value violation, a value violation for a protocol in a given state, a protocol state transition violation, a firewall rule violation, a known bad piece of network data, or a piece of network data decided to be bad. Once a security event has been identified and associated with incoming or outgoing data, the local security component 105 can determine how to protect the mobile device.

Table A below is a listing of some possible events that can be detected by analyzing the files or data stored on the device, function or system calls, or network data and example associated severity levels. The severity level can vary depending both on the event type and the parameters associated with an event. For example, regarding an event corresponding to a virus scan, if no viruses are found, the event would have a low severity. If a virus was found, but it was quarantined, the severity would be slightly higher. If a virus was found, but it could not be quarantined, the severity level would be high.

TABLE A

| DETECTED EVENT (MAX. 5) | SEVERITY |
| --- | --- |
| Virus scan (1 virus found, 0 viruses quarantined) | 5 |
| Known bad data | 4 |
| Virus scan (1 virus found, 1 virus quarantined) | 3 |
| Decidedly bad data | 3 |
| Virus found and quarantined | 3 |
| Protocol length mismatch | 3 |
| Protocol value violation while in specific state | 3 |
| Protocol value violation | 3 |
| Protocol state violation | 2 |
| Local authentication failure | 2 |
| Spam blocked | 1 |
| Firewall rule violation | 1 |
| Virus scan (No viruses found) | 0 |

The local security component 105 sends the security event information to the information gathering component 107 that quantifies the security events and the severity of the security events. For example, the information gathering component 107 processes the detected security events and produces security state assessment results for the mobile device 101. In an embodiment, the security state assessment includes an overall security condition of the mobile device. The security state assessment is also displayed as a graphical representation of the number of security events detected, a chart illustrating the rate of security events detected by the local security component 105 and other visual representations of security related status information. In an embodiment, the overall security assessment condition of the mobile device can range from "Everything is OK" when no severe security events are detected to "Infected", when a virus is detected on the mobile device. Other overall security assessment conditions include "Compromised", when the local security component detects that an exploit or other attack has been successful on the device or the trust model has been otherwise compromised, "Warning", where the local security component 105 is not configured for optimal security or other user action is desired, and "Error", where there are problems with the security of the mobile device that need to be fixed.

The security status information includes an overall mobile device security state as well as additional information about specific detected security events. The security event information is presented in various forms including: charts, graphs, graphical displays and text. The security event information presentation may vary depending upon the display on the mobile device on the client computer. The security status data displayed on the mobile device itself can be in a substantially different format than similar information about the mobile device displayed on the client computer, website or e-mail.

In an embodiment, when data is sent or received by the RF transceiver 115, aspects of the data are analyzed by the local security component 105 to determine if the data should be identified as a security event and if actions should be taken. As noted above, the assessment may involve one or more possible security analysis components, including a known bad analysis component, a known good analysis component, and a decision component. The local security component 105 stores and processes the data concerning security events and determines an overall device-wide security state assessment. The security component 105 also forwards the individual and cumulative security event information to the information gathering component 107 for further processing and producing graphical representations of the device-wide security state. The security state of the mobile device is displayed in the form of a graphical security status icon, security event charts and various other outputs that communicate security information about the mobile device 101. The graphical data is then sent to the transport component 109 which forwards the security state assessment data to a visual display on the mobile device. In another embodiment, the mobile device security information is transmitted to a server(s) and a client computer(s) for display on a device remote from the mobile device.

Figure 2:
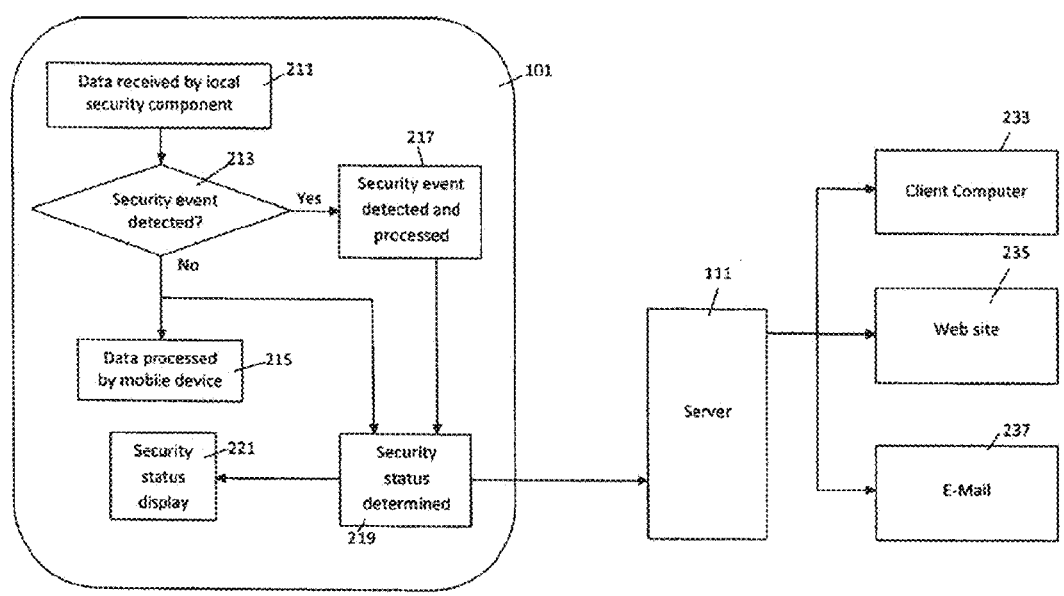
FIG. 2 is an exemplary flow chart illustrating the processing of security events on a mobile device.

The processing of data such as files or data stored on the device, function or system calls, or network data, by the mobile device 101 is illustrated in more detail with reference to FIG. 2. The data is received by the local security component 211. The local security component analyzes aspects of the data to determine if a security event is detected 213. If no security events are detected, the data is determined to be safe and is processed normally by the mobile device 215. In the preferred embodiment, the screened safe data will pass through the local security component in a transparent manner.

If the local security component onboard the mobile device detects a security problem with the data, one or more security events may be triggered. The local security component automatically performs defensive actions to protect the mobile device 101 from the immediate threat. The event or events generated will be processed 217 in order to determine if further actions need to be taken. The type of defensive processing performed by the local security component depends upon the context and type of data being analyzed. For example, the system can drop network data considered to be harmful or may disconnect one or more protocol connections associated with the data. The security component produces an event log that is stored and updated as new events are detected. Although monitoring of the security events is primarily directed towards data, hardware defects may also create security events. For example, physical damage, dead batteries or other defective hardware in the mobile device can cause the security component to detect a security event.

In an embodiment, the local security component analyzes the cumulative security events and the non-security event data to determine an overall security status for the mobile device 219. This security assessment is based upon the type, severity and quantity of the security events, their associated data, and the non-security events and data that are received and processed by the mobile device 101. The information gathering component further processes the security and non-security event data by creating various graphical and text based outputs for the security related information. The data processed by the information gathering component is sent to the transport component which controls how and where the security status will be displayed. The transport component displays the determined security status on the mobile device 221.

In addition to displaying the security status on the mobile device, the security status as well as events and event data can be forwarded to a server 111. The server may further process the events, event data, and security status information and/or output the status information to other electronic devices. A security status signal can be transmitted to a client computer 233 associated with the mobile device 101 through a security widget. In an embodiment, the widget may provide a perpetual display such as text or an icon that provides a graphical indication of the security status of the mobile device on the desktop or an operating system tool bar of the client computer. The security status information can also be output to a web site or database configured to provide content for a web site 235 for access through a web browser. The server 111 also sends e-mails 237 to an electronic address with security status updates and/or event summaries for the mobile device(s) being monitored. The system may require user authentication procedures before allowing remote access to the mobile device security information.

In an embodiment, the mobile device 101 also downloads updated security event information as well as other software and database updates from the server 121. If the mobile device and the client computer are coupled to the same network, it may be possible for the mobile device to transmit the security state information directly to the client computer, allowing the security assessment information to be displayed on the client computer.

Figure 3:
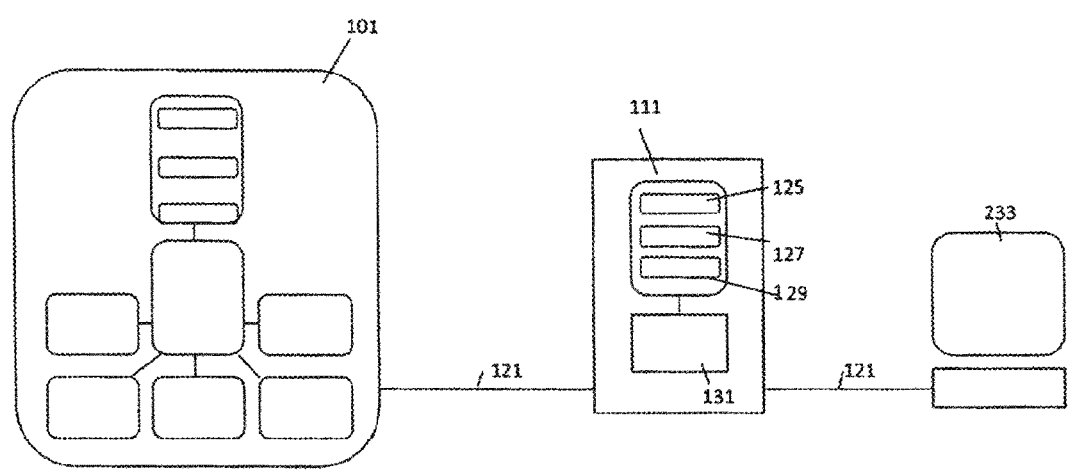
FIG. 3 is an exemplary block diagram depicting an embodiment in which security events detected by a mobile device are processed on a remote server.

With reference to FIG. 3, an alternative configuration of the mobile device security system is illustrated. The mobile device 101 is coupled to a server 111 and the server 111 is coupled to a client computer 233 by the network 121. In this embodiment, the server 111 can include a remote security component 125, a remote information gathering component 127 and a remote transport component 129. The server can also contain a database 131 of security event information including: virus, malware, and network-based attack, and other security threat identification information. The mobile device 101 analyzes files or data stored locally, function or system calls, and/or network data; identifies security events; and forwards data concerning the events to the server 111 for processing. Like the local security component described above, the remote security component 125 processes the data concerning the security events to assess a security state of the mobile device. In this embodiment, the server 111 can receive raw data or data that has been partially or fully processed by the mobile device 101.

The remote security component 125 might also receive data concerning non-security events to determine an overall security status for the mobile device. In an embodiment, the server 111 can transmit the security status and the security event data back to the mobile device 101 for display. The server 111 can also transmit the security data to a remote client computer 233 through a client computer widget, a web site 235 or via e-mail 237. The security event information can include the overall security assessment and specific security events detected which are displayed on graphical user interfaces.

Figure 4:
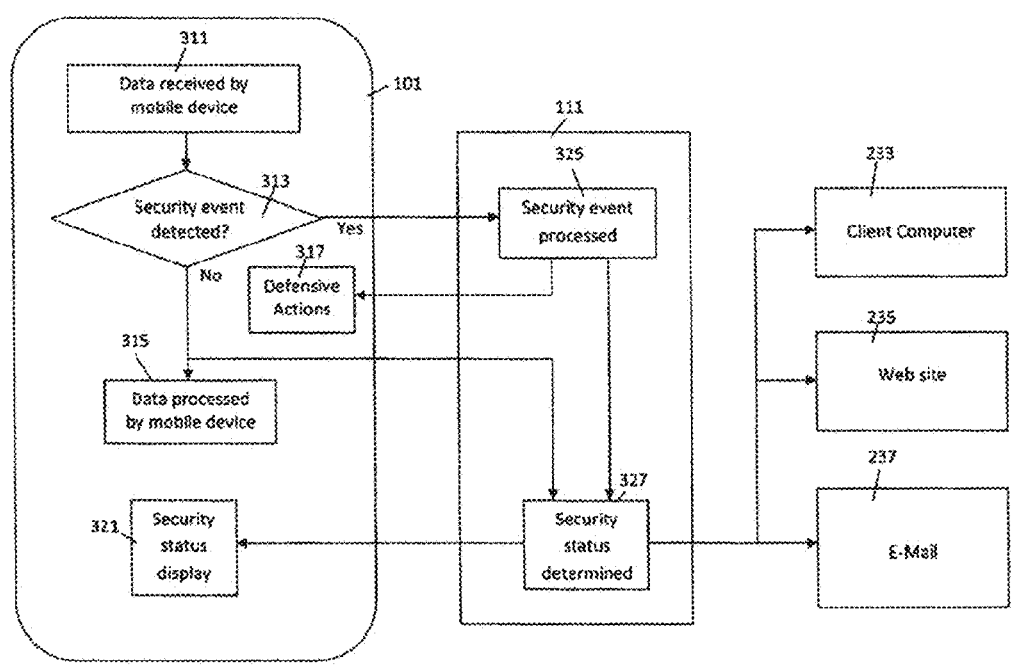
FIG. 4 is an exemplary flow diagram illustrating the processing of security events on a server.

With reference to FIG. 4, a flow chart of the mobile device with server embodiment is illustrated. The mobile device 101 receives data 311 such as files or data stored locally, function or system calls, and/or network data from an internal or external source. The data is then analyzed by the security component for security events 313. If a security event is not detected by the local security component, the mobile device 101 processes the data normally 315. If a security event is detected, the event and its associated data is forwarded to the server 111 for processing 325 by the remote security component which performs many of the same function as the local security component in the mobile device 101 described above.

The remote security component will process the security event data in a manner corresponding to the type of security event detected in order to extract more information from the events and determine an accurate assessment of the security state of the device. For example, the security component on the mobile device 101 may have identified incoming network data as having a length mismatch. The security event is sent to the server 111 which may have information that identifies this specific length mismatch as a very dangerous attack attempting to exploit a recently discovered vulnerability in the mobile device's software. Such an event may be given very high severity to alert the user or administrator responsible for the device 101 about the attack. In another example, a mobile device 101 may run an executable file that is not considered to be a virus by the local security component. The device 101 sends an event corresponding to the execution of the file to the server 111 and the server 111 having more comprehensive virus signature information, may identify the file as a virus and determine the event to be severe. Automatic or manual defensive intervention can be performed to remove the infection. Various other processing can be performed for malware and other types of security events.

The remote security component may receive information about both security event and non-security-event data received by the mobile device. Based upon this cumulative data, the remote security component can determine an overall security status or assessment for the mobile device 327. If the server 111 were to determine that the security component on the mobile device 101 was unable to stop any sort of security attack or virus/malware infection, the server 111 would update the device's security status accordingly. If needed, the server 111 may transmit commands to the device to remediate one or more security problems associated with events 317. These commands may be specialized for the particular virus or other security threat identified by the processing of one or more security events. The information gathering component can process the event information to produce charts, graphs, text outputs and graphical representations for the security state for the mobile device 101. The information gathering component at the server may also produce a log of security events for the mobile device. A transport component can then output the security event information to the mobile device 101 for persistently displaying the overall security status 321. The security event information can also be output by the server 111 to client computers 233 through a direct communication with a widget installed on the client computer 233. The widget will display the security status of the mobile device 101 on the client computer 233. Alternatively, the server 111 can post the status information for the mobile device 101 to a web site 235, which is accessible to client computers 235. The server 111 can also transmit the status information by e-mail to an address 237 associated with the mobile device.

As discussed, the processing of the security events can be performed by the local security component or a remote security component on a server. Because both modes of operation are automated, the functionality of both modes can appear identical to the user of the mobile device. A functional difference between the two modes of operation can be the updating of virus or other attack signatures. In order for the local security component to specifically identify current viruses and attacks, the signatures must be updated regularly. The mobile device can be configured to obtain updates automatically or manually. In contrast, the security event database on the remote server is maintained by the service provider and will always have the most current updates. Another difference is that the communications between the server and mobile device may not be persistent. While the server will normally be able to transmit and receive information persistently, the mobile device can be out of service periodically. The mobile device may not be in a good service area, the battery may be dead or the mobile device is turned off. There are various other reasons that the mobile device temporarily may not be able to transmit and receive data. Since communications may not be persistent, the security status information may need to be transmitted from the server to the mobile device in a store and forward manner. More specifically, the server may determine the mobile device security state and this information may need to be stored on the server until the mobile device is ready to receive data again.

Figure 5:
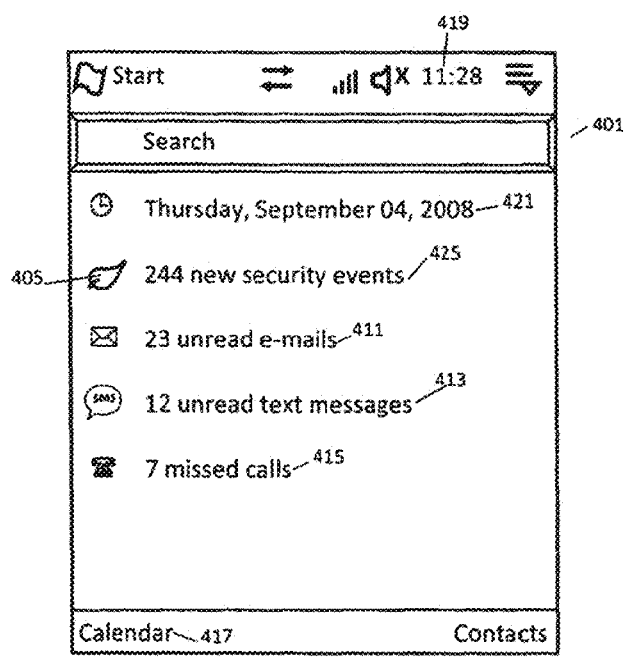
FIG. 5 is an exemplary home screen graphical user interface for the mobile device.

With reference to FIG. 5, mobile devices often have a home screen 401 that displays important information the user may want to see at-a-glance and is typically the default screen that a user can easily navigate to. Common information on such a screen includes the number of unread emails 411, the number of unread SMS messages 413, the number of missed calls 415, a calendar 417 with upcoming appointments, contacts 423, the current date 421 and time 419, and other frequently needed information. A home screen 401 may also be called a "today screen," a "desktop," or other term. In an embodiment, a portion of the home screen displays security-related information. The security-related information contains an icon 405 which graphically represents the current security status of the device and text which may contain the security state of the device or other information such as settings that need attention, the number of recent events 425, a description of a recent severe event, or actions that the user needs to perform in order to keep the device secure.

The icon 405 can be displayed in a dynamic manner that includes in the image an indication of the overall security status of the mobile device. For example, the color of the icon 405 can be a visual representation of the current security status. In an embodiment, a green icon may indicate that "everything is OK", a yellow icon may indicate a potential problem and a red icon may indicate that the device's security needs immediate attention. By activating the portion of the home screen displaying security information 405, 425, the user may be taken to an interface where they can perform needed actions or where they can view additional security-related information. This security screen allows the user to verify that their protection is working and immediately be notice if there are any security issues that may need attention. Because the home screen 401 is very often displayed, security information is pushed to the user in a perpetual display without the user having to request it. Such an embodiment may increase the user's attention to security and ability to react to security issues quickly.

Figure 6:
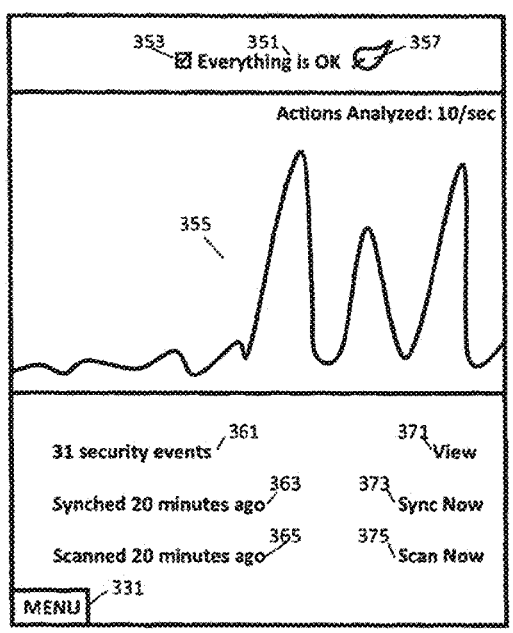
FIG. 6 is an exemplary security screen graphical user interface for the mobile device.

With reference to FIG. 6, an exemplary security screen 301 for a mobile device is illustrated. As discussed above, the security event information is communicated from the local or remote security component to the mobile device display. The status of the mobile device can represent an assessment of the overall security condition of the device. In this example, the status of the mobile device indicates that "Everything is OK" 351. This status can also be indicated by a status icon 357 which can be color coded as described above. If the device is in a non-secure state, the status would indicate that the device is "Infected with a virus" if there had been an un-remediated virus event or "Compromised" if there had been a successful exploitation. If the user had, for example, turned anti-virus protection off, the status would indicate a warning that the user needs to "Check settings". If there had been an internal error, the status would indicate "Error".

In an embodiment, the GUI includes an icon 353 located next to the text which also represents the overall status of the mobile device. The overall security status of the mobile device can be indicated by a color or type of icon 353 displayed. As discussed above, a green icon may indicate that everything is OK, a yellow icon may indicate a potential problem and a red icon may indicate a high severity security event. Similarly, the type of icon can indicate the status, such as a check mark indicating that everything is OK, a question mark may indicate a potential problem or an exclamation point indicating a known security problem. By activating the portion of the display surrounding the icon 353, a corresponding action screen can be displayed. For example, activating the portion of the display surrounding the icon 353 can cause the system to display details about the security settings of the mobile device.

In addition to the display of an overall security status for the mobile device, various other mobile device security data can be displayed on the GUI of the mobile device. In an embodiment, the information gathering component can also produce a security event chart 355 that is a graphical representation of the data being analyzed by the mobile device. The color of the graph may indicate the current security state of the device. For example, if the device is in a secure state, the graph would be green. If the device is in a warning state, the graph would be yellow. If the device is in an insecure state, the graph would be red. In an embodiment, the vertical axis of the chart 355 may represent the number of analysis actions performed by the mobile device and the horizontal axis may represent time. In this example, the graph scrolls left with the most recent data plotted on the right side and the older data on the left side. After a period of time has elapsed, the data is removed from the screen. The graph can be updated at regular time intervals such as every second. The vertical scale can be scaled for the largest number of detected events per time period. In an alternative embodiment, the chart 355 can represent the number of security events that have been detected over a given period of time.

Additional security information that can be displayed on the mobile device display includes: the total number of security events detected in a time period, the last time the mobile device has connected to or synchronized with a server, and the last time the mobile device was scanned for viruses, malware, and other security threats. In this example, 31 security events have been processed by the security system 361, the mobile device data was synchronized 20 minutes ago 363, and the mobile device was scanned 20 minutes ago 365. In an embodiment, clicking on any of these text displays will cause a corresponding action screen to be displayed.

The mobile device GUI can also include user controls that provide additional information to the users. By clicking on the "view" 371 control, the screen will display more information about the detected security events. Clicking the "sync now" 373 control causes the mobile device to synchronize the mobile device data stored locally with a remote back up copy of the data stored on the server. The "scan now" 375 control will allow the user to initiate a security scan of the mobile device. The system may also have controls that enable the user to set a desired format and layout for the security information output on the visual display 115.

While many of the controls are directly accessible from the main screen, the user may be able to access additional security controls by selecting the "menu" button 331. This can cause a pull down window of additional controls to be displayed. The pull down displays can include controls and information such as: view events, synchronize now, scan now, settings, about and exit. By clicking on the setting button, another pull down menu that lists system controls settings can be displayed. The user can then select the system controls and make any desired adjustments.

Many of the controls, such as scan and synchronize, can be performed automatically at time intervals set by the user, or at default time intervals. In an embodiment, the user can select the time interval and the time of day for performing these tasks. If a longer time period for software updates is selected such as once a week, the user can select the day of the week to perform this system maintenance. In an embodiment, the system also allows the user to select the communications mode preferences for the system maintenance such as only using a local area network or only using cellular networks while not roaming. Similar preference controls may be available for the other system controls. For example, the synchronization settings may allow the user to select the type of data to synchronize including: contacts, pictures, documents, call history, SMS messages, audio files and video files. The attack protection settings can allow the user to select the data paths that are protected including: cellular networks, Wi-Fi or other networks, Bluetooth, and short message service (SMS). The anti-spam settings can include blocking SMS and call spam based on pre-set or configurable criteria.

As described above, the mobile device and remote server can also be in direct or indirect communication with a remote client computer. In an embodiment, a widget can be installed on the client computer that allows the mobile device security status to be automatically transmitted from the server to the client computer and displayed in a persistent manner. The user or administrator responsible for a device or group of devices needs to enter authentication information to allow the widget to connect to the server and retrieve information. In this embodiment, the widget can persistently display status and security information corresponding to a device or group of devices in a manner similar to the persistent indicator displayed on the mobile device. For example, if an administrator's widget is configured to represent a group of devices, when all of the devices are in good security states, the widget will display that all of the devices are secure. In the secure state, the widget may display informational statistics such as the number of items backed up or the number of security events processed for the group. If the one or more devices are in a compromised or other insecure state, the widget will prominently display the devices that need attention to the administrator. If the widget indicates that one or more devices need attention, the administrator may click on portions of the widget to access additional security information pertaining to any of the devices that need attention.

In an embodiment, the security status widget corresponding to a single device or group of devices displays device information such as battery level, number of security events, recent data backed up, or other relevant data. The persistent indicator may also be embodied on an operating system tool bar as an icon representing the security state of a device or group of devices. As discussed above with reference to the security status icon in FIG. 5, the icon can have a dynamic aspect in that the color or display of the icon can be an indication of the overall security state of the mobile device. A green icon may indicate that everything is OK, a yellow icon may indicate a potential problem and a red icon may indicate a high severity security event. In an embodiment the type of icon can also indicate the status. For example, a check mark indicating that everything is OK or an exclamation point indicating a problem. The user can click on the icon to access additional security information for the mobile device. For example, the system can also provide a screen that displays other security event information for the mobile device in a graphical or text formats.

Additional security information can also be accessible through a web interface that can provide security information for a mobile device or group of mobile devices. In this embodiment, an administrator responsible for a device or group of devices can access the security status for one or more mobile devices on a single web interface. For example, an organization or family may have members who each have one or more mobile devices. In order to monitor the security status of all devices, the transport components on each of the mobile devices can be configured to transmit status and security information to a server. The server then processes the security information and displays the security status for each of the mobile devices on an administrator's computer that is in communication with the server. By displaying the security status of all mobile devices in the group, the administrator can quickly identify a device or devices that need attention.

In an embodiment, the administrator's computer is configured to remotely control each of the mobile devices. If a mobile device is deemed to be in a compromised, infected, or other bad security state, the administrator or user responsible will be informed and can take defensive actions to fix or investigate the device in order to protect other mobile devices, protect the data stored on the mobile device, and investigate the source of any attacks. For example, if a destructive virus is detected on a mobile device, the administrator can transmit a command to lockdown or reset the infected mobile device to prevent the virus from spreading.

In an embodiment, the server may be configured to automatically take certain actions upon certain security information being received from the device. Additional details of the remote control of the mobile devices are disclosed in U.S. patent application Ser. No. 12/372,719, filed Feb. 17, 2009, "System And Method For Remotely Securing Or Recovering A Mobile Device."

Figure 7:
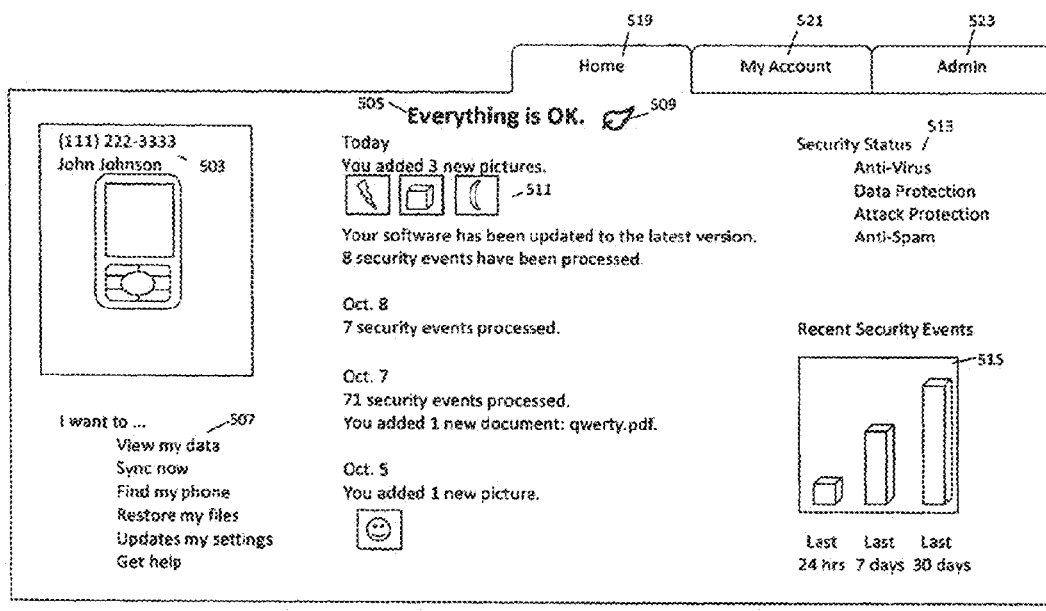
FIG. 7 is an exemplary web based mobile device security status display.

In other embodiments, a user can check the security status of one or more mobile devices through a security status web site. In order to access the web based status information for the mobile device, the user will log onto a web site by providing security information to verify access authorization. Security information can include identification and password protection or various other security screening methods. With reference to FIG. 7, an exemplary web based mobile device information page displayed on a client computer display is illustrated. Since there is typically more room on the client computer display than the mobile device display, the system can display additional information. In this example, the identification 503 and status text 505 and status icon 509 for the mobile device are provided on an upper center portion of the display and a listing of system controls 507 are placed in another area. Many of these controls are the same as the controls on the mobile device described, however these controls allow the client computer to remotely control the operation of the mobile device.

The web based display can also include additional security information about the mobile device such as backed-up data, software updates, and security events processed during the past few days 511. If any events merit user attention, those events may be specifically identified on the news feed 511. For example, if a device detected a virus or was found to be compromised by an attack, those events would be identified on the home screen. The display may identify the security status of each area of the security system including Anti-Virus, Data Protection, Attack Protection and Anti-Spam 513. The display may also include a graphical representation of the security events over the last day, week and month 515. In this example, the described display information is available on the "Home" tab 519. Various other control tabs can be available such as account 521 and administrative 523 pages which include associated controls and information. The illustrated display represents an example of a mobile device security status display. In an embodiment, the user can control the appearance of the web page through preference settings.

In another embodiment, the status of the mobile device can be transmitted to a client (other than the mobile device itself) through e-mail. An exemplary mobile device security status e-mail letter is illustrated in FIG. 8. The e-mail indicates that attack protection is disabled for the device 611, 14 security events have been handled by the system 615, a virus scan has been completed with no viruses found 617, and 1 SMS message has been received by the device 619. The e-mail also provides an identification of the mobile device. In this example, the phone number 621 identifies the mobile device. The quantity of data being protected 623 is also specified. The e-mail may include a link to the mobile device security status home page 625 which is illustrated in FIG. 6. In this embodiment, a current security status e-mail can be automatically sent based upon the user's preferences, such as daily and/or when a high severity security event is detected. The recipient or mobile device user may also be able to configure the information provided in the e-mail according to his or her personal preferences.

As critical infrastructure, mobile devices have a central role in the functioning of government, business, emergency response, and many other necessary functions of a country.

Cyber-terrorism attacks on mobile devices or mobile infrastructures can result in disastrous service outages and the compromise of sensitive data. This system and method materially help defend mobile devices from cyber-terror attacks both by directly preventing attacks on devices and by allowing administrators responsible for mobile device deployments to recognize attacks as early as possible in order to put appropriate protective measures in place. Furthermore, this system and method enables administrators to quickly investigate the source and damage caused by cyber-terror attacks.

One will appreciate that in the description above and throughout, numerous specific details are set forth in order to provide a thorough understanding of the claimed subject matter. It will be evident, however, to one of ordinary skill in the art, that the claimed subject matter may be practiced without these specific details. In other instances, well-known structures and devices are shown in block diagram form to facilitate explanation. The description of the preferred embodiments is not intended to limit the scope of the claims appended hereto.

Embodiments are directed to a system and method for creating a customizable secure environment on a mobile communications device in order to permit safe access to and from trusted services. Embodiments are not limited to the simple grant or denial of access to the mobile communications device, nor are embodiments limited to network or protocol authorization. The disclosed subject matter allows mobile communications device users to access services, and allows service providers to access a mobile communications device with the confidence that the mobile communications device, or portions of the mobile communications device, is secure. As used herein, the term "mobile communications device" refers to mobile phones, PDAs and smartphones, but excludes laptop computers, notebook computers or sub-notebook computers. In the present application, mobile communications device may also be referred to as "handset," "device," "mobile client" or "client." Specifically, mobile communications devices include devices for which voice communications are a primary function, but may offer data or other wireless Internet access capabilities, including Bluetooth, infrared, or wireless Internet access.

It should be appreciated that the claimed subject matter can be implemented in numerous ways, including as a process, an apparatus, a system, a device, a method, or a computer readable medium such as a computer readable storage medium containing computer readable instructions or computer program code, or a computer network wherein computer readable instructions or computer program code are sent over optical or electronic communication links. Applications may take the form of software executing on a general purpose computer or be hardwired or hard coded in hardware. In this specification, these implementations, or any other form that the embodiments may take, may be referred to as techniques. In general, the order of the steps of disclosed processes may be altered within the scope of the embodiments.

A. The Secure Mobile Platform System

Figure 9:
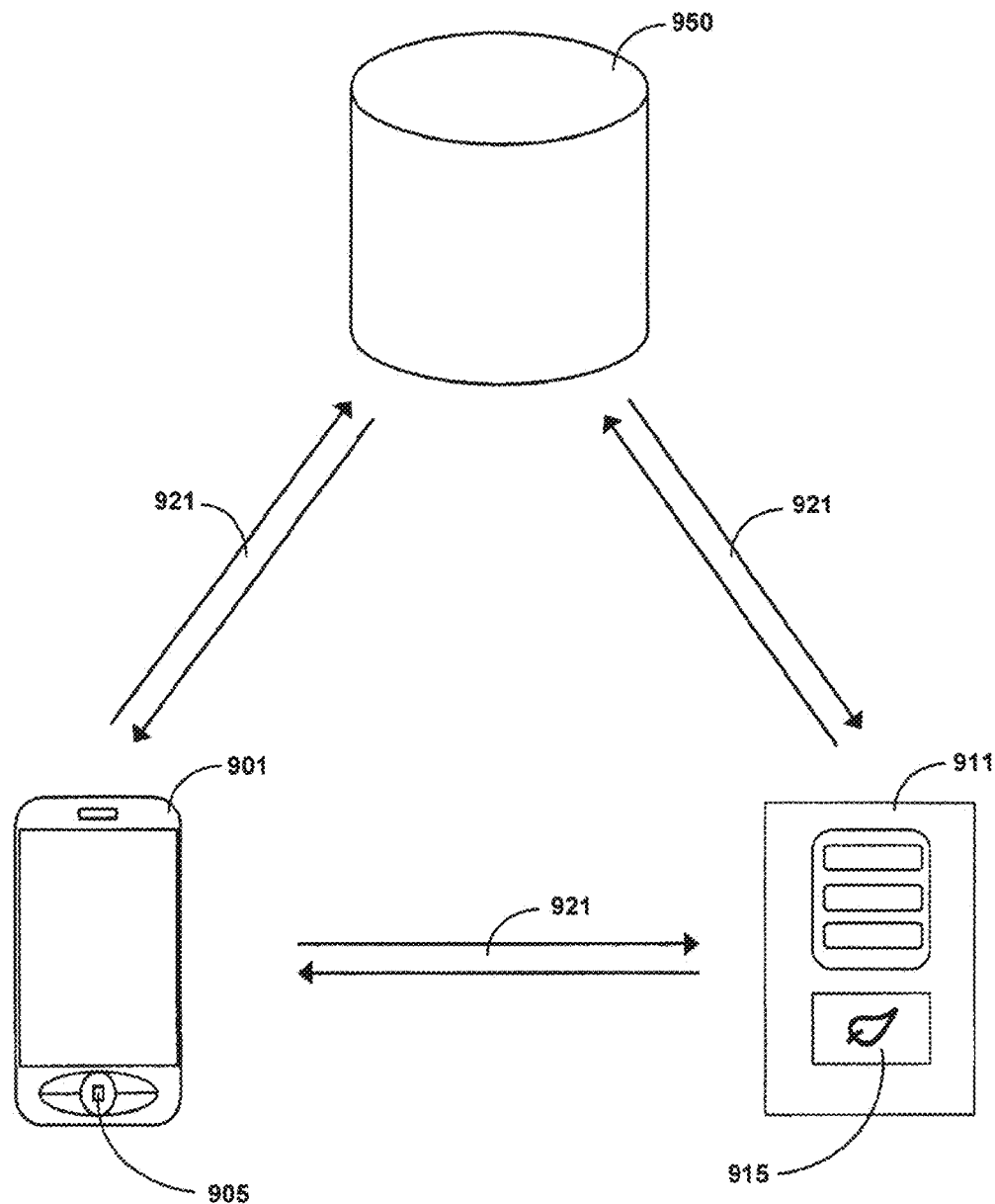
FIG. 9 is an exemplary block diagram depicting an embodiment.

FIG. 9 illustrates the various components that may comprise a system embodiment. As shown, mobile communications device 901 is connected to a network 921. Network 921 may include access to different communications protocols, such as a wireless network, a cellular network, Bluetooth, infrared, Wi-Fi or any other network that device 901 may access. Network 921 provides a communications link between device 901 and server 911. In this fashion, network 921 may carry communications between device 901 and server 911, or between device 901 and service provider 950, or between server 911 and service provider 950. Network 921 may also carry communications between other wireless network or wireless Internet components not pictured in FIG. 9.

One skilled in the art will appreciate that the disclosed subject matter comprises a local software component 905 installed on device 901. In an embodiment, local software component 905 may be responsible for maintaining a secure line of communication with server 911 over network 921. In addition, local software component 905 may manage requests for access to and from device 901. As will be discussed further below, managing requests for access may include requests between device 901 and service provider 950, requests between service provider 950 and server 911, requests between device 901 and server 911, etc. In an embodiment, these requests may be managed in whole or in part by server 911, or may be managed in whole or in part by a remote software component 915 residing on server 911. Remote software component 915 may be responsible for maintaining a secure line of communication with device 905 or service provider 950 over network 921. One will appreciate that in the examples discussed herein, reference may be made to communications between device 901, server 911 and service provider 950. One skilled in the art will appreciate that these communications may actually be between local software component 905, remote software component 915 and service provider 950. Other variations are also possible without departing from this disclosure or the scope of the claimed subject matter.

A person having skill in the art will also appreciate that the system illustrated in FIG. 9 is merely exemplary, and that additional components or configurations may be incorporated without departing from this disclosure or the scope of the claimed subject matter. For example, server 911 may be connected over network 921 to multiple mobile communications devices, and/or multiple service providers, and/or other servers. In another example, service provider 950 may host server 911. Alternatively, service provider 950 may manage server 911, in which case the services provided by service provider 950 may be hosted by server 911 in addition to the secure mobile platform system provided by server 911.

B. Secure Mobile

1. Security State

As discussed above, access to various sensitive services is currently neither available nor encouraged on a mobile communications device because the state of its security is often unknown. In order to assure service providers that a device is secure, the disclosed subject matter provides information on recent security events, if any. Security events include but are not limited to finding possible threats such as exploits, suspicious network traffic, viruses, malware, suspicious system or function calls, authentication failures, etc. Security events may also include hardware or physical issues with the mobile communications device, such as a broken antenna, a cracked screen or case, or a malfunctioning Bluetooth or infrared sensor. Systems and methods for detecting and assessing security events are discussed in U.S. patent application Ser. No. 12/255,621, entitled System and Method for Attack and Malware Prevention, now U.S. Pat. No. 8,108,933, which is hereby incorporated by reference.

Using the system illustrated in FIG. 9, the disclosed subject matter may provide a dynamic assessment of the security of device 901, also termed device 901's "security state" or "state." An assessment of device 901's state may be performed in whole or in part by remote software component 915 on server 911, in whole or in part by local software component 905 on device 901, or a combination of the two. One will appreciate that as used herein, the data or information used to determine device 901's state may be called "security state information," and the resulting assessment using this information may be called device 901's "state." Device 901's state therefore reflects the its current, recent or historic level of security, and may be a measure, calculation or assessment of the security level of device in light of recent security events or other security state information. Device 901's state may also reflect attempts to repair or recover device 901 from harmful security events.

An assessment of the device's state can be made in any number of ways, from logging or counting the number of security events that have recently occurred, to calculating a rating or score based upon weighing the severities of various security events and determining if any events interact. For example, the device may have recently been subjected to any single security event or a set number of security events, at which point the device's state may be classified as "not secure," and thereby not be able to access any service provider or be able to be accessed by any service provider. Alternatively, events such as viruses that may be spread to other devices may be considered severe security events, whereas suspicious network traffic may be considered less severe. If such events are scaled based on severity, the device may be scored accordingly or not classified as "not secure" until the score reaches a certain acceptable limit. In either scenario, if the event is repaired, such as by removing or quarantining the virus, deleting the infected email or message, etc., then the state of the device may improve or otherwise change. In this fashion, a device's state is a dynamic assessment. When a device's state is referenced, it may either be at the time of reference or a time range. Historical data for a device's state may be stored on device 901, on server 911, or a combination of the two. Similarly, data about the device, including its state and information on recent security events, may be stored on device 901, on server 911, or a combination of the two.

In an embodiment, a device's state may be reported or displayed on device 901, or outputted to server 911. Systems and methods for displaying state information and other security event-related information are discussed in U.S. patent application Ser. No. 12/255,635, entitled Security Status and Information Display System, now U.S. Pat. No. 8,060,936, which is hereby incorporated by reference. In an embodiment, a device's state may be sent to server 911 so that it has the most updated security state information about the device. This security state information may also include the device's identifier, configuration, settings, information on recent security events, as well as the device's state. As shown in FIG. 10, mobile communications device 901 may send this security data to server 911 over network 921 (step 1001). In step 1002, server 911 may acknowledge receipt of the security data from device 901.

Figure 11:
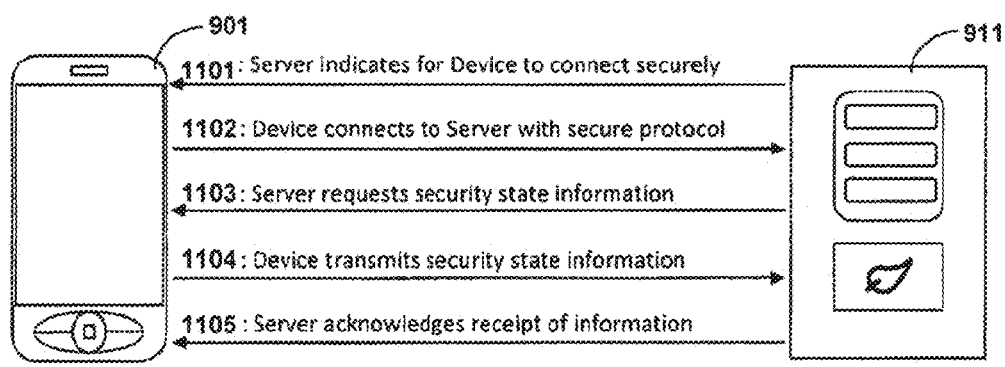
FIG. 11 is an exemplary messaging diagram illustrating the flow of communications according to an embodiment.

In an embodiment, server 911 may initiate a request for device 901's security state information. This may occur if device 901 has not recently sent its security state information to server 901 in accordance with an update or data synchronization schedule, or if server 911 is communicating with device 901 for the first time. As shown in FIG. 11, server 911 may request that device 901 connect to server 911 using a secure protocol (step 1101). In step 1102, device 901 connects to server 911 over network 921 using the secure protocol indicated by server 911. In step 1103, server 911 may request device 901's security state information, which device 901 transmits in step 1104. In step 1105, server 911 may acknowledge receipt of the security state information. Therefore, as shown in FIGS. 10 and 11, the disclosed subject matter provides for two sources of a mobile communications device 901's security state information: the device itself, or on a secure server 911 that communicates with device 901. This information may be stored in a database, table or other memory on device 901 or server 911, or may form part of the local software component 905 or remote software component 915. One will appreciate that other sources of a mobile communications device's security state information are possible without departing from this disclosure or the scope of the claimed subject matter, and that FIGS. 10 and 11 are merely exemplary and are not intended to limit the disclosure.

In an embodiment, the process for assessing the security state information for device 901 may be performed by the remote software component 915 on server 911. In this embodiment, the security state information may be received as raw or partially processed data from device 901. Server 911 may also store a database of security events and may compare device 901's security state information against information in this database in order to assess a severity, score or other determination of device 901's state. In an embodiment, this processing and assessment may be performed in whole or in part on device 901. One will appreciate that other methods for processing security state information or data to assess a mobile communications device's security state information are possible without departing from this disclosure or the scope of the claimed subject matter.

In an embodiment, the state of the device 901 may be a function of having installed a particular security software application. In other words, if this application is present on device 901, then its state may be considered "secure," and able to request or accept access from a service provider 950. The application may enable secure communications with the service provider 950 or with a trusted server 911. Similarly, the state of device 901 may be a function of having access to a specific server 911 or remote software component 915 capable of monitoring activities on the mobile communications device 901. Access may be granted through the secure server 911, which then establishes a trusted and secure communications link 921 with mobile device 901. In this fashion, device 901 is considered secure since communications to and from the device must go through secure server 911.

2. Access

In an embodiment, the level of access that service provider 950 has to mobile communications device 901, and/or the level of access that device 901 has to service provider 950, may depend upon the device's state, either at the time access is requested, or based upon historical data for the device's state, or based upon security state information stored on server 911 for device 901. One will appreciate that "access" to and by mobile communications device 901 may have different meanings based upon the service provided by service provider 950. One will also appreciate that the method for granting access or processing requests for access may be performed in whole or in part by service provider 950, server 911 (on its own or as a proxy server for service provider 950), or a remote software component 915 on server 911. For example, if service provider 950 is a bank or similar financial institution, access may include checking an account balance, viewing previous financial transactions, transferring funds, etc. Access may include all of the activities typically conducted on website accessed by a desktop computer. However, if the mobile communications device 901 is compromised in any manner, and therefore exists in a "not secure" state, then access may be limited or even denied. For example, device 901 may only be able to check an account balance, but not transfer any funds. Alternatively, device 901 may be denied any access to service provider 950, and/or service provider 950 may not have any access to device 901. Service provider 950 may customize the level of allowable access based upon given states, or the level of access may be automatically determined by device 901, local component 905, server 911 and/or remote component 915.

In another example, service provider 950 may be a web application provider, such as Google® Docs or Zoho®. Alternatively, service provider 950 may be an organization that provides access to online documentation or other sensitive materials over the web. Using the disclosed subject matter, a service provider 950 may be able to adjust access based upon the state of the device. For example, a device 901 in a severely compromised state may be denied from accessing service provider 950's website, or may be limited to only viewing a list of documents or files, or may be limited to viewing portions of the files. A device 901 that is not compromised may be able to access, edit, send, upload or perform other activities on the service provider 950's site. One will appreciate that other levels of access and interaction are available based upon device 901's state.

In another example, access may simply be a response returned following a request for security state information and/or the state of a mobile communications device. A service provider 950 or other third party may already have established communication with a mobile communications device, or the mobile communications device user may already be a user of the services provided by service provider 950. The disclosed subject matter may have subsequently implemented, and service provider 950 may wish to check on the status of a mobile communications device. As such, service provider 950 may send a query to device 901 for its security state, or alternatively, service provider 950 may send a query server 911 that maintains updated security state information on device 901. The disclosed subject matter provides a way for a service provider 950 to quickly and simply access information on a mobile communications device's security state without having to install or maintain its own security system network.

Various methods for enabling access to mobile communications device 901 are described in detail below. Access may originate as a request from mobile device 901 to service provider 950. As will be described in more detail below, this request may be passed through server 911. Alternatively, a request for access may originate from service provider 950, in which case the request may be directed toward device 901, or passed through server 911. In any case, an embodiment provides a secure mobile platform system in which the level of interactivity between the mobile communications device 901 and the service provider 950 depends upon the state and security of device 901. Different examples are outlined further below, and are illustrated in the accompanying figures. However, one skilled in the art will appreciate that the following are merely exemplary, and not intended to limit the scope of the claimed subject matter in any way.

a. Device to Server to Service Provider

Figure 12:
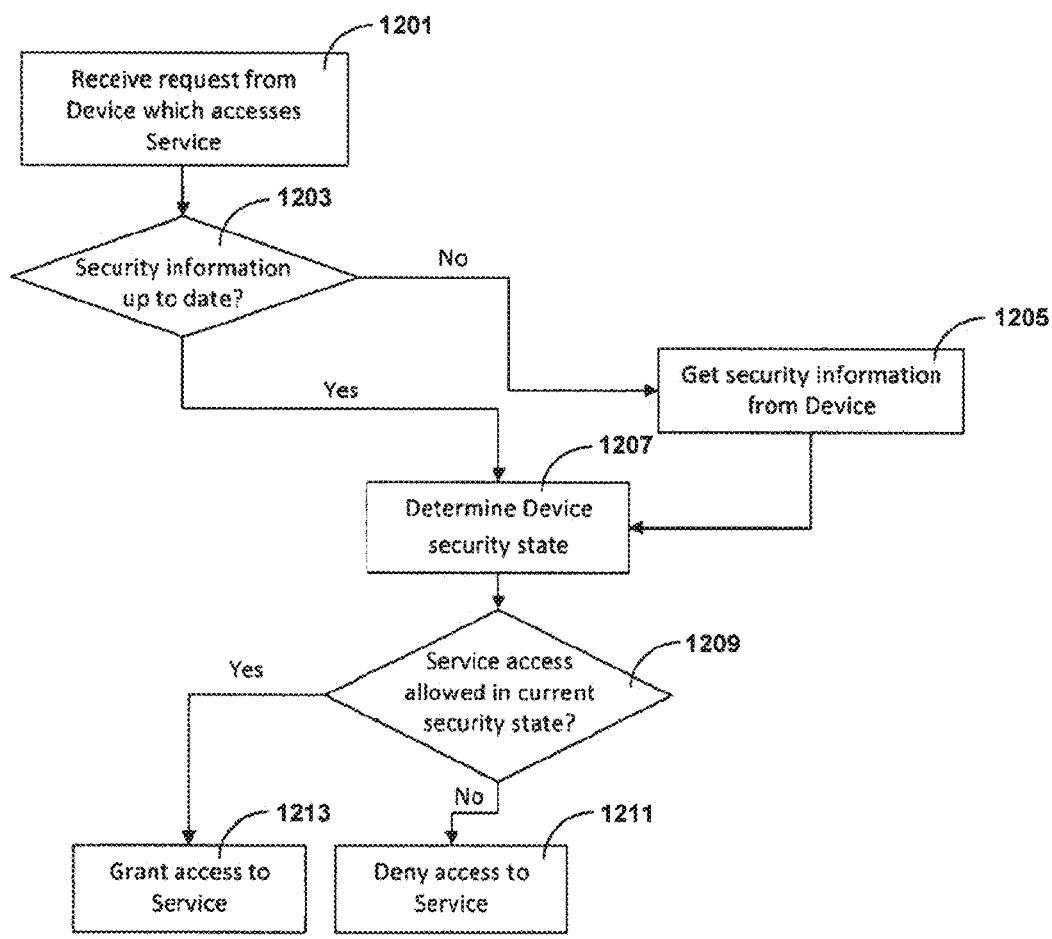
FIG. 12 is an exemplary flow diagram illustrating the steps of an embodiment.

In an embodiment, the user of a mobile communications device 901 may request access to service provider 950. As illustrated above, this may be an embodiment where the user attempts to access a banking service or other network based service using software installed on a handset. As shown in FIG. 12, this request may be managed by server 911, which receives the request from device 901 (step 1201). Server 911 may access a database or other memory to determine whether it has updated security state information for device 901 (step 1203). If not, then in step 1205, this security state information is obtained from device 901. Once obtained, the security state for device 901 may be assessed (step 1207). This assessment may be any method as described previously or incorporated by reference. If the security state is acceptable, then device 901 may have access to service provider 950 (step 1213). If device 901's security state is unacceptable, then access may be limited or denied (step 1211). As previously discussed, the acceptability of a device's security state and the level of access to the mobile communications device 901 may be set by the provider of server 911, the service provider 950, the manufacturer or provider of device 901, or other parties responsible for managing the system of the disclosed subject matter.

b. Service Provider to Device

In an embodiment, service provider 950 may wish to query server 911 for the security status, security state or to gain security state information for a mobile communications device monitored or managed by server 911. In an embodiment, service provider 950 may not manage server 911, but may have a trust relationship with server 911 in order to allow access to the security state of device 901. In another embodiment, service provider 950 may manage server 911 and have an implicit trust relationship to allow the service to access the security state of the device. In either instance, service provider 950 may have the ability to communicate securely and directly with device 901 without using the server 911 to proxy or otherwise enable the connection.

Figure 13:
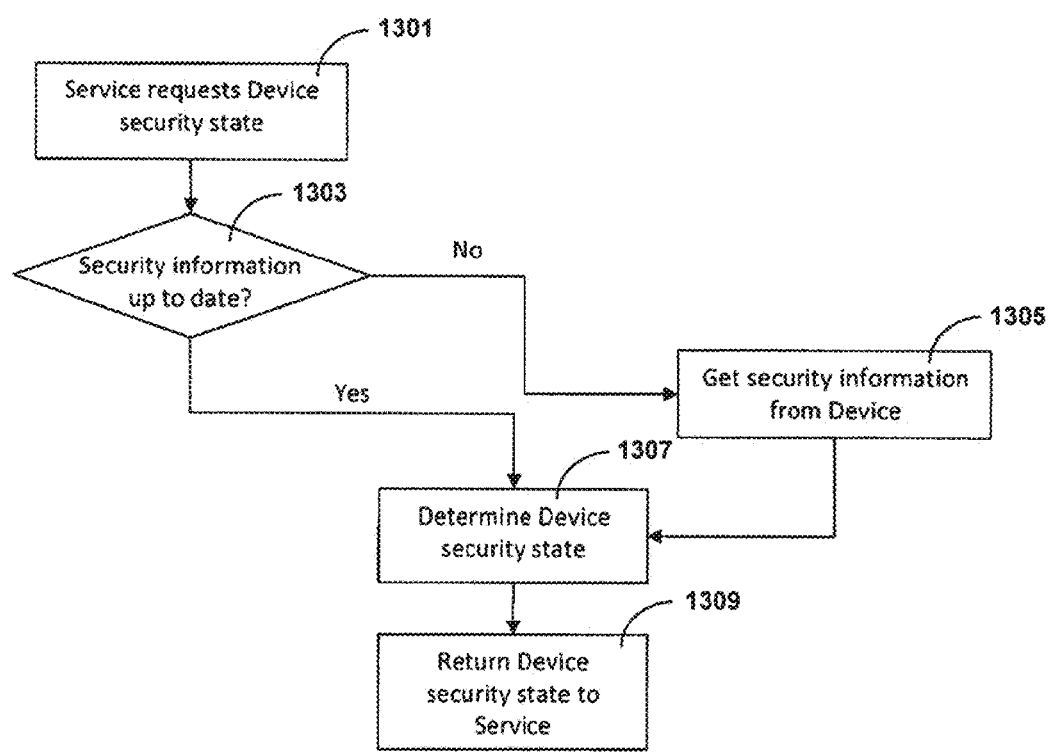
FIG. 13 is an exemplary flow diagram illustrating the steps of an embodiment.

FIG. 13 illustrates a method by which a service provider 950 may request device 901's security state. In step 1301, the service provider 950 initiates the request to get mobile communications device 901's security state from server 911. In step 1303, server 911 checks to see if there is updated security state information for device 901. This may require communicating with a database or memory store storing such information, or communicating directly with device 901. If the information is not updated, then in step 1305, server 911 obtains the security state information from device 901. Once this information is obtained, then in step 1307, server 911 determines the state of device 901. In step 1309, device 901's state may be stored in a server 911 managed by service provider 950 or stored in a database or memory store accessible by service provider 950. This method may provide service provider 950 with a continuously updated overview of the security state of a mobile communications device 901 accessed by service provider 950.

In an embodiment, the server 911 may provide access to the security state of a device 901 through an API over a protocol such as HTTP. This API may have encryption and require authentication for a service provider 950 to retrieve security state information corresponding to a mobile communications device. As such, service provider 950 may perform step 1301 of FIG. 13 by using the API. Alternatively, the server 911 may access an API hosted by service provider 950 whenever the security state of device 901 changes to update the service provider 950 with the newest state information.

As such, the disclosed subject matter provides a simple implementation by which service providers can be updated on the security state of a device 901 monitored by server 911. This provides a significant advantage over prior art that requires installation of a security system or portions of a security system, and delegates security monitoring to a server specifically tailored for the task.

c. Service Provider to Server to Device

Figure 14:
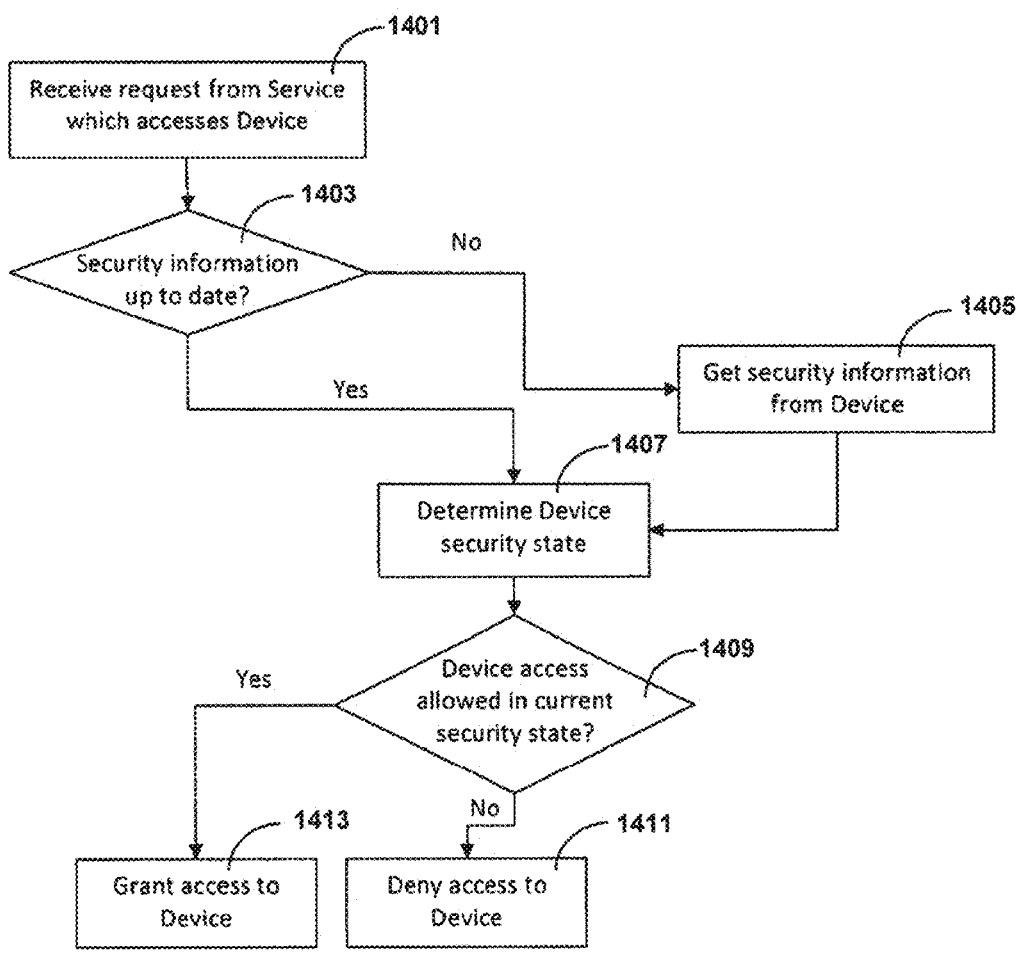
FIG. 14 is an exemplary flow diagram illustrating the steps of an embodiment.

In an embodiment, service provider 950 may request access to device 901 through server 911. In other words, server 911 may be responsible for processing or proxying requests for access based upon device 901's state. If device 901 is in an acceptable state, server 911 may provide the desired access to device 901 by service provider 950. This is shown in FIG. 14.

In step 1401, server 911 receives a request from service provider 950 to access device 901. One will appreciate that server 911 may be responsible for proxying access to device 901 from service provider 950, or service provider 950 may be allowed to access device 901 directly. In step 1403, server 911 may check to see if the security state information for device 901 is up to date. Alternatively, this check may be performed by service provider 950 before or after it passes the request for device 901 to the server 911. If the security state information for device 901 is not updated, then this information is obtained from device 901 (step 1405). In step 1407, server 911 assesses device 901's state based upon the information received. This step may also be performed by the service provider 950. Once device 901's state is determined, server 911 or service provider 950 or a combination of the two may determine whether device 901's security state is acceptable (step 1409). If not, access may be limited or denied (step 1411). If it is acceptable, then service provider 950 may have access to device 901 (step 1413).

In an embodiment, a variation of the above steps may be performed when service provider 950 directly requests access to device 901, but device 901 passes the request to server 911. In this embodiment, the steps of checking whether security state information for device 901 is updated (step 1403), obtaining device 901's security state information (step 1405), assessing device 901's security state (step 1407) then granting (step 1413) or denying (step 1411) service provider 950 access to device 901 may be all be performed by server 911.

Similarly, in an embodiment, service provider may directly request access to device 901, and device 901 may itself determine whether it is in an acceptable state. This may require that device 901 run a separate process that oversees the security state of the device 901. If the process is not kept separate from device 901's other running functions, then it may be compromised by malware or other security event that tricks device 901 into presenting that it is more secure than it may in fact be. One skilled in the art will appreciate that other methods for self-monitoring device 901's security state are possible.

d. Conditional Access to Device

As mentioned previously, service provider 950 may be granted limited or conditional access depending upon the state of device 901. Such things as recent security events, unsuccessfully quarantined viruses, or hardware issues may prevent normal access to device 901. As such, the disclosed subject matter contemplates instances where access may be limited in order to protect the overall secure mobile platform system and prevent contamination of other system components. In an embodiment, limited or conditional access may be decided by server 911 which may proxy the request for access to or from device 901 or may process the request locally. One will appreciate that if device 901 is attempting to access service provider 950, but is not in a sufficiently secure state, the request may be denied without notifying service provider 950 of the attempted access.

Figure 15:
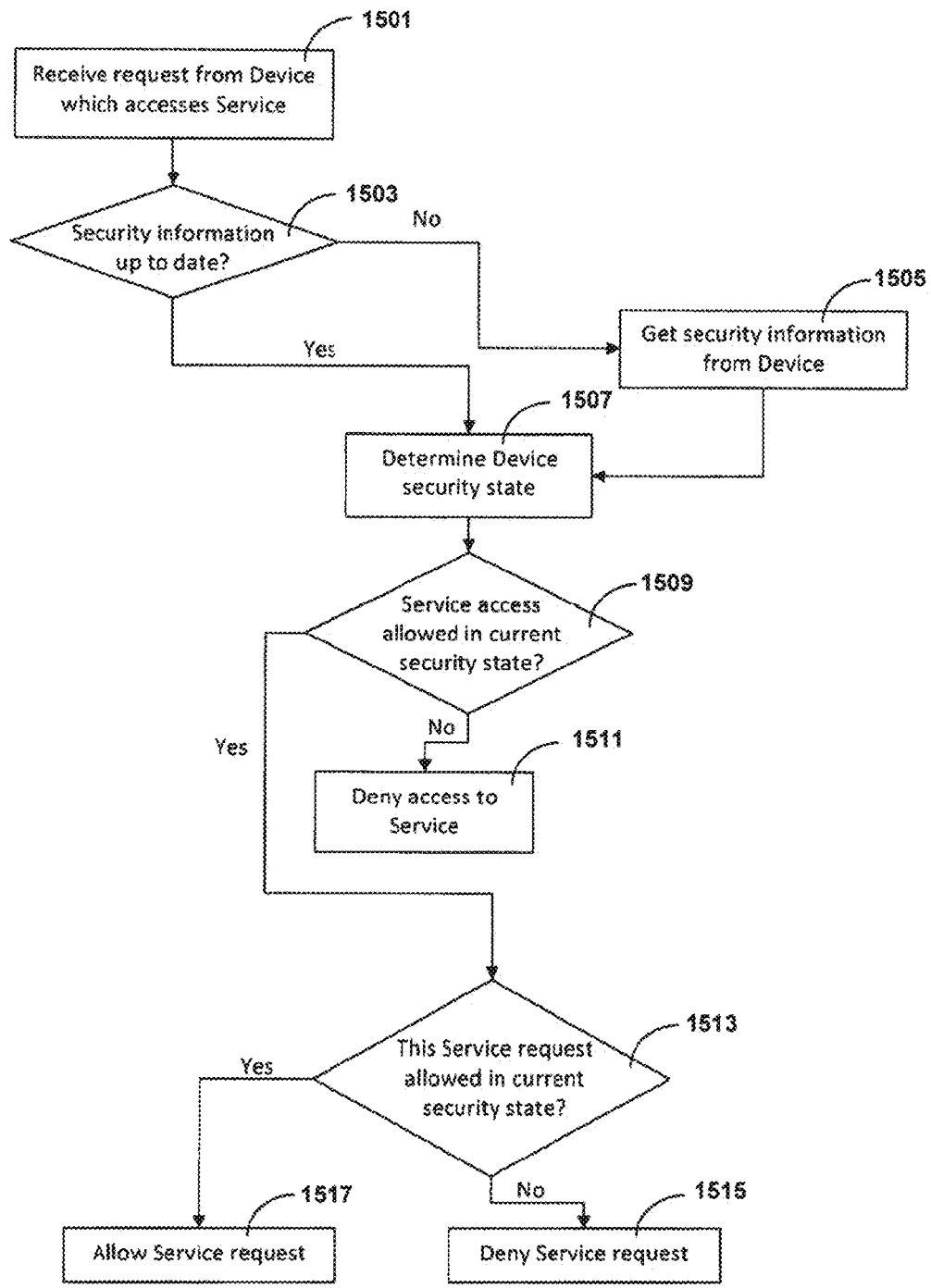
FIG. 15 is an exemplary flow diagram illustrating the steps of an embodiment.

For example, in FIG. 15, step 1501 illustrates that service provider 950 may receive a request to access its services from device 901. This request may originate directly from device 901, or through server 911. Alternatively, server 911 may receive the request to access service provider 950 from device 901. In step 1503, service provider 950 or server 911 checks to see if the security state information for device 901 is up to date. If not, then in step 1505, this information is obtained from device 901. Once obtained, server 911 may determine the security state for device 901 (step 1507). If device 901's state is unacceptable, then access to service provider 950 will be denied (step 1511). In such a case, if server 911 has determined that device 901's state is unacceptable, service provider 950 may never receive device 901's request for access. However, if device 901's state is acceptable, then there may be an additional check to ensure that the state is acceptable for the specific service request or task requested by device 901 (step 1513). If device 901's state is acceptable for the requested task, then in step 1517, access is granted. If device 901's state is unacceptable, then in step 1515, then access is denied. As such, in FIG. 15, device 901 may gain access to service provider 950, but may be denied from performing certain tasks (step 1515). In the previous examples, this may be an instance where device 901 has access to checking an account balance (step 1517), but transferring funds may be denied (step 1515) because of a recent or present security event that has affected device 901's state.

Similarly, conditional access and communications between service provider 950 and device 901 may be primarily managed by server 911. In this embodiment, server 911 provides device 901's security state information to service provider 950, rather than device 901 providing its security state information to service provider 950, as shown in FIG. 15. This is illustrated in FIGS. 16 and 17.

Figure 16:
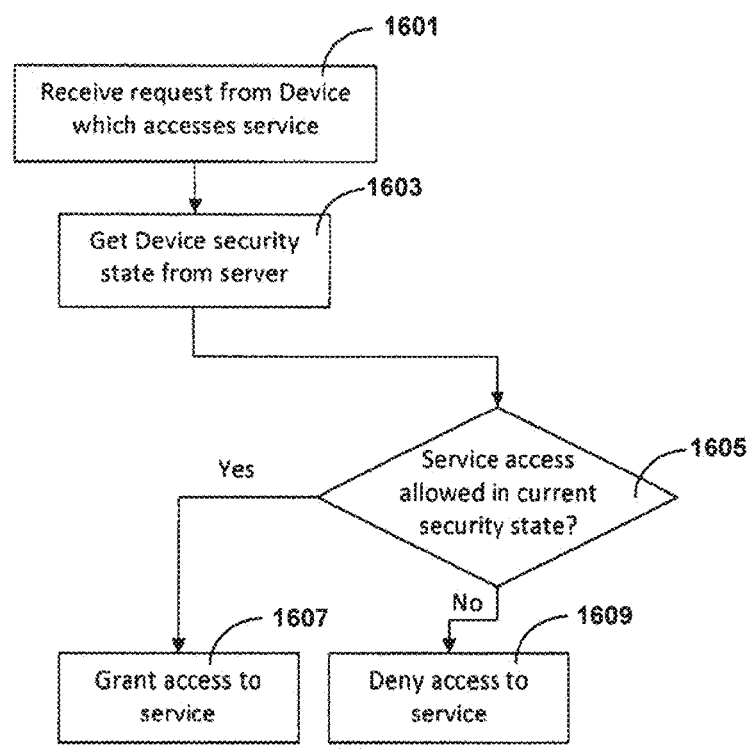
FIG. 16 is an exemplary flow diagram illustrating the steps of an embodiment.

In FIG. 16, service provider 950 receives a request for access from device 901 (step 1601). However, in step 1603, service provider 950 obtains device 901's security state information from server 911, rather than from device 901 (step 1505 of FIG. 15). Server 911 or service provider 950 may then determine whether device 901's state is acceptable for further access to service provider 950. If device 901's state is acceptable, then access is granted (step 1607). If not, then device 901's access to service provider 950 is denied.

Figure 17:
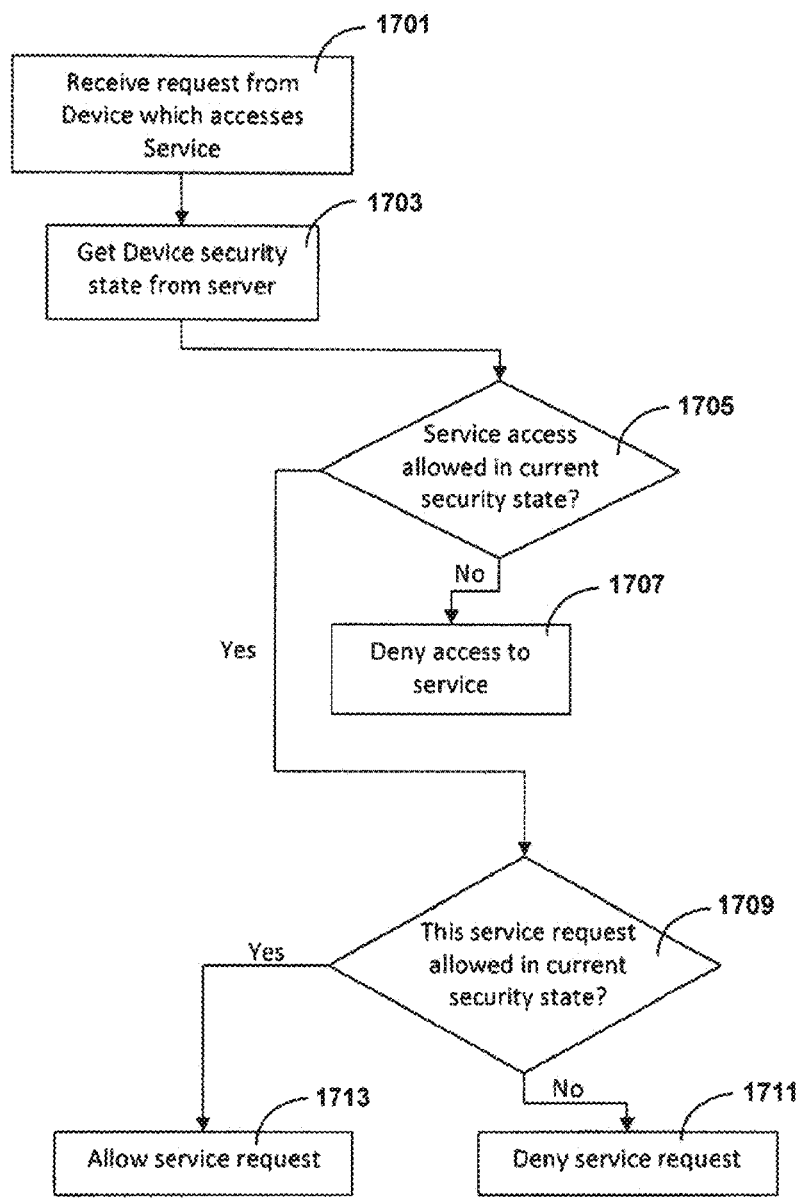
FIG. 17 is an exemplary flow diagram illustrating the steps of an embodiment.

FIG. 17 illustrates steps similar to FIG. 16. In step 1701, service provider 950 receives a request for access from device 901. Service provider 950 then obtains the security state information for device 901 from server 911 (step 1703). If service provider 950 (or server 911) determines that device 901 is not in an acceptably secure state, then further access is denied (step 1707). If, however, device 901 is acceptably secure, then there may be an additional assessment to determine whether device 901's state is acceptably secure for the particular service request (step 1709). If so, then access to service provider 950 for that particular request is granted (step 1713). If not, then access to service provider 950 for that particular request is denied.

Figure 18:
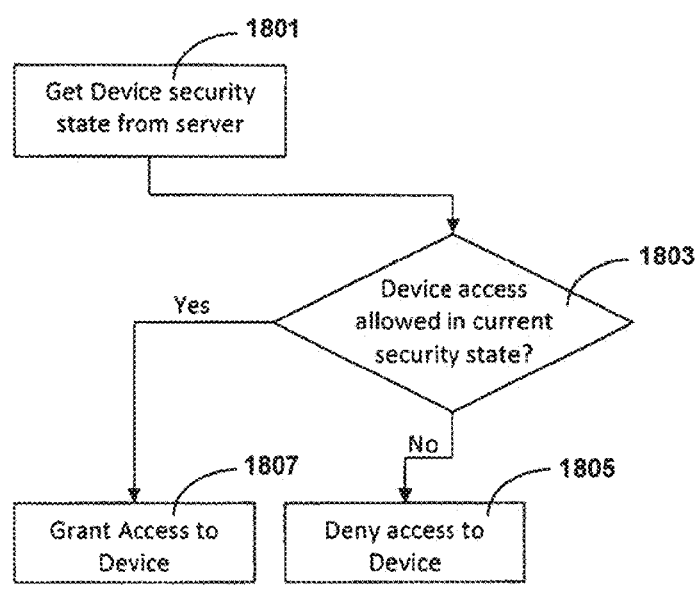
FIG. 18 is an exemplary flow diagram illustrating the steps of an embodiment.

FIG. 18 illustrates steps for conditionally accessing device 901 by service provider 950 depending on the state of device 901 as provided by server 911. This embodiment may occur after service provider 950 has established a trusted relationship with server 911, which in turn has established trusted relationships with device 901. Service provider 950 may interact with server 911 to check device 901's state before accessing device 901. In step 1801, service provider 950 requests device 901's security state from server 911. Service provider 950 (or server 911)

determines whether device 901 is acceptably secure. If not, then service provider 950 will not access device 901 (step 1805). If device 901 is acceptably secure, then service provider 950 may access device 901 (step 1807).

One will appreciate that any of steps of the methods described above and depicted in the accompanying drawings may be performed in a different order or combined. For example, in FIGS. 15, 16, and 17, the steps of determining whether device 901 is acceptably secure for a specific task or request for access may be combined with the steps for determining whether device 901 is acceptably secure enough to access service provider 950. Other variations are possible without departing from this disclosure or the scope of the claimed subject matter.

C. Counteracting Cyber-Terrorism

One will appreciate that the disclosed subject matter is directed to creating and implementing a secure mobile platform system that provides limited to complete access to one or more mobile communications devices depending upon the security state of the one or more devices. While this may be practical and important in most daily business transactions, it is especially important in the context of national security. While mobile devices may not usually be used for accessing sensitive or potentially classified information, at present, there is little to stop someone from attempting such access, especially since many mobile devices today are Internet, intranet and enterprise-enabled. As such, terrorist organizations have many available points of entry into supposedly secure systems simply by hijacking the mobile devices connected to those systems. Similarly, terrorist organizations can use non-secure systems to capture and control connected mobile communications devices. The disclosed subject matter provides a secure defense against such attacks by continuously and dynamically monitoring the security state of all connected mobile devices. If an attack is underway, the system will be aware of such attacks and may possess the means to contain and classify the attack. Similarly, the mobile platform system will be aware if a mobile device is removed from contact, since the system will no longer be receiving updates on the device's security state. Because the disclosed subject matter provides a gateway system for evaluating the security state of a device before granting access to or from the device, device providers as well as service providers can rest assured that they are protected against cyberattacks on their systems.

The descriptions above illustrate how the disclosed subject matter provides a secure platform for mobile communications devices, whereby the security state of the device affects the level and types of services accessible by the device. Similarly, the security state of the device determines the level and types of services that may access the device. One will appreciate that in the description above and throughout, numerous specific details are set forth in order to provide a thorough understanding of the claimed subject matter. It will be evident, however, to one of ordinary skill in the art, that the claimed subject matter may be practiced without these specific details. In other instances, well-known structures and devices are shown in block diagram form to facilitate explanation. The description of the preferred embodiments is not intended to limit the scope of the claims appended hereto.

Embodiments are directed to a system and method for creating, testing and providing a cross-platform software system for a mobile communications device. The disclosed subject matter comprises a platform-independent or "core" component, a platform-specific component, and a lightweight abstraction layer component that may or may not be interdependent to the platform-independent core. The abstraction layer component may depend on the platform-independent component in order to access the functionalities of the platform-independent component. As will be explained further below, this architecture provides a cross-platform system on the mobile communications device platform without sacrificing functionality or power. Additionally, each component may communicate with the other using a common API, as opposed to different APIs as is common in the prior art. As will be also discussed further below, this architecture also streamlines the QA process since it allows for the re-use of testing code and systems.

As used herein, the term "mobile communications device" refers to mobile phones, PDAs and smartphones, but excludes laptop computers, notebook computers or sub-notebook computers. Specifically, mobile communications devices include devices for which voice communications are a primary function, but may offer data or other wireless Internet access capabilities. As used herein, a "mobile communications device" may also be referred to as a "mobile device," "mobile client," or "handset." However, a person having skill in the art will appreciate that while the disclosed subject matter is disclosed herein as being used on mobile communications devices, the disclosed subject matter may also be used on other computing platforms, including desktop, laptop, notebook, or server computers.

It should be appreciated that embodiments can be implemented in numerous ways, including as a process, an apparatus, a system, a device, a method, or a computer readable medium such as a computer readable storage medium containing computer readable instructions or computer program code, or a computer network wherein computer readable instructions or computer program code are sent over optical or electronic communication links. Applications, software programs or computer readable instructions may be referred to as components or modules. Applications may take the form of software executing on a general purpose computer or be hardwired or hard coded in hardware. Applications may also be downloaded in whole or in part through the use of a software development kit or toolkit that enables the creation and implementation of the disclosed subject matter. In this specification, these implementations, or any other form that the embodiments may take, may be referred to as techniques. In general, the order of the steps of disclosed processes may be altered within the embodiments.

Embodiments are directed to a system and method for monitoring and analyzing data transmitted and received by a mobile communications device over multiple network interfaces, regardless of the data's communications protocol. As used herein, a "mobile communications device" may refer to a cell phone, handset, smartphone, PDA, and the like. A mobile communications device may primarily be used for voice communications, but may also be equipped to receive and transmit data, including email, text messages, video, and other data. This data may be received as packets or streams transmitted using one or more communications protocols, including cellular, TCP/IP, Bluetooth, infrared, radio frequency networks, USB, etc. This data is often packaged, encapsulated or layered such that more than one protocol may be used. The disclosed subject matter provides a way to monitor and analyze data encapsulated in multiple protocol layers and received through one of many network interfaces, thereby minimizing the mobile communications device's exposure and protecting the device from harm. In addition, the disclosed subject matter provides a way to monitor and track data that is transmitted from the device, to ensure that the device is not used to propagate malicious software.

It should be appreciated that the claimed subject matter can be implemented in numerous ways, including as a process, an apparatus, a system, a device, a method, or a computer readable medium such as a computer readable storage medium containing computer readable instructions or computer program code, or a computer network wherein computer readable instructions or computer program code are sent over optical or electronic communication links. Applications, software programs or computer readable instructions may be referred to as components or modules. Applications may take the form of software executing on a general purpose computer or be hardwired or hard coded in hardware. In this specification, these implementations, or any other form that the embodiments may take, may be referred to as techniques. In general, the order of the steps of disclosed processes may be altered within the embodiments.

A. System Architecture

Figure 19:
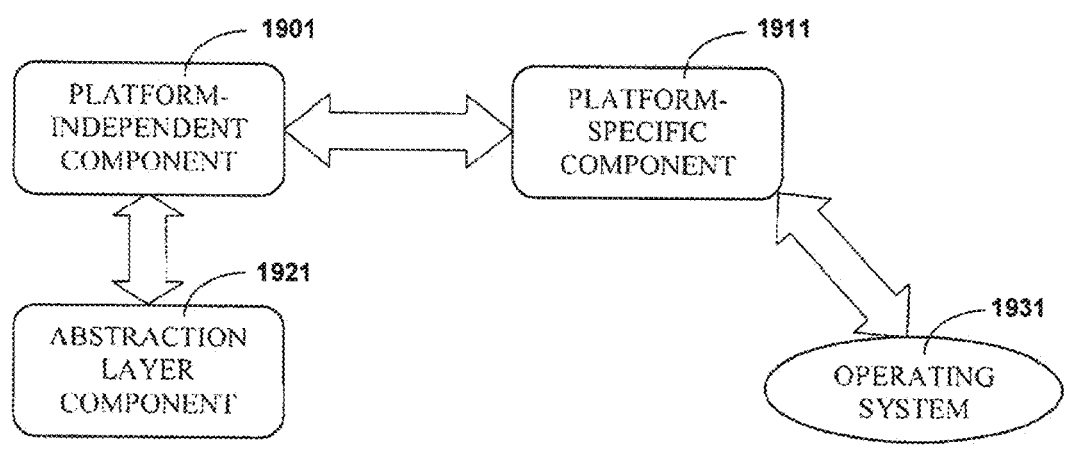
FIG. 19 is an exemplary block diagram depicting an embodiment.

FIG. 19 illustrates an exemplary cross-platform system architecture embodiment. As shown, the cross-platform system may include a core platform-independent software component 1901 and a platform-specific component 1911. In addition, the system may include an abstraction layer component 1921 that is coupled with platform-independent component 1901. The platform-independent component 1901 may present a common API and may provide a code library common to all mobile communications device platforms, regardless of manufacturer, service provider or operating system. This common API may enable communication with portions of the disclosed subject matter, such as platform-specific component 1911, as well as other components of a mobile communications device. Similarly, platform-specific component 1911 may communicate with portions of the disclosed subject matter, such as platform-independent component 1901, as well as other components of the mobile communications device, such as operating system 1931. One will appreciate that the different components in FIG. 19 may communicate or implement functionalities with one another using respective APIs; however, in an embodiment, all of the components of FIG. 19 communicate using a common API. Despite their interconnectedness, each component may be purposefully and explicitly separate from the other.

Figure 23:
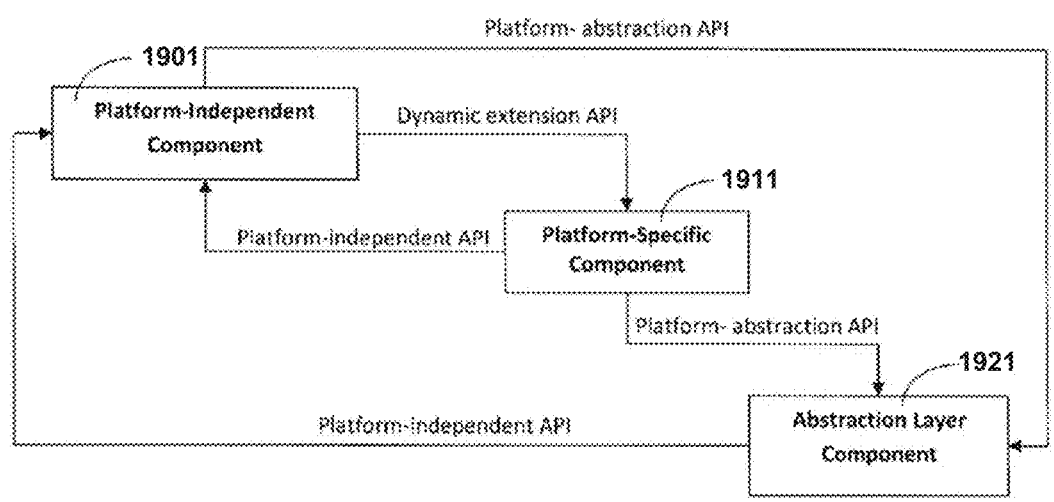
FIG. 23 is an exemplary block diagram depicting an embodiment.

By way of example, FIG. 23 illustrates the interconnectedness between the different components of FIG. 19. Platform-independent component 1901 may be comprised of platform-independent software source code that communicates and interfaces with the other components by exposing the common API. As shown, platform-independent component 1901 may communicate with abstraction layer component 1921 using the common API. In turn, abstraction layer component 1921 may communicate with platform-independent component 1901 using the common API.

Platform-independent component 1901 may also communicate with platform-specific component 1911 through the use of one or more dynamic extensions. For example, dynamic extensions may be registered with platform-independent component 1901 that may call platform-specific component 1911 when necessary or desirable. Dynamic extensions are discussed in more detail below. Platform-specific component 1911 may communicate with platform-independent component 1901 and/or abstraction layer component 1921 using the common API.

Figure 20:
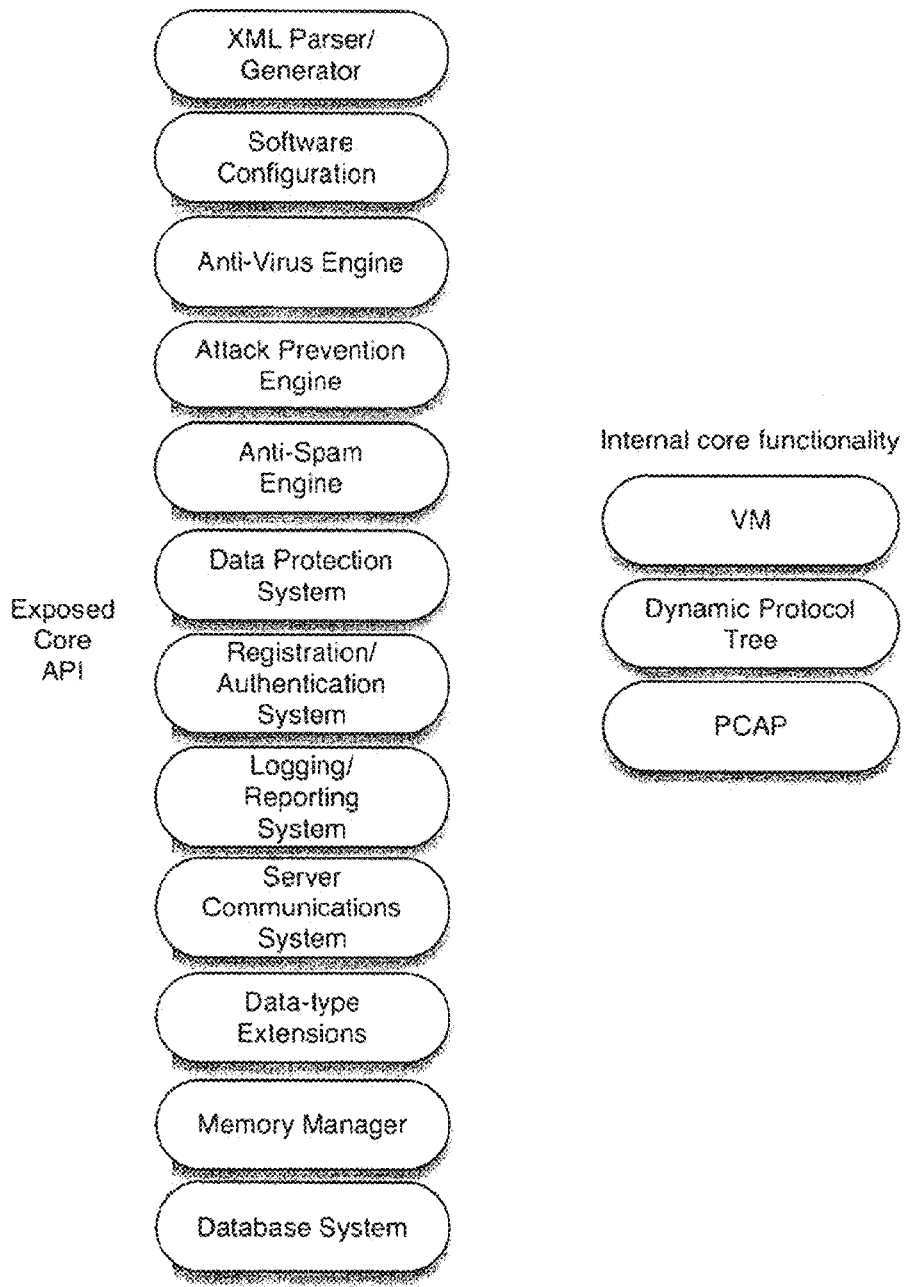
FIG. 20 is an exemplary block diagram depicting an embodiment.

FIG. 23 therefore illustrates the various messaging paths utilized by the system components of the disclosed subject matter. The common API may facilitate this communication and allow access or calling within the system. This enables separation of the various components of the disclosed subject matter to determine the most efficient use of the system architecture. Development for the cross-platform system is discussed in more detail below. However, at a high level, one will appreciate that platform-independent component 1901 exposes a common platform-independent API that provides common functions regardless of the mobile device being used. These functions include but are not limited to a XML parser or generator, the software configuration for the mobile device, an anti-virus engine, an attack prevention engine, an anti-spam engine, a data protection system, a registration/authentication system, a logging or reporting system, a server communications system, data-type extensions, a memory manager or a database system (see FIG. 20).

Figure 21:
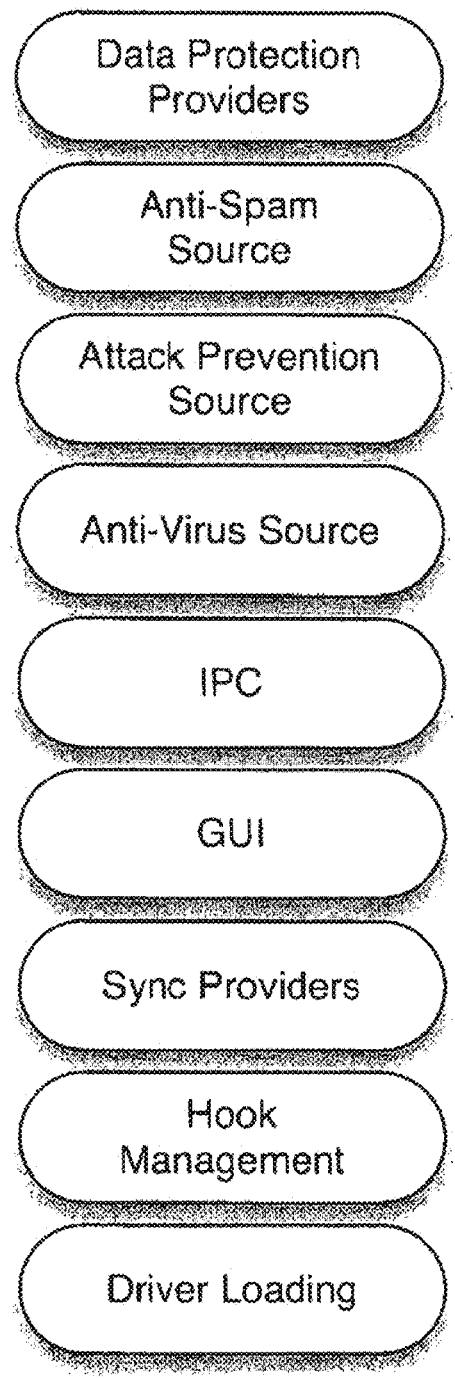
FIG. 21 is an exemplary block diagram depicting an embodiment.
Figure 22:
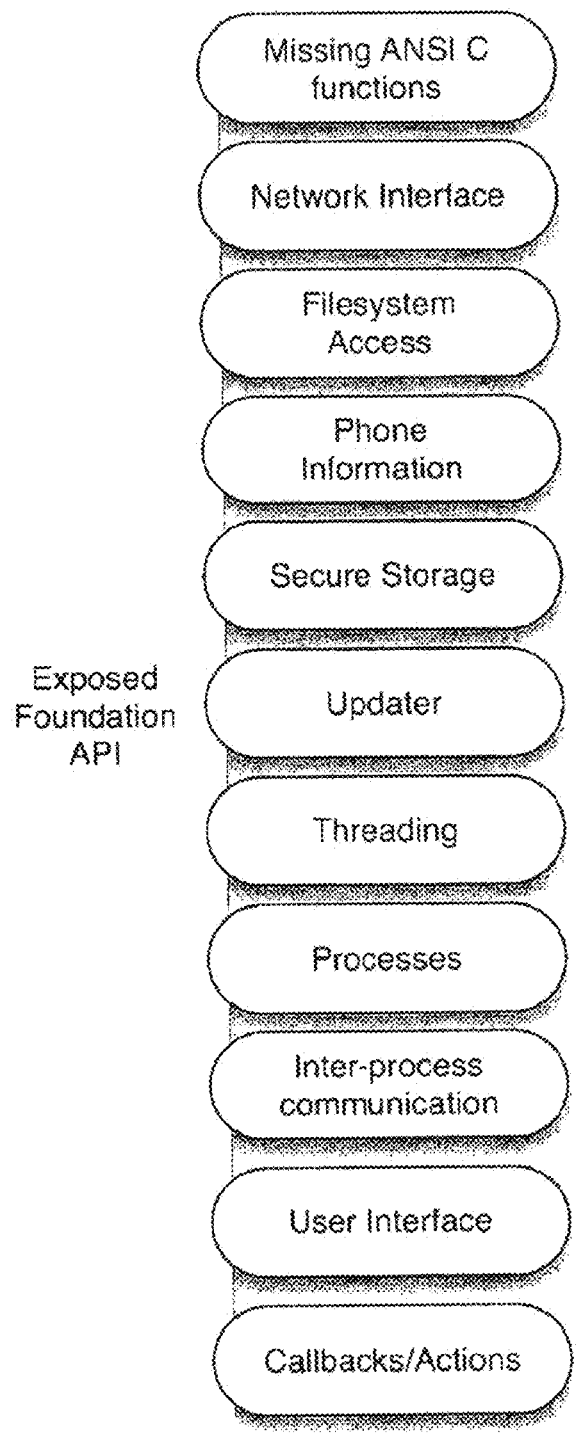
FIG. 22 is an exemplary block diagram depicting an embodiment.

The platform-specific component 1911 may provide for functionalities that are not common to all mobile communications device platforms. For example, as shown in FIG. 21, these may include data protection providers, anti-spam sources, attack prevention sources, anti-virus sources, IPC, GUI, sync providers, hook management and driver loading. The abstraction layer component that integrates with platform-independent component 1901 and communicates with and between platform-independent component 1901 and platform-specific component 1921 may provide or access other functionalities, such as missing ANSI C functions, network interfaces, file system access, phone or device information, secure storage, an updater, threading, processes, inter-process communication, user interface or callbacks or other actions (FIG. 22).

Other examples of how an application built for use on the cross-platform system are discussed further below. One will appreciate that the above lists are merely exemplary and are not intended to limit the claimed subject matter to any one embodiment.

B. Cross-Platform Functionality

Using the system architecture illustrated in FIG. 19 and the messaging pathways illustrated in FIG. 23, the disclosed subject matter achieves efficient cross-platform functionality by utilizing the specific features of each device platform and/or provider, while at the same time utilizing a powerful platform-independent component 1901 library and API as a common code base for all devices. In an embodiment, the cross-platform system relies upon a more specific abstraction layer component 1921 than prior art systems. As such, even though abstraction layer component 1921 exposes the same API on all mobile communications device platforms, the underlying implementation of the applications running on the cross-platform system differs.

As shown in the figures, the platform-independent component 1901 is designed to call and be called by abstraction layer component 1921. As previously discussed, prior art systems lack this type of cross-communication. Specifically, prior art cross-platform systems include the capability to call an abstraction layer, but the abstraction layer does not necessarily depend upon or integrate with the calling component. In the disclosed subject matter, platform-independent code may be incorporated in platform-independent component 1901 such that the applications executed on the cross-platform system are minimally implemented in the abstraction layer component 1921, and instead rely more on platform-independent component 1901 libraries. As such, in the disclosed subject matter, abstraction layer component 1921 allows most application functionalities to execute using platform-independent code. However, the figures also illustrate that platform-independent component 1901 may be called by platform-specific component 1911, thereby enabling those functionalities that require platform-specific code. The various platform-independent component 1901 and platform-specific component 1911 code libraries may reside on the device itself, may be accessible on a server, or a combination of both.

This architecture encourages application development that is more efficient and provides better integration with minimal code duplication on the mobile device platform that eventually runs the application. In addition, it allows for the easy creation and maintenance of a software application across multiple handset platforms, minimizing the amount of code that needs to be "ported", re-written, or conditionally compiled/executed. The architecture is designed to isolate the various components that may differ on each device platform from those components that do not differ, while still allowing platform-specific functionality to take advantage of the platform-independent and abstraction components. The development of a software application for this architecture is discussed further in the next section. Implementation of such an application is discussed below.

Figure 24:
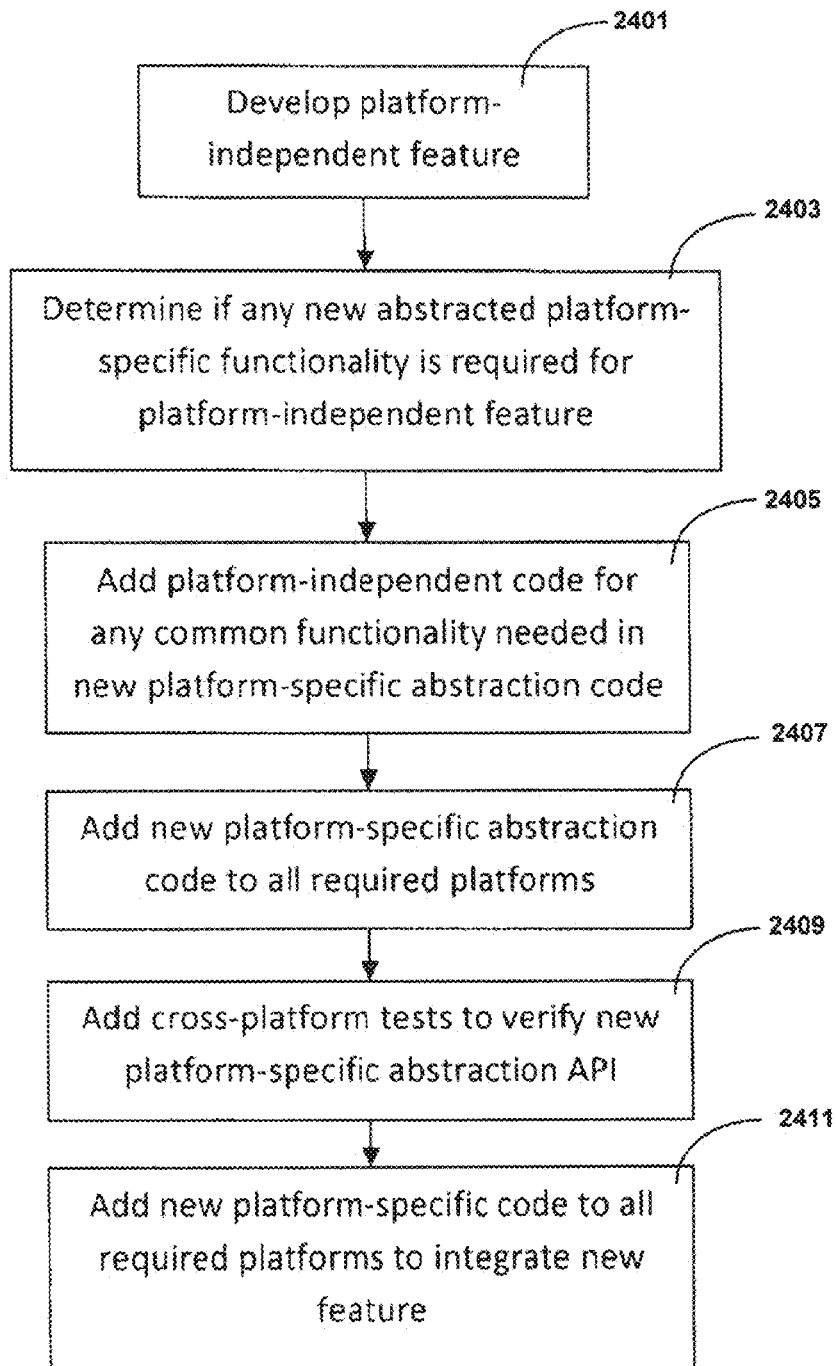
FIG. 24 is an exemplary flow diagram illustrating the steps of an embodiment.
Figure 25:
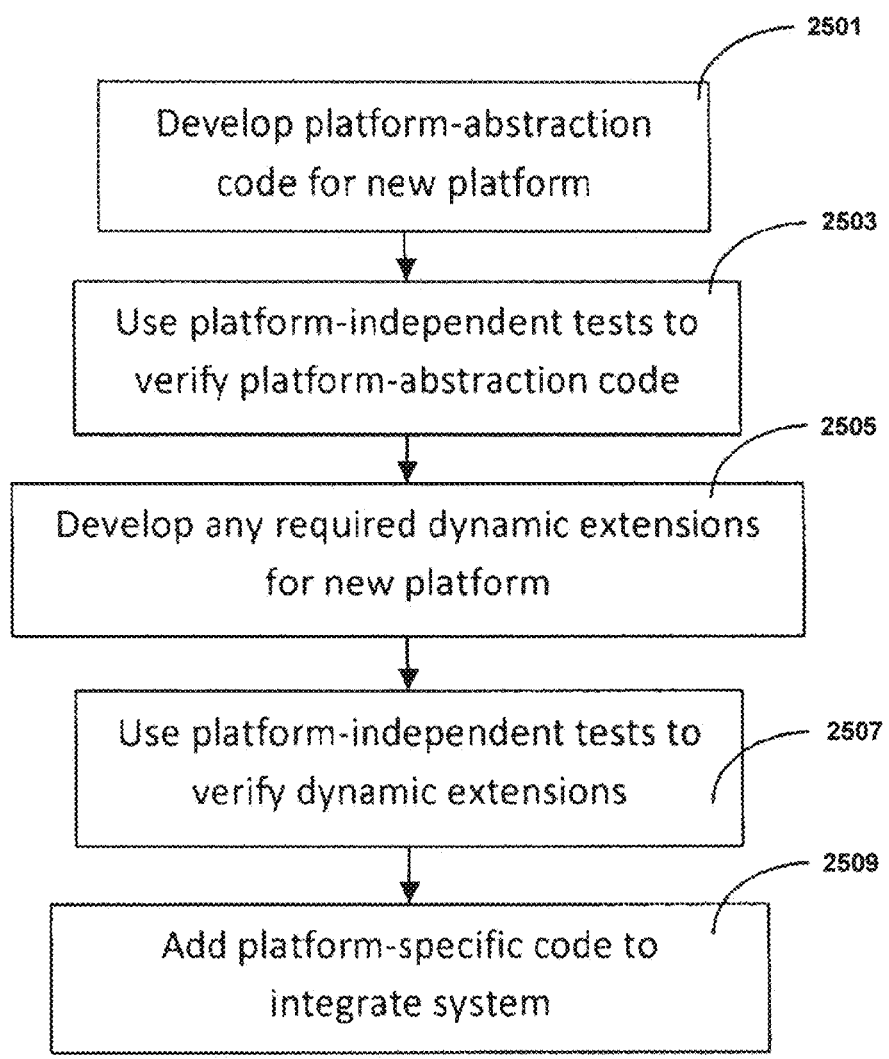
FIG. 25 is an exemplary flow diagram illustrating the steps of an embodiment.
Figure 26:
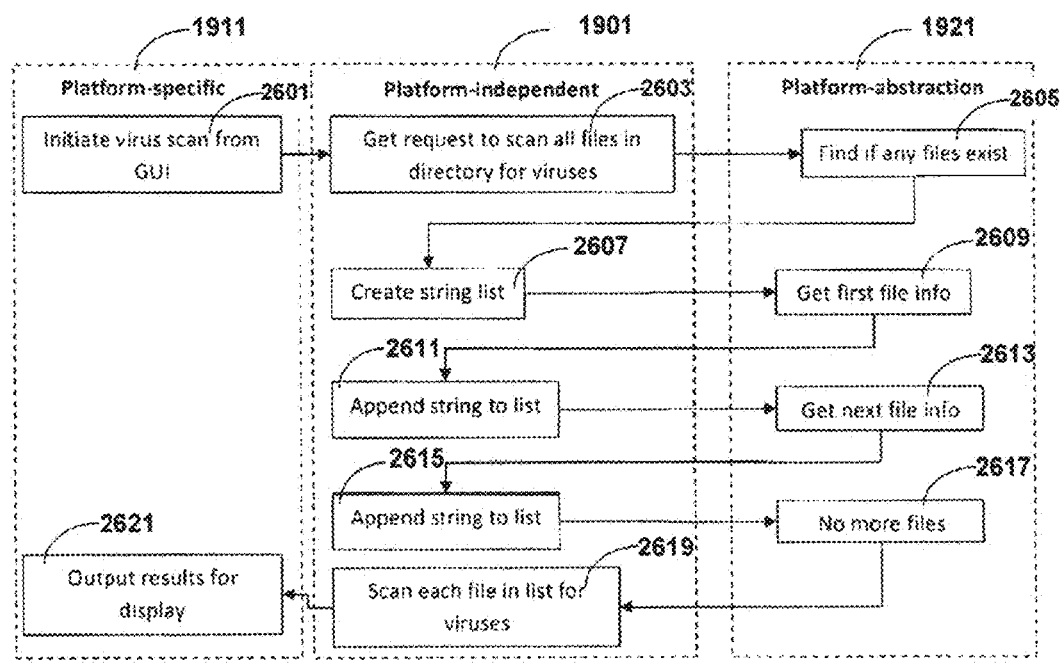
FIG. 26 is an exemplary flow diagram illustrating the steps of an embodiment.
Figure 27:
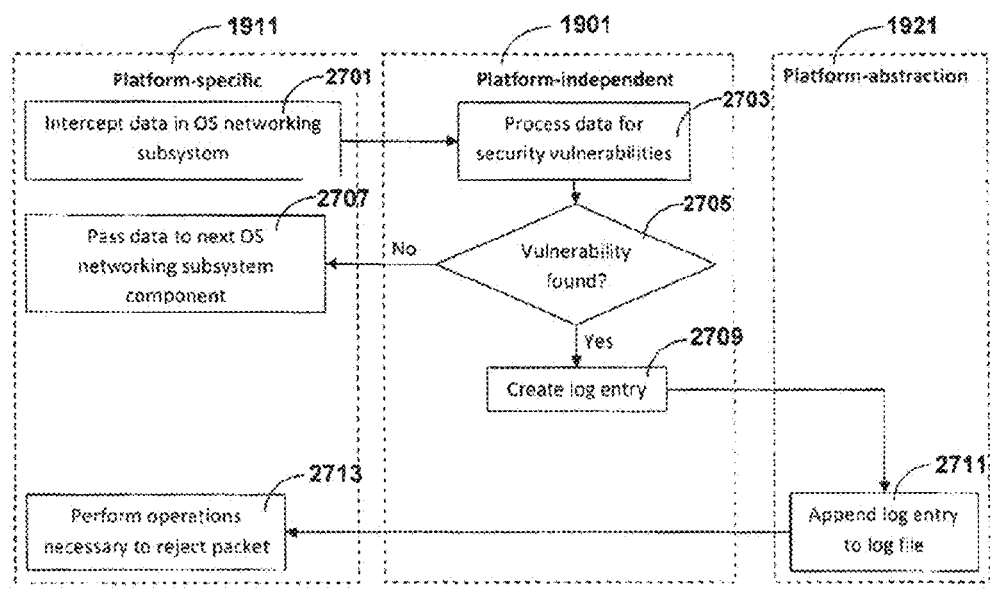
FIG. 27 is an exemplary flow diagram illustrating the steps of an embodiment.

FIGS. 26 and 27 illustrate how some applications may be developed for the cross-platform embodiment. As such, one will appreciate that the disclosed subject matter includes the cross-platform system, as well as applications developed using the cross-platform system on a mobile communications device. The actual development process is illustrated in FIGS. 24 and 25, discussed in the next section.

FIG. 26 depicts a simple virus scanning system on a mobile communications device in which platform-independent component 1901 and the abstraction layer component 1921 are interdependent. In other words, in this embodiment, the abstraction layer is integrally tied to the platform-independent component that it is supporting. In step 2601 of FIG. 26, a virus scan may be initiated by using the GUI of the mobile communications device. Because a GUI may differ between mobile communications devices, initiating a virus scan using the GUI may require identifying the platform-specific characteristics of each device. As such, the platform-specific component 1911 of the cross-platform system will likely enable this functionality. In step 2603, the platform-independent component 1901 receives the request to scan data files stored in a directory on the mobile communications device. The method of receiving such a command and performing the scan will likely not differ between each mobile communications device. In other words, the cross-platform anti-virus system will typically use the same detection engines to identify malware and viruses between platforms. As such, the platform-independent component 1901 can be tasked with handling such a scan. An example of such a scan is described in U.S. patent application Ser. No. 12/255,621, entitled "SYSTEM AND METHOD FOR ATTACK AND MALWARE PREVENTION," incorporated in full herein.

Accessing the directories and underlying files system of a mobile communications device is typically abstracted to a separate interface to avoid direct interaction with the data. As such, platform abstraction layer component 1921 may enable the function of locating the files in the directory identified for scanning (step 2605). A list of these files may be created by platform-independent component 1901 since it will eventually perform the scan (step 2607). The steps of identifying files and building a list of those files will be jointly performed or enabled by abstraction layer component 1921 and platform-independent component 1901 (steps 2609, 811, 813, 815, 817). Once complete, the platform-independent component 1901 may enable a scan of the identified files (step 2619). Results may then be outputted to a display specific to the mobile communications device (step 2621). As such, this final step may be performed or enabled by the platform-specific component 1911. An example of how such information might be displayed is discussed in U.S. patent application Ser. No. 12/255,635, entitled "SECURITY STATUS AND INFORMATION DISPLAY SYSTEM," incorporated in full herein.

FIG. 27 illustrates an intrusion prevention system using the cross-platform system embodiment. This system may be similar to that described in U.S. patent application Ser. No. 12/255,614, entitled "SYSTEM AND METHOD FOR MONITORING AND ANALYZING MULTIPLE INTERFACES AND MULTIPLE PROTOCOLS," incorporated in full herein. As FIG. 27 shows, the balance of functionalities between the platform-specific component 1911, platform-independent component 1901 and the abstraction layer component 1921 may vary depending upon the functionality being enabled or utilized on a mobile communications device. In step 2701, data is intercepted in the OS networking subsystem of the mobile communications device. The platform-specific component 1911 may enable this functionality to provide access to networking subsystems and network access points that may differ from device to device. However, the processing of this intercepted data will likely not differ from device to device. As such, in step 2703, the platform-independent component 1901 may handle this processing to determine if the intercepted data contains any vulnerabilities or other security threats (step 2705). If not, then the data is allowed to proceed to its intended destination for further processing, which may be the next OS networking subsystem component (step 2707). One will appreciate that the abstraction layer component 1921 was not involved in this transaction because there were no functions that needed to be abstracted. In this embodiment, the abstraction layer is therefore not interdependent on any other component of the cross-platform system.

However, if a vulnerability or security threat is identified by the platform-independent component 1901, then the platform-independent component 1901 may create and store a log entry or otherwise record the security event (step 2709). The function of appending the log entry to a log file may be performed by the abstraction layer component 1921 (step 2711), since this may be considered a file system or data file interaction not suited for the platform-independent component 1901. Treatment of the infected data, such as rejection from further processing, deletion or quarantine, may be handled by the platform-specific component 1911 since the process of implementing treatment may differ between mobile communications devices (step 2713).

The above examples illustrate some benefits of the disclosed subject matter. One will appreciate that when applied to mobile device security software, the disclosed subject matter helps combat criminal and cyber-terrorist attacks by enabling rapid response to emerging threats. Mobile communications devices are already recognize as an integral part of society's infrastructure, supporting data and voice communications for commerce, government and security. As such, it is of extreme importance to the functioning of both government and commerce that such devices remain functional and not compromised. As discussed previously and throughout, the disclosed subject matter allows security functionality to be written in platform-independent code, even though this functionality needs to be tightly integrated with the operating system on which it runs. Cyber-attacks can thereby be stopped on all supported platforms by adding security and protection functionality to the platform-independent component and deploying an updated version of the security software. By requiring only one version of the protection functionality for these cyber-attacks, the disclosed subject matter enables a substantial increase in the ability to respond quickly to vulnerabilities affecting multiple mobile device platforms.

In prior art cross-platform systems and methods, the abstraction layer, in addition to including abstracted functionalities, also includes platform-specific and platform-independent functionalities. In the disclosed subject matter, the abstraction layer does not include these different functionalities. Instead, the abstraction layer component 1921 is kept lightweight, and is designed to rely on abstracted functionalities provided by the platform-independent component 1901. Conversely, platform-independent component 1901 may call abstraction component 1921 as needed, thereby ensuring a two-way interdependency, when optimal, between platform-independent component 1901 and abstraction component 1921. As a result, during software development for the disclosed subject matter's cross-platform system, a greater proportion of software code may be cross-platform.

The disclosed subject matter therefore functions by virtue of the tightly integrated and non-general abstraction layer component 1921. Because of the specific design of the abstraction layer component 1921, the disclosed subject matter provides cross-platform functionality for low-level functions, such as security or other features that require communication with a device's operating system. Additionally, the disclosed subject matter does not require much code duplication between platforms. A greater proportion of code may be written to the platform-independent component 1901, thereby lightening the abstraction layer 1921 and enabling more devices to be cross-platform.

C. Development for the Cross-Platform System

As previously discussed, application development for the cross-platform system of the disclosed subject matter may require that software engineers and programmers determine initially which features of the application can depend upon platform-independent functionalities, and which features can depend upon platform-specific functionalities. Development may involve compiling programs and code using portions of the cross-platform system library that may stored on a remote server, or may involve using a toolkit or similar software development kit that contains portions of the cross-platform library stored locally. Developers may upload finished or partially finished applications to a server or servers for distribution to mobile communications device users, thereby ensuring distribution and verification on different devices. These applications may then be downloaded or otherwise transferred to a mobile communications device, regardless of the hardware or software platform, so long as the device or the software being downloaded contains the cross-platform system.

By way of example, FIG. 24 illustrates a possible software development method for creating or adding a new feature to a mobile communications device that may rely upon some platform-specific functionality. In step 2401, the platform-independent feature may initially be developed. The software engineer may then determine if any new abstracted platform-specific functionality is required for the platform-independent feature (step 2403). If so, then in step 2405, platform-independent code for any common functionality in new platform-specific abstraction code may be added. This new platform-specific abstraction code may then be added to all required platforms (step 2407). Cross-platform tests must then be performed to verify the new platform-specific abstraction API (step 2409). Alternatively, tests may be performed to verify compatibility with the common API. If the tests are successful and the platform-specific code performs as expected, then the new platform-specific code may be added to all required platforms, thereby integrating the new feature (step 2411).

In some instances, the software engineer or programmer may need to integrate a new mobile communications device with the disclosed subject matter's cross-platform system. This may require an evaluation of the device's configuration and features, and a determination of which aspects of the device may rely upon the platform-independent component 1901 already adopted and implemented across all other previously-integrated mobile communications devices, as well as a determination of the platform-specific features that can be integrated into a new platform-specific component 1911 for the new device. Further, this may necessarily require development of an abstraction layer component 1921 to implement and interface with the platform-independent component 1901 and the platform-specific component 1911 that will be installed for the new device.

FIG. 25 illustrates an exemplary cross-platform development method to add support for a new mobile communications device or platform. In step 2501, the abstraction layer component 1921 may be developed for the new device or platform. The new abstraction layer component 1921 must then be tested using platform-independent verification to ensure that the abstraction layer component 1921 code performs as expected. Since the mobile communications device itself may include functionalities, features or hardware components that differ from other devices, these different functionalities may be addressed through dynamic extensions. These dynamic extensions may be developed for the new platform (step 2505). Verification of these dynamic extensions may also be tested using platform-independent tests (step 2507). Once the dynamic extensions and abstraction layer component 1921 have been verified, the platform-specific code may be added to the mobile communications device (step 2509), thereby integrating the platform-independent component 1901, abstraction layer component 1921 and platform-specific component 1911 on the device.

In the previous example, the software engineer or programmer may need to consider developing dynamic extensions for and on the mobile communications device. One will appreciate that service providers for these devices may request that certain device functions be disabled or removed. Similarly, one will appreciate that even though two devices may use the same operating system, they perform functions differently. Dynamic extensions offer a way to take advantage of the individual features of a mobile communications device that may not be present on other mobile communications device, even if those devices are from the same manufacturer or use the same operating system. By adding dynamic extensions for the mobile communications device during development (step 2505), the cross-platform system of the disclosed subject matter may recognize and determine the unique functionalities of the device at run-time.

For example, software may be developed for an entire mobile device platform or operating system, such as Android™ or Windows Mobile®. However, specific mobile communications devices that run the Android platform may differ from other devices running the Android platform. Specifically, some devices may possess functionalities that do not exist on others (such as a SIM card contact-list storage). By developing and adding dynamic extensions to the cross-platform system of the disclosed subject matter, the system may determine which dynamic extensions it may wish to register with the platform-independent component 1901 on the device, thereby allowing a single executable to support a variety of individual device configurations on the platform.

One will appreciate that the above examples describe a few exemplary methods for developing and adding to the cross-platform system of the disclosed subject matter. The above examples are not intended to limit the disclosure in any way, and one will appreciate that other development methods are possible without departing from this disclosure or the scope of the claimed subject matter.

D. Quality Assurance/Testing for the Cross-Platform System

As previously discussed, the system architecture of the disclosed subject matter streamlines the testing and verification of applications for the cross-platform system. An embodiment contemplates a common platform-independent component 1901 for all mobile communications device platforms that communicates with the platform abstraction layer component 1921. In other words, the abstraction layer component 1921 exposes the same platform-independent component 1901 API on all mobile communications device platforms, but each platform implements the system differently depending upon its configuration. In any event, because the same platform-independent component 1901 API exists on all mobile communications devices, testing to ensure that the abstraction layer component 1921 integrates with this platform-independent component 1901 is more easily and efficiently performed than on cross-platform systems that do not implement the disclosed subject matter's system architecture. As a result, testing systems and algorithms may be refined and re-used repeatedly in order to verify that the abstraction layer component 1921 performs as expected. The disclosed subject matter does not require different testing systems and algorithms for every instance of the abstraction layer, as is required in the prior art. Similarly, any dynamic extensions developed for a platform are easily tested and verified. Even though dynamic extensions may differ between mobile devices because of different configurations, the dynamic extensions for a particular platform will still possess a common API specification. As such, the common API specification may be verified with a common test. By allowing for the use of common and re-usable testing algorithms, the QA portion of the development cycle is shortened. Developers and QA engineers do not need to create new tests, thereby saving time and expediting launch of new applications and devices using the cross-platform system of the disclosed subject matter.

Figure 28:
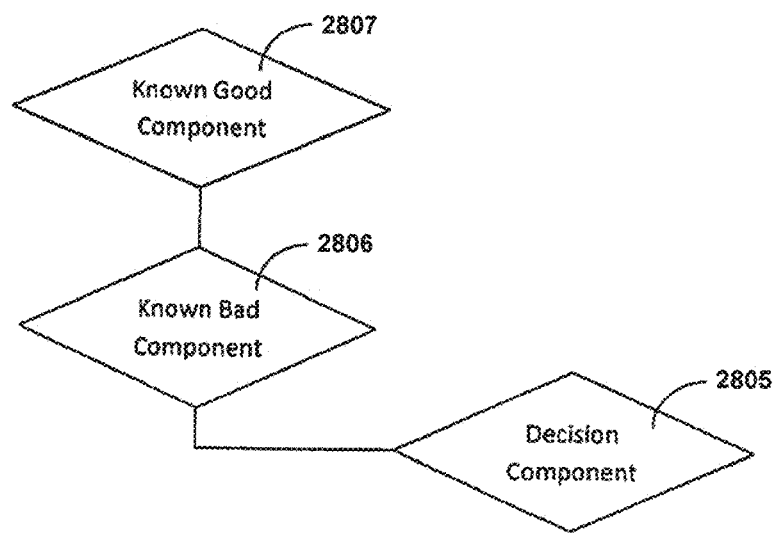
FIG. 28 is an exemplary block diagram depicting one embodiment.

In an embodiment, the disclosed subject matter is comprised of at least three software components resident on a mobile communications device. As shown in FIG. 28, a first component 2807 may be used to recognize data that is safe, or "known good." A second component 2806 may be used to recognize data that is malicious, or "known bad." A third component 2805 is a decision component that may be used to evaluate data that is neither known good nor known bad. Each of these components is discussed in more detail below.

One will appreciate that as referred to herein, data may include network data, files, executable and non-executable applications, emails and other types of objects that can be transmitted to or received by a mobile communications device. Mobile communications devices typically transmit and receive data through one or more network interfaces, including Bluetooth, Wi-Fi, infrared, radio receivers, and the like. Similarly, data may be encapsulated in a layered communications protocol or set of protocols, such as TCP/IP, HTTP, Bluetooth, and the like. In order to evaluate the security threat level of the data, it may be necessary to identify or parse the one or more protocols used to encapsulate the data. This may be done using a system such as the one described in U.S. patent application Ser. No. 12/255,614, entitled "SYSTEM AND METHOD FOR MONITORING AND ANALYZING MULTIPLE INTERFACES AND MULTIPLE PROTOCOLS," now U.S. Pat. No. 8,051,480 which is hereby incorporated by reference in full herein.

In addition, one will appreciate that data can vary in size and complexity depending upon its source, destination and purpose. It may be difficult to analyze received data objects as a whole; therefore, in order to optimize resources on the mobile communications device platform, the disclosed subject matter may apply hashing functions or hashing algorithms to the received data. A hashing algorithm will transform the data into a fixed length identifier for easier evaluation. Applying the hash function may be performed by any of the components in the system illustrated in FIG. 28, or alternatively, may simply be performed by the system itself.

Hashed data may then be submitted to some or all of the three components for categorization and further action, if necessary. For example, the known good component 2807 may have access to or may associate with a stored database of known good hash identifiers. As discussed herein, the database may be a data store or table of known good hash identifiers, or may be logic providing a comparison against hash identifiers for known good data. When data is analyzed by the mobile communications device, it may be quickly hashed and compared against this stored database by the known good component. This database may include identifiers for data that has been analyzed before and been deemed safe, originates from a trustworthy source, or simply recognized as good based upon its characteristics. This may include an examination of the data's structure, statefulness, purported source and destination, etc. If there is a match against the known good hash identifier database, then the data may be categorized as known good, and no further analysis is necessary. This data may then be allowed to pass to its intended destination for processing, execution or other operation.

A person skilled in the art will appreciate that since the total number of known good applications for mobile communications devices is small, use of the known good component 2807 coupled to a database of known good application identifiers may significantly reduce false-positive malware detection. One will also appreciate that use of a known good component 2807 may be particularly effective for data that contains executable software code. Executable software code for a given application rarely changes between different mobile communications devices, so creating a database of known good hash identifiers or logic for evaluating known good hash identifiers may be an effective method for recognizing safe or trustworthy data. This database may vary in size depending upon the resources available on the mobile communications device. Alternatively, aspects of the disclosed subject matter, such as the known good component, may have access to a remote server with a larger library of hash identifiers for known good data or applications. Additionally, as discussed further in the next section, known good component 2807 may be able to evaluate the security of data depending upon whether the data possesses sufficient characteristics common to other known good data.

The second component of the system embodiment may include a component capable of recognizing if received data is malicious, or "known bad" (106 in FIG. 28). Known bad component 2806 may have access to a database, logic or other data store containing information on known attack signatures or definitions that can be stored on the mobile communications device without occupying a significant amount of memory. For example, virus or other malware signatures can be reduced to hashing identifiers and stored in a database. In other words, there may be a known bad hash identifier database that complements the known good hash identifier database stored on the mobile communications device. Additionally or alternatively, known bad component 2806 may be capable of identifying malware using characteristics common to other malicious software code. When applied to network data or data files, known bad component 2806 may have access to a database containing patterns or other characteristics of a protocol data unit or file format which presents a security threat. Similar to the known good component 2807 and database, any data identified as containing malware may be deleted, quarantined, or rejected from further processing by the mobile communications device. If a known bad data object is detected, the disclosed subject matter may also display a notification or other message similar to that described in U.S. patent application Ser. No. 12/255,635, entitled "SECURITY STATUS AND INFORMATION DISPLAY SYSTEM," incorporated in full herein.

The third component of the system embodiment may be a decision component 2805. This component may be used to evaluate data that cannot be characterized as either known good or known bad. Since a majority of the data received on the mobile communications device may fall within this category, this component may utilize most of the resources allocated to the system embodiment. This component may apply fuzzy logic, heuristic or other methods of analysis in order to determine whether received data may be passed to its intended destination, or rejected to prevent harm from befalling the device. Examples of this analysis are discussed below.

One will appreciate that the system embodiment may exist independently on a mobile communications device, or may be incorporated into an existing security system on the mobile communications device such as the one in U.S. patent application Ser. No. 12/255,614. One will also appreciate that in order to implement the disclosed subject matter on a variety of mobile communications device platforms, it may be necessary to program aspects of the disclosed subject matter using a cross-platform system, such as the one disclosed in U.S. patent application Ser. No. 13/313,937, entitled "SYSTEM AND METHOD FOR A MOBILE CROSS PLATFORM SOFTWARE SYSTEM," now U.S. Pat. No. 8,271,608, incorporated by reference in full herein. In addition, aspects of the disclosed subject matter may be used to determine a security state for a mobile communications device, as is described in U.S. patent application Ser. No. 12/255,632, entitled "SECURE MOBILE PLATFORM SYSTEM," now U.S. Pat. No. 8,087,067 incorporated by reference in full herein.

One will also appreciate that while the disclosed subject matter is disclosed as installed on a mobile communications device, portions of the disclosed subject matter may communicate or work in conjunction with a remote server or a series of servers. For example, the system embodiment may be configured to update its virus definitions or compare received data against a larger virus signature database on a remote server. Alternatively, the mobile communications device may be configured to send a hash identifier for received data to one or more servers for analysis and/or evaluation. One server may contain the known good component 2807, known bad component 2806 and decision component 2805 of the disclosed subject matter, or the components may be distributed across two or more servers. The one or more servers may thereby perform the analysis using the hash identifier, and if analysis reveals that the hash identifier identifies recognizably safe data, then the one or more servers may notify the mobile communications device or instruct the device that it may accept and process the data. If the analysis reveals that the hash identifier identifies recognizably malicious data, then the one or more servers may notify the mobile communications device or instruct the device to reject the data and not process it further. If the analysis is inconclusive, then the one or more servers may request that the mobile communications device send the data identified by the hash identifier to a server for further analysis. Further analysis may be performed by a decision component 2805 or manually. One will appreciate that other variations are possible without departing from this disclosure.

B. Malware and Attack Detection Using Data Characteristics

The system architecture discussed above offers an improvement over prior art mobile communications device security systems that typically only include a known good detection method or a known bad detection method. Because the disclosed subject matter incorporates a decision component 2805 as well, it minimizes false-positive or false-negative detection errors common to prior art systems. Other advantages and improvements are discussed in this section that describes some of the analyses performed by the system embodiment.

1. Known Good Characteristics

In an embodiment, the disclosed subject matter may be configured to recognize good characteristics that all known good data should possess. Analyzing data for good characteristics may include the equivalent of applying a database or other data store of known good characteristics or logic asserting known good characteristics, and performing a comparison against the database. Alternatively or additionally, analyzing data for good characteristics may include the equivalent of applying logic asserting known good characteristics. The database or logic may not include all of the characteristics that may determine if data is good; however, if the data object lacks key known good characteristics, then the system can conclude that the data may be malicious and should be further analyzed, or alternatively, rejected outright. The database of known good characteristics or logic asserting known good characteristic may supplant the known good component 2807 discussed above, or in some cases may replace it as a lightweight alternative. In other words, a list of all the known good data files and network data may be infinitely large, but the list of characteristics common to known good data files and known good network data may be much smaller. As such, the database of known good characteristics may be smaller in size than the known good database, and may therefore be more practical in mobile communications devices with less memory or processing resources.

One will appreciate that there are a number of characteristics common to known good data, but that these characteristics may differ depending upon whether the data is network data, a data file, or executable data. The disclosed subject matter is able to evaluate all types of data receivable by a mobile communications device. For example, network data and data files may be examined for structure and state.

This may involve checking the data against its associated metadata to confirm that the size, type and description match the data being described. Using this analysis, known good component 2807 may be configured to allow or accept data that has valid statefulness and structure, and provide data that does not pass these tests to the known bad component 2806 for further analysis or simply reject it outright. One will appreciate, however, that having valid statefulness and structure are not alone enough for concluding that a data file or network data is good, and further analysis by known bad component 2806 and/or decision component 2805 may be necessary. In other words, even though data analyzed by known good component 2807 may result in a positive match finding that the data has recognizably good characteristics, or has a hash identifier matching known good data, the data may still be analyzed by known bad component 2806 and/or decision component 2805.

With regards to executable data, the list of known good executable applications for mobile communications devices is small. As such, known good component 2807 may simply compare hash identifiers for gathered executable data and compare them against a stored database of known good executables. One will appreciate that other methods, such as validating the structure of an executable file format or validating any cryptographic signatures on an executable may be applied as well.

2. Known Bad Characteristics

In an embodiment, data may be compared using logic or a database or other data store of known bad characteristics. As such, if data has known bad characteristics, it may be considered malicious and may be rejected, deleted or quarantined. One will appreciate that the entire data object may have known bad characteristics, or part of the data object may have known bad characteristics, or a pattern in an object may be recognized as known bad, or the data object may yield a positive result from logic that performs a specific test for known bad characteristics. In such situations, it may warrant further analysis or confirmation to avoid an inaccurate result. Further analysis protects against situations in which the disclosed subject matter may not recognize a specifically malicious data object that has not been recognized as such before. It is preferable to avoid mistakenly characterizing an object as more good than bad if it presents a security threat. Data that is recognized as known good, or is recognized has having sufficient known good characteristics, may be passed on to its intended destination. Data that fails to have all of the characteristics of a known good file or application, is found to be more bad than good, or is simply unrecognized may be passed along to the decision component 2805 for further analysis.

As noted previously, data may be analyzed differently depending upon whether it is network data, file data, or executable data. Network data and file data may be encapsulated in various multi-layer protocols or formats. These protocols or formats may be analyzed using the system and methods described in U.S. patent application Ser. No. 12/255,614. If any of the data has known bad violations of its purported protocol or format, contains anomalous content or state transitions, or is invalid for the processor or subsystem to which it is directed, then known bad component 2806 may reject this data as potentially malicious.

Known bad executables may be evaluated using full hash signatures, a string match anywhere or at a relative or absolute offset in the file, or a pattern anywhere or at a certain offset in the file consistent with known pieces or families of malware. If any of these characteristics are encountered, then the known bad component 2806 may identify the data as malware and reject it. One will appreciate that other methods for detecting known bad data may be used as well, including but not limited to blocking executables which utilize a piece or specific combination of privileged functionality, or blocking executables which a server deems to have access frequency characteristics across many mobile devices indicative of viruses or malware.

3. Further Analysis

In some instances, data may not be immediately recognized as known good or known bad, and so decision component 2805 may be used. One will appreciate that a key aspect of the disclosed subject matter is its ability to analyze data that is not immediately known good or known bad. As mentioned above, this may require an analysis to determine if data is more good than bad, or more bad than good. As such, the disclosed subject matter provides a sliding scale with which to assess the degree of how good or how bad received data may be. This permits a more precise measurement of not only how data may or may not harm a mobile communications device, but in light of this data, how the overall security state of the device may change.

The decision component 2805 may utilize one or more types of internal decision systems to characterize whether data is good or bad. The decision component 2805 is designed to detect security threats without specific signatures for the threats being protected against. In other words, decision component 2805 may operate as an additional security component to compensate for any weaknesses from known good component 2807 or known bad component 2806.

One will appreciate that there are a number of decision systems that may be utilized by decision component 2805, including but not limited to heuristic algorithms, rule-based or non-rule-based expert systems, fuzzy logic systems, neural networks, or other systems that may be used to classify a subject. In an embodiment, decision component 2805 can analyze network data or files for possible security threats. For example, a fuzzy system may be configured to analyze the timing related to authentication actions over a given protocol, such as Bluetooth. A remote device connected to the local device via Bluetooth may repeatedly try to request access to a privileged resource on a device. Each time the remote device sends an authentication request, a window may pop up on the target device that requires user action before normal device interaction can resume. Because there is often no rate limiting built into the Bluetooth authentication system of mobile phones, a remote device can continue interrupting the local user by requesting access to the privileged resource and until the local user becomes frustrated and simply grants the request.

A fuzzy system can analyze data such as the timings between authentication requests, the results of previous authentication requests, and the time required for the user to respond to previous authentication requests. Such a system can detect when a remote device is attempting to repeatedly request authorization and the user is denying it quickly to prevent a situation where the user becomes frustrated and grants privileged access on his or her device to a remote attacker. Such a system can also be used to detect denial of service attacks, port scans, or other attacks that have a significant temporal component.

In another example, a heuristic algorithm may be used to detect the presence of shellcode in a data packet, stream, or data file in which none is expected. Such shellcode may be indicative that the data contains an exploit designed to perform a memory corruption attack where the attacker aims to have the supplied shellcode executed by the target device's processor.

In another example, the decision component 2805 may contain a system for detecting anomalies in protocol behavior or file content so as to catch security threats that rely on unforeseen, yet out-of-the-ordinary mechanisms.

In another example, the decision component 2805 may contain a system for analyzing authentication or other strings in network data or files that may be used to "socially engineer" a user. "Social engineering" attacks often manipulate the user into performing an action that is not in his or her best interest by using false information or otherwise presenting information to the user that he or she may interpret as legitimate but, in fact, is not. Such a system can examine the content of strings to determine if the data is of legitimate origin or is a potential social engineering attack. Examples of attacks this type of system may stop include: "phishing," "SMS phishing," Bluetooth device name manipulation, and others.

In an embodiment, the decision component 2805 may analyze applications, libraries, or other executables on a mobile communications device. In an example, the decision component 2805 may contain a neural network which analyzes characteristics of an executable and determines a security assessment based on pre-set connection characteristics. Such characteristics may be determined based on information contained in the executable file format or as a result of processing the content of the executable file.

In an example, the decision component 2805 may contain a virtual machine-based decision system by which an executable can be classified by a set of rules that may be updated independently of the decision component itself. Such a system is able to add new logic to detect certain new classes of viruses on the fly without having to update the whole decision component. The system may pre-process the executable so that the virtual machine's logic can symbolically reference the executable rather than having to process the executable itself In an example, the decision component 2805 may contain an expert-system which analyzes the behavior of an executable through function calls, system calls or actions an executable may take on an operating system. If an executable accesses sensitive system calls in a way that signifies malicious behavior, the system may flag that executable as potential malware and action may be taken.

The above examples illustrate how decision component 2805 may utilize a number of analytical methods in order to fully evaluate the threat level of data received by or transmitted from the mobile communications device. Other examples may be contemplated without departing from the scope of this disclosure or the spirit of the claimed subject matter.

C. Data Analysis

Figure 29:
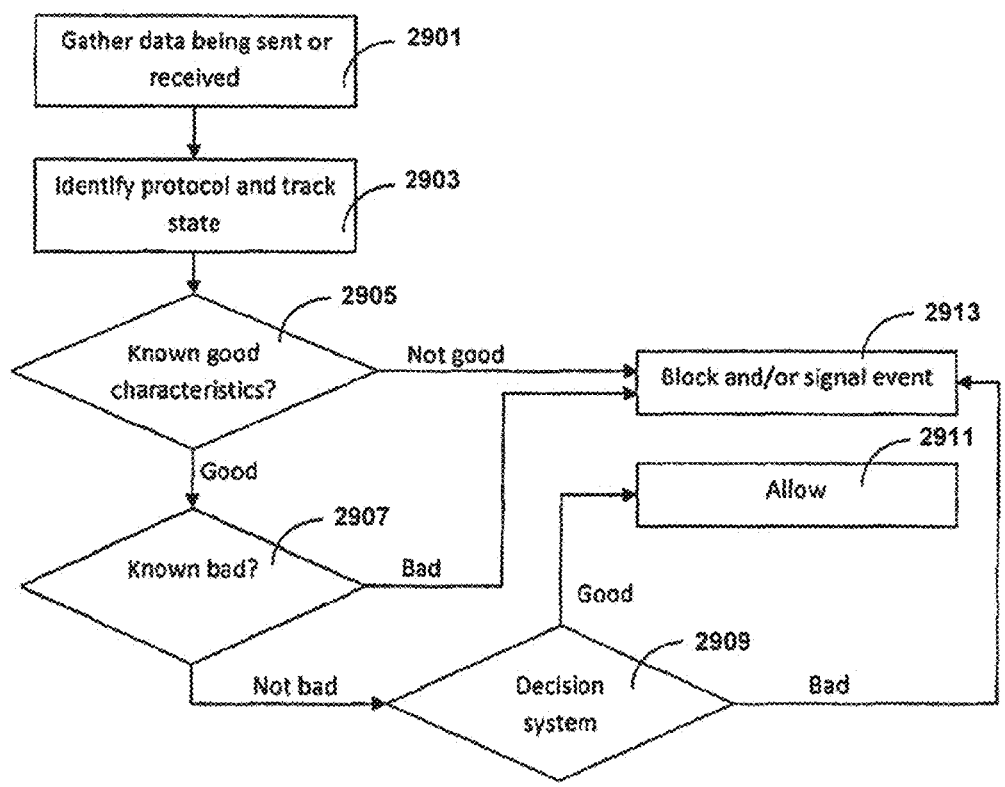
FIG. 29 is an exemplary flow diagram illustrating the steps of an embodiment.
Figure 30:
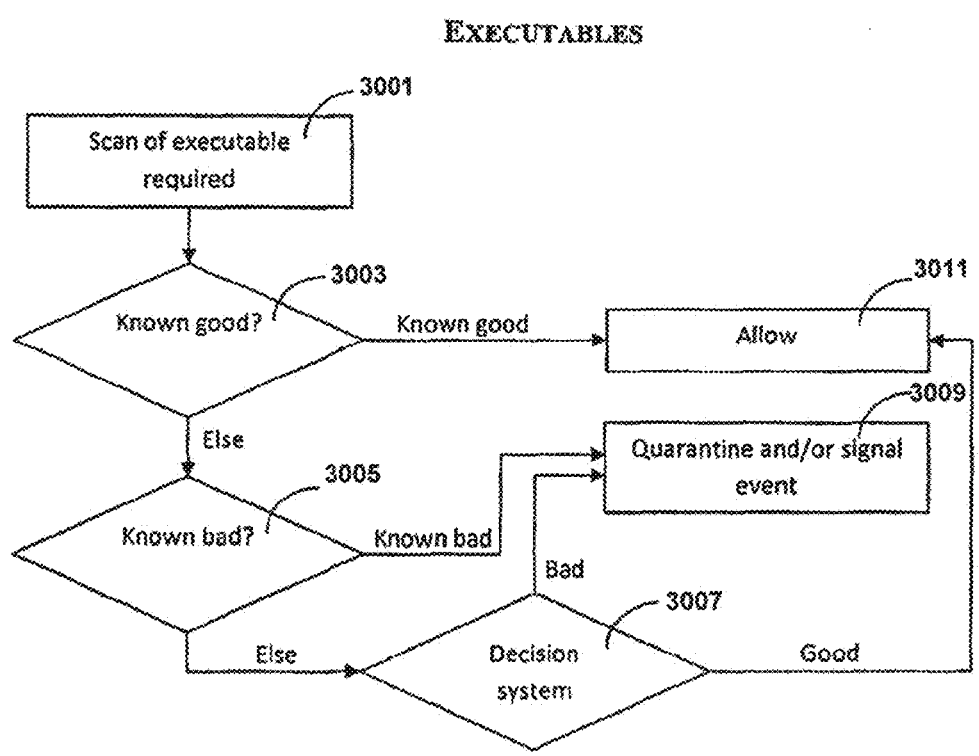
FIG. 30 is an exemplary flow diagram illustrating the steps of an embodiment.

FIGS. 29 and 30 provide examples of how the system described above may apply its algorithm for evaluating data to detect malware and prevent attack. FIG. 29 illustrates the disclosed subject matter evaluating network data or data files. FIG. 30 illustrates the disclosed subject matter evaluating executable code. Each is discussed in turn.

1. Analysis of Network Data or Data Files

As shown in FIG. 29, step 2901 may involve gathering data sent to or received from the mobile communications device. The data may be analyzed to identify its protocol and track state (step 2903). One will appreciate that these steps may be performed in whole or in part by the system described in U.S. patent application Ser. No. 12/255,635. In step 2905, known good component 2807 may evaluate the gathered data for known good characteristics. Known good characteristics may include the characteristics previously discussed. If the data contains sufficient known good characteristics, it may be allowed to proceed to its intended destination (step 2911) for processing, execution or other operation. Alternatively, it may be further analyzed by known bad component 2806 to confirm that the data is truly safe (step 2907). If known bad component 2806 determines that the data is truly safe, then the data may be allowed to proceed to its intended destination (step 2911). Decision component 2805 may also be available to provide a final check (step 2909) before allowing the data to proceed (step 2911).

At any point during the analysis, if either known good component 2807, known bad component 2806 or decision component 2805 determines that the data is not good, or affirmatively contains security threats, data inconsistencies, etc., then in step 2913 the data will be blocked, rejected, deleted or quarantined. As discussed above, a signal event or security event information log may be updated to record the encounter with the contaminated data.

One will appreciate that the steps illustrated in FIG. 29 are merely exemplary and are not meant to limit the claimed subject matter to any one method.

2. Analysis of Executable Data

Like FIG. 29, FIG. 30 similarly depicts and exemplary method for evaluating executable data, including but not limited to applications, programs and/or libraries on the mobile communications device. In step 3001, the executable is determined to need to be classified as either good or bad as a result from an attempt to access the executable or the executable being downloaded or otherwise transferred to the mobile device. The executable may or may not be pre-processed to determine a hash identifier or other characteristic before being evaluated by known good component 2807. This evaluation may include comparing the executable's hash identifier against a database of known good characteristics, identifying whether the executable has sufficient known good characteristics, or any of the criteria discussed above. If the executable is recognized as known good, then in step 3011, it may be allowed to execute its code or proceed to its intended destination for processing or other operation. If known good component 2807 fails to allow the executable data, then known bad component 2806 may perform its analysis (step 3005). If known bad component 2806 confirms that the executable is malicious, then the executable may be quarantined, rejected, or deleted, and the event may be logged (step 3009). If known bad component 2806 is unable to characterize the executable, then the decision component 2805 may perform its analysis as described above (step 3007). If decision component 2805 ultimately determines that the executable is safe, then the executable is allowed (step 3011). If decision component 2805 ultimately determines that the executable is not safe, or remains unsure, then the executable may be quarantined (step 3009). One will appreciate that since executables may contain code that can cause significant harm to the mobile communications device, it may require more rigorous analysis before the executable is allowed to proceed. Any of the steps illustrated in FIG. 30 may be altered without departing from this disclosure or scope of the claimed subject matter.

One will appreciate that the above examples contemplate that the disclosed subject matter operates wholly on a mobile communications device. However, as previously discussed, it is also possible for portions of the disclosed subject matter to reside on one or more remote servers. In the example of an antivirus system, a file's hash identifier may be transmitted to a remote server that then identifies whether the file is known good or known bad, or if the file contains known good or known bad characteristics. If the server does not recognize the file's hash identifier, the server may request that the file itself be transmitted to the server for analysis. This analysis may be automatic, or may be performed by a human. The server may furthermore analyze access patterns of a given executable between multiple devices to determine if the executable has virus or malware-like spreading characteristics. In an embodiment, analysis on the server is concurrent or in conjunction with an analysis performed by and on the mobile communications device. If the mobile communications device's antivirus system fails to classify the file, it may query the server for its results. Alternatively or in addition, the disclosed subject matter on the mobile communications device may perform a heuristic analysis using the decision component 2805 described above. The results from the local decision component 2805 on the mobile communications device may be logged locally and/or transmitted to the server.

As described above, the disclosed subject matter provides a robust and flexible security system for preventing attacks on a mobile communications device. By implementing the disclosed subject matter, attacks from cyber-terrorists and other criminal groups may be thwarted. As a result, mobile communications devices can be used for many tasks with a reduced risk of security threats such as exploits, viruses, malware, social engineering attacks, denial of service attacks, and the like.

Figure 32:
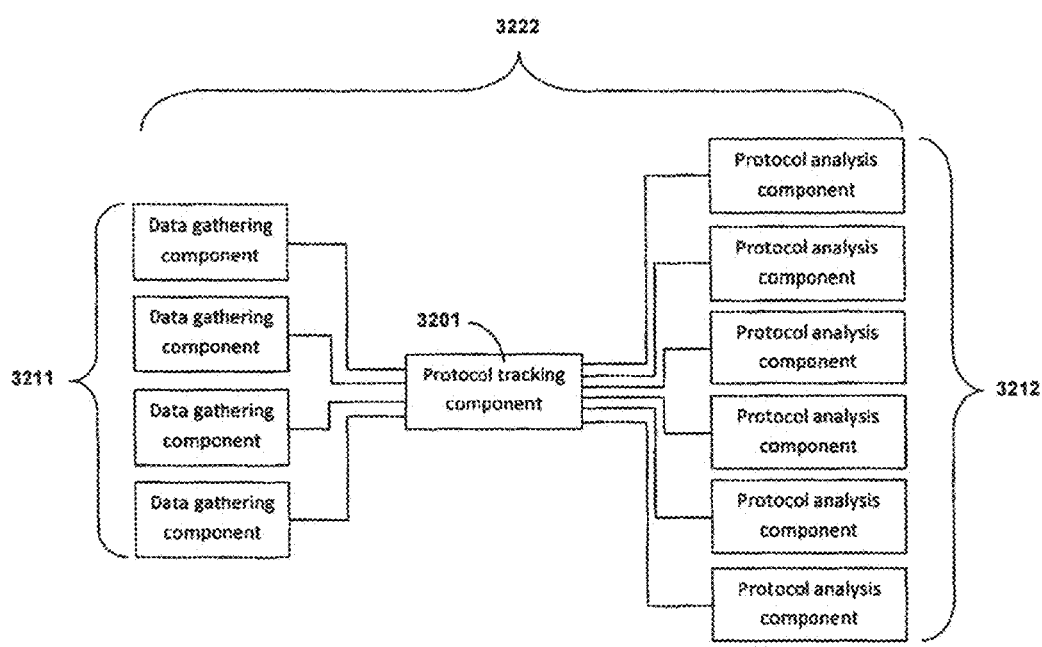
FIG. 32 is an exemplary block diagram illustrating a system embodiment.

FIG. 32 illustrates some of the various software components that may comprise a system embodiment. These software components may be installed on a mobile communications device such that data analysis is performed entirely on the device. However, one skilled in the art will appreciate that portions of the received data may be analyzed by or on a remote server, in which case data transmitted to the device may be sent to the server for analysis.

Figure 31:
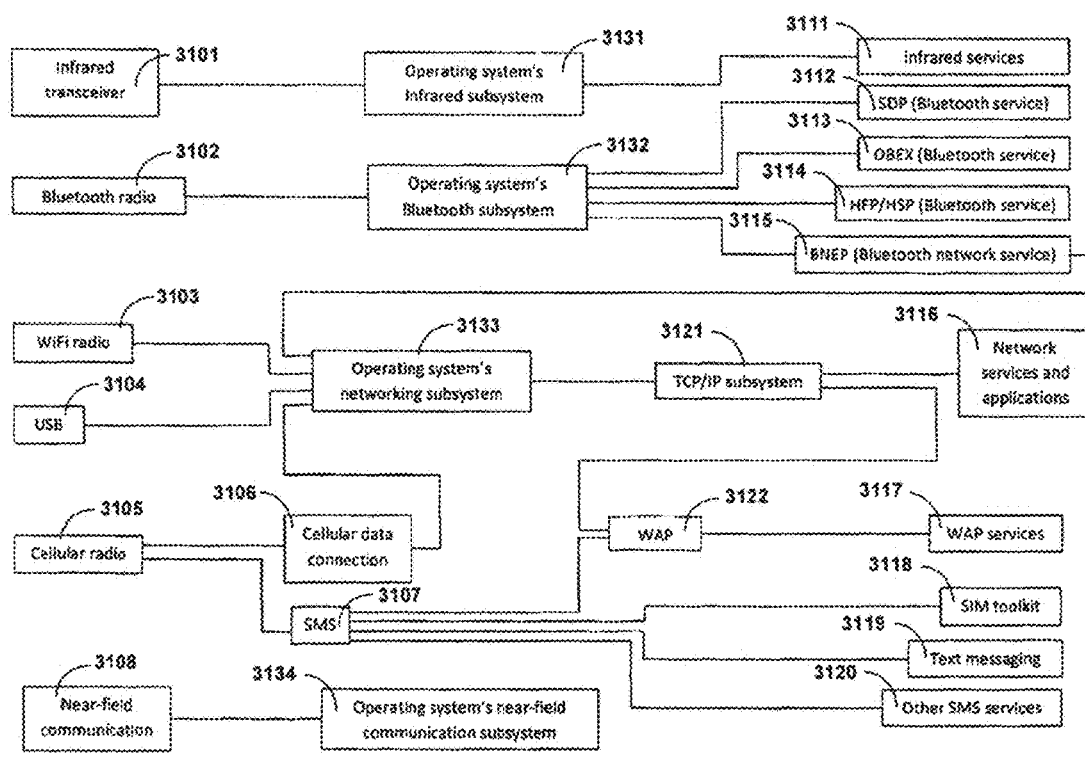
FIG. 31 is an exemplary block diagram depicting a prior art communications pathway.

In general, the system embodiment may be comprised of three software components: data gathering component 3211, protocol tracking component 3201 and protocol analysis component 3212, as shown in FIG. 32. Data may be received by, transmitted from, or otherwise intercepted on the mobile communications device at one or more network interfaces on the device (see FIG. 31). The data is gathered by one or more data gathering components 3211 and passed to protocol tracking component 3201 after some initial analysis. Protocol tracking component 3201 may perform further analysis on the data by calling one or more protocol analysis components 3212. This analysis is discussed further below, but may include identifying and determining if there are any other protocol layers in the received data. Reference character 3222 refers to a system embodiment comprising at least one data gathering component 3211, at least one protocol tracking component 3201, and at least one protocol analysis component 3212, as well as the means to send data and information between each component.

FIG. 32 illustrates that in an embodiment, there may be multiple instances of the data gathering component 3211 and the protocol analysis component 3212, and a single instance of the protocol tracking component 3201. For example, there may be a data gathering component for each network interface on the mobile communications device. One data gathering component may correspond to the device's Bluetooth interface, another data gathering component for the device's infrared interface, another for the Wi-Fi interface, and so on. Similarly, there may be a protocol analysis component for each communications protocol. For example, the Bluetooth interface receives data transmitted using various Bluetooth protocols. As such, there may be a protocol analysis component for protocols such as HCI, L2CAP, RFCOMM, OBEX, SDP, BNEP, and others. The data may contain additional layers or stacks, as is common with most network communications protocols. Therefore, there may be protocol analysis components for each underlying protocol layer or stack. As each underlying protocol is identified, the protocol tracking component 3201 will call a respective protocol analysis component to parse and analyze a layer. If a protocol analysis component identifies another layer during its analysis, it will send this information to the protocol tracking component 3201 that will call a respective protocol analysis component for the newly identified layer. This method is further discussed below. One will also appreciate that in an embodiment, there may be a single protocol analysis component capable of handling all communications protocols.

Figure 33:
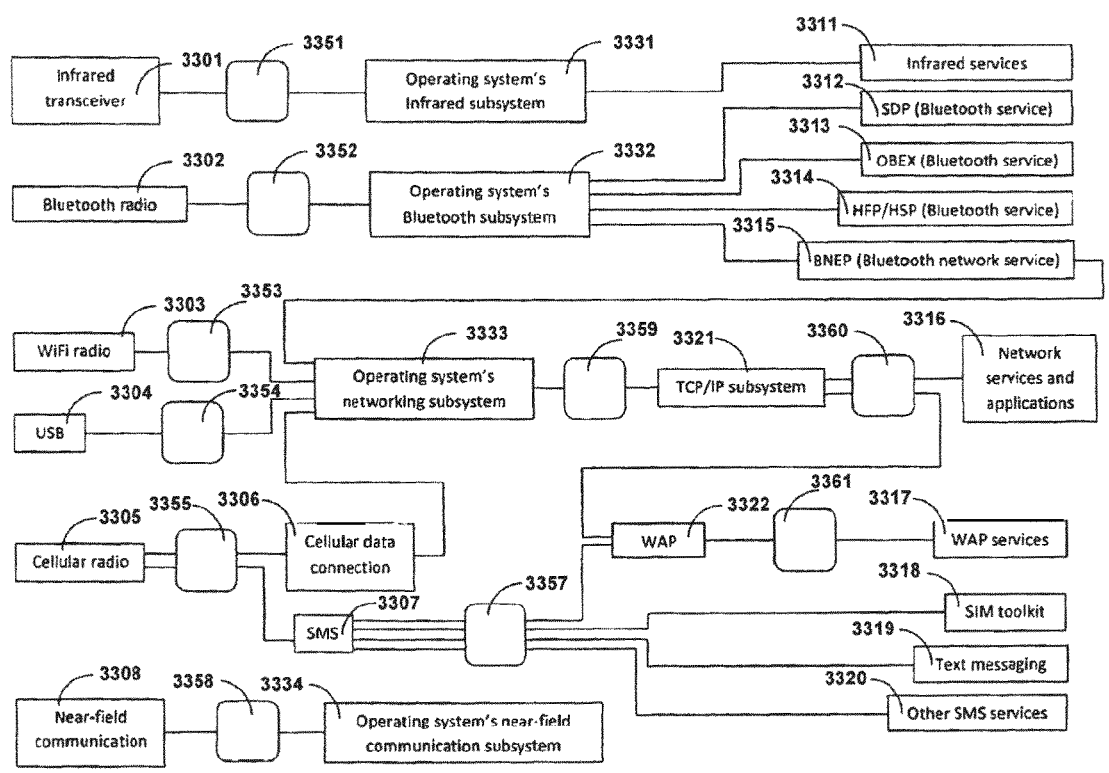
FIG. 33 is an exemplary block diagram depicting a communications pathway for an embodiment.

In an embodiment, the calling of the data gathering components 3211 and the protocol analysis components 3212 is designed to be dynamic such that data can travel throughout the mobile communications device using multiple pathways, and may be subsequently analyzed by selecting the appropriate protocol analysis component 3212 as identified by protocol tracking component 3201. This is illustrated in FIG. 33. As shown, data is received and transmitted through network interfaces such as infrared receiver 3301, Bluetooth radio 3302, Wi-Fi radio 3303, USB interface 3304, cellular radio 3305, near-field communication interface 3308, etc. However, instead of allowing data to proceed directly to the respective operating system subsystem, the data is gathered, tracked and analyzed by system 3220. Since each instance of system 3222 may differ depending upon the network interface and communications protocol, each instance is labeled uniquely in FIG. 33 as 3351, 352, 353, 354, 355, 357, 358, 359, 360 and 3361. One will appreciate, however, that each instance of system 3222 does not have to be unique from another instance. Any one of systems 3351, 352, 353, 354, 355, 357, 358, 359, 360 and 3361 may be the same or may differ from the other.

For example, in an embodiment, data received by or transmitted from infrared transceiver 3301 may be gathered, tracked and analyzed by system instance 3351, which may comprise one or more data gathering components, a single protocol tracking component, and one or more protocol analysis components as shown in FIG. 32. Similarly, data received by or transmitted from Bluetooth radio interface 3302 may be gathered, tracked and analyzed by system instance 3352, which may also comprise one or more data gathering components, the protocol tracking component, and one or more protocol analysis components. The gathering, tracking and analyzing steps are discussed further below. In an embodiment, the data gathering components and protocol analysis components may be the same or may differ between each network interface, depending upon the protocol used. For example, in order to optimize mobile communications device resources, a protocol analysis component may be able to identify and analyze multiple protocols if the protocols are similar enough. A protocol analysis component is also able to analyze a given protocol transmitted or received through different interface types and in different protocol stacks.

FIG. 33 also illustrates that an instance of system 3222 may be placed between subsystems. System instance 3359 may gather, track and analyze data from TCP/IP subsystem 3321 and operating system networking subsystem 3333.

One will appreciate that system instance 3359 may perform its gathering, tracking and analyzing after system instance 3360 has performed its functions. System instance 3359 may thereby analyze a different layer of the TCP/IP protocol stack than system instance 3360, and similarly system instance 3360 may analyze a different layer of a protocol stack than system instance 3361 and/or system instance 3357.

In an embodiment, the disclosed subject matter allows the operating system's normal reassembly, decryption, and other data processing functions to operate on data so that assumptions are not made by the analysis or security components as to how the operating system will process data. For example, when a packet corresponding to a TCP stream is received over Ethernet, protocol layers up to TCP may be analyzed before the TCP/IP reassembles the packet into part of a stream. If system instance 3359 were to try to reassemble the stream and make security decisions separately from how the operating system reassembles the stream, an attacker may take advantage of this configuration so as to make a stream reassemble differently in system instance 3359 than in operating system TCP/IP subsystem 3321. By allowing multiple system instances to operate on data at different portions of the protocol stack, the disclosed subject matter can protect the device in a layered fashion by analyzing data before it is processed, but waiting until lower layer processing has been completed by the operating system before processing higher layer protocols. By utilizing the protocol tracking component 3201, data as a part of a stream can be deterministically linked to the packets which contain segments of that stream. In another example, the disclosed subject matter can inspect encrypted data by performing analysis of the decrypted data after the operating system has performed the decryption and is passing the data to the next component in the pathway. In an embodiment, protocol analysis components 3212 may be configured to signal for or otherwise instruct the protocol tracking component 3201 to stop analyzing data in anticipation of further analysis by another system instance at another point in the data pathway. Alternatively, the protocol tracking component 3201 may determine when to stop analyzing data. In a further embodiment, the data gathering component 3211 may configure the protocol tracking component 3201 or protocol analysis components 3212 to stop processing data when certain protocol criteria are met in anticipation of a further system instance at another point in the data pathway.

Therefore, as shown in FIG. 33, the system embodiment is able to receive data from multiple sources using any number of network interfaces, and the system is able to dynamically analyze each layer of the data, thereby ensuring that all received data is fully identified and analyzed. The system embodiment may perform its functions at any point in the communications pathway. This is an improvement over prior art which only performs perfunctory analysis at a single network interface on a single communications protocol, and only on data that is received, not transmitted. As such, the disclosed subject matter provides added protection over prior art systems. The various methods employed by the disclosed subject matter are discussed in the following section.

By way of example, malware, viruses and other security threats can inhabit different data layers depending upon their intended target. The system embodiment ensures that no layer is ignored. Once each layer is identified and analyzed, the data may be passed to a security system for further analysis, such as identifying if any threats are present in the data layers, and taking remedial action. Alternatively or in conjunction, the analysis component for each protocol may incorporate a security system to analyze each layer individually. Examples of how malware may be identified and quarantined are discussed in U.S. patent application Ser. No. 12/255,621, entitled "SYSTEM AND METHOD FOR ATTACK AND MALWARE PREVENTION," incorporated in full herein.

One skilled in the art will appreciate that there are many ways to create and install the disclosed subject matter on a mobile communications platform. In an embodiment, the disclosed subject matter is designed and built on a cross-platform system such as the one discussed in U.S. patent application Ser. No. 12/255,626, entitled "SYSTEM AND METHOD FOR A MOBILE CROSS-PLATFORM SOFTWARE SYSTEM," incorporated in full herein. In this embodiment, data gathering components 3211 may be platform-specific, in that they may be designed to utilize the specific functionalities of the mobile communications device on which it is installed. Since different mobile communications devices offer different network interfaces, the disclosed subject matter may be customized to monitor only those network interfaces that are available. Additionally, one device's Bluetooth receiver may differ from another's, even though they may both accept the same Bluetooth protocols. As such, by identifying and accounting for these differences during the platform-specific phase of development, one skilled in the art can ensure full compatibility.

On a cross-platform system, the protocol tracking component 3201 may be considered platform-independent or a core software component. Communications protocols are developed to encapsulate, encode, and transport data, regardless of platform. As such, data received in a particular protocol should not differ based upon what platform is receiving the data. Since communications protocols are inherently platform-independent, one skilled in the art can program the software code for the protocol tracking component 3201 in the core platform-independent component of the cross-platform system.

On a cross-platform system, the protocol analysis components may be considered platform-independent or platform-specific, depending upon the communications protocol that is being analyzed. For example, some protocols are well-defined regardless of platform, such as Bluetooth. As such, the respective protocol analysis components for the Bluetooth protocol layers may be platform-independent. Conversely, some protocols differ between mobile communications devices, such as text messaging or SMS. Therefore, the respective protocol analysis components for text messaging and SMS may be platform-specific. One will appreciate that the configuration of the disclosed subject matter on a cross-platform system is merely exemplary, is not intended to limit the claimed subject matter in this application or in any patent applications that are incorporated by reference.

One skilled in the art will also appreciate that the disclosed subject matter need not be cross-platform, but can be built specifically for the mobile communications device upon which it resides. Variations of the software structure and system architecture are possible without departing from this disclosure or the scope of the claimed subject matter.

B. Protocol Tracking and Analysis Method

Figure 34:
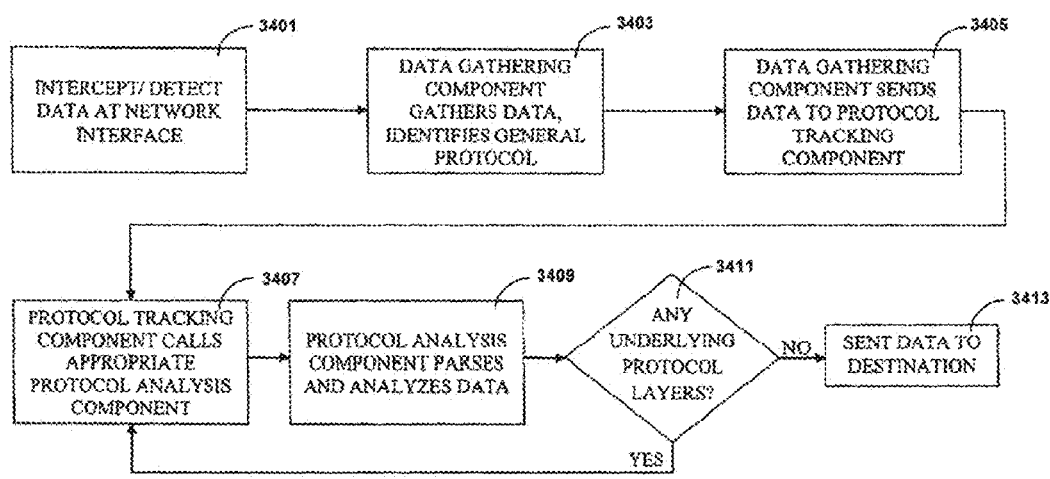
FIG. 34 is an exemplary flow diagram illustrating a method embodiment.

As discussed above, data may be received by the mobile communications devices using one or more network interfaces, and then analyzed to identify the one or more protocols. FIG. 34 illustrates an exemplary method of how received or transmitted data may be treated by the system described above. One will appreciate that the method shown in FIG. 34 may performed in whole or in part by the various system components illustrated in FIG. 32. One will also appreciate that the steps shown in FIG. 34 need not be performed sequentially, but may be performed in a different order by different instances of the system illustrated in FIG. 32. One will further appreciate that variations of the method illustrated in FIG. 34 may be performed simultaneously by different instances of the system illustrated in FIG. 32.

In step 3401, data is intercepted or detected at a network interface, either as it is received or before it is transmitted. This data is gathered and preliminarily analyzed by a data gathering component to determine the general protocol of the data (step 3403). Once the general protocol is identified, it is sent to the protocol tracking component (step 3405), which calls the appropriate protocol analysis component for that general protocol (step 3407). The protocol analysis component may further analyze, may parse the data for source and type, may perform security analyses (step 3409), and may then determine whether there is an additional protocol layer in the data or in a subset of the data (step 3411). If the protocol analysis component determines that the data corresponding to that given protocol is unsafe, the whole stack of network data being analyzed may not be analyzed further and instead may be passed to the appropriate destination (step 3413). If there is no security analysis performed by the protocol analysis component or the data is safe and the protocol analysis component determines that there is data corresponding to another protocol present, then the protocol tracking component will call another protocol analysis component for that additional layer. Once all of the layers have been identified and analyzed, the data passes to the appropriate destination (step 3413). This may include sending the data for further security analysis as discussed above, where it may be quarantined, rejected or deleted if found to contain malware. Alternatively, the data may be sent to the appropriate subsystem for handling, execution or storage on the mobile communications device (see FIG. 33). Alternatively, data may be held for further analysis by a respective protocol tracking component. One will appreciate that these steps need not be performed immediately after one another. For example, the protocol layers of a multi-layered protocol stack may be analyzed by the respective protocol analysis component 3212 at any time during the data's passage through the communications pathway, so long as each layer is analyzed before it reaches its final destination, regardless if the final destination is the device's operating system subsystem or transmission out of the device.

FIG. 34 illustrates a general method of analysis using the components illustrated in FIG. 32. As will be discussed, the steps shown in FIG. 34 may vary depending upon the type of data received or transmitted by the mobile communications device. The steps may also vary depending on the format of data received or transmitted by the mobile communications device. Each scenario is discussed further below using various examples.

1. Protocol Tracking and Analysis of Bluetooth Data

In a first example, data may be received through a mobile communications device's Bluetooth receiver (step 3401). A data gathering component for the Bluetooth network interface will gather the data and will recognize that it uses the Bluetooth protocol (step 3403). The data will be sent to the protocol tracking component (step 3405), which will call a general Bluetooth protocol analysis component (step 3407). The general Bluetooth protocol analysis component will then analyze the data (step 3409) and will see if there are any other protocol layers in the received data (step 3411). A person having ordinary skill in the art will recognize that Bluetooth may include additional protocol layers, including the Bluetooth Host Controller Interface (HCI), the Logical Link Control and Adaptation Protocol (L2CAP), the Bluetooth Network Encapsulation Protocol (BNEP), the Radio Frequency Communication protocol (RFCOMM), the Object Exchange protocol (OBEX), Ethernet, IP, TCP, HTTP and the like. As such, data transmitted using the Bluetooth protocol can include one or more of these layers depending upon the type and purpose of the data.

In an embodiment, there may be a specific protocol analysis component for each of the protocol layers identified, or in an embodiment, there may be protocol analysis components for groups of similar protocol layers. In the Bluetooth example, there may be a protocol analysis component for HCI, a separate protocol analysis component for L2CAP, another protocol analysis component for BNEP, etc. Alternatively, there may be a protocol analysis component for Bluetooth protocols such as HCI, L2CAP and BNEP, there may be a protocol analysis component for IP-centric network protocols covering the TCP/IP and Ethernet protocol suites, and there may be a protocol analysis component at the network interface stream/socket level supporting protocols such as HTTP, POP3, IMAP, and others. The disclosed subject matter may also call a combination of these two configurations, such that there is an initial Bluetooth network interface packet level protocol analysis component, then additional protocol analysis components for HCI, L2CAP and BNEP, respectively. These variations of the protocol analysis component ensures that each protocol layer in a data stack is identified and analyzed, regardless if the layer is at a high-level or low-level in the stack. This is an improvement over prior art methods that typically only analyze data at the IP-based packet level. In the disclosed subject matter, each layer is identified until every layer has been analyzed and passed to the appropriate destination in the mobile communications device (step 3413). Additionally, the identification and analysis of each layer does not have to be sequential, but may occur in different stages.

2. Mobile Communications Device Optimization

One skilled in the art will appreciate that the size of the data received and transmitted on the mobile communications device can affect the device's performance. The disclosed subject matter may be configured to optimize the resources of the mobile communications device. For example, data transmitted and received as stream data is typically comprised of data chunks. In other words, large data files may be subdivided into chunks, and each chunk will be identifiable by associated metadata, such as a chunk header. In the disclosed subject matter, the data gathering components may therefore gather these data chunks, send them to the protocol tracking component, which then sends them to the appropriate protocol analysis component. The protocol analysis components may therefore analyze each received chunk, which may only be portions of the entire data stream. In order to ensure that the entire data stream is fully analyzed, chunks may be temporarily stored by the respective protocol analysis component until it receives the rest of the data stream's chunks from the data gathering component, by way of the data tracking component. In other words, protocol analysis components may pause analysis before proceeding further to ensure that data is fully analyzed. Alternatively, the protocol tracking component may temporarily store data stream chunks before sending them to the appropriate data analysis component.

Temporary storage may be accomplished by using one or more temporary buffers, or may be minimized by utilizing a virtual machine. For example, data transmitted using the HTTP protocol is typically complex, and may not all be received sequentially or as a complete data object. As such, data gathering components can gather HTTP data as they are received, send them to the protocol tracking component, which may then send them to the appropriate protocol analysis component. In this example, the protocol analysis components may be managed by a virtual software machine. If the data received by a protocol analysis component is incomplete, then the virtual software machine can cause that protocol analysis component to suspend its state, and therefore its analysis and processing, until more data is received. Since these protocol analysis components may be protocol-specific, which may in turn be network interface or port-specific, different protocol analysis components can be tailored to suspend analysis or proceed or perform depending upon the protocol or network interface or port being monitored. Temporary memory buffers for storing portions of data may be practical for mobile communications devices with sufficient memory capacity. Virtual machine configurations, which take up less memory and resources than buffers, may be practical for less memory capacity. One will appreciate that there are many variations possible in order to optimize performance on the mobile communications device. Analysis and processing may also be a combination of buffers and virtual machines (which include stack machines, state machines, and other machine systems that can be implemented in software), and all of the components may be performing simultaneously or intermittently depending upon the amount and type of data being processed, and the capabilities of the mobile communications device.

3. Analysis of Novel Communications Protocols

As new mobile communications devices reach the market, they may incorporate new network interfaces and new protocols. One will appreciate that embodiments are not limited to the network interfaces and communications protocols listed in the above examples.

Indeed, the disclosed subject matter has mechanisms in place to analyze protocols that do not fall within the categories listed above. One will appreciate that communications protocols build upon previous protocols well-known in the industry. If the data gathering component fails to identify an initial protocol for received data, or if the protocol tracking component cannot immediately identify the exact protocol used by the received data, the protocol tracking component may apply deterministic analyses of the data to identify the threat level of the data. For example, data may typically include metadata or header information identifying its source, type and destination. This information may be used to heuristically determine which protocol tracking component is appropriate for analyzing the data. The system may also have mechanisms in place, such as a database or other stored information that identifies common protocol layers in a particular stack. As such, even if the layers are not immediately identifiable, the system may refer to this database to determine common protocol layers associated with the data, and may analyze the data accordingly using the appropriate protocol tracking component. This flexibility enables the disclosed subject matter to adapt to new and unknown protocols, thereby extending the applicability of the disclosed subject matter to numerous mobile communications device platforms.

4. Countering Cyber-Terrorism

One of the benefits of the disclosed subject matter is its ability to dynamically analyze data by communications protocols at any stage of the communications pathway on mobile communications device. As such, the disclosed subject matter provides increased monitoring and protection of a mobile communications device where previously none existed. As noted above, prior art methods ignore non-TCP/IP data, which exposes a significant amount of network vulnerabilities. Because the disclosed subject matter significantly reduces these network vulnerabilities, the disclosed subject matter provides a significant line of defense against cyber-terrorist attacks. Using the disclosed subject matter, cyber-terrorists will be much less able to exploit network interface or protocol vulnerabilities on mobile communications devices. Additionally, since the disclosed subject matter protects both received and transmitted data, cyber-terrorists will be less able to hijack or otherwise misappropriate mobile communications devices to propagate malicious software.

One will appreciate that in the description above and throughout, numerous specific details are set forth in order to provide a thorough understanding of the disclosed subject matter. It will be evident, however, to one of ordinary skill in the art, that the disclosed subject matter may be practiced without these specific details. In other instances, well-known structures and devices are shown in block diagram form to facilitate explanation. The description of the preferred embodiments is not intended to limit the scope of the claims appended hereto.

A system and method identifies mobile applications that can have an adverse effect on a mobile device or mobile network. In an implementation, a server monitors behavioral data relating to a mobile application and applies a model to determine if the application has an adverse effect or has the potential to cause an adverse effect on a mobile device or a network the mobile device may connect to. A mobile device may monitor behavioral data, apply a model to the data, and transmit a disposition to the server. The server may aggregate behavioral data or disposition information from multiple devices. The server may transmit or make available the disposition information to a subscriber through a web interface, API, email, or other mechanism. After identifying that an application may have an adverse effect, the server may enact corrective actions, such as generating device or network configuration data.

A specific implementation is directed to a system and methods for using a server to provide protection from and removal of undesired applications or other data objects that may affect a mobile communications device or plurality of mobile communications devices, regardless of the make or model of the mobile communications device(s), the mobile communication network, or the software applications present on the mobile communications device(s). As used herein, all of the services associated with the identification, analysis, and removal of potentially undesired applications or other data objects, as well as mobile communications device protection are described under the non-limiting term, "security." Thus, an embodiment is directed to providing security to a plurality of mobile communications devices, such as a plurality of mobile communications devices for a group of employees, or a plurality of mobile communications devices that access a particular network. An embodiment is directed to safely and securely gathering information about applications on mobile communications devices without taxing individual mobile communications devices or the mobile network and utilizing the information about applications to secure mobile communications devices. An embodiment is directed to using information gathered from mobile communications devices to generate user or device information that can be used to develop future products or services for mobile communications devices. An embodiment is directed to an early warning system to detect if an application is harmful or adverse to the mobile communications device, mobile communications device network, or both based on the application's presence on a small number of devices before the application is on a large number of devices.

In a specific embodiment, application behavioral data from two or more mobile communications devices is received and aggregated. A model is applied to the data to determine whether or not the application would have an adverse effect on a mobile communications device, network, or both. The behavioral data may be received at a server so that the determination can be made at the server. The aggregated behavioral data may be received at a mobile device so that the determination can be made at the mobile device. Upon making the determination, disposition information regarding the determination can be created for notifying a subscriber that the application would have an adverse effect on the mobile device, network, or both. Configuration information can be generated at the server and transmitted to the mobile device, network, or both, to prevent the application from adversely affecting the mobile device, network, or both.

This disclosure is directed to a system and methods for using a server to provide protection from and removal of undesired applications or other data objects that may affect a mobile communications device or plurality of mobile communications devices, regardless of the make or model of the mobile communications device(s), the mobile communication network, or the software applications present on the mobile communications device(s). As used herein, all of the services associated with the identification, analysis, and removal of potentially undesired applications or other data objects, as well as mobile communications device protection are described under the non-limiting term, "security." Thus, an embodiment is directed to providing security to a plurality of mobile communications devices, such as a plurality of mobile communications devices for a group of employees, or a plurality of mobile communications devices that access a particular network. An embodiment is directed to safely and securely gathering information about applications on mobile communications devices without taxing individual mobile communications devices or the mobile network and utilizing the information about applications to secure mobile communications devices. An embodiment is directed to using information gathered from mobile communications devices to generate user or device information that can be used to develop future products or services for mobile communications devices.

It should be appreciated that an embodiment can be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein. One will appreciate that the mobile communications device described herein may include any computer or computing device running an operating system for use on handheld or mobile devices, such as smartphones, PDAs, tablets, mobile phones and the like. For example, a mobile communications device may include devices such as the Apple iPhone®, the Apple iPad®, the Palm Pre™, or any device running the Apple iOS™, Android™ OS, Google Chrome OS, Symbian OS®, Windows Mobile® OS, Palm OS® or Palm Web OS™. As used herein, the mobile communications device may also be referred to as a mobile device, a mobile client, or simply, as a device or as a client.

In the context of this document, a computer usable medium or computer readable medium may be any medium that can contain or store the program for use by or in connection with the instruction execution system, apparatus or device. For example, the computer readable storage medium or computer usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, infrared, optical, or electrical system, apparatus or device for storing information. Alternatively or additionally, the computer readable storage medium or computer usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory.

Applications, software programs or computer readable instructions may be referred to as components or modules or data objects or data items. Applications may be hardwired or hard coded in hardware or take the form of software executing on a general purpose computer such that when the software is loaded into and/or executed by the computer, the computer becomes an apparatus for practicing an embodiment. Applications may also be downloaded in whole or in part through the use of a software development kit or toolkit that enables the creation and implementation of an embodiment. In this specification, these implementations, or any other form that an embodiment may take, may be referred to as techniques. In general, the order of the steps of disclosed processes may be altered within the scope of the claimed subject matter.

Figure 35:
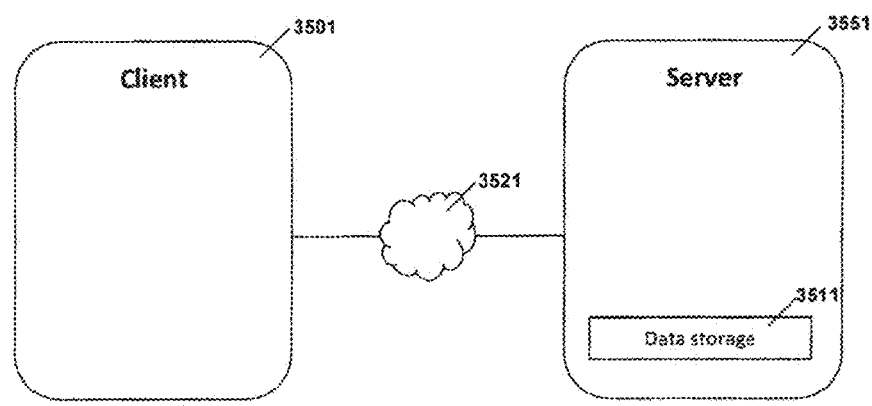
FIG. 35 is an exemplary block diagram depicting an embodiment.

As previously mentioned, security services may be provided to one or more mobile communications devices by a server or group of servers that operate together. There are many possible ways in which multiple servers may operate together to provide security services without departing from the scope of this disclosure. An embodiment of this system is shown in FIG. 35, in which one or more servers 3551 communicate with one or more mobile communications devices 3501 over a cellular, wireless Internet or other network 3521. As mentioned above, mobile communications device 3501 may also be referred to as a "mobile client device," "client device," "device," or "client," and may be referred to in the singular or plural form. The one or more servers 3551 may have access to a data storage 3511 that stores security information for the one or more mobile communications devices 3501. Data, assessment information, information about the mobile communications devices 3501, or other objects for storage may be stored on servers 3551 and/or data storage 3511. Servers 3551 or data storage 3511 may be singular or plural, or may be physical or virtualized. Data storage 3511 may be a database, data table, data structure, file system or other memory store. Data storage 3511 may be hosted on any of the one or more servers 3551, or may exist externally from the one or more servers 3551, so long as the one or more servers 3551 have access to data storage 3511. In an embodiment, data storage 3511 is an external service provided by a third-party, such as the Simple Storage Service (S3) or other products provided by Amazon Web Services, LLC. One will appreciate that the configuration of the system illustrated in FIG. 35 is non-limiting and merely exemplary, and that other configurations are possible without departing from this disclosure.

One will appreciate that communication between mobile communications device 3501 and server 3551 may utilize a variety of networking protocols and security measures. In an embodiment, server 3551 operates as an HTTP server and the device 3501 operates as an HTTP client. To secure the data in transit, mobile communications device 3501 and server 3551 may use Transaction Layer Security ("TLS"). Additionally, to ensure that mobile communications device 3501 has authority to access server 3551, and/or to verify the identity of mobile communications device 3501, device 3501 may send one or more identifiers or authentication credentials to server 3551. For example, authentication credentials may include a user name and password, device-specific credentials, or any other data that identifies mobile communications device 3501 to server 3551. Authentication may allow server 3551 to store information specific to mobile communications device 3501 or an account associated with mobile communications device 3501, to provide customized services to device 3501, and to maintain a persistent view of the security status of mobile communications device 3501.

In order to provide security services for mobile communications device 3501, one having ordinary skill in the art will appreciate that mobile communications device 3501 will transmit certain data to server 3551. As will be discussed in more detail below, server 3551 will analyze this data and provide a security related assessment, response and/or other action. The following describes the type(s) of data transmitted from mobile communications device 3501 to server 3551, the analysis performed by server 3551, and the action taken with or by mobile communications device 3501.

One will appreciate that an embodiment may exist independently on mobile communications device 3501, or may be incorporated into an existing security system resident in the mobile communications device such as the one described in U.S. patent application Ser. No. 12/255,614, entitled "SYSTEM AND METHOD FOR MONITORING AND ANALYZING MULTIPLE INTERFACES AND MULTIPLE PROTOCOLS," filed on Oct. 21, 2008, and incorporated in full herein. One having ordinary skill in the art will also appreciate that in order to implement an embodiment on a variety of mobile communications device platforms, it may be necessary to incorporate a cross-platform system such as the one disclosed in U.S. patent application Ser. No. 12/255,626, entitled "SYSTEM AND METHOD FOR A MOBILE CROSS PLATFORM SOFTWARE SYSTEM," filed on Oct. 21, 2008, and incorporated in full herein. In addition, as discussed further below, embodiments may be used to determine a security state for a mobile communications device 3501, as described in U.S. patent application Ser. No. 12/255,632, entitled "SECURE MOBILE PLATFORM SYSTEM," filed on Oct. 21, 2008, and incorporated in full herein.

One having ordinary skill in the art will appreciate that mobile communications devices are exposed to different types of data. This data includes network data, files, executable and non-executable applications, emails, and other types of objects that can be transmitted to, received by, or installed on a mobile communications device. Mobile communications devices also typically transmit and receive data through one or more network interfaces, including Bluetooth, Wi-Fi, infrared, radio receivers, and the like. Similarly, data may be encapsulated in a layered communications protocol or set of protocols, such as TCP/IP, HTTP, Bluetooth, etc. Current server-client security models, such as those currently available for desktop and laptop computers, cannot extend their capabilities to provide adequate assessment and security to a plurality of mobile communications devices.

This disclosure contemplates at least two types of data that can be used to evaluate and protect mobile communications devices. The first type of data includes data about a mobile communications device, i.e., "device data." Device data pertains to the state, capabilities, operating system, firmware version, memory capacity, available communication ports, battery limitations, hardware characteristics and other "baseline" information that may be common to all similar devices absent user customization. Device data may include the default specifications for a device as it is received from a manufacturer, service provider, or IT service. Device data may include state information common to all similar mobile communications after they have all been upgraded in some fashion. As will be discussed further below, device data may be used to evaluate whether vulnerabilities exist due to unguarded communication ports, operating system exploits, device-specific attacks, and the like.

A second type of data that can be used to evaluate mobile communications devices is data that pertains to a particular application, file, or object that may be installed or run on a mobile communications device. As used herein, this data is referred to as "application data." Application data includes both data objects and information about data objects, such as behavioral data or metadata. Data objects include application packages that may be particular to certain mobile communications devices. For example, iPhone OS devices typically use IPA files or APP packages, Android OS devices typically use APK files, Windows Mobile devices typically use CAB, EXE or DLL files, and Symbian OS devices typically use SIS files. Devices may also support cross-platform application formats such as the SWF format underlying Adobe's Flash runtime or JAR files that can be run on Java virtual machines.

Application data includes data objects that are malware or spyware, and thereby can negatively affect a mobile communications device. Malware and spyware include applications, files, and other data objects that are purposefully designed to adversely affect or steal information from a mobile communications device. Application data also includes data objects that are not designed for nefarious reasons, but may have coding flaws or other issues that can negatively affect a device. Application data also includes data objects that may be undesirable for various reasons. For example, a data object may be undesirable because it compromises privacy, overtaxes a device's battery or network connection, and/or has objectionable content. As used herein, "data objects" may also be referred to as "data items." Use of either term is not intended to limit the data to any one form.

Application data includes metadata about data objects. For example, metadata is information about a specific data object, rather than the data object itself. Metadata includes the location on a mobile communications device's filesystem where a data object is stored, a hash of the data object, the name of the data object, a unique identifier present in or associated with the data object such as a GUID or UUID, security information related to the data object such as its cryptographic signer information or level of permissions granted, and characteristics of how the data object is installed on or integrates with the mobile communications device's operating system. Metadata for a data object may also include from where the data object came (e.g., a URL from where it was downloaded, an application marketplace from which it was downloaded, a memory card from where it was installed or stored. Metadata may also be retrieved from an application marketplace. Such metadata, called marketplace metadata, includes information about a data object such as the number of downloads, user comments about the data object, the description of the data object, permissions requested by the data object, hardware or software requirements for the data object, information about the data object's author, the price of the data object, the language or languages supported by the data object, and other information that a marketplace may provide.

In an embodiment, application data also includes behavioral data. Behavioral data includes information about how an application interacts with or uses a mobile communications device's resources, such as memory usage, battery usage, network usage, storage usage, CPU usages, API usage, errors and crashes, network services connected to (e.g., remote host address and port), and runtime library linkage. Behavioral data also includes information about how an application, file or data object, when it is run, utilizes the functionalities of the mobile communications device's operating system, such as notifications and messaging between processes or installed applications.

As will be explained further below, both device data and application data are useful for providing an assessment of the security of a device based upon the data stored (e.g., installed applications) or passing through the device. One having ordinary skill in the art will appreciate that device data and application data are merely examples of the types of data that may used in order to safeguard a mobile communications device or provide other functions related to a mobile communications device. Other types of data may also be evaluated by the disclosed system without departing from the scope of this disclosure. As used herein, the term assessment refers to information relating to a data object that may be used to evaluate or otherwise further understand a data object's operation or effect of operation. For example, an assessment may include a determination that an application is malicious or non-malicious, bad or good, unsafe or safe, or that an application may appear on a blacklist or whitelist. An assessment may include categorization or characterization data for a data object, ratings such as security ratings, privacy ratings, performance ratings, quality ratings, and battery impact ratings for a data object, trust ratings for a data object, distribution data for a data object. Assessments may result from collecting and/or processing data by server 3551 and may be exposed by server 3551 to users or other systems via an API, user interfaces, data feeds, or other methods. One will appreciate that the previous description for an "assessment" is not meant to be limiting in any fashion.

A. Device Data Collection, Models, and Remediation

What follows is a discussion about how device data and application data are collected and stored, according to an embodiment. In general, the following discussion includes communications between server 3551 and mobile communications devices 3501 over network 3521. Any data transmitted or received during these communications may be stored on server 3551 or on data storage 3511. In an embodiment, data stored on data storage 3511 or server 3551 is associated with a particular account or device known to the system. The association between data and a device or account may allow server 3551 to provide tailored functionality for the account or device based on previously received data. In an embodiment, some or all of the data is stored on server 3551 or data storage 3511 with an anonymous association to a particular account or device. For example, data may be stored with an anonymous association for privacy purposes so that examination of the data on server 3551 or data store 3511 cannot tie the anonymously-associated data to a particular account or device; however, a device can populate and update this anonymously-associated data. Anonymous associations are described in further detail below. In an embodiment, server 3551 will request information from mobile communications devices 3501, which will respond with the requested information. In an embodiment, a mobile communications device 3501 will transmit device data and/or application data to server 3551 for analysis and assessment. For example, a user of mobile communications device 3501 may wish to download a file to his device, but prior to installing the file, may wish to send the file or identifying data associated with the file to the server 3551 in order to check if the file is malicious or otherwise undesirable. Server 3551 will then analyze this received information in order to provide a security assessment that is available to any of the mobile communications devices 3501. In another example, it may be useful to know how an assessed data object will affect the performance or behavior of a mobile communications device, the assessment containing information such as average battery impact or average network usage of the data object. In an embodiment, server 3551 stores assessments of data objects after analysis and can provide access to these assessments in a number of ways. The analysis performed by server 3551 will be discussed further below. The process by which server 3551 provides access to assessment information will be also be discussed further below.

What follows is a discussion about how device data and application data are collected and stored, according to an embodiment. In general, the following discussion includes communications between server 3551 and mobile communications devices 3501 over network 3521. Any data transmitted or received during these communications may be stored on server 3551 or on data storage 3511. In an embodiment, data stored on data storage 3511 or server 3551 is associated with a particular account or device known to the system. The association between data and a device or account may allow server 3551 to provide tailored functionality for the account or device based on previously received data. In an embodiment, some or all of the data is stored on server 3551 or data storage 3511 with an anonymous association to a particular account or device. For example, data may be stored with an anonymous association for privacy purposes so that examination of the data on server 3551 or data store 3511 cannot tie the anonymously-associated data to a particular account or device; however, a device can populate and update this anonymously-associated data. Anonymous associations are described in further detail below. In an embodiment, server 3551 will request information from mobile communications devices 3501, which will respond with the requested information. In an embodiment, a mobile communications device 3501 will transmit device data and/or application data to server 3551 for analysis and assessment. For example, a user of mobile communications device 3501 may wish to download a file to his device, but prior to installing the file, may wish to send the file or identifying data associated with the file to the server 3551 in order to check if the file is malicious or otherwise undesirable. Server 3551 will then analyze this received information in order to provide a security assessment that is available to any of the mobile communications devices 3501. The server 3551 can apply a model to at least some of the obtained behavioral data for the data object. In another example, it may be useful to know how an assessed data object will affect the performance or behavior of a mobile communications device, the assessment containing information such as average battery impact or average network usage of the data object. In an embodiment, server 3551 stores assessments of data objects after analysis and can provide access to these assessments in a number of ways. The analysis performed by server 3551 will be discussed further below. The process by which server 3551 provides access to assessment information will be also be discussed further below.

To prevent taxing network 3521 and server 3551 with network traffic, various methods may be used to reduce the amount of data requested by and transmitted to server 3551. For example, rather than transmitting whole data objects, such as application files or application packages, for analysis, hashing functions or hashing algorithms may be applied to data and the resulting hash of the data may be sent to the server 3551. The server 3551 may use the hash to uniquely identify the data object. If the server has previously performed an assessment of the data object identified by the hash, the server 3551 may return that previous assessment if it is still valid. If the server 3551 has not yet performed an assessment for the data object, the server 3551 may return a response indicating that the assessment is unknown and/or request additional data from the mobile communications device 3501. One having ordinary skill in the art will appreciate that a hashing algorithm will transform an arbitrary amount of data into a fixed length identifier. For example, the SHA-1 hashing algorithm can digest an arbitrary amount of input data into a 160-bit hash. In another example, metadata besides a hash of the data object may be sent in lieu of a data object itself, e.g., metadata for an application may be sent for an assessment rather than the whole application. In many cases, metadata, such as a package name, application name, file name, file size, permissions requested, cryptographic signer, download source, a unique identifier such as a UUID, and other information may be sufficient as identifying information for a data object; thus, if server 3551 receives appropriate identifying information, it can determine if the data object is undesirable. One skilled in the art will appreciate that there are a variety of methods by which a data object can be identified in such a way that can allow server 3551 to determine if a data object installed on device 3501 is malicious without having to transmit the entire data object to server 3551.

In an embodiment, server 3551 may request portions of a data object, rather than a complete data object. A whole data object may be transmitted incrementally such that network 3521 is not burdened by network traffic. Alternatively or additionally, server 3551 may request information about a particular application, but may query a group of mobile communications devices that each has this application. In this manner, server 3551 may receive a portion, or "chunk" of data from one mobile communications device, and another portion of data from a second mobile communications device, and so forth, as necessary. Server 3551 may then aggregate this information as it is being received, thereby pooling from a number of mobile communications device having the application/file data without taxing any specific mobile communications device. An example of this method is discussed further below.

Figure 36A:
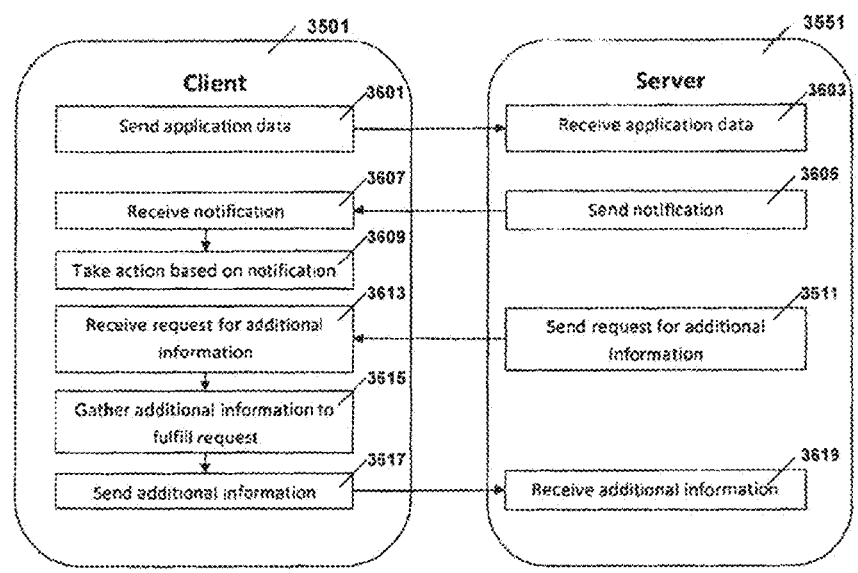
FIG. 36A is an exemplary flow diagram illustrating the steps of an embodiment.

FIG. 36A is a general overview of the transmission of different types of data between a mobile communications device 3501 and server 3551. As FIG. 36A shows, in block 3601, mobile communications device 3501 sends application data to server 3551, which receives this data (block 3603). In this embodiment, mobile communications device sends identifying or authentication information to server 3551 so that server 3551 can reference previously stored identifying or authentication information about mobile communications device 3501, store and retrieve data associated with the mobile communications device 3501, and specifically identify or authenticate mobile communications device 3501 amongst other mobile communications devices.

In an embodiment, server 3551 sends a notification to mobile communications device 3501 (block 3605). This notification can be an alert, a message, an instruction or other information related to application data or device data specific to mobile communications device 3501. In an embodiment, the notification is due to the device previously having sent application data corresponding to a data object that was not initially assessed by the server 3551 to be undesirable but was subsequently determined by the server 3551 to be undesirable. In block 3607, mobile communications device 3501 receives the notification, and in block 3609, the mobile communications device 3501 takes action based upon the notification. As will be discussed in more detail below, such actions may include deactivating one or more features or applications on the mobile communications device 3501.

One having skill in the art will appreciate that the interaction between mobile communications device 3501 and server 3551 can include communication from the mobile communications device to the server, as well as from the server to the mobile communications device. For example, in an embodiment, server 3551 may receive application data from mobile communications device 3501, but server 3551 may require additional information before providing an assessment or transmitting a notification. In block 3611, server 3551 may request the additional information from mobile communications device 3501. Mobile communications device receives the request (block 3613), gathers additional information as requested by server 3551 (block 3615), then in block 3617, transmits the additional information to server 3551. In block 3619, server 3551 receives the requested additional information. One will appreciate that this process may repeat as necessary.

In an embodiment, the server 3551 is in communication with a plurality of mobile communications devices 3501 operating in a mobile communications device network. The server 3551 monitors behavioral data for a data object accessed by at least one mobile communications device. The behavioral data is stored in a data store accessible by the server 3551. When it is making an assessment of the data object, the server 3551 accesses the stored behavioral data and applies a model to at least some portion of the stored data. The purpose of the model is to determine whether or not the data object would have an adverse effect on the at least one mobile communications device network, or at least one mobile communications device. If the application of the model to at least a portion of the behavioral data indicates that the data object would have an adverse impact upon the mobile communications device or the mobile communications device network, the server creates disposition information (relating to an assessment of the data object) that can be stored and communicated to system subscribers who want to be informed about data objects that will adversely effect either the mobile communications device (specific one or specific device type) or a mobile communications device network.

In this embodiment, the behavioral data can be correlated to mobile communications device data for at least one of the mobile communications devices that accessed the data object. The disposition information can be sent to the subscriber as a data feed, an e-mail, a text message, or it can be published as a web interface accessible to the subscriber.

Figure 36B:
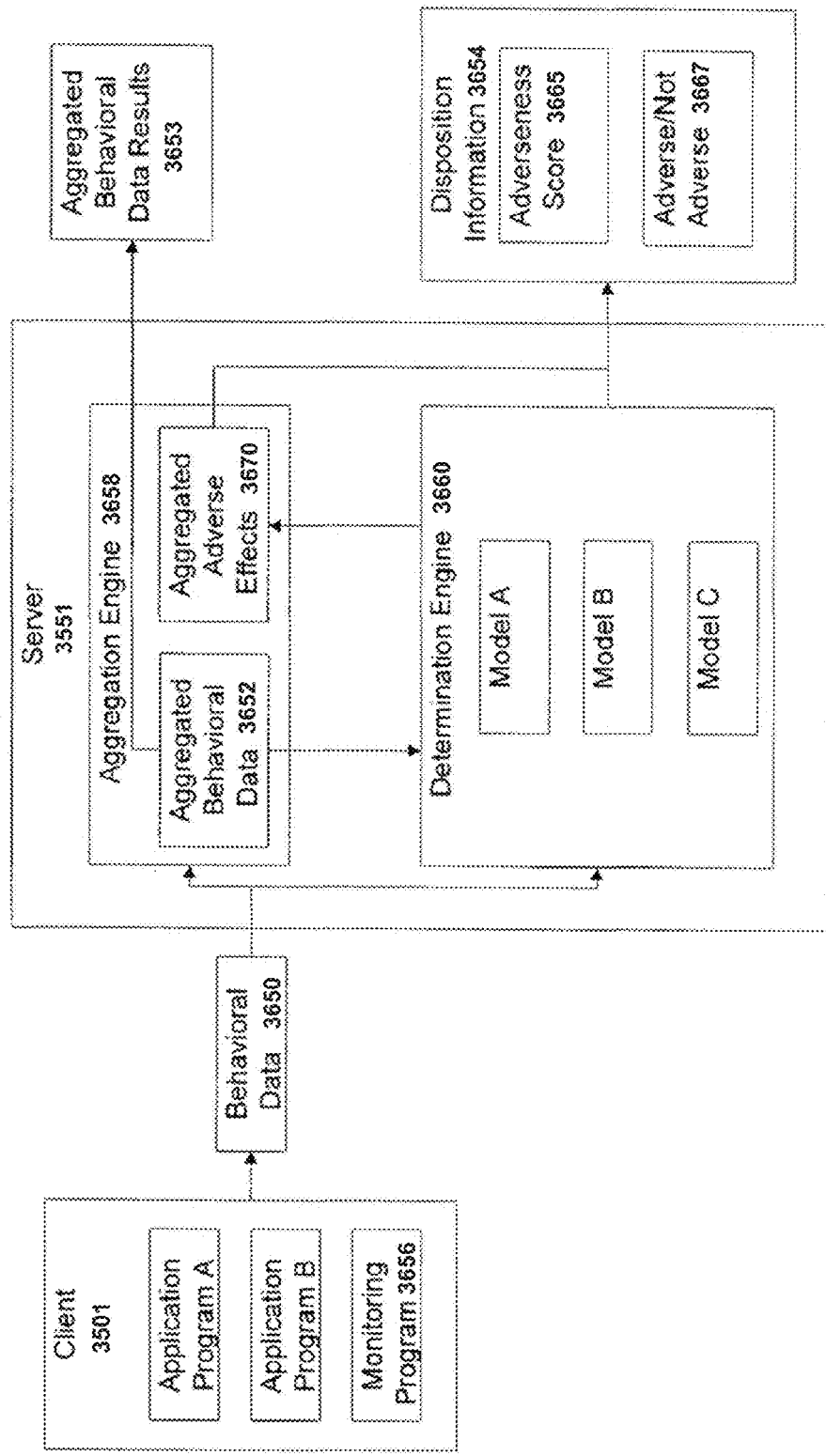
FIG. 36B is an exemplary block diagram depicting an embodiment.

More specifically, FIG. 36B shows a block diagram of a specific embodiment of a system for analyzing behavioral data gathered from the mobile communications devices. The system accepts as input behavioral data 3650 from one or more client devices 3501 and outputs aggregated behavioral data result 3653, disposition information 3654, or both.

In particular, as shown in FIG. 36B, a monitoring program 3656 is at the client. The client may include any number of application programs such as application program A, application program B, and so forth which are monitored by the monitoring program. Some examples of application programs which the monitoring program may monitor include Bump®, Facebook®, Foursquare®, Geodelic®, Goggles, Layar®, and many others.

In this specific embodiment, the server includes an aggregation engine 3658 and a determination engine 3660. The determination engine includes models such as model A, model B, and model C.

The monitoring program at the client transmits to the server behavioral data based on the monitoring of the one or more application programs at the client. In a specific embodiment, the behavioral data is inputted to the determination engine as individual behavioral data. That is, the input of the behavioral data is non-aggregated behavioral data, i.e., is from a single client or single application program on the client.

The determination engine, upon receiving the behavioral data applies a model to the behavioral data to determine whether the application program associated with the behavioral data would have an adverse effect on the client, the network, or both. For example, network operators can use the information provided by the system to detect applications that are causing problems on the user client devices, to detect device incompatibilities with particular applications, and to detect applications that may adversely affect mobile network performance or availability. Enterprises may use the information to determine what service is acceptable. Further, the information may be used to determine malfunctioning devices.

As an example, model A may include a policy that specifies the threshold limit for network usage is a rate of 100 megabytes per day. If the behavioral data indicates that the application's network usage is above this threshold limit then the application can be flagged as adversely affecting the network or having the potential to adversely affect the network.

As another example, a given cell network may be able to handle 20 megabits per second of downstream data transfer (i.e. data downloaded to a mobile communications device). If a single application constantly uses 5 megabits per second, a single user would not cause an adverse effect, though 5 users would. The system can identify the potential adverse effect upon the first user using the application program, rather than waiting for the network to actually be adversely effected. Thus, in a network adversity analysis, the device or application behavior itself is not adverse, but the behavior is a characteristic, which, if widely deployed, would be problematic. In another example, the rate at which an application causes data connections on a mobile communications device network to be opened may be used to determine adverse behavior. In a specific embodiment, the connection rate (i.e., how often does the application program attempt to transfer data over the network) is used to detect if the application program is harmful or adverse. In an embodiment, the connection rate determination takes into account information such as the packet size, duration, and frequency of an application's network data transfers that can be used to determine whether or not an application causes state transitions of a mobile communications device's cellular network radio. For example, if an application transmits or receives network data in a manner that causes an undesirable number of radio state transitions on a cellular radio, that application may be considered harmful or adverse. In another specific embodiment, the connection rate is used in combination with other behavioral data such as the amount of data transmitted and received by the application program, the number of mobile communications devices on which the application is installed, and so forth.

Alternatively, the system can identify the actual adverse effect rather than the potential to have such an effect given the behavioral data. As a further example, for adverse effects that are contained on the device (e.g., battery overuse, crashes, slowness, or sluggish application response), the system can detect a potential adverse effect based on the behavioral data (e.g., using more battery than typical applications, high CPU utilization) or detect the actual adverse effect (e.g., the device running out of battery, crashes occurring, UI waiting notifications).

The output of the system can include disposition information (e.g., a determination that a particular application may have an adverse effect on the network, client, or both). In a specific embodiment, the disposition information includes an adverseness score 3665 of the application program. For example, an adverseness score value of 80 may indicate that the application is very likely to be adverse. In contrast, a lower adverseness score value, such as 20, may indicate that the application is less likely to be adverse.

The adverseness score may indicate a degree of adverseness or intrusiveness. For example, a score of 95 may indicate that the application program is very intrusive (e.g., application program tracks the client's precise location using a global positioning system (GPS) or mobile network and sends or transmits the location off the client; or the application program has access to information that can be used to identify the user of the client including the user's mobile number and client serial number).

The disposition information may instead or additionally include an adverse/non-adverse result 3667, i.e., a binary result that indicates whether the application program is adverse or not adverse. The disposition information may be generated automatically based on the analysis of the behavioral data.

The disposition information can be made available to system users by any number of techniques. In an embodiment, the information is published on a website such as a website maintained by the system or a third-party website (e.g., Facebook®). A user can access the website or webpage to view the information, download the information, or both. In one specific embodiment, the information is publicly available on the website. In another specific embodiment, the disposition information or at least a portion of the disposition information is not publicly available. For example, the user may need to login to the website via a username and password. In another embodiment, the user may also have to be a service subscriber.

In another specific embodiment, the disposition information is transmitted from the server to a user such as via e-mail, text message, a tweet via Twitter®, a data feed (e.g., Really Simple Syndication (RSS)), or combinations of these in order to notify the user. In another specific embodiment, an application programming interface (API) with or without an API key required is provided so that other software services can access and use the information provided by the system.

A user who receives or is given access to the disposition information may be referred to as a subscriber. A subscriber does not necessarily need to have the application referenced in the disposition information installed on a mobile communications device. For example, the subscriber may be interested in keeping abreast of trends in application development, regardless of whether or not the subscriber has the application. In a specific embodiment, subscribing to the disposition information includes making a payment. The payment may be a one-time payment, a monthly payment, an annual payment, and so forth.

In another specific embodiment, the subscription is without cost to the user, but the user must complete a signup process where the user enters information such as their name and e-mail address. As part of the disposition information subscription process, the user may be asked to complete a marketing survey. The survey can request information such as the user's age, birthday, address, what products the user typically uses, what websites the user typically visits, or combinations of these. There can be a promotional period in which the disposition information is provided without charge, but afterwards payment is required in order to continue to receive the disposition information. Alternatively, the disposition information or a portion of the disposition information may be provided as a free, publicly available service. Disposition information provided without charge may be accompanied by advertisements such as banner ads embedded with the disposition information.

A software system that registers to receive information about one or more applications may also be referred to as a subscriber or a subscriber agent. In other words, a subscriber may be software or a software program (e.g., executable code) that communicates with the server via an API. In an embodiment, the subscriber can register to receive information about all applications or about specific applications. For example, the server may, by default, notify a subscriber (e.g. a user or software system) about any applications that are considered to be adverse, but allow configuration of a subset of applications for the subscriber to subscribe to. This configuration or preferences information may be stored at the server or client. Thus, a first subscriber may be notified by the server about a first set of applications considered to be adverse, based on the configuration or preferences information of the first subscriber. A second subscriber may be notified by the server about a second set of applications considered to be adverse, based on the configuration or preferences information of the second subscriber, where the second set of applications is different from the first set of applications. Allowing subscribers to choose the applications that they want to receive information about helps to ensure that the subscribers are not overloaded with information. A subscriber can register to receive information about a specific application, a category of applications (e.g., games, entertainment, news, productivity, search tools, social networking, or sports), applications from a specific developer or company, or combinations of these.

Generally, the disposition information, behavioral data, post-aggregated data (e.g., aggregated behavioral data and aggregated determinations), other intermediate output, or any combinations of these is saved or stored on server 3551 (or at a storage location accessible by the server) so that the data can be accessed at a later time. For example, it may be desirable to later access the data to perform a statistical analysis or other studies or analyses. Such studies or analyses may be based on data accumulated over a period of several months or years. The information may be saved or stored in nonvolatile memory or other persistent storage medium (e.g., hard disk, optical disc, flash memory, and so forth).

In another specific embodiment, the behavioral data is aggregated by the aggregation engine before the data is received as input to the determination engine. In a specific embodiment, the aggregated behavioral data is from two or more different client devices, i.e., multiple devices. In this specific embodiment, a model operates on the behavioral data from the two or more different client devices, i.e., the aggregated behavioral data. The aggregated behavioral data may be stored using a variety of data stores such as in a file or database table. For example, the data may be stored in a purpose-built binary file format or using a database system such as SQLite, MySQL™, or HBase. The aggregation engine can add behavioral data from first and second client devices to a table. Table B below shows an example of aggregated behavioral data.

TABLE B

| Client | Application Program | Network Usage Rate (megabytes per day) |
|---|---|---|
| 1 | Application Program A | 125 |
| 2 | Application Program A | 105 |
| 3 | Application Program A | 130 |
| 4 | Application Program B | 20 |
| 5 | Application Program B | 10 |
| 6 | Application Program A | 90 |
| 7 | Application Program B | 25 |

As shown in the example table B above, the table specifies the application program installed at the client and behavioral data associated with the application program. That is, the behavioral data is correlated to the client device that accessed the application program. In this example, the behavioral data includes an indication of the network usage of the application program. For example, client 1 includes application program A where the network usage rate by application program A at client 1 is 125 megabytes per day. Client 2 includes application program A also where the network usage rate by application program A at client 2 is 100 megabytes per day, and so forth. The network usage rate may be an average or rolling average that is calculated over a specific period of time (e.g., 1 week, 2 weeks, 1 month, 10 days, 1 hour, or 8 hours). For example, the network usage rate of 125 megabytes per day for application program A at client 1 may be an average based on the application's daily usage of the network over a one week period. The specific period of time may be consecutive units of time or nonconsecutive units of time (e.g., 10 business days).

In this specific embodiment, the determination engine takes as input the aggregated behavioral data and applies a model to make determinations of adverseness. The model can specify, for example, that if 10 percent or more of the time a particular application is installed it uses more than 100 megabytes per day, then it is considered potentially adverse.

For example, analyzing application program A via the model may include identifying a number of installs of the application program. In this example, application program A is installed on clients 1, 2, 3, and 6. So, there is a total of 4 installs of application program A. As shown in table B above, application program A's network usage rate exceeded 100 megabytes per day at clients 1, 2, and 3. So, there is a total of 3 instances or occasions where application program A's network usage rate exceeded 100 megabytes per day. Thus, the percent of time the application (or percent of application A installs) where the usage rate exceeded 100 megabytes per day is 75 percent (i.e., 3 instances exceeding 100 megabytes per day divided by 4 total installs equals 75 percent). Thus, application program A according to the model is determined to have or potentially have adverse effects because 75 percent of the time the application program is installed it uses more than 100 megabytes per day.

In contrast, as shown above in table B, the network usage rate for application program B falls well below the 10 percent/100 megabytes per day threshold limitations. So, application program B would not be flagged as being adverse.

Thus, the disposition information indicates that application program A is (or has the potential to be) adverse. The information or indication may be used to notify a network administrator so that the administrator can examine the outputted aggregate behavioral data more closely. The disposition information may indicate that application program B is not adverse.

Table B above showed an example where network usage rate was calculated as a daily rate. However, it should be appreciated that the usage rate may instead be calculated on a more granular level such as per minute, per hour, or for a particular time period during the day such as 10:00 am to 11:00 am. The determination engine can analyze such aggregated behavioral data to characterize an application as potentially adverse based on factors such as the number of instances, installations, or downloads of the application program, the network usage rate for a specific time period, rate of open connections, and so forth. The determination engine can scan or traverse the aggregated data and correlate such factors to identify relationships between two or more factors to make determinations of adverseness.

For example, an application program that had a moderate network usage rate but whose usage was concentrated during a particular time period (e.g., 10:00 am to 11:00 am) may be characterized as adverse if there is a very high number installations. Thus, even though the application's network usage rate is moderate, the high number of installations and data indicating that most of the users use the application around the same time period can result in the application program being characterized as adverse. In contrast, an application program that had a very high network usage rate, but whose usage was scattered throughout the day or occurred during off-peak hours, may not be characterized as adverse because usage of the application is unlikely to degrade the network.

Generally, to characterize an application program, a model is applied to at least a portion of the behavioral data collected from one or more client devices, such as two or more different client devices. The model specifies which specific collected behavioral data points of an application program should be analyzed to determine whether the application program will be characterized as adverse. Examples of collected behavioral data include information indicating network usage, number of open connections, amount of time the user spent using the application program, what time during the day the application program was used, what other application programs are on the device, what other application programs were being concurrently executed, user id, or information about the sensitive actions performed by the application program (e.g., accessing GPS unit of device, application accessing a directory of contacts stored on device, application accessing device configuration information, application accessing system registry files, or application accessing personal user information stored on device). A model can use any combination of this behavioral data in order to characterize an application program. Further, when characterizing an application program, a model may use in combination with behavioral data other data as well such as evaluations or ratings of the application program from other sources.

In a specific embodiment, the determination engine analyzes raw behavioral data. In another specific embodiment, the aggregation engine processes or preprocesses the behavioral data before a model is applied to the aggregated behavioral data. In a specific embodiment, the processing includes generating a data distribution, probability curve, average (e.g., average battery consumption across two or more devices), rolling average, weighted average, ratios, or some other statistical or non-statistical calculation, or combinations of these. Thus, for example, a model of the determination engine may operate on a normalized form of the data such as a histogram rather than the raw behavioral data.

A data distribution can identify the number of devices that reported a variable as X, the number of devices that reported a variable as Y, and so forth. In a specific embodiment, a data distribution is generated based on device battery consumption. The data distribution calculation can indicate the number of occurrences or frequency at which an application program was found to have consumed certain amounts of battery.

The behavioral data collected at the client may be transmitted to the server by any number of techniques. In a specific embodiment, the behavioral data is transmitted from the client to the server based on a predetermined schedule such as during off-peak hours to reduce load on the network. Alternatively, the behavioral data may be transmitted in real-time. In an embodiment, the frequency at which behavioral data is transmitted is based on the release date of the application, developer of the application, or both. For new applications, behavioral data may be sent more frequently as compared to old applications since there is likely to be more uncertainty with new applications. Certain application developers may be identified as consistently developing applications that are abusive. So, in an embodiment, applications from these developers will have their behavioral data sent more frequently so as to keep a closer watch on these applications.

Behavioral data may be transmitted using a push-model from the client to the server. Alternatively, the data may be transmitted using a pull-model in which the server requests the data from the client. In an embodiment, the system employs statistical techniques to gather behavioral data of a representative sample or a statistically significant number of the devices. Limiting the amount of behavioral data to a representative sample as compared to gathering data from every single device helps to reduce network load. Alternatively, data may be gathered from every single device. Further details of behavioral data collection is described in the discussion below that accompanies FIG. 41.

As shown in FIG. 36B, in another specific embodiment, determinations of adverseness from the determination engine are inputted to the aggregation engine to be aggregated 3670. It may be desirable to determine if an application's adverseness on a particular device before determining if the application is generally considered adverse. For example, a model for determining adverseness may need to take into account multiple data sources relative to a particular device rather than operating on aggregate data. Aggregating the determinations can allow for an overall determination of adverseness of an application program based on the number of times the application program is flagged by the determination engine. Specifically, if there are 100 installations of an application program, but the application program was flagged only 2 times by the determination engine then the application program may not be categorized as being adverse. But, if the application program was flagged 80 times by the determination engine, the application program may be categorized as being adverse.

In some cases, determinations of adverseness are based on multiple factors (e.g., peak data rate, average data rate, or data transfer) that may be interrelated. There can be any number of factors, e.g., 1, 2, 3, 4, or more than 4 factors. These factors determine the characterization of an application program as adverse or not adverse. In cases where multiple factors are involved it may be desirable to make a determination before an aggregation is performed to reduce the complexity of the calculations, and to reduce the probability that some data will be lost such as through averaging out and rounding errors. Thus, analyzing behavioral data of a single device can help to ensure granularity. After a determination is made for the single device or the application on the device, the determinations can be aggregated to obtain a macro view or overall determination of whether or not an application should be characterized as adverse.

In another specific embodiment, the aggregation engine aggregates behavioral data from two or more application programs on a single device. Table C below shows an example of aggregating behavioral data from two or more applications on a single client device where the aggregated behavioral data includes an indication of the amount of battery consumption by the application program.

TABLE C

| Application Program | Rate of Battery Consumption (milliwatt-hours per hour) |
|---|---|
| Application Program A | 100 |
| Application Program B | 90 |
| Application Program C | 125 |
| Application Program D | 60 |
| Application Program E | 150 |

As shown in the example of table C above, application program A consumes a battery of a client device at a rate of 100 milliwatt-hours per hour, application program B consumes the battery at a rate of 90 milliwatt-hours per hour, and so forth. Because it may not be possible to directly measure the battery consumption of a particular application on a mobile communications device, it may be desirable to estimate the battery consumption based on measurable characteristics. In an embodiment, battery consumption is estimated based on general or device-specific battery consumption in relation to measurable characteristics. For example, measurable characteristics may include an application's CPU time, GPS usage time, data transfer over particular network types, network traffic (e.g., amount of data or connection rate information for data that the application program receives, transmits, or both over the network), and any modification to the device's power state. One will appreciate that the battery consumption estimation may take place in a variety of places, such as part of a determination engine, part of gathering behavioral data, or part of an aggregation engine.

The aggregated behavioral data can be inputted to the determination engine so that the determination engine can apply a model to determine which application program on the client consumes the most battery capacity. In this example, the model identifies application program E as consuming the most battery capacity as compared to application programs A, B, C, and D. A user of the client device may then receive a warning message from the system that application program E consumes a very large amount of battery capacity as compared to other applications on the client device. Thus, the user will know that when using application program E, the application program will deplete the device's battery life faster than when using the other application programs and the user can tailor their use of the application program appropriately.

In another specific embodiment, a model includes a points system to determine whether the application program will have an adverse effect. Application program activities or operations are assigned a specific number of points. When the number of points an application program accumulates exceeds a threshold limit the application program is determined to have an adverse effect on the network, mobile communications device, or both.

For example, a first rule of the model may specify that each megabyte of network usage per day is 1 point. A second rule of the model may specify that each connection per minute is 2 points. A third rule of the model may specify that when the total number of points an application program accumulates is greater than a threshold limit of 100 points, the application program is determined to have an adverse effect.

In this example, a first input to the model is the application's network usage such as 90 megabytes per day which is assessed 90 points based on the first rule. A second input to the model is the number of connections such as 10 connections per minute which is assessed 20 points based on the second rule. The sum of the points is 110 points (90 points+20 points=110 points). So, based on the third rule the application program is determined to have an adverse effect because 110 points is greater than the 100 point limit specified in the third rule. Thus, in this example, a combination of network data usage and a total number of connections are inputs into a model that determines if an application has an adverse effect.

In another specific embodiment, separate models may be applied for different network types. In this specific embodiment, model B is used for Code Division Multiple Access (CDMA) networks. Model C is used for Global System for Mobile Communications (GSM) networks. Models B and C may have different network usage rate thresholds, different connection rate thresholds, or both which trigger a determination of whether the application program will have an adverse effect. For example, model B may be applied where the device data indicates a CDMA network. Model B may categorize application programs that use more than 100 megabytes per day as having an adverse effect. Model C may be applied where the device data indicates a GSM network. Model C may categorize application programs that make more than 500 connections per hour as having an adverse effect.

Some networks may be more sensitive to certain types of application program operations as compared to other networks. Thus, selecting which model to apply based on the type of network can be desirable because it helps to determine the adverseness of an application on a particular network type. Similarly, selecting which model to apply may be based on the type of client device, carrier, or both. For example, carrier A (e.g., AT&T) may specify network usage thresholds that are different from another carrier B (e.g., Verizon). In an embodiment, if a mobile communications device is capable of operating on multiple network types (e.g., General Packet Radio Service (GPRS) and Wi-Fi), behavioral data for an application differentiates network behavior based on network type so that separate models may be applied for different network types. For example, if a network-intensive application only makes large data transfers over Wi-Fi, then a model for determining adverseness of the application on a GPRS network would only specify thresholds for the portion of the application's network traffic that is occurs on a GPRS network.

In an embodiment, the threshold limits of the models such as network data usage and number of connections are user-configurable. That is, an administrator can configure data usage thresholds, connection thresholds, or both that, when exceeded, will consider or determine the exceeding application abusive.

In a specific embodiment, the system includes a fuzzy logic system that takes multiple types of network usage metrics to produce an adverseness rating because it may be desirable to have a more granular assessment of adverseness rather than a simple binary result. For example, the system may take as inputs the application's average data transmission rate, the application's highest amount of data transmitted in a minute, the application's average connection rate, and the application's highest number of connections in a minute. One skilled in the art will appreciate that the system may use a variety of techniques to produce a fuzzy adverseness rating. For example, the model may have an equation that determines a fuzzy adverseness rating from the inputs or the model may use data resulting from machine learning, such as a series of membership functions that, when applied to a given set up inputs, produce a fuzzy adverseness rating.

FIG. 36B shows three models, however, it should be appreciated that there can be any number of models. A model can represent the relationships and interdependencies among the variables which can affect the network and can be used to determine whether a particular application is likely or unlikely to adversely affect the network. A model can include one or more rules having a conditional statement and action, e.g., if X then do Y, else do Z, an application policy that includes a behavioral limitation such as a threshold limit on the rate of open connections, or both. A model can be used to simulate network effects, perform forecasting, or a what-if analysis based on the aggregated behavioral data. In a specific embodiment, a network administrator can alter a portion of the aggregated behavioral data to create a what-if scenario for application of the model. The output of the model allows the administrator to see how alterations or changes in behavior are likely to affect the network. Some examples of changing the behavioral data for predictive modeling include increasing or decreasing the number of users using an application program, increasing or decreasing the number of users using an application program during a specific time period, and so forth. This feature allows network administrators to be able to predict the probability of an outcome and ensure that the network remains operational.

The aggregated behavioral data exposed by the server or outputted is referred to as aggregated behavioral data result 3653. The result data includes the data which led the system to determine an application's adverseness (e.g., application transmits an average of 100 megabits of data per minute and opens 10 connections per second). In various embodiments, the data is made available as raw data, a web page, an API response, provided as a report, or combinations of these.

Generally, the format can be in any externally consumable format that can be machine-readable or readable by a human. For example, the result may be provided as a report (e.g., pdf report, or printed report) for a network administrator. The report may include text, metrics, graphs, tables, or charts. The report can help the administrator to identify those applications that use the most network resources. In such cases, the administrator may seek to start charging or impose additional costs for the use of those applications.

The administrator may be associated with a specific network carrier (e.g., AT&T or Verizon). The aggregated behavioral data result and the disposition information help to provide an early warning to such administrators so that the administrators can take corrective action if needed. Such action can include contacting the application developer, developing a partnership with the developer, pulling or removing the application program from the marketplace (e.g., Android marketplace), blocking the application from running on the devices, developing a response plan to ensure that if additional users download the application that the network will not be adversely affected (e.g., loss of a cell tower), or combinations of these. The information provided by the system can allow carrier network administrators to identify which applications are slowing down the network, devices, or both. Further, the information can be used to identify bugs in the devices that cause an application to malfunction. If the information indicates that a specific application is especially popular, the carrier can work with the developer to optimize the application for the carrier's devices.

Figure 36C:
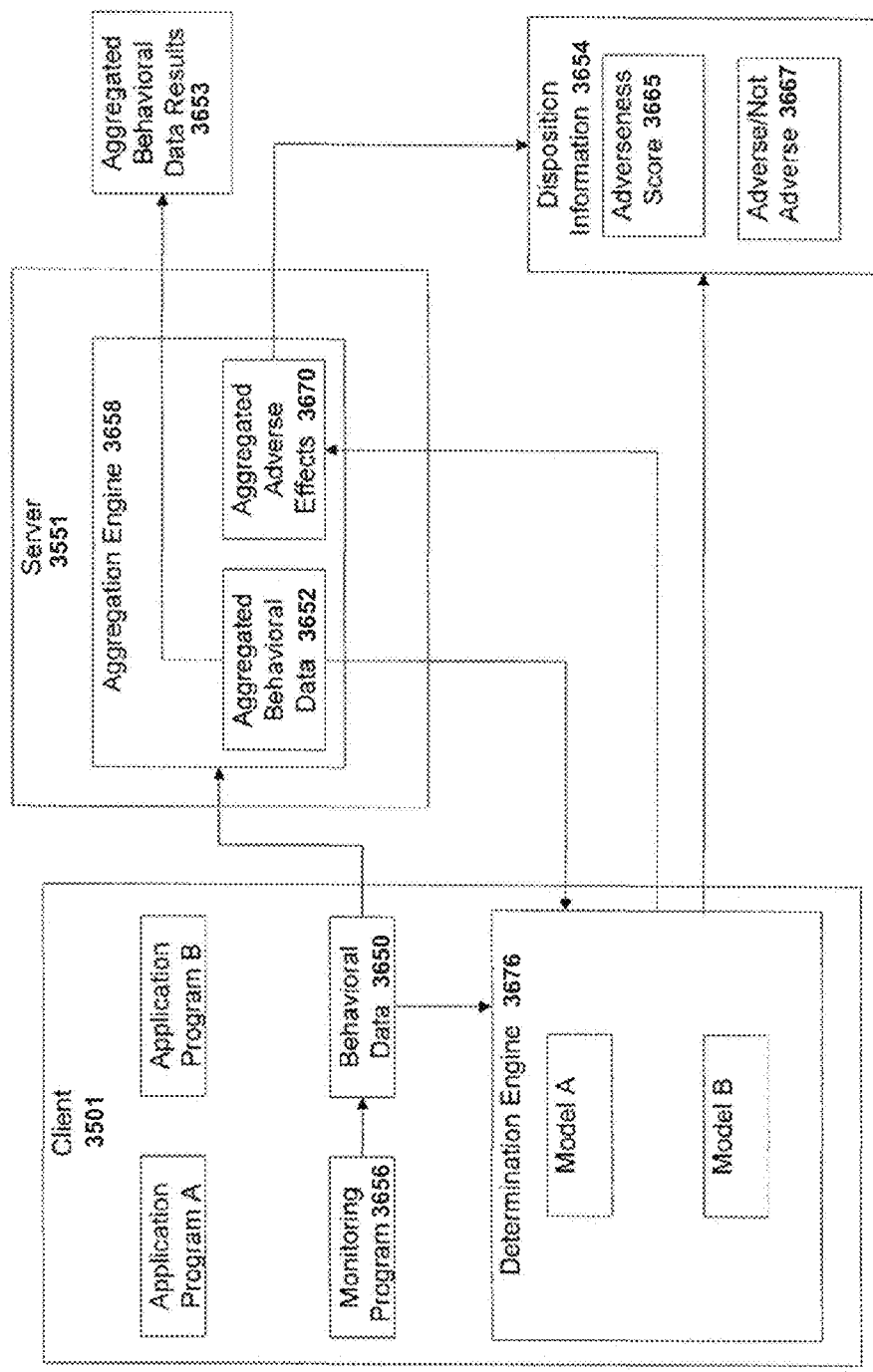
FIG. 36C is an exemplary block diagram depicting an embodiment.

FIG. 36C shows a block diagram of another specific embodiment of a system for analyzing behavioral data. FIG. 36C is similar to FIG. 36B, but in FIG. 36C a determination engine 3676 is at the client device whereas in FIG. 36B, the determination engine is at the server. The implementation in FIG. 36B may be referred to as a server-side implementation of the determination engine. The implementation in FIG. 36C may be referred to as a client-side implementation of the determination engine.

Having the determination engine on the client device allows a determination of whether or not an application is adverse or abusive to be made on the client device. This can be useful in cases where, for example, the user is unable to connect to the network, the determination engine uses a large amount of data from the device that is undesirable to transmit over the network, there is a large amount of complex behavioral data such that it would desirable to preprocess or make an initial determination before transmitting the data to the server, or combinations of these.

As shown in FIG. 36C, the determination engine at the client makes determinations of adverseness based on local behavioral data 3650 associated with one or more application programs at the client. The determination engine may additionally receive aggregated behavioral data 3652 from a remote source, such as server 3551. As discussed above, the aggregated data includes behavioral data from other client devices. The received aggregated behavioral data provides additional data points for the client-based determination engine which can improve the accuracy of determining whether or not an application program is adverse. Using the local behavioral data, the client-based determination engine can make a preliminary determination of adverseness. Upon receiving the aggregated behavioral data, the client-based determination engine may alter its preliminary determination. Alternatively, the received aggregated behavioral data may be combined with the local behavioral data and the combined behavioral data is analyzed by the determination engine at the client.

After the determination engine makes a determination at the client, the determination can be transmitted to the server for aggregation. That is, the aggregation engine at the server can receive determinations of adverseness from multiple client devices and then aggregate the received determinations. The determination made at the client device may instead or additionally be made available as disposition information. The disposition information may be made available at the client device where the determination was made, at a device other than the client device where the determination was made (e.g., at the client device of a network administrator), or both.

Determination engine 3676 may utilize a fewer number of models than determination engine 3660 (FIG. 36B), such as only models that are relevant to the client device, carrier network of the client device, applications on the client device, or combinations of these. Having a few number of models can reduce processing overhead.

Figure 36D:
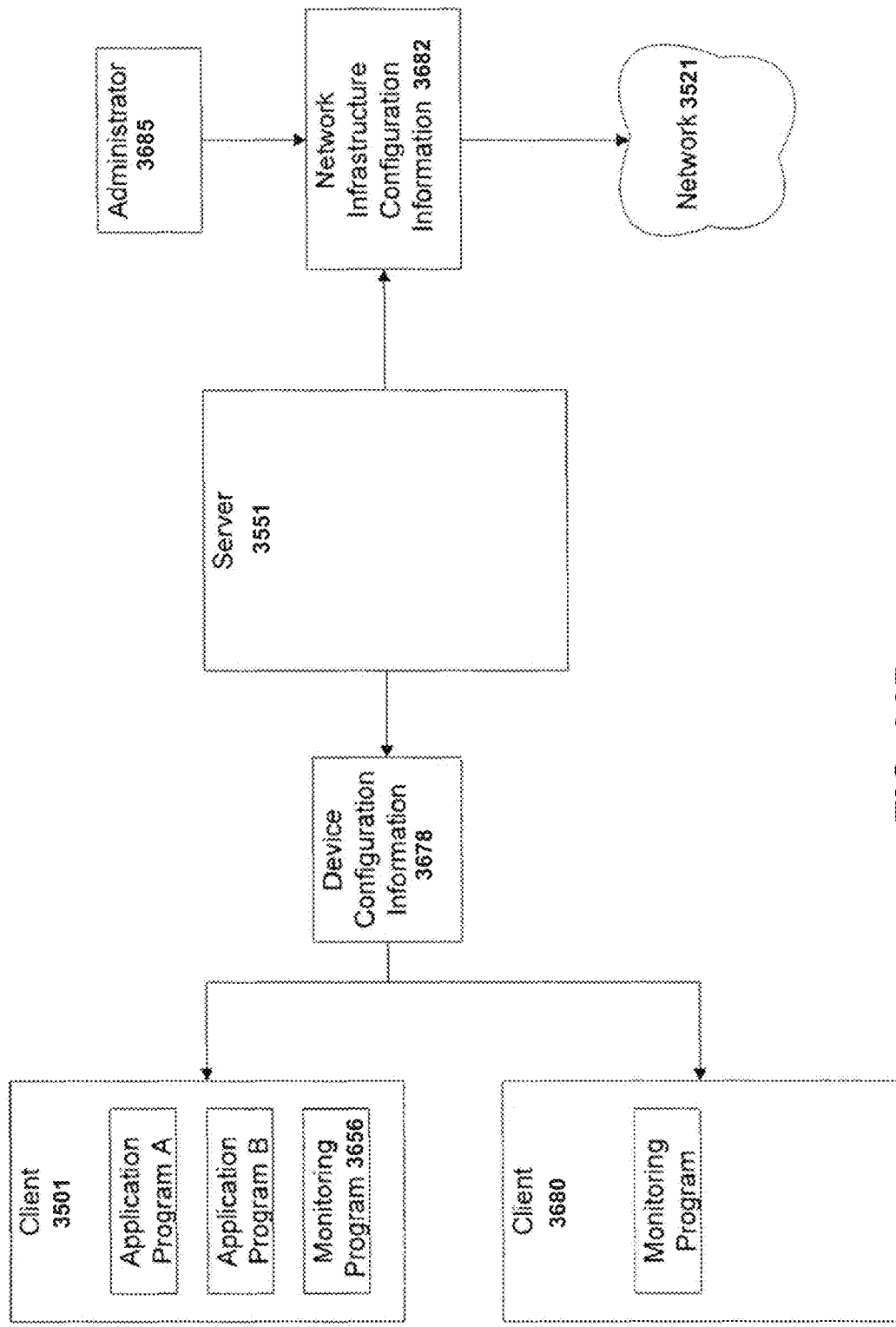
FIG. 36D is an exemplary block diagram depicting an embodiment.

FIG. 36D shows a block diagram of remediation upon determining that an application program may have or has an adverse effect on the network, client device, or both. As shown in FIG. 36D, for device remediation, device configuration information 3678 is generated at the server and is transmitted from the server to one or more client devices such as client device 3501, a client device 3680, or both. The device configuration information may be used by the monitoring program to block or restrict the normal operations of an application program that is determined by the system to be abusive.

In the case of network remediation, the server generates network configuration information or network infrastructure configuration information 3682. The information may be transmitted to infrastructure powering network 3521 so that the network may be directly configured. For example, the information may be transmitted to one or more network devices such as a firewall, intrusion prevention system, proxy, router, switch, and so forth. The information may instead or additionally be made available for download by a network administrator 3685. For example, network infrastructure configuration information may be used to block traffic associated with the application program, block transmission of an application binary for the application program, or both.

Configuration information may be referred to as a configuration profile, configuration file, or configuration settings.

Device configuration information may be transmitted from the server to the client that has the abusive application program to prevent adverse effects to the client, network, or both. Configuration information may be transmitted to a client that does not have the application program as a preventative measure. For example, the configuration information may contain network addresses associated with an adverse application to block traffic to and from so that the application does not function on the network. In this example, traffic associated with an adverse application may be blocked on a cellular network but allowed on a Wi-Fi network. In another example, the configuration information may contain a signature to block the application binary from being transmitted across the network, a URL associated with the application to block, or instructions to an application market to block the application from being downloaded. In this example, the application itself may be prevented from being downloaded or used.

Figure 37:
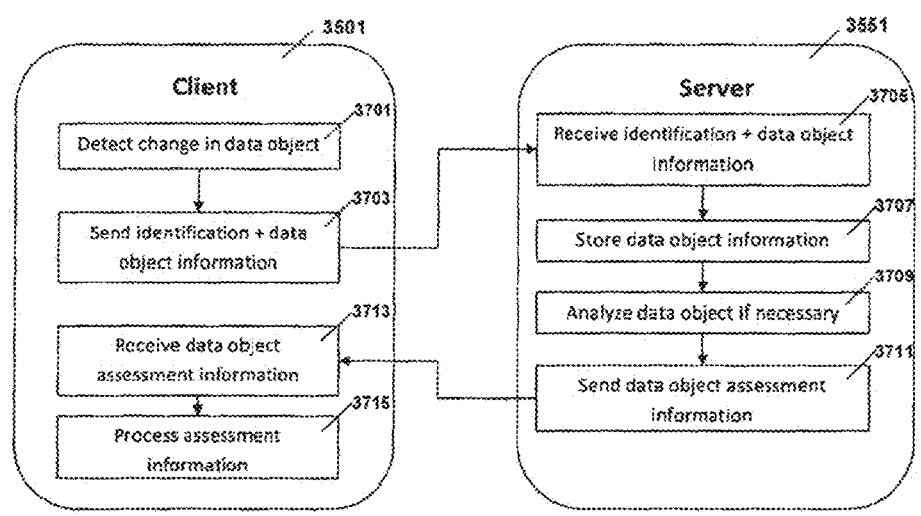
FIG. 37 is an exemplary flow diagram illustrating the steps of an embodiment.

FIGS. 37-40 illustrate the transmission and collection of application data and device data in more detail. FIG. 37 illustrates an embodiment in which server 3551 evaluates a change in a data object stored on mobile communications device 3501. In FIG. 37, mobile communications device 3501 detects a change in a specific data object (block 3701). One having skill in the art will appreciate that detecting changes in a data object may involve mechanisms such as intercepting system calls or file system operations, a file system or other data object change listener, receiving an event from a package management system (e.g., PACKAGE_UPDATED and/or PACKAGE_REPLACED intents in the Android™ operating system), and polling for data objects in a file system or other system capable of enumerating data objects. Other techniques for detecting changes may also be used. Alternatively or additionally, the following methods may occur when a change to a data object is detected, upon request by the user of the mobile communications device, or upon a pre-configured schedule for analyzing and assessing data objects on the mobile communications device.

In an embodiment, a change in a data object includes any time a data object is added, removed, or modified. After transmitting application data for a data object, mobile communications device 3501 waits for confirmation from the server before recording that it has successfully transmitted application data for the data object. After receiving application data for a data object from a mobile communications device 3501, server 3551 transmits a confirmation. If there was an error in transmission or with the data itself, server 3551 returns an error. If mobile communications device 3501 receives an error from server 3551, or no response after transmitting application data for a data object, mobile communications device 3501 will not record the application data for the data object as having been sent, and the mobile communications device 3501 may retry sending the data at some point in the future. One skilled in the art will recognize that mobile communications devices are sometimes unable to connect to a network or may have their network connection interrupted in the middle of a transmission. As such, a mobile communications device 3501 recording whether or not server 3551 has successfully received application data for a data object is important to the functioning of a reliable data collection system. In an embodiment, any time application data for a data object has not been transmitted from mobile communications device 3501 and received by server 3551, it is considered to be changed and needs to be transmitted.

In an embodiment, mobile communications device 3501 stores whether it has transmitted and server 3551 has successfully received application data for one or more data objects present on the device. In order to identify which data objects have had appropriate application data reported to server 3551, mobile communications device 3501 may store a database containing identification information for data objects that have been successfully reported to server 3551 to determine whether the device needs to transmit application data for those data objects. For example, a data object that is a file on a filesystem may be identified by a hash of its contents. When the data object is first installed on a mobile communications device 3501, the database may contain no data for the data object. Because there is no identifying information for the data object, the mobile communications device 3501 recognizes the data object as new and transmits application data for the data object to server 3551 indicating that the object is new. After transmitting application data for the data object to server 3551 and receiving confirmation that the server successfully received the application data, the device stores the hash of the file contents and the location on the filesystem where the file resides in the database. If the data object were to be deleted, the mobile communications device 3501 can detect that there is no file at the previously stored filesystem location and can report the deletion of the data object to server 3551 by reporting the filesystem location and/or hash identification information for the data object. If the file were to be modified, such as in the case of an application being updated, the mobile communications device can detect that there is a file in the previously stored location on the filesystem, but the content hash of the file does not match the stored content hash. In this case, the mobile communications device 3501 can report to the server that the data object identified by the file location and/or previous content hash has been updated and report the new content hash of the file.

In an example, a security system installed on mobile communications device 3501 may report application data for a data object to server 3551 for purposes of receiving an assessment of the data object. If a mobile communications device downloads a new application that is malicious, it is important that the security system detect this new item as soon as possible. Server 3551 can analyze the new application and provide a security assessment whereby actions can be taken based on the results. In another example, a first version of an application may be safe, but a second version of the application may be malicious. It is important that a security system recognize this update as different from the first version of the application so that it will produce a new assessment of the second version and not just report the first assessment. Server 3551 can analyze the updated application and provide a security assessment whereby actions can be taken based on the results.

In block 3703 of FIG. 37, mobile communications device 3501 transmits identification information for the mobile communications device to server 3551. In an embodiment, the identification information is authentication information. In an embodiment, the identification information is a non-authoritative identifier for the device such as a device ID that is not considered to be secret. In an embodiment, identification information includes device information for the mobile communications device (e.g., make, model, hardware characteristics). In addition, mobile communications device 3501 transmits information for the changed data object. Such information may include identifying information for the data object, such as metadata (e.g., hash, package name, file name, file path, cryptographic signer, unique identifier such as a UUID) and the like. In block 3705, server 3551 receives the identifier for mobile communications device 3501 and information for the changed data object. The received data is stored by server 3551 on the server or on data storage 3511 (block 3707). In an embodiment, only some of the data received by server 3551 is stored. In block 3709, server 3551 provides an assessment for the changed data object using any of the techniques disclosed herein or from U.S. patent application Ser. No. 12/255,621, which is incorporated in full herein. The assessment may include instructions and/or a categorization labeling the changed data object as safe, malicious, or unknown. In an embodiment, some or all of the received data is stored on server 3551 or data storage 3511 and is associated with the device that transmitted the data. For example, this may later allow server 3551 to determine which applications a device has encountered. In another embodiment, some or all of the received data is stored on server 3551 or data storage 3511 in a way that server cannot directly tie the information to a particular device. For example, server 3551 may store received data without any link to a particular device or account. In another example, data may be anonymously associated with a device by the server associating the data with an identifier when stored. To ensure that server 3551 cannot associate the stored data with a particular device, the identifier is only known to the device transmitting the data and is provided to the server whenever the device transmits data. The server does not store this identifier so that the identifier is never directly linked with a particular device or account on server 3551 or data store 3511. In an embodiment, server 3551 stores the results of the assessment on the server or on data storage 3511. If, when an assessment for a data object is required 3709 and a previous assessment for the data object exists and is considered valid, server 3551 retrieves the previous assessment from data storage 3511 instead of performing a new assessment. Assessments may be considered to be for the same data object if the metadata relating to each object matches in a variety of ways, including if the assessments relate to data objects with the same hash, same package name, same cryptographic signer, or same file path. In block 3711, the assessment is transmitted to mobile communications device 3501, which receives this assessment from server 3551 (block 3713), then processes the assessment or takes appropriate action (block 3715).

Figure 38:
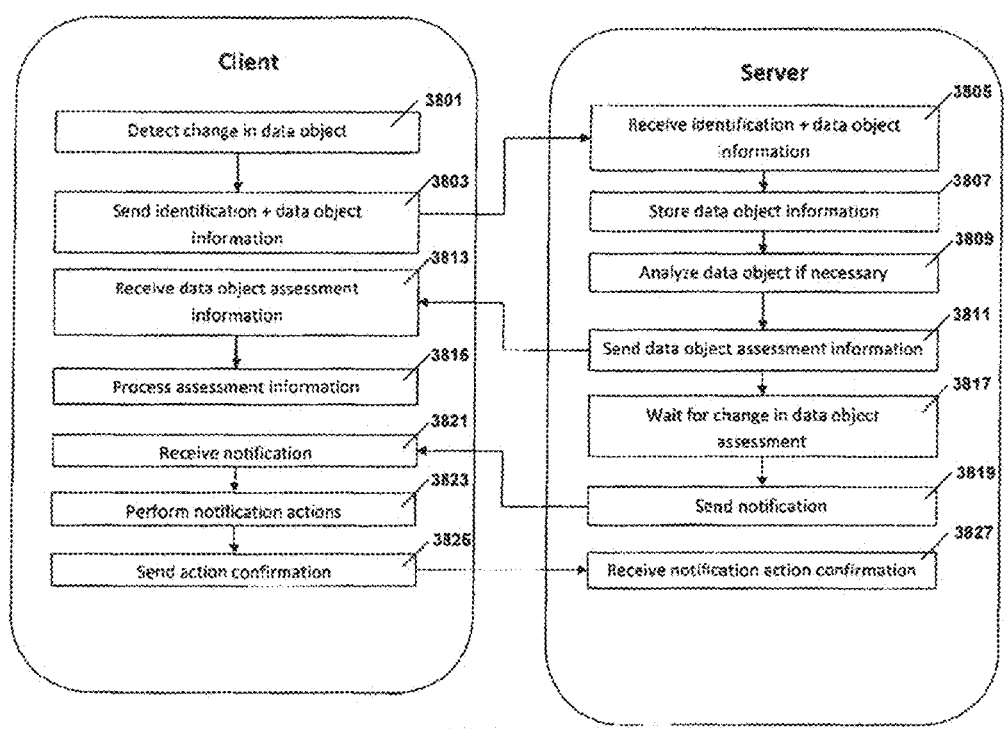
FIG. 38 is an exemplary flow diagram illustrating the steps of an embodiment.

One having ordinary skill in the art will appreciate that the interaction between mobile communications device 3501 and server 3551 is dynamic, in that server 3551 can proactively transmit notifications or instructions to remediate data objects whose assessment has changed, thereby requiring action by mobile communications device 3501. FIG. 38 illustrates such an embodiment. In block 3801 of FIG. 38, mobile communications device 3501 detects a change in a specific data object. In block 3803, mobile communications device 3501 sends identification information for the device and information about the changed data object to server 3551. Server 3551 receives the identification information for mobile communications device 3501 and information about the changed data object (block 3805). In block 3807, server 3551 stores the changed data information on the server or on data storage 3511. In block 3809, server 3551 may analyze and assess the changed data object, and may report the assessment to mobile communications device 3501 (block 3811). As discussed previously, if an assessment has already been performed for the data object, that previously performed assessment may be retrieved and used instead of re-performing the assessment. If server 3551 reports an assessment, mobile communications device 3501 receives the assessment or other notification in block 3813, and processes the assessment (block 3815).

In an embodiment, the assessment for the data object may change. For example, a data object that may previously have been assessed as safe or unknown may later be identified as malicious, causing some previously unknown vulnerability, or causing an undesirable behavior such as network overuse or battery drainage. In block 3817, if server 3551 detects a change in assessment for a previously analyzed data object, then in block 3819, server 3551 may transmit a notification, remediation instructions or the like to mobile communications device 3501. Mobile communications device 3501 receives the notification from server 3551 (block 3821), then performs the recommended actions or remediation instructions (block 3823). In block 3825, mobile communications device 3501 transmits a confirmation that it performed the required actions, which server 3551 receives (block 3827). In an embodiment, the notification is only sent to mobile communications device 3551 if the data object is determined to be present on mobile communications device. In an embodiment, the server 3551 stores information on the server 3551 or on data storage 3511 allowing the server 3551 to determine whether the mobile communications device 3501 currently has the data object or has previously requested an assessment for the data object.

One having skill in the art will appreciate that FIG. 38 provides only one example of how server 3551 may report changes in assessment to a mobile communications device, and some steps may be skipped without departing from this disclosure. For example, mobile communications device may perform remediation instructions or other required actions without sending confirmation to server 3551.

Figure 39:
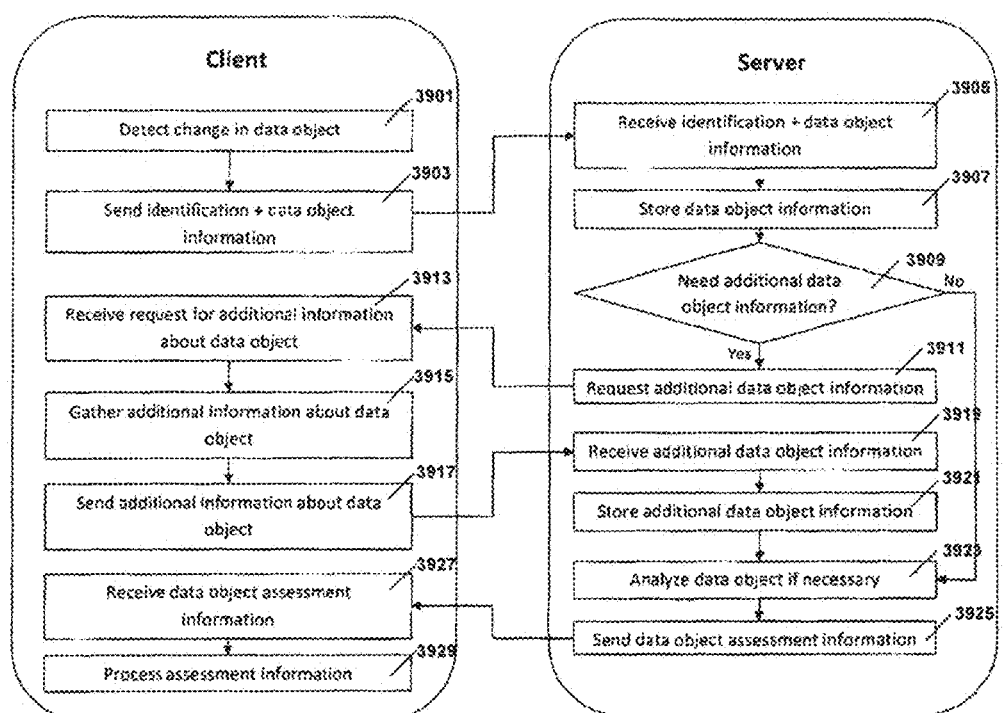
FIG. 39 is an exemplary flow diagram illustrating the steps of an embodiment.

In an embodiment, server 3551 may request additional information about a particular data object from mobile communications device 3501. For example, mobile communications device 3501 may send information about a changed data object to server 3551; however, the information sent may be insufficient for server 3551 to perform a conclusive analysis. FIG. 39 illustrates this embodiment. In block 3901 of FIG. 39, mobile communications device 3501 detects that a data object has changed, and transmits identification information for mobile communications device 3501 with information for the changed data object to server 3551 (block 3903). Server 3551 receives the identification information for mobile communications device 3501 and information for the changed data object (block 3905), and stores the information for the changed data object on the server or on data storage 3511 (block 3907). In block 3909, server 3551 determines whether it requires additional information about the changed data object. For example, server 3551 may attempt to assess whether the changed data object is safe or malicious, but is unable to provide a conclusive assessment (i.e., the assessment results in "unknown"). The determination of whether more information is needed can be performed either before the server 3551 performs an assessment if there is not enough data to even begin an assessment or after an assessment returns inconclusively due wholly or in part to a lack of data. If additional information is required, then server 3551 may request the additional information from mobile communications device 3501 (block 3911).

In block 3913 of FIG. 39, mobile communications device 3501 receives the request for additional information, gathers the requested information (block 3915), then transmits the additional information to server 3551 (block 3917). In an embodiment, additional information includes behavioral data for a data object and application data for the data object, such as the content for the data object. In block 3919, server 3551 receives the additional information from mobile communications device 3501, and stores the additional information (block 3921). Server 3551 may then analyze the changed data object information with the additional information to provide an assessment (block 3923), which may be sent to the mobile communications device 3501 (block 3925). In block 3927, mobile communications device 3501 receives the assessment of the changed data object from server 3551 then processes the assessment (block 3929).

Figure 40:
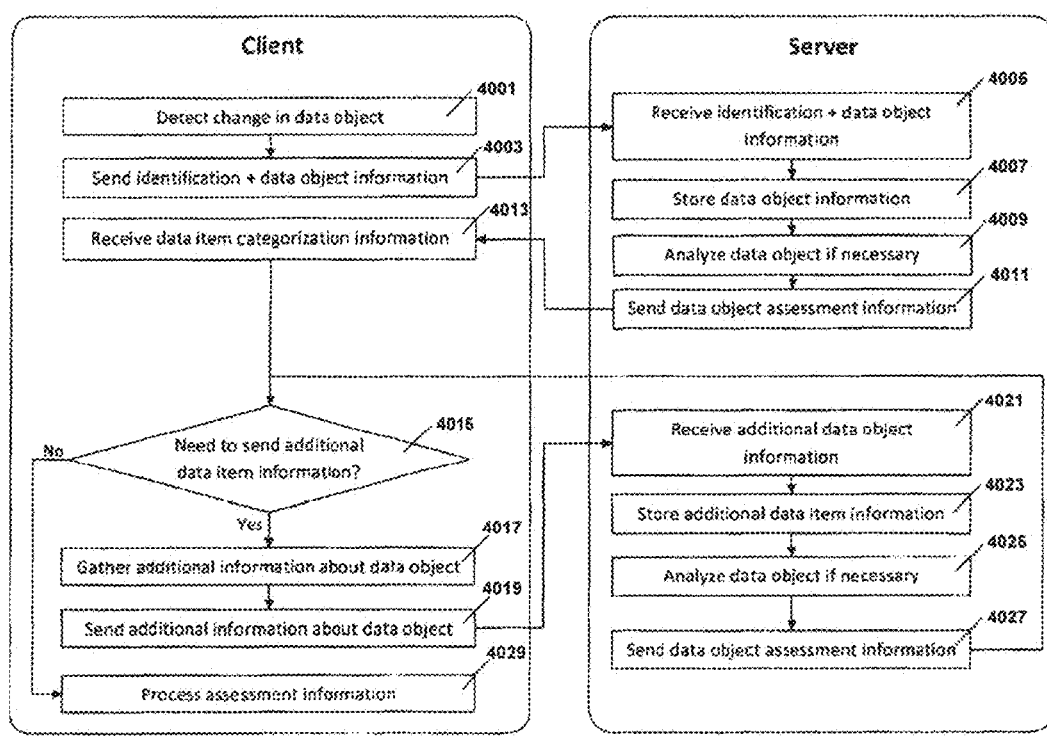
FIG. 40 is an exemplary flow diagram illustrating the steps of an embodiment.

In an embodiment, mobile communications device 3501 may elect to transmit additional information to server 3551. For example, server 3551 may analyze a data object, but not provide a conclusive assessment. Rather than requesting additional information from mobile communications device 3501, the device may request an additional assessment by providing additional information for the data object to server 3551. FIG. 40 illustrates this embodiment.

In block 4001 of FIG. 40, mobile communications device 3501 detects a change in a data object, then in block 4003, mobile communications device 3501 sends its identification information and information for the changed data object to server 3551. In block 4005, server 3551 receives the identification information for mobile communications device 3501 and the information for the changed data object. This information is stored by server 3551 on the server or on data storage 3511 (block 4007), then analyzed by server 3551 to result in an assessment (block 4009). In block 4011, server 3551 transmits the assessment or an appropriate notification to mobile communications device 3501. Mobile communications device 3501 receives the assessment from server 3551 (block 4013 of FIG. 40). In block 4015, mobile communications device 3501 determines whether to send additional information about the data object. For example, server 3551 may be unable to produce an assessment for the data object given the data it has available, and thus needs more information to be able to produce an assessment. In block 4017, if mobile communications device 3501 determines that it should send additional information about the data object, then this information is gathered. In block 4019, mobile communications device 3501 transmits the additional information to server 3551, which receives this information (block 4021), and stores the received additional information (block 4023). One will appreciate that server 3551 will know that the additional information will pertain to the information previously received by server 3551 (block 4005), since mobile communications device 3501 will transmit identification information with the additional information.

In block 4025 of FIG. 40, server 3551 analyzes the additional information received from the mobile communications device 3501. In an embodiment, the additional information may be analyzed with the previously received information (block 4005). In block 4027, server 3551 transmits the assessment to mobile communications device 3501, which processes the assessment (block 4029). If mobile communications device 3501 still needs to send additional information, it may repeat the process as necessary.

Figure 41:
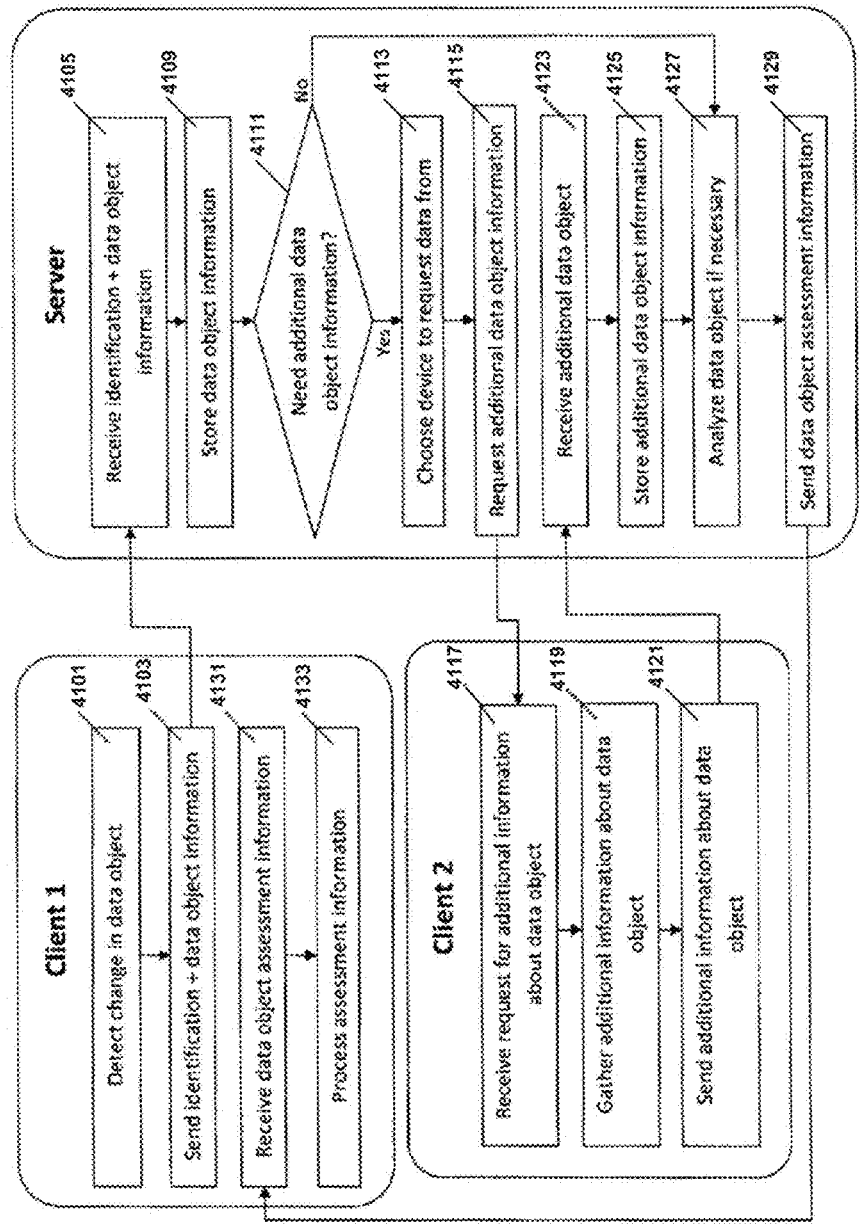
FIG. 41 is an exemplary flow diagram illustrating the steps of an embodiment.

As noted previously, server 3551 may have access to a plurality of mobile communications devices, some of which may run or store the same application programs or data objects. Requesting data object information from a single mobile communications device can cause network traffic, affecting not only the single mobile communications device, but other devices on the network. In an embodiment, if server 3551 requires information about a data object that is stored on more than one mobile communications device, server 3551 can gather portions of the required information from each of the mobile communications devices, rather than relying on a single device. FIG. 41 illustrates an embodiment using a first and a second mobile communications device, thereby optimizing data collection from two or more mobile communications devices.

In block 4101 of FIG. 41, the first mobile communications device detects a change in a data object. The data object is also found on the second mobile communications device, but may or may not realize the same change. The first mobile communications device transmits its identification information and information for its changed data object to server 3551 (block 4103). In block 4105, server 3551 receives the identification information for the first mobile communications device with the information for the changed data object. This information is stored by server 3551 (block 4109). In block 4111, server 3551 determines that it requires additional information about the data object. In block 4113, server 3551 identifies the second mobile communications device that server 3551 knows also stores the data object as well as additional information for the data object.

In block 4101 of FIG. 41, the first mobile communications device detects a change in a data object. The data object is also found on the second mobile communications device, but may or may not realize the same change. The first mobile communications device transmits its identification information and information for its changed data object to server 3551 (block 4103). In block 4105, server 3551 receives the identification information for the first mobile communications device with the information for the changed data object. This information is stored by server 3551 (block 4109). In block 4111, server, 3551 determines that it requires additional information about the data object. In block 4113, server 3551 identifies the second mobile communications device that server 3551 knows also stores the data object as well as additional information for the data object.

In block 4115 of FIG. 41, server 3551 requests the additional information for the data object from the second mobile communications device. This request is received by the second mobile communications device (block 4117). In response, the second mobile communications device will gather the additional information (block 4119), then transmit the additional information to server 3551 (block 4121). Server 3551 receives (block 4123) and stores the additional information about the data object from the second mobile communications device on server 3551 or on data storage 3511 (block 4125), then analyzes this additional information with the previously received information from the first mobile communications device to render an assessment (block 4127). This assessment is transmitted to the first mobile communications device (block 4129), which receives the assessment (block 4131) and process the assessment (block 4133). One will appreciate that if relevant, server 3551 may also transmit the assessment to the second mobile communications device.

In an embodiment, server 3551 can gather additional information from multiple devices. In an embodiment, server 3551 chooses which devices to request additional information from by analyzing device information and application data previously stored by server. For example, to characterize an application's usage of SMS messaging to determine whether or not it is abusing SMS for spam purposes, server 3551 may request the count of SMS messages sent by an application from many mobile communications devices that have previously reported that they have installed the application. In an embodiment, server attempts to analyze a data object to produce an assessment without first waiting to receive information about the data object from a device. Instead, server may receive data from other sources and proactively request information from one or more devices to create an assessment for the data object.

In an embodiment, server 3551 can gather additional information from multiple devices. In an embodiment, server 3551 chooses from which devices to request additional information by analyzing device information and application data previously stored by server. For example, to characterize an application's usage of SMS messaging to determine whether or not it is abusing SMS for spam purposes, server 3551 may request the count of SMS messages sent by an application from many mobile communications devices that have previously reported that they have installed the application. In an embodiment, server attempts to analyze a data object to produce an assessment without first waiting to receive information about the data object from a device. Instead, server may receive data from other sources and proactively request information from one or more devices to create an assessment for the data object.

In an embodiment, server 3551 can gather additional information from multiple devices. In an embodiment, server 3551 chooses which devices to request additional from by analyzing device information and application data previously stored by server. For example, to characterize an application's usage of SMS messaging to determine whether or not it is abusing SMS for spam purposes, server 3551 may request the count of SMS messages sent by an application from many mobile communications devices that have previously reported that they have installed the application. In an embodiment, server attempts to analyze a data object to produce an assessment without first waiting to receive information about the data object from a device. Instead, server may receive data from other sources and proactively request information from one or more devices to create an assessment for the data object.

In an embodiment, application data for a data object that is gathered and transmitted by mobile communications device 3501 to server 3551 may include behavioral data about the data object. Usage of such data by server 3551, such as during analysis, is discussed more in depth below. Behavioral data may include information about what the data object did when it ran on the device. Examples of behavioral data include information about network connections caused by the data object (e.g., server names, source/destination addresses and ports, duration of connection, connection protocols, amount of data transmitted and received, total number of connections, frequency of connections, and network interface information for the connection, DNS requests made), behavior of the data object when run (e.g., system calls, API calls, libraries used, inter-process communication calls, number of SMS messages transmitted, number of email messages sent, information about user interfaces displayed, URLs accessed), overhead caused by the data object (e.g., battery used, CPU time used, network data transmitted, storage used, memory used). Other behavioral data includes the context when a particular behavior occurred (e.g., whether the phone's screen was off when the data object sent an SMS message, whether the user was using the data object when it connected to a remote server, etc.).

Because a large amount behavioral data is generated by data objects every time they run, it is important for a mobile communications device not to gather or transmit all of the possible behavioral data; otherwise, the gathering and transmission of behavioral data may over-utilize resources on the device 3501, server 3551, and the network 3521. In an embodiment, mobile communications device 3501 limits what type of behavioral data for a data object it gathers and transmits, and how frequently to gather and transmit behavioral data based on the period of time since the data object has last changed. For example, when a data object is first installed on a mobile communications device, the device may gather and transmit the full amount of behavioral data available every day. After one week following installation of the data object, the device may only send a limited subset of behavioral data in weekly intervals. A month after installation, the device may only send a minimal amount of behavioral data in monthly intervals. In an embodiment, if the data object were to be updated (e.g., updating an application to a different version), the device may transmit the full scope of behavioral data daily and reduce the scope and frequency of data gathered and transmitted after one week and/or after one month. In an embodiment, server 3551 sends configuration to mobile communications device 3501 requesting that the device send specific types of behavioral data at a specific frequency. The device stores the configuration so that it may determine whether to gather and/or transmit behavioral data for data objects. In an embodiment, the configuration information is specific to a particular data object. In an embodiment, the configuration information is for all data objects encountered by the device. In an embodiment, server 3551 requests behavioral data for a particular data object from the device so that the server can minimize unnecessarily gathered and transmitted behavioral data.

In an embodiment server 3551 can influence the gathering and transmission of behavioral data from device 3501 to server 3551. For example, server 3551 may transmit instructions to mobile communications device 3501, requesting behavioral data for a data object only if the server has information indicating that the device currently has the data object, and if the server needs more behavioral data to better assess the data object. In an embodiment, the server 3551 determines that it needs more behavioral data for an object based on the number of devices that have already reported behavioral data. For example, the server may require at least one hundred (100) devices to report behavioral data for each data object in order to have a confident assessment. In an embodiment, the difference of the behavioral data reported by different devices is used to determine how much behavioral data is needed for an assessment to be confident. For example, if thirty (30) devices all reported battery usage by a data object within a small variance, the server may not request any more behavioral data for that object; however, if those thirty (30) devices showed a wide variation of battery usage, the server may request behavioral data from two hundred (200) devices.

In an embodiment, a mobile communications device may only transmit behavioral data if the data is outside of normal bounds. In an embodiment, the bounds are universal to all data objects. For example, a bound on network usage may be set so that mobile communications device transmits behavioral data for a data object's network connections only if the data object maintains at least one open connection for more than 50% of the time it is running or if the data object transmits more than one megabyte of data in a 24 hour period. In an embodiment, server 3551 can update bounds on a mobile communications device 3501 by transmitting updated bound information to the device. In an embodiment, bounds may be particular to one or more data objects. For example, a device may have a set of default bounds by which it will send behavioral data, but the server may transmit bounds for a particular data object, identifying that data object through identifying information such as a hash, cryptographic signer, package name, or filesystem location. The updated bounds may instruct the device to send more or less behavioral data than the default set of bounds. For example, a mobile communications device may default to never send behavioral data. When a new data object is installed on the device, the device reports the installation event and metadata associated with the data object to the server. If the server has already characterized the data object through behavioral data from other devices, the server may send bounds to the device specifying the typical behavior of the data object on other devices (e.g., uses less than 100 kilobytes of data per day, never sends SMS messages, never sends email) so that if the data object deviates from these bounds, the mobile communications device will send the deviated behavioral data to the server. Such deviations may be useful in the case of a legitimate application that becomes exploited and begins exhibiting uncharacteristic behavior or in the case of a "time-bomb" application that only starts becoming malicious after a certain time.

In an embodiment, data transmitted from mobile communications device 3501 to server 3551 is configurable in order to protect user privacy; prevent overuse of device, network, or server resources; or for other reasons. Some example configurations include choosing what application data is sent from device 3501 to server 3551, how often application data is sent, and how application data is re-transmitted should initial transmissions fail. Example configurations may further include transmitting only identifying information (e.g., no additional metadata or behavioral data), never transmitting any application data, never transmitting data object content, only transmitting application data for data objects based on the source of the data objects, only transmitting certain type of behavioral data, only transmitting a certain amount of application data per day, only transmitting one data object's content per day, transmitting behavioral data a maximum of once per day per data object, and the like. One skilled in the art will recognize that additional configurations are possible without departing from the scope of the claimed subject matter. In an embodiment, the configuration may be enforced by a mobile device 3501 and/or server 3551 by the device only making certain transmissions and/or the server only making certain requests from the device. In an embodiment, the configuration is controlled by one or more parties. For example, the configuration may be automatically set by server 3551 or software residing on mobile communications device 3501, or controlled by an administrator via server 3551, and/or controlled by a user via mobile device 3501. In an embodiment, portions of the configuration are controlled by different parties. For example, a user may be able to control whether or not data objects are reported to server 3551 but an administrator on server 3551 may control the behavioral data reporting frequency for all devices to optimize battery usage of the security system.

In an embodiment, software on a mobile communications device 3501 displays a user interface dialog when it receives a request to transmit application data for a data object, such as its content or behavioral data. As discussed above, a request for the data object's content may be for the whole content or for a portion of the content, the request identifying which portion of the content if a portion is requested. The user interface dialog displayed may identify the data object for which application data is to be transmitted, and give the device's user a chance to allow or reject the transmission. In an embodiment, the dialog allows the user to have the device remember his or her decision for future data objects. In an embodiment, the dialog allows the user to view more in-depth information about the application data to be sent, and provides a way for the user to understand the privacy implications of sending the data such as linking to a privacy policy, privacy description, or other content that describes how the data is transmitted, stored, and used. In an embodiment, a mobile communications device attempts to transmit a data object when it receives an indication that server 3551 needs more information to produce an assessment. In this instance, the device may display a user interface dialog prompting the device's user to choose whether or not to transmit the data object's content when the device attempts to transmit a data object. In an embodiment, some attempted transmission of certain types of application data, such as a data object's content, results in user interface dialog for confirmation while other types of application data, such as metadata or behavioral data, are transmitted without requiring a user confirmation.

Because a particular application may utilize multiple data objects, it may be desirable for mobile communications device 3501 and/or server 3551 to group multiple data objects together so that the application can be analyzed as a whole. In an embodiment, mobile communications device 3501 or server 3551 may perform grouping by comparing application data between multiple data objects. For example, application data that may be used to group data objects includes how data objects were installed (e.g., data objects from the same installer may be grouped), if data objects are linked together at runtime or dynamically, whether multiple data objects are in the same filesystem directory, and if data objects share a cryptographic signer. For example, an application installer may extract an executable and multiple libraries to the filesystem on a mobile communications device. The mobile communications device 3501 may use the common installer to consider the data objects grouped and may store the grouping information for use in gathering behavioral data (discussed below). In order for server 3551 to recognize the group, each data object's application data may include identification information for the common installer. The server 3551 may explicitly store the grouped relationship on server 3551 or in data storage 3511 to efficiently access the grouping information during analysis.

Because behavioral data cannot always be attributed to a single data object when multiple objects execute together such as in the context of single process, if the device operating system does not support granular behavioral data, or through other mechanisms, it may be desirable for mobile communications device 3501 to group multiple data objects together and report behavioral data for the group together. In an embodiment, mobile communications device 3501 transmits information indicating that grouped data objects are associated and transmits application data for grouped data objects to server 3551 together. For example, if a process on a mobile communication loads multiple components from different vendors and network data can only be gathered on a per-process level, and/or if the process is detected to be connecting to a known malicious server, then it may be desirable for all components loaded in the process to be identifiable by the server to determine the offending component. When the mobile communications device 3501 gathers behavioral data (such as the IP addresses the process has connected to) for the process, the device reports identification information for all of the data objects that are associated with the process to the server. When the server receives behavioral data for a group of data objects it may analyze behavioral data from multiple devices and determine that only groups containing a particular data object will connect to the malicious server. Thus, only the data object that results in connecting to the malicious server will be considered malicious. In an embodiment, if a mobile communications device does not provide granular information about the behavior of particular data objects, behavioral data for the device as a whole may be transmitted to the server as representing the group of all data objects installed on the device. For example, if an operating system does not provide per-process battery usage information, devices running that operating system may transmit a list of applications installed on each device and the overall battery life for each device to server 3551. The server can then perform analysis on this data to determine which applications are correlated to better or worse battery life and estimate each application's contribution to battery life when installed on a device. In an embodiment where multiple data objects in a group have different behavioral data gathering configurations, the mobile communications device will join the configurations together. For example, if mobile communications device 3501 is configured to report a large amount of behavioral data every day for one data object, but is configured to only report anomalous behavioral data for another data object, and the data objects are grouped, the device may join the two configurations and report a large amount of behavioral data for the group. Alternatively, if the second data object is configured to never report behavioral data for privacy reasons, no behavioral data may be reported for the group to satisfy the privacy constraint.

One having skill in the art will appreciate that data transmitted by server 3551 or mobile communications device 3501, such as metadata, behavioral data, configuration information, behavioral data bounds, grouping data, requests for additional data, notifications, and other forms of data may be formatted using binary formats or non-binary formats. Examples include formatting data in XML, JSON, or as part of a URI. The data may be transmitted using a variety of protocols, including TCP, UDP, DNS, and HTTP. Other formats and/or protocols may be used without departing from this disclosure.

The above are various non-limiting examples of how data is gathered and collected from one or more mobile communications devices. Techniques for optimizing data collection are also disclosed above. As discussed, mobile communications devices 3501 will transmit some or all of the above-described data to server 3551 for analysis so that server 3551 can provide an assessment of the analyzed data. The following section describes non-limiting examples of analysis techniques. One having skill in the art will appreciate that while the examples and embodiments below use the data gathered using the methods described herein, other types of data may be transmitted and that this disclosure is not limited to the data described herein.

B. Data Collection System

Figure 44:
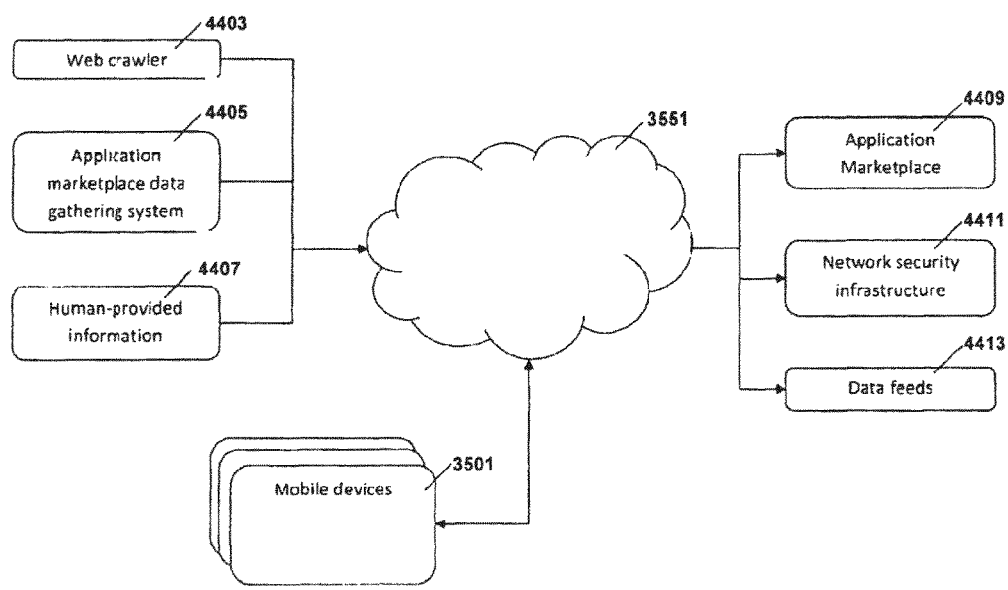
FIG. 44 is an exemplary flow diagram illustrating the steps of an embodiment.

One skilled in the art will appreciate that server 3551 may receive data from sources other than mobile communications devices for use in analyzing a data object and producing assessments. FIG. 44 illustrates an embodiment in which server 3551 may receive data from multiple sources and transmit assessment information for multiple uses. One or more servers 3551 are illustrated as a "cloud" to emphasize that multiple servers may operate in coordination to provide the functionality disclosed herein. One or more mobile communications devices 3501 are illustrated as a group to emphasize that multiple devices 3501 may transmit and receive information to and from server 3551. As disclosed above, one or more mobile communications devices 3501 may transmit application data for data objects to server 3551 and devices 3501 may receive assessment data, requests for more information, notifications, and the like from server 3551.

In addition to gathering data from mobile communications devices, server 3551 can receive information pertaining to data objects from a variety of data gathering systems. Such systems may be separate from server 3551 or may be part of server 3551. In an embodiment, a data gathering system directly updates a database or other storage on server 3551 or data storage 3511 with information for one or more data objects. In an embodiment, a data gathering system communicates with server 3551 to provide information to server 3551. There are many types of systems that may be used as data feeds to server 3551. Some examples include web crawlers 4403, application marketplace data gathering systems 4405, honeypots, and other systems that may feed information related to mobile device applications to server 3551.

In an embodiment, a web crawler 4403 downloads data objects that can run on mobile communications devices and retrieves information about data objects, feeding both to server 3551. For example, the web crawler 4403 may utilize a search engine to look for web sites that host mobile applications. Once the crawler 4403 identifies sites hosting mobile downloads, the crawler may retrieve web pages available on those sites, examining the content of each page to determine additional pages to retrieve. For example, a page on a mobile download site may contain links to other pages as well as links to download data objects. It may be desirable for data gathering systems to only transmit information to server 3551 that is relevant to mobile devices, as there is much content available on the internet that does not affect mobile communications devices (e.g., PC software). In an embodiment, the crawler 4403 can identify if a data object available for download or that has already been downloaded is able to run on a mobile communications device. For example, the crawler 4403 may examine a download URL for a specific string indicating that the URL corresponds to mobile application package (e.g., SIS, APK, CAB, IPA). In another example, the crawler 4403 may examine a data object after it has been downloaded to determine if it affects mobile communications devices and if so, whether it affects a specific mobile platform. In this case, the crawler 4403 may examine the data object downloaded for characteristics such as its name, whether it contains executable code compatible with any mobile platforms, or if it contains data that is typical for a particular mobile device platform. In an embodiment, the web crawler 4403 gathers marketplace metadata about data items and transmits the marketplace metadata to server 3551. Some example marketplace metadata includes from which web sites a data object is available for download, user ratings and comments for a data object, the price of the data object if it is available for purchase, the number of times the data object has been downloaded, information about the author of the data object, and other information pertaining to a data object that is available on web sites. As will be discussed below, where a given data object is available can be used to determine how trustworthy a data object is. For example, a data object available from a reputable company's web site may be considered more trustworthy than a data object uploaded on a mobile device forum by one of the forum's users.

Because many mobile applications are only available via mobile application marketplaces, it may be important for server 3551 to receive information about data objects that are available in application marketplaces. In an embodiment, an application marketplace data gathering system 4405 retrieves information about a data object, such as the data object's content and marketplace metadata for the data object, from mobile application marketplaces and reports the information to server 3551. In an embodiment, the application marketplace data gathering system 4405 is part of server 3551. In alternative embodiment, the application marketplace data gathering system is separate from server 3551. Application marketplaces are often provided by mobile platform vendors (e.g., Android Marketplace, Blackberry App World, Apple App Store, Nokia Ovi Store) or third parties (e.g., GetJar, Handango) and may use a proprietary API. In an embodiment, application marketplace data gathering system 4405 is configured to communicate with application marketplace servers via a proprietary protocol. In order to transmit the data received from application marketplace servers to server 3551 in a manner that is usable by server 3551, the marketplace data gathering system 4405 may transform application data for data objects from a proprietary format into a format that server 3551 can utilize for analysis. For example, an application marketplace may provide an API to access users' comments and ratings for an application; however, the data returned by that API may be different from another application marketplace's comment data. In another example, an application market may proactively transmit data to marketplace data gathering system 4405 so that the data gathering system does not have to repeatedly query it. To allow server 3551 to be able to analyze comment data from multiple application marketplaces, application marketplace data gathering system 4405 may transform differently formatted comment data into a standard format for transmission to server 3551. In an embodiment, an application marketplace data gathering system 4405 can search for certain terms in user reviews, such as "battery drain," "crash," "privacy settings," "does not work," "phone number," "contacts," and the like, which can be used to characterize an application as "known bad," or used to establish the trustworthiness of an application using the system components described herein. In an alternative embodiment, application marketplace data gathering system 4405 can gather all comment data and analysis of the comment data can be performed by server 3551. Similarly, server 3551 or application marketplace data gathering system 4405 can be capable of recognizing positive reviews or scores for a data object, thereby improving the assessment and/or trustworthiness for the data object.

In addition to automated gathering of data object information, it may be important for server 3551 to accept human information 4407. Such information may include subjective trust scores for mobile application vendors, specific keywords or other characteristics, such as heuristics, that may classify a mobile application as suspicious. One skilled in the art will recognize that other types of information related to the analysis of data objects for mobile devices may be provided by a human is possible without departing from the scope of this disclosure. In an embodiment, server 3551 provides a user interface by which someone may provide information to server 3551 about a specific data object, a group of data objects (e.g., data objects from a particular developer, all data objects on a specific platform), or for the analysis system as a whole (e.g., updated analysis heuristics). In an embodiment, a server separate from server 3551 provides a user interface by which someone may provide information about a specific data object, a group of data objects, or for the analysis system as a whole. This separate server may transmit the user-provided information to server 3551 where server 3551 stores it on server 3551 or in data storage 3511. In an embodiment, the separate server directly updates data storage 3511 with the user-provided information.

FIG. 44 illustrates how server 3551 may provide information about data objects to external systems. In an embodiment, information provided by server 3551 may be transmitted via an API; provided as a list, a data feed, a report, or formatted data such as firewall or virus definitions; or in other forms. In an embodiment, server 3551 provides information about data objects to an application marketplace 4409. For example, server 3551 may provide marketplace 4409 with a list of malicious data objects that are present in marketplace 4409. In another example, server 3551 may expose an API by which application marketplace 4409 can transmit identification information (e.g., a hash of a data object's content) to server 3551 to determine if the data object is considered malicious or otherwise undesirable. In an embodiment, server 3551 provides data to network security infrastructure 4411 so that the network security infrastructure 4411 may protect against malicious or undesired applications at the network level. For example, by protecting at the network level, even mobile communications devices that do not have security software installed may benefit from protection. In an embodiment, server 3551 transmits threat signatures to network security infrastructure 4411. Such threat signatures may take a variety of forms, for example, hashes of undesired applications, binary sequences for undesired applications, package names of undesired applications, firewall rules to block malicious servers or attackers, and rules for a network security system such as Snort. In an embodiment, server 3551 provides data in the form of data feeds 4413. The data feeds 4413 may contain a variety of data available to server 3551 or data storage 11 either from server's data gathering or from further analysis (described below), for example, a list of any data objects that use more network traffic than a given threshold to identify misbehaving or abusive applications, a list of the most prevalent malicious data objects, and a list of applications that match criteria such as a set of heuristics for identifying potentially malicious applications.

C. Server-Side Analysis Systems

Figure 45:
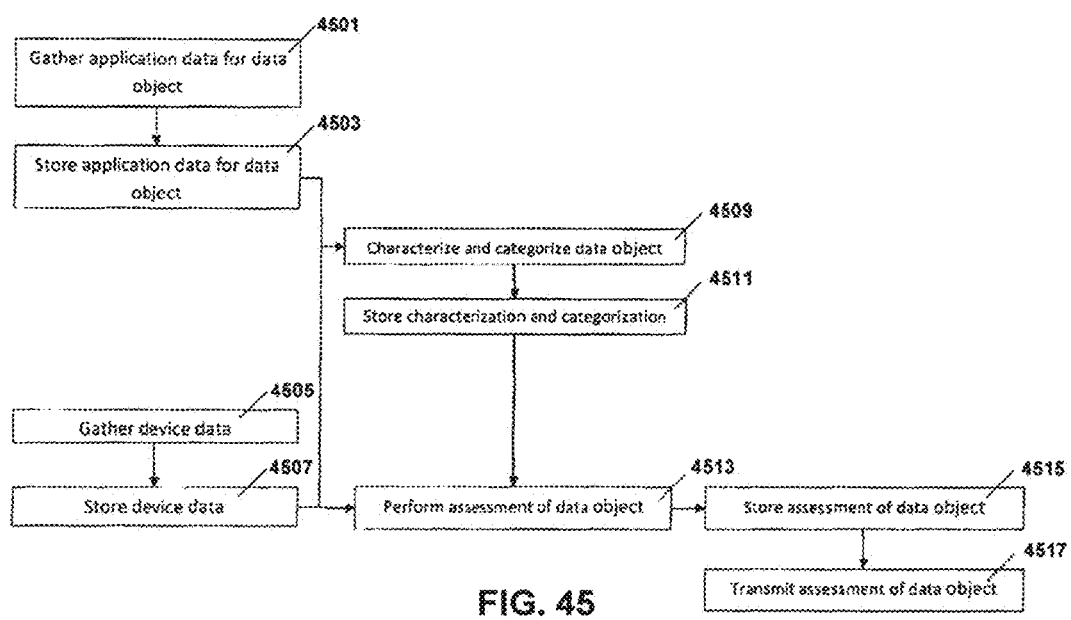
FIG. 45 is an exemplary flow diagram illustrating the steps of an embodiment.

In order to produce assessments for data objects or other forms of useful output, server may use a variety of methods of analysis. In an embodiment, because server has access to information collected about data objects from one or more sources, server can process the information to produce an assessment for a data object. FIG. 45 illustrates an embodiment in which server 3551 aggregates application data for a data object, stores the information, generates characterizations and categorizations for the data object, assesses the data object to produce assessment information, and transmits the assessment information. In block 4501 of FIG. 45, application data (e.g., data object content, metadata, behavioral data, marketplace metadata) is gathered for a data object. Some of the possible methods for gathering and types of data gathered have been discussed above. Such methods may include gathering data from devices, from web sites, from application marketplaces, from people, and from other sources. In block 4503, application data for the data object is stored on server 3551 or data storage 3511 so that the data may be used at a different time than when it is gathered.

In block 4505, device data is gathered and stored (block 4507) on server 3551 or data storage 3511. It may be desirable for device data to be linked to the application data for the device that reported so that assessments, categorization, and characterization can take into account the source of the data. For example, if an application only malfunctions when installed on a particular device type, it is important for server 3551 to be able analyze application data provided by devices in the context of what particular device type provided the data. In an embodiment, when application data is stored 4503 it is associated with device data for the device that provided it. For example, when a device 3501 transmits application data to server 3551, the device may transmit authentication information that allows server 3551 to retrieve previously stored data for the device 3501. If the device 3501 has already transmitted device data to server 3551, the previously stored device data can then be associated with the new application data. In such a data gathering system, it may be important to protect privacy and minimize individually identifiable information stored by server 3551 or data storage 3511. In an embodiment, application data for multiple devices having the same device data is aggregated so that the stored data is not linked to a particular device, but rather a set of device data shared by one or more devices. In the design of such a system, it may be important to take into account the balance between granularity of device data and the level to which the aggregated data can be ascribed to a particular device.

As part of analyzing a data object, it may be desirable for server 3551 to characterize it and/or categorize it (block 4509). In an embodiment, server 3551 stores characterization and categorization data for data objects (block 4511). It may be desirable for characterization and categorization data to be updated as more data becomes available or analysis of the data changes. In an embodiment, server 3551 performs additional analysis (block 4509) and updates stored categorization and characterization data (block 4511) for a data object when new or updated data for the data object used by analysis systems is available.

Characterization data includes information that describes a data object's functionality, behavior, and reputation such as its capabilities, metrics for the data object, analyses of other data relating to the data object, and the like. In an embodiment, server 3551 produces characterization data about a data object using application data, device data, marketplace data, distribution data, and other data available to server 3551. While some methods are described below, one skilled in the art will appreciate that there are other of methods for generating characterization information that can be employed without departing from the scope of this disclosure. In an embodiment, server 3551 transmits characterization information as an assessment. One will appreciate that characterization information may be useful for a user to understand when deciding whether to install an application. For example, if a user is considering downloading a game but the user receives an assessment indicating that the game has the capability to send the user's location to the internet, the user may decide not to install the game. In another example, if a user is considering downloading an instant messaging application and is concerned that the application may use a disproportionate amount of battery power, the user may receive an assessment to see the application's average battery usage metric and decide that, based on the metric, the application is acceptable to install. In an embodiment, characterization information is consumed as an input to one or more other analysis systems. For example, an analysis system producing an assessment of the privacy risk of an application may use characterization information to determine if an application has risky capabilities such as sending location or contact list information to an internet server.

Characterization data includes information that describes a data object's functionality, behavior, and reputation such as its capabilities, metrics for the data object, analyses of other data relating to the data object, and the like. In an embodiment, server 3551 produces characterization data about a data object using application data, device data, marketplace data, distribution data, and other data available to server 3551. While some methods are described below, one skilled in the art will appreciate that there are other of methods for generating characterization information that can be employed without departing from the scope of this disclosure. In an embodiment, server 3551 transmits characterization information as an assessment. One will appreciate that characterization information may be useful for a user to understand when deciding whether to install an application. For example, if a user is considering downloading a game but the user receives an assessment indicating that the game has the capability to send the user's location to the internet, the user may decide not to install the game. In another example, if a user is considering downloading an instant messaging application and is concerned that the application may use a disproportionate amount of battery power, the user may receive an assessment to see the application's average battery usage metric and decide that, based on the metric, the application is acceptable to install. In an embodiment, characterization information is consumed as an input to one or more other analysis systems. For example, an analysis system producing an assessment of the privacy risk of an application may use characterization information to determine if an application has risky capabilities such as sending location or contact list information to an internet server.

Capabilities are one form of characterization data that server 3551 may produce. In an embodiment, server 3551 extracts capabilities from a data object. In certain mobile operating systems or application environments, applications may request granular permissions to access privileged functionality on a device, such as sending or receiving network data, accessing the phone's location, reading or writing contact entries, and SMS messaging. In an embodiment, server 3551 uses data about permissions requested by a data object to determine the capabilities of the data object. Server may determine permission data by a variety of means, including metadata and behavioral data reported by devices, marketplace data, static analysis of data objects, and dynamic analysis of data objects. For example, applications on the Android operating system have to declare permissions at install time, so server 3551 may analyze these declared permissions in an application package directly via metadata about an application package reported by one or more devices or via marketplace data to determine permission data.

In an embodiment, server 3551 performs analysis of a data object's content to determine what APIs on a device the data object utilizes. In an embodiment, the API analysis may include a search of the data object for data sequences indicating API calls; an analysis of specific library, function, class, or other import data structures in the data object; an analysis of dynamic linker calls; an analysis of calls to local or remote services; static analysis of the data object; dynamic analysis of the data object; and analysis of behavioral data reported by one or more devices. In an embodiment, server 3551 utilizes extracted API call information to determine that the application has a particular capability. For example, if an application calls an API to interact with a GPS radio on a device, server 3551 determines that the application has the capability to determine the device's location. Although such analysis may detect the vast majority of APIs used by a data object, it is possible that advanced self-modifying code may prevent thorough analysis of a data object. In an embodiment, server 3551 detects if the code is, or may possibly be, self-modifying. The capability of a data object to modify itself may signify that the data object is of higher risk than data objects that are more straightforward. While many instances of malware on PCs use self-modifying code to hide from anti-malware systems, copy-protection systems also often encrypt code to prevent unauthorized access; thus, self-modification alone may not be sufficient to classify a data object as malicious, it may be used by an analysis system, in addition to other characteristics, such as behavioral data, to produce an assessment for the data object.

In an embodiment, server 3551 analyzes behavioral data to determine capabilities for a data object. For example, server 3551 may look for a data object making phone calls, sending SMS messages, accessing the internet, or performing other actions that indicate a particular application capability. In some cases, it is important not only to understand what single functions are utilized by a data object, but also whether an application exchanges data between APIs. For example, an application that uses the internet and can read a device's contact list may have multiple capabilities that have significantly different risks. For example, an address book application that simply uses the internet to check for updates has less of a privacy risk than an address book application that reads contacts and sends those contacts to the Internet. In an embodiment, server 3551 analyzes data object to determine if there are code paths by which data returned or produced by one API or service are sent to another API or service. For example, server 3551 may perform taint tracking between two APIs to determine whether an application transfers data between APIs. For example, server 3551 may determine if there is a code path in a data object by which data returned by any call to the contact API on a mobile device can be provided to any network API on the device. If there is such a code path, server 3551 determines that the data object has the capability of sending contacts to the internet. Having such a capability may be more valuable during further analysis by server 3551 or by a user than simply knowing that an application accesses contacts and that it accesses the internet. Many applications may use both permissions; however, fewer may actually send contact data to the internet. A user or an automated analysis system will be able to use the capability of knowing that there is a code path between two APIs as a much stronger indicator of capabilities than less granular capability measurements.

In an embodiment, server 3551 analyzes behavioral data to determine capabilities for a data object. For example, server 3551 may look for a data object making phone calls, sending SMS messages, accessing the internet, or performing other actions that indicate a particular application capability. In some cases, it is important not only to understand what single functions are utilized by a data object, but also whether an application exchanges data between APIs. For example, an application that uses the internet and can read a device's contact list may have multiple capabilities that have significantly different risks. For example, an address book application that simply uses the internet to check for updates has less of a privacy risk than an address book application that reads contacts and sends those contacts to the Internet. In an embodiment, server 3551 analyzes data object to determine if there are code paths by which data returned or produced by one API or service are sent to another API or service. For example, server 3551 may perform taint tracking between two APIs to determine whether an application transfers data between APIs. For example, server 3551 may determine if there is a code path in a data object by which data returned by any call to the contact API on a mobile device can be provided to any network API on the device. If there is such a code path, server 3551 determines that the data object has the capability of sending contacts to the internet. Having such a capability may be more valuable during further analysis by server 3551 or by a user than simply knowing that an application accesses contacts and that it accesses the internet. Many applications may use both permissions; however, fewer may actually send contact data to the internet. A user or an automated analysis system will be able to use the capability of knowing that there is a code path between two APIs as a much stronger indicator of capabilities than less granular capability measurements.

In an embodiment, server 3551 analyzes behavioral data to determine capabilities for a data object. For example, server 3551 may look for a data object making phone calls, sending SMS messages, accessing the internet, or performing other actions that indicate a particular application capability. In some cases, it is important not only to understand what single functions are utilized by a data object, but also whether an application exchanges data between APIs. For example, an application that uses the internet and can read a device's contact list may have multiple capabilities that have significantly different risks. For example, an address book application that simply uses the internet to check for updates has less of a privacy risk than an address book application that reads contacts and sends those contacts to the Internet. In an embodiment, server 3551 analyzes data object to determine if there are code paths by which data returned or produced by one API or service are sent to another API or service. For example, server 3551 may perform taint tracking between two APIs to determine if whether an application transfers data between APIs. For example, server 3551 may determine if there is a code path in a data object by which data returned by any call to the contact API on a mobile device can be provided to any network API on the device. If there is such a code path, server 3551 determines that the data object has the capability of sending contacts to the internet. Having such a capability may be more valuable during further analysis by server 3551 or by a user than simply knowing that an application accesses contacts and that it accesses the internet. Many applications may use both permissions; however, fewer may actually send contact data to the internet. A user or an automated analysis system will be able to use the capability of knowing that there is a code path between two APIs as a much stronger indicator of capabilities than less granular capability measurements.

In an embodiment, server 3551 runs a data object in a virtual (e.g., simulated or emulated) or physical device and analyzes the behavior of the data object when run. In an embodiment, the virtual or physical device is instrumented so that it reports behavioral data for the data object. In an embodiment, the virtual or physical device's network traffic, calls, and SMS messages are analyzed by server 3551. For example, a virtual device may be configured to always report a specific location via its location APIs that are unlikely to occur in any real world circumstance. By analyzing the device's network traffic for various encodings of that location, such as a binary double encoding, base 64 encoding, and text encoding, server 3551 is able to determine whether the data object attempts to report the device's location to a server. In an embodiment, server 3551 examines the difference in state of the virtual or physical device before the data object is run on the device and after the data object has run. For example, a data object may exploit the kernel on a device upon which it is installed in order to install a stealth rootkit. In this case, a virtual device may show a substantial difference in certain sections of memory, such as in a system call dispatch table, that should not change under ordinary circumstances. In an embodiment, the physical or virtual device has a custom root certificate authority in its list of trusted certificates and server 3551 intercepts all TLS traffic, using a server certificate that is signed by the custom certificate authority, and proxies the traffic to its original destination. Because the device has a custom certificate authority, the data object is able to establish a valid TLS connection through server 3551 and all encrypted traffic is able to be analyzed by server 3551.

Aside from capabilities of a data object, it may be important for server 3551 to gather metrics relating to a data object's effect of running on a device or its usage of capabilities on a device. For example, overuse of network data, email, or SMS messaging may be considered abusive or indicative of a malicious or exploited application. In an embodiment, server 3551 analyzes application data from many mobile communications devices, such as metadata and behavioral data, device data, and other data it has available to it to produce metric data that characterizes a data object. For example, server 3551 may determine how much battery usage an application requires on average for all devices or for a particular device type, how much data a data object sends over any network interface or over cellular vs. Wi-Fi network interfaces, how many email messages or SMS messages a data object sends, how many telephone calls an object makes, and other metrics.

Server 3551 may produce other characterization information from what has been described above that may aid in further analysis by server 3551 to produce an assessment or that may be exposed directly by server 3551. In an embodiment, server 3551 analyzes network traffic information associated with a data object to produce network characterization data, such as a list of the servers the data object has connected to, the ports and protocols on those servers data object communicates with, how much data is transmitted to and received from each server. In an embodiment, network characterization information includes what proportion of devices running a particular data object connect to each server. For example, an application that connects to an IM server or a known malicious bot command and control server may connect to only one or a small number of servers on all devices that it is installed on; however, a web browser or application that allows user-specified connections may connect to a very large number of different servers on different devices. In an embodiment, if a data object connects to many different servers, server 3551 informs one or more devices to not collect network behavioral data for that data object to minimize unnecessary data reporting. In an embodiment, the network traffic information is gathered as behavioral data from mobile communications devices or gathered by server 3551 running the data object on a virtual or physical device.

Server 3551 may produce other characterization information from what has been described above that may aid in further analysis by server 3551 to produce an assessment or that may be exposed directly by server 3551. In an embodiment, server 3551 analyzes network traffic information associated with a data object to produce network characterization data, such as a list of the servers the data object has connected to, the ports and protocols on those servers data object communicates with, how much data is transmitted to and received from each server. In an embodiment, network characterization information includes what proportion of devices running a particular data object connect to each server. For example, an application that connects to an IM server or a known malicious bot command and control server may connect to only one or a small number of servers on all devices that it is installed on; however, a web browser or application that allows user-specified connections may connect to a very large number of different servers on different devices. In an embodiment, if a data object connects to many different servers, server 3551 informs one or more devices to not collect network behavioral data for that data object to minimize unnecessary data reporting. In an embodiment, the network traffic information is gathered as behavioral data from mobile communications devices or gathered by server 3551 running the data object on a virtual or physical device.

In an embodiment, server 3551 determines whether a data object causes a mobile communications device 3501 to access malicious Internet or other public or private networks. For example, a data object that causes a mobile communications device to access a malicious website may subject the device to exploitation. An embodiment allows for resolution of transmitted Inter- or Intranet addresses (e.g., URLs) to determine whether the address will direct the mobile communications device to a safe website, rather than a nefarious website or phishing scam. This information can be stored as it relates to a particular data object.

In order for a user to apply application policy to a mobile device without having to make a separate decision for every single application, it may be helpful to categorize applications so that the user may simply decide which categories of applications to allow or deny. In an embodiment, server 3551 categorizes a data object using data it has available such as application data, device data, marketplace data, and characterization data. For example, if a data object is characterized as calling location APIs on a mobile communications device, then server 3551 may categorize the data object as a mapping or other location-based application. In an embodiment, categories may directly map to capabilities, such as applications that read your contact list or applications that can send your location to the internet. Other example categories include whether a data object transmits any information from a mobile communications device's contact list, whether a data object causes other data such as a device's phone number to be transmitted by a mobile communications device, and other behaviors that may affect the privacy security of a mobile communications device. In an embodiment, server 3551 uses metric data for a data object to categorize it. For example, server may have a category of heavy battery users that includes data objects that typically use more than 10% of a device's battery. Because the categorization may be dependent on device data in addition to characterization data, the category of battery wasters may depend on what type of device an assessment is for. For example, a data object that uses more than 10% of one device's battery may use only 5% of another device's battery.

In order for a user to apply application policy to a mobile device without having to make a separate decision for every single application, it may be helpful to categorize applications so that the user may simply decide which categories of applications to allow or deny. In an embodiment, server 3551 categorizes a data object using data it has available such as application data, device data, marketplace data, and characterization data. For example, if a data object is characterized as calling location APIs on a mobile communications device, then server 3551 may categorize the data object as a mapping or other location-based application. In an embodiment, categories may directly map to capabilities, such as applications that read your contact list or applications that can send your location to the internet. Other example categories include whether a data object transmits any information from a mobile communications device's contact list, whether a data object causes other data such as a device's phone number to be transmitted by a mobile communications device, and other behaviors that may affect the privacy security of a mobile communications device. In an embodiment, server 3551 uses metric data for a data object to categorize it. For example, server may have a category of heavy battery users that includes data objects that typically use more than 10% of a device's battery. Because the categorization may be dependent on device data in addition to characterization data, the category of battery wasters may depend on what type of device an assessment is for. For example, a data object that uses more than 10% of one device's battery may use only 5% of another device's battery.

In an embodiment, if a data object does not directly provide categorization information, server 3551 can deduce such information. For example, if a data object communicates with a known instant messaging server, server 3551 may determine that the data object is an IM application. For example, applications that connect to servers belonging to a popular social network may be classified during analysis as social networking applications, applications that connect to a known malicious IRC server may be classified as a malicious bot, and applications that drain one or more devices' batteries may be flagged as battery drainers.

Because the categorization of an application may be subjective and difficult to determine automatically, it may be desirable to have one or more persons, internal to an organization or as part of a collaborative community effort, determine categories for an application. In an embodiment, server 3551 exposes an interface by which users can suggest categories for a data object. For example, server 3551 may define a category of applications that are inappropriate for children, the applications having content that includes pornography or violence. In this example, one or more users can sign in to a community voting system provided as a web application where they can search and browse all applications known to server 3551. The list of applications may be populated by marketplace crawling and application data reported by devices. Each application may have a page whereby users can select their recommended category for that application. In an embodiment, the user interface shows information about the data object, such as aggregated application data, characteristics for the data object, and other information available to server 3551 so that users can make a decision based on the output of analysis. In an embodiment, the user interface allows a user to select from a list of categories, add new categories, and add tags for a data object. In an embodiment, the user interface has a discussion component so that that people may discuss the appropriate categorization for a data object. In an embodiment, the category for an application is determined by a voting system by which users may select their preferred category for the application, the category selected by the most users being the authoritative category for the application. In an embodiment, the user interface is displayed on a mobile communications device, displays a list of data objects installed on the device, and allows a user to suggest categories for those data objects.

In an embodiment, server 3551 processes application data and device data to determine distribution data for a data object. Distribution data may include how widely a given application is currently distributed, what the growth of the application's distribution has been over the period of time that the application has been available, what customer demographics, such as geography, have installed the application, and other functions of the prevalence of an application amongst groups of mobile communications devices. For example, server 3551 may examine how many mobile communications devices report having installed a data object at the current time to determine how prevalent that application is. In an embodiment, server 3551 uses distribution data to determine trustworthiness of a data object or to analyze a data object for risk, as is discussed below. For example, an application that has been installed on many devices for a long period of time without being uninstalled is likely to be less risky than an application that is brand new and only installed on a few devices.

Because server 3551 may encounter legitimate applications that are in development and therefore are not distributed widely, an embodiment is directed to server 3551 identifying which applications may be in development, thereby preventing them from being classified as undesirable in an anti-malware or other system. Server 3551 may receive application data for a data object indicating that the data object has characteristics inherent to applications in development, such as debugging symbols, debuggable permissions or flags, linkage to debugging libraries, and other characteristics. Applications in development may also be likely to have low distribution or isolated distribution. If server 3551 identifies that an application is in development, it may store an indication of the application being considered in development and use the indication to prevent server 3551 from assessing the application as suspicious or undesirable or to decrease the likelihood that the server reaches such assessments. In an embodiment, when determining whether a data object should be treated as "in development," server 3551 considers previous data objects encountered by devices that encountered the data object in question. If the devices frequently encounter data objects that are in development, server 3551 is more likely to classify the data object as in development. If the devices infrequently encounter data objects in development, server 3551 is less likely to classify the data object as under development.

In an embodiment, server 3551 establishes the reputation or level of trust for the data object. In an embodiment, the level of trust is determined manually or automatically and assigned to a single data object, multiple data objects that are part of an application, multiple versions of an application, or for all applications from a given developer on one platform or multiple platforms. In an embodiment, trust data is stored by server 3551 on the server or in data storage 3511 so it may be subsequently used directly or as part of producing an assessment.

In an embodiment, trust is granted via a manual review process for an application. For example, if server 3551 deems application to be risky based only on its capabilities (e.g., has access to private data and/or utilizes sensitive APIs), a user viewing the assessment may choose not to download it, even if the application is well regarded. To solve this problem, the application may be assigned a trust rating by manual review. If the review deems the application to be trustworthy, the assessment reports the application as not risky; however, if upon review, the application is determined to be suspicious, the assessment may continue to report the application as risky. Because a reputable application may consist of multiple data objects, may be updated with new data objects, or may have versions for multiple platforms, it may be important to allow a trust rating to span multiple data objects, applications, and even platforms so that a manual review does not need to be completed for every version or file that is part of an application. Similarly, because many reputable software vendors may produce multiple applications that can be assumed to be trustworthy, it may be desirable to automatically grant a high level of trust to data objects identified to originate from those vendors. In an embodiment, server 3551 grants a data object a high level of trust if the data object can be attributed to a trusted vendor or trusted applications through data available to server 3551 such as the data object's cryptographic signer, package name, or marketplace metadata.

In an embodiment, server 3551 uses distribution data and application data to establish trust for an application. For example, if a popular application, such as Google® Maps, is installed on millions of mobile communications devices and there are multiple previous versions of the application all having the same cryptographic signer and similar distribution characteristics, subsequent versions of the application with that cryptographic signer would be deemed to have a high level of trust. If server 3551 encounters another application that has the same name as a popular application, such as Google® Maps, is installed on only a few devices, and uses a different cryptographic signer, server 3551 may grant the low-distribution application a low level of trust. An anti-malware system may use such data indicating that a data object has low trust to automatically assess a data object as undesirable or to flag it for manual review. In an embodiment, trust data for an application may take into account associated applications such as applications determined to be created by the same developer on the same platform or on different platforms. For example if a company produces an application for one mobile platform that has a large number of users and good ratings, and the company releases a new application on a different platform, the new application may be given a high trust rating based on its association to the first application.

In an embodiment, server 3551 analyzes application data to determine if a data object is part of a mobile communications device operating system or preloaded by a manufacturer or operator. In an embodiment, if server 3551 determines that a data object is part of a mobile operating system or is preloaded, it is to be granted a high level of trust automatically.

In an embodiment, server 3551 analyzes user-generated ratings and comments for an application, such as those gathered by application marketplace data gathering system 4405. For example, server 3551 may use ratings and reviews to determine a trust rating for the application. If an application has low ratings and negative comments indicating that the application "crashes" or is otherwise "bad", server 3551 assigns the application a low trust rating based on the reputation indicated in its comments; however, if an application has consistently high ratings and many reviews, server 3551 assigns the application a high trust rating. In another example, server 3551 uses ratings and reviews to as a subjective indicator of application quality for use in producing assessments for the application. If an application has a significant number of reviews with text indicating that the application "drains battery" or "sucks battery", server 3551 determines that the application has the reputation of having adverse battery effects and produces an assessment of the application indicating that.

In an embodiment, server exposes trust data to third-parties via an API. For example, trusted applications may be considered certified by Lookout. In an embodiment, the trust level exposed by the API is binary (e.g., trusted, not trusted), fuzzy (e.g., 86% trusted, 11% trusted), or categorical (e.g., fully trusted, malicious, suspicious, semi-trusted). Mobile application marketplaces may wish to display an indicator of this certification on an application download user interface as a signal that the application has a good reputation. In this case, server 3551 may expose an API by which third-parties can supply a data object or identification information for a data object such as a hash identifier, package name, or cryptographic signer. After receiving a data object or enough information to identify one, server 3551 responds with an indication of whether the data object is considered certified or not. In an embodiment, the response is an image indicating whether server 3551 considers the data object to be certified or not. In an embodiment, the response contains a hyperlink to server 3551 whereby a user can verify that the certification for the application is genuine. In an embodiment, the web page referenced by the hyperlink shows additional information about the application, such as why it was considered trusted or not (e.g., through manual review, comments, distribution data), what permissions are requested by the application, characteristics and capabilities the application has, and commentary about the application during manual review.

In an embodiment, server exposes trust data to third-parties via an API. For example, trusted applications may be considered certified by lookout. In an embodiment, the trust level exposed by the API is binary (e.g., trusted, not trusted), fuzzy (e.g., 86% trusted, 11% trusted), or categorical (e.g., fully trusted, malicious, suspicious, semi-trusted). Mobile application marketplaces may wish to display an indicator of this certification on an application download user interface as a signal that the application has a good reputation. In this case, server 3551 may expose an API by which third-parties can supply a data object or identification information for a data object such as a hash identifier, package name, or cryptographic signer. After receiving a data object or enough information to identify one, server 3551 responds with an indication of whether the data object is considered certified or not. In an embodiment, the response is an image indicating whether server 3551 considers the data object to be certified or not. In an embodiment, the response contains a hyperlink to server 3551 whereby a user can verify that the certification for the application is genuine. In an embodiment, the web page referenced by the hyperlink shows additional information about the application, such as why it was considered trusted or not (e.g., through manual review, comments, distribution data), what permissions are requested by the application, characteristics and capabilities the application has, and commentary about the application during manual review.

In an embodiment, server exposes trust data to third-parties via an API. For example, trusted applications may be considered certified by lookout. In an embodiment, the trust level exposed by the API is binary (e.g., trusted, not trusted), fuzzy (e.g., 86% trusted, 11% trusted), or categorical (e.g., fully trusted, malicious, suspicious, semi-trusted). Mobile application marketplaces may wish to display an indicator of this certification on an application download user interface as a signal that the application has a good reputation. In this case, server 3551 may expose an API by which third-parties can supply a data object or identification information for a data object such as a hash identifier, package name, or cryptographic signer.

After receiving a data object or enough information to identify one, server 3551 responds with an indication of whether the data object is considered certified or not. In an embodiment, the response is an image indicating whether server 3551 considers the data object to be certified or not. In an embodiment, the response contains a hyperlink to server 3551 whereby a user can verify that the certification for the application is genuine. In an embodiment, the web page referenced by the hyperlink shows additional information about the application, such as why it was considered trusted or not (e.g., through manual review, comments, distribution data), what permissions are requested by the application, characteristics and capabilities the application has, and commentary about the application during manual review.

Using data gathered by server 3551 or from an analysis system described herein, server may produce an assessment (block 4513 of FIG. 45). After producing the assessment, server 3551 may store the assessment of the data object so that it may be retrieved at a later time (block 4515). Server may then transmit the assessment for the data object (block 4517). For example, server may publish the assessment on an application provider website, provide the assessment in the form of searchable reports, transmit a notification to a mobile communications device, transmit virus signatures containing the assessment that a given data object is known good or known bad, and transmit a response to an API call querying for the assessment of the data object. Such information can be in the form of readable text, a machine readable format, or may include a "score," a badge, an icon or other symbolic rating. One skilled in the art will appreciate that other situations in which server 3551 transmits an assessment for the data object are possible without departing from the scope of this disclosure.

In an embodiment, assessment data includes the output from an analysis system, such as characterization data, categorization data, trust data, and distribution data. For example, an assessment for a data object may include (solely or in addition to other information) detected capabilities for the data object, average battery usage for the data object, average number of SMS or email messages sent by the data object, the most common servers the data object connects to, the average amount of network data for the data object, and trust ratings for the data object. One will appreciate that the above assessment data may be provided as an input to server 3551. For example, a network operator or enterprise may operate a server that produces assessment data and feeds it data back to a master server. In another example, users may determine assessment data and provide it to server 3551 via an interface such as a web application. In this case, users may provide subjective trust data, risk ratings, a categorization, or other assessment data that may be used by the server. In an embodiment, server 3551 combines assessment data received from multiple sources to produce an aggregated assessment. For example, if a malware author attempts to transmit an assessment to server 3551 indicating that a malicious application is safe in the hopes of causing server 3551 to produce a false assessment, the server may utilize the number of unique sources providing assessments and the trustworthiness of those sources to produce the aggregated assessment. If one hundred assessments are received from different, reliable sources such as network operators and enterprises that indicate the application to be malicious, but ten thousand assessments from a particular unverified source indicate the application to be safe, the server produces an aggregated assessment indicating the application to be malicious.

In an embodiment, assessment data includes the output from an analysis system, such as characterization data, categorization data, trust data, and distribution data. For example, an assessment for a data object may include (solely or in addition to other information) detected capabilities for the data object, average battery usage for the data object, average number of SMS or email messages sent by the data object, the most common servers the data object connects to, the average amount of network data for the data object, and trust ratings for the data object. One will appreciate that the above assessment data may be provided as an input into to server 3551. For example, a network operator or enterprise may operate a server that produces assessment data and feeds it data back to a master server. In another example, users may determine assessment data and provide it to server 3551 via an interface such as a web application. In this case, users may provide subjective trust data, risk ratings, a categorization, or other assessment data that may be used by the server. In an embodiment, server 3551 combines assessment data received from multiple sources to produce an aggregated assessment. For example, if a malware author attempts to transmit an assessment to server 3551 indicating that a malicious application is safe in the hopes of causing server 3551 to produce a false assessment, the server may utilize the number of unique sources providing assessments and the trustworthiness of those sources to produce the aggregated assessment. If one hundred assessments are received from different, reliable sources such as network operators and enterprises that indicate the application to be malicious, but ten thousand assessments from a particular unverified source indicate the application to be safe, the server produces an aggregated assessment indicating the application to be malicious.

In an embodiment, assessment data produced by server 3551 includes one or more ratings for a data object. For example, an assessment for a data object may include a rating for the data object's privacy by server 3551 taking into account whether the application has the capability to send location data, contact data, SMS messages, or files from a device to a server. In another example, an assessment for a data object may include a rating for the data object's security by server 3551 taking into account whether there are any known vulnerabilities for the application, whether the application listens for network connections on any ports, whether it meets secure coding guidelines, what the trust level of the application is, and whether there are any anomalies in the application (e.g., stealth code, decrypted code, structural anomalies). In another example, an assessment for a data object may include a rating for the data object's battery impact, such as estimated number of minutes of phone battery life reduction, by server 3551 taking into account by taking into account the battery usage data reported by devices. In another example, an assessment for a data object may include a rating for the data object's performance that is produced by server 3551 taking into account the average CPU usage of the application and the frequency which the application does not respond to user input events. In another example, an assessment for a data object includes a quality rating that is produced by server 3551 taking into account the frequency of application crashes, user comments, user ratings, and the average time the application is kept on devices. In an embodiment, server 3551 provides multiple ratings as part of one assessment so as to provide information about a data object along multiple dimensions. In an embodiment, assessments may be binary (e.g., good, bad) or fuzzy (e.g., 100%, 90%, 10%). In an embodiment, multiple ratings are combined into an overall rating.

In an embodiment, server 3551 processes multiple data sources available to server 3551 to produce a rating for the data object. For example, server 3551 may utilize application data, device data, characterization data, trust data, distribution data, and user-supplied data to determine if an application is malicious. The server may utilize a variety of systems or models applied to the data available at the server to produce the assessment. For example, producing an assessment of whether a data object is malicious may involve a malware detection system that includes a heuristic engine that analyzes characteristic data to identify behavior of data objects that are likely to be malicious. Some example heuristics include detecting whether a data object utilizes any capabilities to evade detection by hiding from application enumeration systems on the OS it is installed on, whether an application attempts to modify itself, whether an application has capabilities associated with known spyware, and whether an application connects to known malicious servers.

One skilled in the art may appreciate that part of the analysis performed at server 3551 to produce an assessment may be seen as extracting features for a data object, and another portion of analysis may be seen as applying a model to those features to produce a useful assessment; thus, one may apply a variety of systems, such as artificial intelligence systems or algorithms, to process the features for a data object to reach a desired form of rating or assessment.

In an embodiment, server 3551 produces multiple assessments for a data object that take into account different device data or configuration information. For example, if server 3551 is configured to produce assessments of whether a data object will function correctly and if a data object malfunctions when installed on one type of device, but functions correctly when installed on another device type, server may produce two assessments for the data object. If server 3551 has an API by which a mobile communications device 3501 can request an assessment for a data object given identifying information for the data object and the mobile communications device has sent device data to server 3551, then server 3551 can provide the assessment for the data object that corresponds to the device requesting the assessment. If a device 3501 where the data object would malfunction requests an assessment, then server 3551 will return the assessment indicating the malfunctioning behavior of the data object on that device 3501. If a device 3501 where the data object would function correctly requests an assessment, then server 3551 will return the assessment indicating the correctly functioning behavior on that device 3501.

In an embodiment, an assessment indicates whether a data object is allowed to run on a device given policy set by an administrator. If multiple policies are configured on server 3551 and data storage 3511 stores which policy is to be applied to a device 3501, then a given data object may have multiple assessments that depend on the policy of the device querying for an assessment. For example, if a device with a strict privacy policy requests an assessment for an application that can share a user's location, server 3551 transmits an assessment indicating that the application is disallowed. If a device with a lenient privacy policy requests an assessment for the same application, server 3551 transmits an assessment indicating that the application is allowed. In an embodiment, assessment data is not stored and only information used to produce the assessment such as application data, device data, distribution information, characterization information, trust data, and categorization information is stored and the assessment is performed upon request by applying policy to the stored information.

Although automated analysis systems may produce acceptable results most of the time, there may be situations in which manual analysis overrides the result of automatic analysis. In an embodiment, server 3551 stores manual analysis results for a data object and transmits the manual analysis results as an assessment. For example, server 3551 may categorize an application as a social networking application based on its behavioral data; however, the application may actually be a word processing application that allows the user to publish notes to a social network. In this case, a user or administrator may override the categorization for the data object, server 3551 storing the categorization and transmitting it in response to a request for an assessment for the data object. In another example, an anti-malware system identifies data objects having certain characteristics as undesirable. It may also be desirable for a user to manually configure server 3551 to treat particular data objects as undesirable. Server 3551 stores a list of data objects that are considered undesirable and, when asked for an assessment for one of these data objects returns an assessment indicating that the data object is undesirable.

Because it may be desirable for assessments about a data object to reflect the most up-to-date information available, in an embodiment, server 3551 first produces an assessment and then updates it if additional application data or device data becomes available or if the analysis system itself is updated. In an embodiment, if a data object is re-assessed (e.g., because of new application data, device data, or updated analysis systems), server 3551 stores the new assessment 4511 and transmits it 4513. For example, after gathering device data and application data for a data object from ten devices, server 3551 may generate an assessment for that data object. Then, if server 3551 receives device data and application data from one thousand more devices, it may re-analyze the data object in light of the new data, producing a new assessment for the data object. If the updated assessment is materially different from the first, actions such as notifying devices or users may be performed by server 3551.

C. Anti-Malware System

D. Anti-Malware System

In an embodiment, server 3551 and mobile communications device 3501 are configured to function together to prevent malware or spyware from adversely affecting mobile communications devices. Because mobile communications devices are limited in memory, processing ability, and battery capacity, it may be desirable for server 3551 to perform analysis, such as the analysis described herein, to determine if an application is considered to be malware or spyware rather than each device performing the analysis. Furthermore, it may be desirable for server to store the results of the analysis so that if multiple devices encounter the same application, the analysis does not need to be repeated. Additionally, it may be desirable for server 3551 to collect data about potentially malicious applications, using data collection systems described herein, in order to provide data from a variety of sources for use by analysis systems.

In an embodiment, when mobile communications device 3501 assesses a data object, such as an application package or executable, to determine whether the data object is malicious or otherwise undesirable, the device sends a request to server 3551 for an assessment of the data object, the request containing identifying information for the data object. In an embodiment, the request transmitted by mobile communications device 3501 contains application data for the data object for use by the server in performing the assessment. For example, in addition to transmitting identifying information such as an application's package name and hash, mobile communications device may additionally transmit the permissions requested by the data object and information, such as a list of APIs utilized, determined by the device by performing static analysis.

In an embodiment, mobile communications device 3501 gathers metadata for a data object by using operating system provided facilities and potentially additional processing. For example, both the Blackberry and Android platforms provide mechanisms by which an anti-malware application can query the list of packages installed on a device. Each also provides methods to query additional information about the packages such as cryptographic signature information and information about how the packages choose to integrate or expose themselves to the operating system.

In another example, mobile communications device 3501 may extract features from a data object to assist in server 3551 producing an assessment. In an embodiment mobile communications device 3501 performs static analysis on the data object to extract application data to transmit to server 3551. For example, on Android, the device may analyze the executable portion of an application packages, typically called "classes.dex". The device may extract a list of inter-process communication calls directly or indirectly performed by the executable file that utilize the "binder" mechanism and transmit information about the calls to server 3551 for use in analyzing the application package.

In an embodiment, server 3551 may analyze the data object immediately, or may need to gather additional information using a process such as one disclosed herein. After producing an assessment for the data object, the server transmits the assessment to mobile communications device 3501. In an embodiment, the assessment contains an indication of whether the data object is considered undesirable or not. For example, server 3551 may transmit one of three assessments, known good, known bad, and unknown. If the server determines that the data object is known to be good (e.g., because it has a high trust level), it will return an assessment that the data object is known good. If the server determines that the data object is known to be bad (e.g., because it is determined to be a piece of malware), it will return an assessment that the data object is known bad. If the server does not have enough information to make a determination, it will return an assessment that the data object is unknown. In an embodiment, the assessment contains a risk level of the data object or a confidence level of the known good or known bad assessment so that mobile communications device or its user can use the risk or confidence level to determine how to classify the data object.

In an embodiment, server 3551 may analyze the data object immediately, or may need to gather additional information using a process such as one disclosed herein. After producing an assessment for the data object, the server transmits the assessment to mobile communications device 3501. In an embodiment, the assessment contains an indication of whether the data object is considered undesirable or not. For example, server 3551 may transmit one of three assessments, known good, known bad, and unknown. If the server determines that the data object is known to be good (e.g. because it has a high trust level), it will return an assessment that the data object is known good. If the server determines that the data object is known to be bad (e.g., because it is determined to be a piece of malware), it will return an assessment that the data object is known bad. If the server does not have enough information to make a determination, it will return an assessment that the data object is unknown. In an embodiment, the assessment contains a risk level of the data object or a confidence level of the known good or known bad assessment so that mobile communications device or its user can use the risk or confidence level to determine how to classify the data object.

In an embodiment, the assessment transmitted by server 3551 to mobile communications device 3501 contains information as to why server 3551 determined that the data object was undesirable. For example, server 3551 may transmit the name of a malware family the data object was determined to belong to or server may transmit an HTTP URL referencing server 3551 that mobile communications device 3501 can use to display additional information about the data object, the URL containing an identifier that is decoded by server 3551 to allow it to retrieve stored information about the data object. The web page may display additional information such as the output from different analysis systems used to produce the assessment. For example, the web page may display distribution information for the data object, information about common servers connected to by the data object, information provided by human analysis of the data object, trust data associated with the data object, information about the geographic distribution of the data object, information about similar data objects, and information about the author of the data object.

It may be desirable to minimize requests mobile communications device 3501 needs to send to server 3551 for assessments of data objects so that the device minimizes the amount of data it transmits and receives, reduces time required to assess a data object, optimizes battery consumption, and minimizes load on server 3551. In an embodiment, a mobile communications device 3501 maintains a local cache of assessment information received from server 3551. The local cache may be stored using a lightweight database such as SQLite or in a proprietary binary file format that is optimized for assessment storage. For example, the cache may contain an indication as to whether a data object was undesirable or not, a risk level associated with a data object, and definition information such as identifying information for a data object. When a device scans a data object, it can look up the data object's identifying information in the local cache. If an assessment for the data object is cached, that assessment is used. If an assessment is not cached, the device retrieves an assessment from server 3551. In an embodiment, when a mobile communications device inserts an assessment into its cache for a data object encountered on the device, it generates definition information for the data object. For example, a device may use the hash of a data object's content to ensure that it caches assessment results from a server. In an embodiment, server 3551 transmits definition information with an assessment so that mobile communications device can apply the assessment to the appropriate set of applications. For example, in some cases server 3551 may indicate that an assessment only applies to a specific data object identified by a hash of its contents while in other cases the server may indicate that an assessment applies to all data objects signed with the same cryptographic key.

In an embodiment, a mobile communications device 3501 stores a local cache of definitions for known good data objects and known bad data objects for use by a recognition component (described below) operating on the mobile communications device. Using the recognition component, the mobile communications device can determine an assessment for a suspect data object if the local cache contains a definition and corresponding assessment that corresponds to the suspect data object. For example, the definitions may use criteria such as hash identifiers, package names, and cryptographic signers to match a data object. Each definition may have a corresponding assessment (e.g., "good", "bad"). If a definition matches a suspect data object, the definition's assessment is used for the suspect data object. If no definitions correspond to the data object, such as the data being recognized as safe or not safe, then the mobile communications device 3501 may transmit application data for the suspect data object to server 3551 for more comprehensive analysis.

In an embodiment, the cache is used as the primary storage of anti-malware definitions that determine whether anti-malware software on mobile communications device 3501 will recognize a data object as malicious or not without having to consult server 3551. In an embodiment, the cache stores definition information used by a recognition component on the device. For example, the cache may contain definition information such as package names, cryptographic signers, byte sequences, patterns, or logic that is used to match data objects on a device with cached assessments. If the cache contains an entry linking a particular byte sequence to an assessment of being a malicious application and a data object on a device contains that byte sequence, then the device will determine that data object to be malicious without having to contact server 3551. In an embodiment, the cache only contains definition information, all definitions corresponding to a single assessment of a data object being malicious. In an embodiment, the cache may contain assessment information, the assessment information possibly containing an identifier, as discussed above, which can be transmitted to server 3551 in order for the device to retrieve information for display to a user. Such an identifier being used to retrieve data from server 3551 allows the cache to minimize the information it stores about potential malware. In an embodiment, a device cache serves as both a whitelist and a blacklist. The cache contains definition information for known good and known bad data objects so that if a data object is determined to be known good or known bad, the device does not need to request an assessment from server 3551. In an embodiment, the cache that serves as both a blacklist and a whitelist is used by a recognition component on the mobile communications device to determine if data objects are recognizably bad or recognizably good. If a data object encountered by a device is neither recognizably good nor recognizably bad based on definition data stored in the cache, then the device may transmit application data for the data object to server 3551 so the device can receive an assessment for the data object from the server. In an embodiment, anti-malware software on a mobile communications device is installed with a pre-populated cache of definitions that are modified by the device as it receives new assessments or stored assessments are deemed to be invalid.

In an embodiment, assessments and definitions cached on a device are only considered valid for a period of time so that the mobile communications device does not rely on data that is potentially out of date. In an embodiment, cached assessments and definitions are stored indefinitely and considered to be valid without time constraint. In an embodiment, a device only stores certain types of assessments and definitions. For example, a device may only cache known good assessments or may only cache known bad assessments. In this case, definitions are only stored if they have a corresponding assessment. In an embodiment, part of the cache is stored in volatile storage, such as RAM, and part of the cache is stored on non-volatile memory, such as flash. Because volatile memory is typically more limited yet much faster than non-volatile memory, a device may store frequently accessed assessments and definitions in volatile memory while less frequently accessed assessments and definitions in non-volatile memory. For example, if an anti-malware system analyzes data objects every time they are opened, it may be desirable to very quickly determine an assessment for a data object if it has been recently scanned and not changed. By storing a recently used definition and assessment in volatile memory, the device can recall the previous assessment very quickly.

In an embodiment, server 3551 transmits cache control information with an assessment, indicating whether the device should cache it and, if so, for how long. For example, server 3551 may transmit an assessment for a popular application from a reputable company, including cache control information indicating that a device should cache the assessment. If server 3551 transmits an assessment for a lesser-known application, it may include cache control information indicating that a device should not cache the assessment, as the application may turn out to be considered undesirable in the future after more is known about it. In an embodiment, server 3551 determines cache control information based on the confidence of an assessment. For example, known good assessments for applications that have a high trust level may be considered to be highly confident while assessments indicating that an application is unknown due to lack of data available to the server may not be considered confident. In an embodiment, when an assessment expires, cached definition information associated with the assessment is also expired.

Because retrieving cached assessments is faster than retrieving assessments from server 3551 (thereby minimizing the delay and overhead with determining whether a data object is malicious or not), it may be desirable to maximize the number of assessments that can be determined locally from cached data. In an embodiment, server transmits assessments to a mobile communications device without the device requesting the assessments and the mobile communication stores these assessments in its cache. Because all of the assessments available to server 3551 may require more storage than is desirable on mobile communications device 3501, server may only transmit a subset of its available assessments. In an embodiment, server 3551 determines which assessments to transmit to mobile communications device 3501 by analyzing device data and application data. For example, server 3551 may store the operating system a data object is compatible with associated with assessments for data objects in such a way that the server can query for all of the assessments related to a given operating system. Server 3551 may then only transmit assessments to a mobile communications device that are for data objects that are compatible with the operating system the device is running. The other assessments would not be transmitted to the device because the data objects referenced by the other assessments are not able to run on the device's operating system. In another example, server may use a device's country, language, or area code to determine what assessments to transmit to the device. Users in the United States are unlikely to download Russian-language applications, just as users in Russia are unlikely to download Spanish-language applications.

In an embodiment, server 3551 stores which assessments it has already transmitted to a device and the device has successfully received so that assessments are not unnecessarily re-transmitted. If a device has not received assessments that are desired, the server transmits the assessments the next time the device connects. In order to efficiently track which assessments have already been received by a device, server 3551 may group assessments, such that a given device receives all assessments in one or more groups. For example, a given group of assessments may have changes (e.g., new data objects being assessed, changes to existing assessments) multiple times per day; however, a device may be configured to receive updated assessments only once per day. To determine what assessments to transmit to a device, server may record the time when a device has last received up to date assessments for a group and only examine changes to the group since the device has last received assessments. For example, if a device receives all of the assessments for a given group on Monday and two new assessments are added to the group on Tuesday, then, if the device connects on Wednesday, the server only needs to query what assessments have changed in the group since Monday and will determine that it needs to transmit just the two added assessments. In an embodiment, server utilizes a push service such as one described herein to alert a device that there are additional assessments that server is ready to transmit to the device. When using such a push service, when server updates assessments that are part of a group, all devices that receive assessments from that group can be updated with the latest assessments nearly immediately.

There are a variety of ways in which assessments can be grouped by server 3551 in order to selectively transmit assessments to a device. For example, there may be more assessments for data objects compatible with a given operating system than it is desirable to store on a device. In this case, the server may produce a group of assessments that correspond to the most prevalent data objects, based on distribution data or market data available to server 3551. In this case, devices will cache assessments for the data objects they are most likely to encounter. It is also possible to further improve the likelihood that a device has assessments cached for data objects it encounters by server 3551 analyzing the application data available at the server corresponding to the data objects previously encountered by the device and predicting, based on those previous encounters, what data objects the device is likely to encounter in the future. Assessments for these likely data objects can then be transmitted to the device.

Because the optimal amount of assessment data to cache on a device may be different depending on a device's hardware, user behavior, or user preferences, it may be desirable for that amount of data to be tunable. In an embodiment, the amount of assessment data to cache on a mobile communications device 3501 is determined by server 3551. For example, server 3551 may examine the amount of storage available on a device, the frequency by which a user downloads applications, and how likely additional cached assessment data will be to reduce the number of required assessment requests transmitted by the device. If a device has a lot of available storage and its user downloads a lot of applications, then the server may determine to cache a large amount of assessment data; however, if a device has little available storage and its user rarely downloads applications, then the server may determine to cache only a small amount of data or no data. The server may also examine previous assessment requests made by the device to determine if those requests could have been avoided by the device caching additional assessment information. For example, if a device currently receives assessments belonging to a particular group of applications and the server is evaluating whether device should receive assessments for an additional group of applications, the server examines previously assessment requests to determine how many of those assessments were in the second group. If server 3551 determines that enough of the assessments requests would have been avoided, then it will start transmitting assessments from both groups to the device. In an embodiment, a user can control the amount of storage to allocate to cached assessments on a mobile communications device 3501.

Instead of always producing an absolute assessment (e.g., known good or known bad), it may be desirable for server 3551 to report that it does not yet have an assessment. In an embodiment, server 3551 transmits an assessment for a data object indicating that the object's undesirability is unknown. When mobile communications device 3501 encounters a data object, it transmits a request to server 3551 for an assessment, and receives an unknown assessment, the device temporarily trusts the data object and retries the request for assessment at a later time. In order to avoid unnecessary requests, the device increases the time delay between retries if it continues to receive unknown assessments. During such a period of temporary trust, the device does not re-transmit an assessment request every time a data object is scanned.

For example, in an anti-malware system on a mobile device designed to scan files on a file system when they are accessed, the first access to a data object may result in the device transmitting an assessment request to server 3551. If the server returns an unknown assessment, then the device stores a temporary entry in its assessment database indicating identifying information for the data object, a temporary assessment indicating that the data object is allowed, and the time period the assessment is valid for.

In an embodiment, server 3551 transmits information about a data object in an unknown assessment and mobile communications device 3501 uses the data assessment from server 3551 as an input into a local analysis system. For example, mobile communications device 3501 may have a heuristic system that analyzes the content of a data object to determine if it is malicious. In the case of a known good or known bad result from server 3551, then the device either does not run the heuristic system or discards the result from the heuristic system. If server 3551 returns an unknown result including a trust level for the data object, device 3501 combines result from the heuristic system with the trust level provided by the server to determine whether to treat the data object as undesirable or not. For example, mobile communications device 3501 may scale the result from local analysis based on the trust level reported by server 3551. If a heuristic system on the device determines that a data object is 66% risky and an unknown assessment from server 3551 indicates that the data object has a suspicious 1% trust level, the device determines that the data object is undesirable; however, if the unknown assessment from server 3551 indicates that the data object has a 70% trust level, then device 3501 determines that the data object is desirable.

In order to respond to undesirable applications, such as malware and spyware, as soon as they are identified as such, it may be desirable for server 3551 to transmit notifications to mobile communications device 3501 about data objects that are determined to be undesirable after previously being classified as good or unknown. In an embodiment, server 3551 stores information about data objects encountered by mobile communications device 3501 so that if a data object encountered by the device was assessed to be good or unknown but was subsequently determined to be undesirable, server 3551 may determine all of the devices that have encountered the data object and transmits a notification indicating that the data object is undesirable. In an embodiment, server 3551 only transmits a notification to device 3501 if the data object that is the subject of the notification can operate on the device's operating system. For example, if a device runs Blackberry and has encountered an Android spyware application, server 3551 would not transmit a notification to the device; however, if the device encountered a Blackberry spyware application, server 3551 would transmit a notification. As disclosed herein, the determination of whether a data object can operate on a given device may be determined by analyzing device data for the device and application data for the data object.

In an embodiment, the notification transmitted from server 3551 to device 3501 is designed to be consumed by the device and includes both identification information and remediation information for the data object. For example the notification may utilize a push service provided by a platform vendor and include the package name and content hash for a data object. The notification may also specify a remediation action such as "killing" any processes containing the data object, requesting for a user to uninstall the data object, and deleting the data object without user intervention. In an embodiment, the notification includes information for display to a user about the data object such as remediation instructions, an explanation for why the data object is considered undesirable, or a request to take a particular action. In an embodiment, the notification is in the form of a human readable message, such as a text message, email, or telephone call. It may be desirable for server to perform both human readable and machine readable notification to ensure that a user responds to a dangerous data object. For example, server may transmit an email message to a user and transmit a notification for the device to remove the data object without user intervention.

In an embodiment, mobile communications device 3501 contains a database of all data objects that are present on the device and server 3551 transmits updated signature data to the device when a data object encountered by the device is determined to be undesirable. When the device receives the updated signature data, it compares the updated signature data to data objects present on the device. If any objects that are present on the device are considered by the updated signature data to be undesirable, then the device immediately initiates remediation actions, not waiting for the next time the data object is scanned.

If an anti-malware system performs an assessment for a data object, it may be desirable to trust the data object as long as it hasn't changed to avoid having to re-assess the data object. In an embodiment, mobile communications device 3501 maintains a list of data objects identified that have been analyzed and are considered to be desirable. When a data object is desired to be scanned, the device may first check this list to see if the data object is present. If the object is present, the device does not re-scan the object. After scanning a file and determining it to be desirable, the device places an identifier for the data object in the list. Example identifiers include a file name, filesystem node identifier, or operating system specific data object handle. In an embodiment, the mobile communication saves this list of data objects to non-volatile storage so that the list can be preserved even if the device is rebooted or runs out of battery. When storing assessments and later accessing them, it's important that any stored assessments are valid only for a particular set of data object content. If the data object's content changes, a different assessment may be necessary, as the data object may have been modified to include malicious code that was not present in the original data object. In an embodiment, the list contains a cryptographic hash of the content of the data object. When the device determines whether the data object is considered to be on the list, it compares the hash of the data object as stored on the device with the hash stored in the list. If the hash matches, the data object is considered to be on the list. In an embodiment, the anti-malware software can determine when files are opened and closed. If a file on the list is opened with write access, then it is removed from the list. While there are open writers to the file, the file cannot be added to the list.

One will appreciate that an embodiment contemplate other ways for reducing network traffic while providing sufficient options for securing mobile communications devices. In an example, a mobile communications device can request an analysis of all of the data resident on the device (a "scan") when the mobile communications device first starts up or powers on, or when the application responsible for monitoring the mobile communication is first launched. This provides a baseline analysis of the security of the mobile communications device. Future scans may be performed when new applications are accessed by the mobile communications device, or at pre-set time intervals, or upon user request. Scans may be adjusted depending upon the access to network 3521. If connectivity is an issue, then only newer data may be assessed, or suspect data. Scans may be queued and performed when connectivity improves.

In an embodiment, an anti-malware system on mobile communications device 3501 has the capability to perform both an on-demand and a scheduled scan of all data objects present on a device. If the anti-malware system utilizes server 3551 to perform assessments for the data objects, it may be desirable to optimize the time required to perform the scan. Because network latency causes a delay between the time a request for an assessment is transmitted by a device and the time the device receives a response from server 3551, it may be desirable to pipeline requests in such a way that the device does not simply idle while waiting for a response. In an embodiment, mobile communications device transmits a request to server 3551 to provide assessments for multiple data objects and server 3551 transmits assessments for those multiple data objects to the device. For example, during an on-demand scan, a device may be configured to first enumerate all of the data objects on the device and then send a request to server 3551 to assess all of the enumerated data objects. In another example, a device may enumerate ten data objects at a time, then send a request to the server and receive a response for those ten data objects before scanning additional data objects. In another example, a device may enumerate data objects and transmit assessment request, continuing the enumeration process without waiting for assessment responses from the server. The device may only wait for responses when the enumeration is complete.

In an anti-malware system that blocks the loading or executing of a data object until the system has reached a disposition, it may be desirable to assess a data object before it needs to be loaded or executed. In an embodiment, mobile communications device 3501 proactively scans data objects and stores the results so that when the data object is loaded, the device can reference the previous scan result. For example, when a device loads a program that depends on multiple other files (e.g., an executable that is linked to shared libraries), an anti-malware system on the device may analyze the program to determine all of the libraries it depends on, send a request to server 3551 for assessments for the program and its dependent libraries, and then allow the program's execution to proceed once the device receives positive assessment results. When the device's operating system loads the libraries the application depends on, no request to server 3551 is needed because the system already has up-to-date assessments for the libraries. If the libraries were not proactively analyzed, the total load time for the program could be greater as the device may have to wait for multiple requests to server 3551 to occur in serial. In an embodiment, software on a mobile communications device analyzes data objects after they are downloaded but before they are executed. For example, anti-malware software on a device may watch the download directory for new files or may simply wait for files to be created, written to, and then closed. After the download completes, the software may initiate a scan of the new file so that once the file is opened, the system already has assessed it and can recall the previous assessment.

If an anti-malware system blocks user-requested or system operations while it is assessing a data object, it may be desirable to give the user an indication that an assessment is in progress, especially if the assessment depends on a network connection that may have significant latency. In an embodiment, an anti-malware system on mobile communications device 3501 displays a user interface indicating that a data object is being scanned when the system is scanning the data object and blocking user-requested operations. For example, if an anti-malware system prevents the execution of applications until the application and all of its dependent libraries have been assessed by interposing itself in the application launch process, there can be a significant delay perceivable to the device's user. The annoyance associated with the delay may be mitigated by informing the user what is happening instead of the device simply seeming unresponsive. When a user launches an application, the device displays a user interface view indicating that the anti-malware system is assessing the application that the user launched. In an embodiment, the user interface allows the device's user to skip waiting for the scan to finish. For example, if the device's scanning of a data object needs to connect to server 3551 and the user doesn't want to wait, the user may proceed without waiting for the assessment to return. If the assessment subsequently returns that the data object is malicious, the device may initiate remediation actions, such as killing any processes containing the data object and deleting the data object, even though the data object was allowed to run.

A user may be interested in having an application assessed, but does not wish to wait for a response from server 3551. The user may choose to forego complete analysis and use the application while waiting for analysis results. In such a situation, it would be helpful if server 3551 or the user's mobile communications device 3501 could provide a temporary trustworthiness evaluation prior to formal analysis. Reporting can be in the form of an interface element, a notification, a warning, a risk rating, or the like. In an embodiment, the mobile communications device 3501 can run a local analysis to determine whether an application is temporarily trustworthy. It may also be desirable to show information about a data object on a user interface that indicates when an anti-malware system is waiting for an assessment from a server so that users do not accidentally skip items that are high risk. In an embodiment, the waiting user interface shows the result of local analysis while waiting for an assessment from server 3551. For example, the user interface may show the capabilities of the data object or a risk score for the data object. In an embodiment, the device only allows a user to skip waiting for an assessment from server 3551 if local analysis determines that the data object is low risk. For example, a risk score may be calculated by analyzing what sensitive functionality a data object accesses. A data object that accesses a user's contact list and browser history may be deemed more risky than a data object that doesn't access any sensitive functionality.

In an embodiment, an anti-malware system on device 3501 determines whether it should wait for a response from server 3551 before reaching a conclusion based on the context of the scan. For example, scans that occur during system startup or when there is no active network connection should not block waiting for a response from the server. In order to determine if there is a network connection, the anti-malware system may rely on a variety of methods such as querying network interface state information provided by the operating system and analyzing whether requests to server 3551 time out. If the anti-malware system intercepts system calls, scans that occur as a result of the system trying to execute a data object should block while waiting for a response from server 3551 while scans that result from an application getting information about a data object (e.g., file manager extracting an icon for the data object) should not block while waiting for a response. In an embodiment, if a request for a data object assessment is unable to be completed, it is retried at a later time.

In an embodiment, the anti-malware system skips portions of server or local analysis if an accurate assessment can be produced without the additional analysis. For example, if local analysis determines that a data object is not risky, then the device may not request an assessment from server 3551—the device may only request an assessment from server 3551 if the data object being scanned has a minimum riskiness as determined by a local analysis component on the device. In an example, the determination of whether to skip waiting for additional results is determined by both the results and which system returned each result. A "bad" result from local analysis before receiving a result from server 3551 may be enough to treat a data object as malicious; however, a "good" result from local analysis may still require the system to wait for an assessment from server 3551 to confirm that the data object is good before determining a final disposition.

In an embodiment, if multiple analysis systems produce different results, the anti-malware system on a device analyzes the results of the systems to make a determination as to the final disposition of a data object, the determination taking into account both what results were produced and which system produced each result. For example, the anti-malware system may determine that a single undesirable result is enough to flag a data object as undesirable. In another example, server 3551 may be treated as authoritative or server 3551 may transmit a confidence level of its assessment so that device 3501 can determine whether to treat the assessment as authoritative or not. In another example, known bad results from server 3551 may be authoritative but known good results from server can be overridden by a known bad result from a local analysis system on device 3501.

In an embodiment, server 3551 stores a list of malware or other undesirable applications that have been detected on the device and which are still active on the device. In order for this list to be populated, mobile communications device 3501 sends events to server 3551, including whenever it encounters an undesirable application, whenever an undesirable application is removed, and whenever an undesirable application is ignored. The events include identifying information for data objects so that server 3551 can correlate the events with known data objects. For example, because a user may choose to ignore malware, it's important for the user to be able to see his or her list of ignored malware to avoid a situation where a malicious user installs malware on someone else's phone and configures anti-malware software on the phone to ignore the malware, preventing the system from automatically removing it. In this circumstance, the legitimate user of the phone is able to tell that a piece of malware is active on his or her device, but is ignored. In an embodiment, because server 3551 has data indicating whether device 3501 currently has active malware, network access can be allowed or denied to the device depending on its malware state by a network access control system querying server 3551 for the state of a given device.

Figure 43:
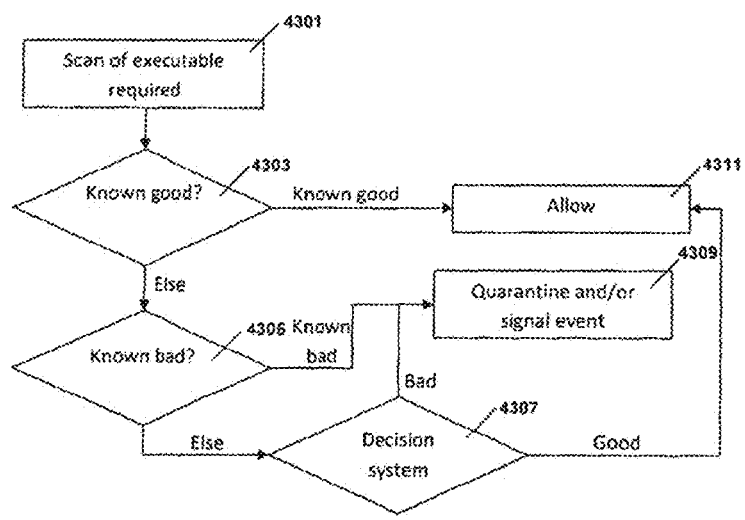
FIG. 43 is an exemplary flow diagram illustrating the steps of an embodiment.

In an embodiment, server-side or "cloud" analysis may be performed using a version of the three-component system described in U.S. patent application Ser. No. 12/255,621, which is incorporated in full herein. An example of a three-component system is illustrated in FIG. 43 and includes a first component 4303 that may be used to recognize data that is safe, or "known good" (also referred to herein as forming part of or being included on a "whitelist").

A second component 4305 may be used to recognize data that is malicious, wastes device resources, or is "known bad" (also referred to herein as forming part of or being included on a "blacklist"). A third component 4307 is a decision component that may be used to evaluate data that is neither known good nor known bad, i.e., "unknown." In an embodiment, known good component 4303 and known bad component 4305 may reside on mobile communications device 3501, and decision component 4307 may reside on server 3551. In an embodiment, known good component 4303, known bad component 4305 and decision component 4307 may all reside on server 3551. In an embodiment, portions of known good component 4303, known bad component 4305 and/or decision component 4307 may reside on mobile communications device 3501, and portions of known good component 4303, known bad component 4305 and/or decision component 4307 may reside on server 3551. In an embodiment, known good component 4303 and known bad component 4305 reside on server 3551 while decision component 4307 resides on mobile communications device 3501.

For example, data store 3511 may contain malware definitions that are continuously updated and accessible by server 3551. The mobile communications device 3501 may be configured to send application data, such as a hash identifier, for a suspect data object to server 3551 for analysis. Server 3551 may contain known good component 4303, known bad component 4305 and decision component 4307, or the components may be distributed across two or more servers. The one or more servers may thereby use application data to determine if the suspect data object is a recognizably safe data object. If the suspect data object is recognizably safe, then the one or more servers may notify the mobile communications device or instruct the device that it may accept and process the data object. The one or more servers may then use application data to determine if the suspect data object is recognizably malicious. If the suspect data object is recognizably malicious, then the one or more servers may notify the mobile communications device or instruct the device to reject the data object and not process it further. The known good and known bad components may have a variety of methods for recognizing known good and known bad data objects. The data, logic, and any other information used by known good and/or known bad components to identify recognizably good or recognizably bad data objects, respectively, may be called "signatures" or "definitions" (explained further below).

If the known good and known bad components are inconclusive, one or more servers may perform additional analysis to reach a decision as to the disposition of the data object. In an embodiment, server 3551 contains a decision component that uses one or more analysis systems to analyze application data for the data object and make a determination as to whether the data object is considered undesirable or not. In an embodiment, if there is not enough information to perform the additional analysis, then the one or more servers may request that a mobile communications device send additional application data to the server for analysis. For example, a device may initially send a hash identifier, package name, and cryptographic signer information for a data object to a server for analysis. If the known good or known bad component fails to identify the data object as known good or known bad, the server may request that the device send the whole data object to the server so that the data object itself may be analyzed. Upon receiving additional application data, further analysis to reach a disposition for whether a device should accept or reject the data object may be performed by a decision component 4307 or manually. In an embodiment, the server stores whether or not a given data object needs manual analysis so that an analysis team may easily determine what data objects need to be analyzed.

If the known good and know bad components are inconclusive, one or more servers may perform additional analysis to reach a decision as to the disposition of the data object. In an embodiment, server 3551 contains a decision component that uses one or more analysis systems to analyze application data for the data object and make a determination as to whether the data object is considered undesirable or not. In an embodiment, if there is not enough information to perform the additional analysis, then the one or more servers may request that a mobile communications device send additional application data to the server for analysis. For example, a device may initially send a hash identifier, package name, and cryptographic signer information for a data object to a server for analysis. If the known good or known bad component fails to identify the data object as known good or known bad, the server may request that the device send the whole data object to the server so that the data object itself may be analyzed. Upon receiving additional application data, further analysis to reach a disposition for whether a device should accept or reject the data object may be performed by a decision component 4307 or manually. In an embodiment, the server stores whether or not a given data object needs manual analysis so that an analysis team may easily determine what data objects need to be analyzed.

Because an assessment for a data object may rely on human analysis to be produced, server 3551 may use analysis systems to produce store a list of suspicious data objects that need further study. In an embodiment, some results from analysis systems on server 3551 produce assessments that are transmitted to mobile communications device 3501 and others identify data objects as needing human analysis. For example, if server 3551 utilizes a set of heuristics to identify malicious applications, some set of the heuristics may be well tested and provide acceptable accuracy in correctly identifying malicious behavior while another set of heuristics may be experimental, requiring human analysis to determine if the results are acceptable.

Because an assessment for a data object may rely on human analysis to be produces, server 3551 may use analysis systems to produce store a list of suspicious data objects that need further study. In an embodiment, some results from analysis systems on server 3551 produce assessments that are transmitted to mobile communications device 3501 and others identify data objects as needing human analysis. For example, if server 3551 utilizes a set of heuristics to identify malicious applications, some set of the heuristics may be well tested and provide acceptable accuracy in correctly identifying malicious behavior while another set of heuristics may be experimental, requiring human analysis to determine if the results are acceptable.

The following describes each of the components identified above in more detail. A person skilled in the art will appreciate that since the total number of known good applications for mobile communications devices can be identified, use of the known good component 4303 coupled to a database, logic, or other data store containing definitions for known good data objects (e.g., application data such as hash identifiers) may significantly reduce false-positive undesirable application detection and reduce the need to perform computationally expensive analysis or to contact a server for analysis. One will also appreciate that use of a known good component 4303 may be particularly effective for data that contains executable software code. Executable software code for a given application rarely changes between different mobile communications devices, so creating a database of known good application data or logic for evaluating application data may be an effective method for recognizing safe or trustworthy data. This database may vary in size depending upon the resources available on the mobile communications device. Alternatively, aspects of this disclosure, such as the known good component and known bad component, may have access to a remote server with a larger library of application data for known good or bad data objects, such as server 3551 coupled to a data store 3511 in FIG. 35.

In an embodiment, known bad component 4305 may have access to a database, logic, or other data store containing definitions for known bad data objects that can be stored on the mobile communications device without occupying a significant amount of memory. For example, virus and other malware or spyware definitions can include application data such as hash identifiers, package names, cryptographic signers, byte sequences, and byte patterns stored in a database or other memory cache. In other words, there may be a known bad database that complements the known good database stored on mobile communications device 3501. Additionally or alternatively, known bad component 4305 may be capable of identifying malware using characteristics common to other malicious software code. When applied to network data or data files, known bad component 4305 may have access to a database containing patterns or other characteristics of a protocol data unit or file format which presents a security threat. Known bad component 4305 may also identify data that undesirably affects a mobile communications device, such as exposing vulnerabilities, draining battery life, transmitting private or unauthorized information to third parties, or using up unnecessary device resources. Similar to the known good component 4303 and database, any data identified as "bad" may be deleted, quarantined, or rejected from further processing by the mobile communications device. If a known bad data object is detected, an embodiment may also display a notification or other message similar to that described in U.S. patent application Ser. No. 12/255,635, entitled "SECURITY STATUS AND INFORMATION DISPLAY SYSTEM," filed on Oct. 21, 2008 and incorporated in full herein.

In an embodiment, known bad component 4305 may have access to a database, logic, or other data store containing definitions for known bad data objects that can be stored on the mobile communications device without occupying a significant amount of memory. For example, virus and other malware or spyware definitions can include application data such as hash identifiers, package names, cryptographic signers, byte sequences, and byte patterns stored in a database or other memory cache. In other words, there may be a known bad database that complements the known good database stored on mobile communications device 3501. Additionally or alternatively, known bad component 4305 may be capable of identifying malware using characteristics common to other malicious software code. When applied to network data or data files, known bad component 4305 may have access to a database containing patterns or other characteristics of a protocol data unit or file format which presents a security threat. Known bad component 4305 may also identify data that undesirably affects a mobile communications device, such as exposing vulnerabilities, draining battery life, transmitting private or unauthorized information to third parties, or using up unnecessary device resources.

Similar to the known good component 4303 and database, any data identified as "bad" may be deleted, quarantined, or rejected from further processing by the mobile communications device. If a known bad data object is detected, an embodiment may also display a notification or other message similar to that described in U.S. patent application Ser. No. 12/255,635, entitled "SECURITY STATUS AND INFORMATION DISPLAY SYSTEM," filed on Oct. 21, 2008 and incorporated in full herein.

Decision component 4307 may be used to evaluate data that cannot be characterized as either known good or known bad. Since a majority of the data received on the mobile communications device 3501 may fall within this category, this component may reside on server 3551. This component may utilize a variety of methods to produce an assessment for a data object, including using any of the analysis systems disclosed herein. For example, decision component 4307 may apply static analysis, dynamic analysis, distribution analysis or other methods of analysis in order to determine whether received data may be passed to its intended destination or rejected to prevent harm from befalling the device. Examples of this analysis are discussed below.

The following examples illustrate how one or more servers can be used to augment or replace the methods described in U.S. patent application Ser. No. 12/255,621.

Multiple systems containing known good component, known bad component, and decision component are possible. Depending on the specific types of data being analyzed and the types of security threats being prevented, different orders of execution and logic applied to each component's output can be employed. In an embodiment, if data is not determined to be good by known good component 4303 (block 4205), it will be rejected from processing 4213. Data that known good component 4303 determines to be good (block 4205) is still analyzed by known bad component 4305 (block 4207). If known bad component 4305 determines data to be bad (block 4207), it is rejected from processing 4213, otherwise data may be analyzed by decision component 4307 (block 4209). In an embodiment, if data is not determined to be known good by known good component 4303, known bad component 4305 analyzes it. If known good component determines the data to be good, it is allowed. If known bad component 4305 determines the data to be bad, it will be rejected from processing 4213. If known bad component 4305 does not determine the data to be bad, the data may be analyzed by decision component 4307 to reach an assessment for the data.

Figure 42:
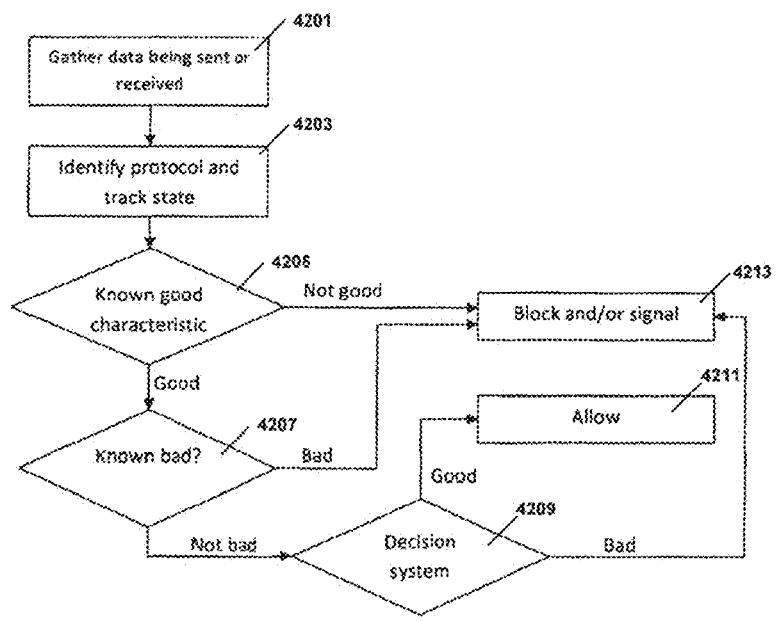
FIG. 42 is an exemplary flow diagram illustrating the steps of an embodiment.

An example analysis of network data or data files present on a mobile communications device is shown in FIG. 42. As shown in FIG. 42, block 4201 may involve gathering data sent to or received from the mobile communications device. The data may be analyzed to identify its protocol and track state (block 4203). In block 4205, known good component 4303 resident on the mobile communications device may evaluate the gathered data for known good characteristics. Known good characteristics may include the characteristics previously discussed or described in U.S. patent application Ser. No. 12/255,621. If the data contains sufficient known good characteristics, it may be allowed to proceed to its intended destination (block 4211) for processing, execution or other operation. Alternatively, the data may be further analyzed by known bad component 4305 resident on the mobile communications device to confirm that the data is truly safe (block 4207). If known bad component determines that the data is truly safe, then the data may be allowed to proceed to its intended destination (block 4211). Decision component 4307 may also be available to provide a final check (block 4209) before allowing the data to proceed (block 4211).

Analysis of a data object may be performed at any time. For example, the data object may be evaluated prior to access or download, or after download but prior to installation, or after installation, prior to installation of a new version of the data object, or after the installation of a new version of the data object, if the data is an application. In an embodiment, a data object that has not yet been downloaded to a device is evaluated by using identifying information about the data object. For example, if an application market accessible to a mobile communications device makes applications available for download and provides identifying information about the data object such as a hash of the application's content or a package name for the application, software on the mobile communications device can use the identifying information to determine an assessment for the application by evaluating the identifying information locally using any of the systems described herein or by transmitting the identifying information to server 3551 and receiving an assessment from the server. In this manner, the software on the mobile communications device can assess whether applications are undesirable or not before a user downloads them.

At any point during the analysis, if either known good component 4303, known bad component 4305 or decision component 4307 (discussed further below) determines that the data is not good, or affirmatively contains security threats, data inconsistencies, etc., then in block 4213 the data will be blocked, rejected, deleted or quarantined. In an embodiment, a signal event or security event information log may be updated to record the encounter with the contaminated data.

The analysis of executable data such as applications, programs and/or libraries on the mobile communications device may proceed as illustrated in FIG. 43. In block 4301, the executable is determined to need to be classified as either good or bad as a result from an attempt to access the executable, installing the executable, or the executable being downloaded or otherwise transferred to the mobile device. The executable may or may not be pre-processed to extract additional application data such as a hash identifier, cryptographic signer, package name or other characteristics before being evaluated by known good component 4303 resident on the mobile communications device (block 4303). This evaluation may include comparing the executable's hash identifier or other characteristics against a database of known good characteristics, identifying whether the executable has sufficient known good characteristics, or any of the criteria discussed above or described in U.S. patent application Ser. No. 12/255,621.

If the executable is recognized as known good, then in block 4311, it may be allowed to execute its code or proceed to its intended destination for processing or other operation. If known good component 4303 fails to allow the executable data, then known bad component 4305 resident on the mobile communications device may perform its analysis (block 4305). If known bad component 4305 confirms that the executable is malicious, then the executable may be quarantined, rejected, or deleted, and the event may be logged (block 4309). If known bad component 4305 is unable to characterize the executable, then the decision component 4307 may perform its analysis as described further below (block 4307). If decision component 4307 ultimately determines that the executable is safe, then the executable is allowed (block 4311). If decision component 4307 ultimately determines that the executable is not safe, or remains unsure, then the executable may be quarantined (block 4309). One will appreciate that since executables may contain code that can cause significant harm to the mobile communications device, it may require more rigorous analysis before the executable is allowed to proceed.

One will appreciate that known good component 4303 and known bad component 4305 can be kept lightweight on the resident mobile communications device by only storing definition information about those applications most likely to be accessed by the mobile communications device. As described above, such information may be determined, for example, based upon device data, the applications previously installed on the mobile communications device, and the way the mobile communications device is used (e.g., work versus entertainment, accessing public networks versus private networks, etc.). One will appreciate that each mobile communications device may store different definition information, and that an embodiment contemplates such granularity.

As discussed above and throughout, an embodiment is directed to server-side analysis of data in the event that known good component 4303 and known bad component 4305 are unable to determine whether the data is safe. In an embodiment, decision component 4307 resides on one or more servers 3551 in communication with the mobile communications device over network 3521, i.e., "in the cloud." The decision component may rely on one or more analysis systems, such as the analysis systems disclosed herein. Because decision component 4307 resides on computing resources that are more powerful than the mobile communications device, it can provide a more robust analysis to determine if data should be considered bad or good for device 3501. Furthermore, analysis that takes place on server 3551 can take advantage of data collected by the server to produce an assessment that would not be possible only relying on data available to mobile communications device 3501. For example, decision component 4307 on server 3551 may determine that a data object is malicious if behavioral data reported by devices indicate that the data object sends premium-rate SMS messages or dials premium-rate phone numbers on devices that it is installed on.

In an embodiment, decision component 4307 utilizes one or more types of internal analysis systems to characterize whether a data object is good or bad. The decision component 4307 is designed to detect security threats without specific definitions for the threats being protected against. In other words, decision component 4307 may operate as an additional security component to compensate for any weaknesses from known good component 4303 or known bad component 4305 and to identify new threats that have not been previously identified.

One will appreciate that there are a number of analysis systems that may be utilized by decision component 4307, including but not limited to systems that use heuristic algorithms, rule-based or non-rule-based expert systems, fuzzy logic systems, neural networks, or other methods by which systems can classify a data object. As described above, such systems may use a variety of data available to decision component 4307, including but not limited to distribution data, characterization data, categorization data, trust data, application data, and the like. For example, decision component 4307 may analyze applications, libraries, or other executables on a mobile communications device. In an example, the decision component 4307 may contain a neural network which analyzes characteristics of an executable and determines a security assessment based on network connection characteristics. Such characteristics may be determined based on information contained in the executable file format or as a result of processing the content of the executable file. In another example, the decision component 4307 may contain an expert-system which analyzes the behavior of an executable through function calls, system calls or actions an executable may take on an operating system. If an executable calls in a way that signifies malicious behavior, the system may flag that executable as potential malware and action may be taken.

One will appreciate that there are a number of analysis systems that may be utilized by decision component 4307, including but not limited to systems that use heuristic algorithms, rule-based or non-rule-based expert systems, fuzzy logic systems, neural networks, or other methods by which systems can classify a data object. As described above, such systems may use a variety of data available to decision component 4307, including but not limited to distribution data, characterization data, categorization data, trust data, application data, and the like. For example, decision component 4307 may analyze applications, libraries, or other executables on a mobile communications device. In an example, the decision component 4307 may contain a neural network which analyzes characteristics of an executable and determines a security assessment based on network connection characteristics. Such characteristics may be determined based on information contained in the executable file format or as a result of processing the content of the executable file. In another example, the decision component 4307 may contain an expert-system which analyzes the behavior of an executable through function calls, system calls or actions an executable may take on an operating system. If an executable access sensitive system calls in a way that signifies malicious behavior, the system may flag that executable as potential malware and action may be taken.

If decision component 4307 is located on mobile communications device 3501, it may be desirable to update rules or analysis parameters independently of updating the executable code powering the decision component. In an embodiment, the decision component 4307 contains a virtual machine-based decision system by which an executable can be classified by a set of rules that may be updated independently of the decision component itself. Such a system is able to add new logic to detect certain new classes of undesirable applications on the fly without having to update the whole decision component. The system may pre-process the executable so that the virtual machine's logic can symbolically reference the executable rather than having to process the executable itself.

In an example, the decision component 4307 may consider third party information to evaluate data. A person having skill in the art will appreciate that a mobile communications device 3501 is capable of accessing an application provider, such as Apple's App Store, the Android Market, or other software repository or digital distribution platforms for providing applications available for download and installation on the mobile communications device. In an embodiment, server 3551 has access to such application providers and can collect information about specific applications. For example, server 3551 can search for and collect user-generated reviews or ratings about applications. An application that has favorable ratings may be deemed safe while an application with significantly negative ratings may be deemed undesirable. Because server 3551 may also determine trust data for data objects, the assessment for an application with negative reviews may only indicate that the application is undesirable if the application has a low trust rating while an application with a high trust rating and negative reviews may still be considered desirable by an anti-malware system.

The above examples illustrate how decision component 4307 may utilize a number of analytical methods in order to fully evaluate the threat level of data received by or transmitted from the mobile communications device. Other examples may be contemplated without departing from the scope of this disclosure.

One will appreciate that identifying recognizably good data objects and recognizably bad data objects, such as by mobile communications device 3501 or server 3551, may be performed by a single component rather than by separate "known good" and "known bad" components. In an embodiment, a single recognition component performs the functionality of identifying both recognizably good and recognizably bad data objects.

In an embodiment, a recognition component utilizes definitions to determine an assessment for a data object. The recognition component first examines application data for a data object to determine if any definitions correspond to the data object. For example, if the recognition component has access to definitions that are hashes of data objects' content, a definition that has the same hash as the hash of a given data object's content is determined to correspond to the data object. In another example, if the recognition component accesses definitions that contain byte sequence signatures, a definition with a byte sequence contained in a data object's content is determined to correspond to the data object. Each definition may be associated with an assessment so that the recognition component can examine application data for a data object to determine a corresponding definition, determine a corresponding assessment for the definition, and therefore produce an assessment that corresponds to the data object. For example, the application data for a data object may include identifying information such as the data object's hash, package name, unique identifier, or other application data such as the data object's content. In an embodiment, the definitions used by a recognition component represent known data objects. In this case, when the recognition component determines if an assessment for a known data object corresponds to a data object being analyzed, the data object being analyzed and the known data object do not have to be exactly the same. For example, if a first application from a particular developer is determined to be undesirable through analysis (e.g., manual analysis, automated analysis), a definition may be created for the first application that matches the first application's package name. If the developer creates a modified application that has the same package name as the first application and the recognition component encounters the modified application, the definition is determined to correspond to the modified application because the package name in the definition matches the modified application's package name. The recognition component then determines that the undesirable assessment for the first application applies to the modified application.

For example, a recognition component may access a database of definitions, each definition indicating a hash of a data object's content and an indication of whether a data object to which the definition corresponds is considered to be good or bad. In an embodiment, the definitions used by one or more recognition components operating on server 3551 are stored on server 3551 or on data storage 3511. In an embodiment, known good component 4303 and known bad component 4305 are each implemented on server 3551 using a recognition component. For example, a known good component may include a recognition component where all of the definitions accessed by the recognition component correspond to an assessment that a data object is considered to be good. In an embodiment, known good and known bad components are each implemented as recognition components that match application data for a data object against known good and known bad application data. For example, a known good component may have a list of known good hash identifiers, package names, and cryptographic signers that it tries to match with data objects being analyzed. In an embodiment, if a data object has any characteristic in the known good list, it is considered safe. In an embodiment, a server may use a similar known bad system that matches known bad application data to application data for a data object being analyzed. Other known good and known bad analysis systems are possible without departing from the scope of this disclosure. In an embodiment, the recognition component produces a variety of assessments—not simply "good" or "bad." In an embodiment, the recognition component uses a single assessment instead of storing multiple assessments if all definitions only have a single corresponding assessment, such as in the case where the recognition component only identifies whether a data object is "known bad." Other variations are also possible without departing from the scope of this disclosure.

For example, a recognition component may access a database of definitions, each definition indicating a hash of a data object's content and an indication of whether a data object to which the definition corresponds is considered to be good or bad. In an embodiment, the definitions used by one or more recognition components operating on server 3551 are stored on server 3551 or on data storage 3511. In an embodiment, known good component 4303 and known bad component 4305 are each implemented on server 3551 using a recognition component. For example, a known good component may include a recognition component where all of the definitions accessed by the recognition component correspond to an assessment that a data object is considered to be good. In an embodiment, known good and known bad components are each implemented as recognition components that match application data for a data object against known good and known bad application data. For example, a known good component may have a list of known good hash identifiers, package names, and cryptographic signers that it tries to match with data objects being analyzed. In an embodiment, if a data object has any characteristic in the known good list, it is considered safe. In an embodiment, server may use a similar known bad system that matches known bad application data to application data for a data object being analyzed. Other known good and known bad analysis systems are possible without departing from the scope of this disclosure. In an embodiment, the recognition component produces a variety of assessments—not simply "good" or "bad." In an embodiment, the recognition component uses a single assessment instead of storing multiple assessments if all definitions only have a single corresponding assessment, such as in the case where the recognition component only identifies whether a data object is "known bad." Other variations are also possible without departing from the scope of this disclosure.

Figure 46:
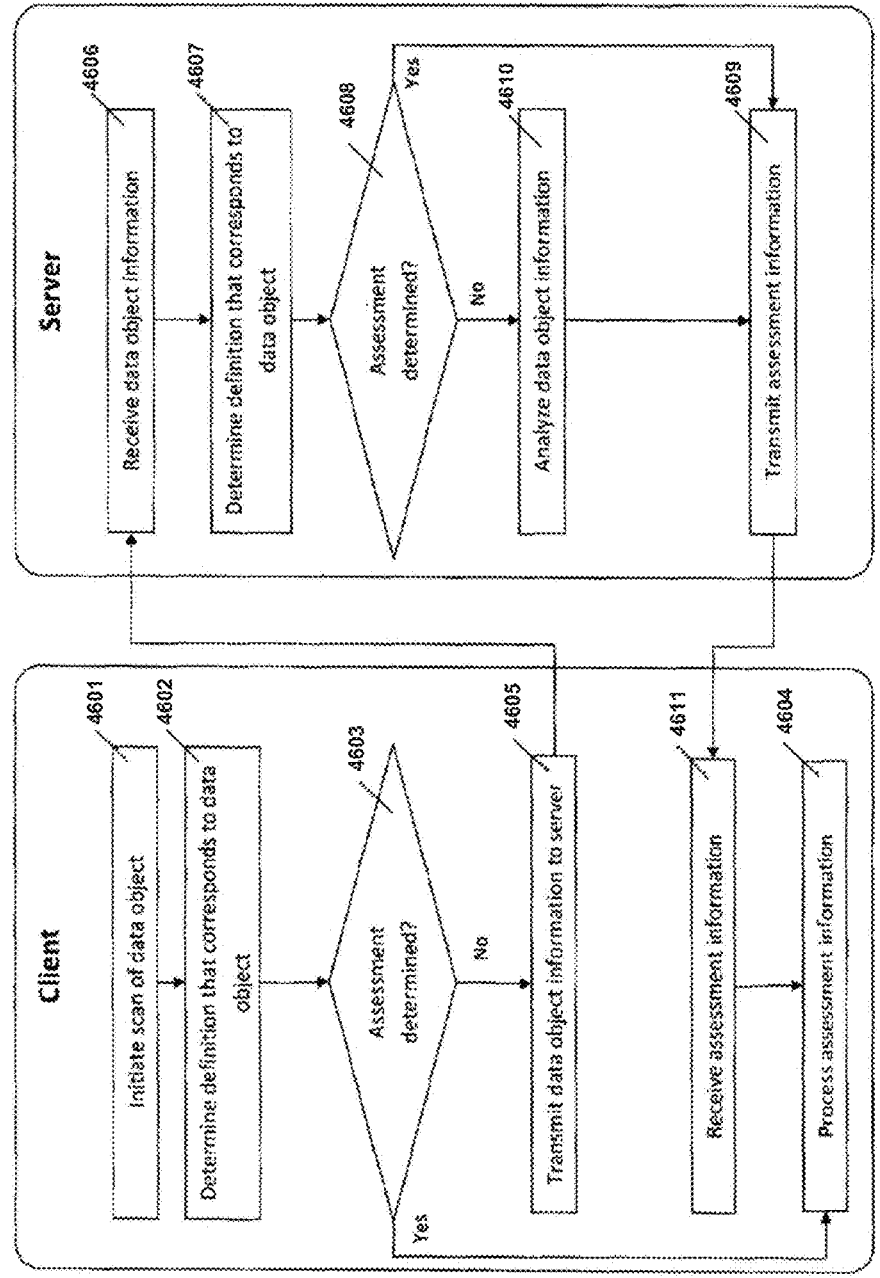
FIG. 46 is an exemplary flow diagram illustrating the steps of an embodiment.

FIG. 46 illustrates an embodiment used to assess data objects on a mobile communications device. A mobile communications device 3501 may first initiate a scan of a data object, such as in the case of a full system scan or when the data object is being executed or installed 4601. The recognition component evaluates application data for the data object (e.g., package name, hash of data object's content, unique identifier, content of data object) to determine if a definition accessible to the recognition component corresponds to the data object (block 4602). For example, as discussed above, the correspondence may include matching identifying information for the data object to data contained in a definition or matching the data object's content to sequences, patterns, or logic contained in a definition. If a definition corresponds to the data object, then the recognition component determines the corresponding assessment for the data object. In an embodiment, recognition component in block 4602 utilizes a data store of definition and assessment information. For example, as discussed above, the definitions stored on the mobile communications device may be pre-populated or populated when the mobile communications device receives the definition and assessment information from server 3551. In an embodiment, the definitions stored on the mobile communications device may be considered a cache, the cache functioning as described above. If the recognition component on the mobile communications device determines an assessment for the data object (block 4603), that assessment is processed to determine how to treat the data object (block 4604). For example, if the assessment indicates that the data object is malicious, then the mobile communications device may disallow the data object from being executed or prompt the device's user to uninstall the data object. If the recognition component on the mobile communications device does not determine an assessment for the data object (block 4603), then mobile communications device 3501 transmits data object information such as application data (e.g., identifying information, content of the data object) to server 3551 (block 4605). The server receives the data object information (block 4606), and a recognition component on server evaluates the data object information to determine if a definition accessible to the recognition component corresponds to the data object (block 4607). If a definition corresponds to the data object (block 4608), then server 3551 determines an assessment for the data object and transmits it to mobile communications device (block 4609). If the recognition component does not determine a corresponding definition or assessment for the data object (block 4608), a decision component on the server analyzes the data object information (block 4610). If the decision component produces an assessment, then server 3551 transmits the assessment to the mobile communications device (block 4609). If no assessment is produced by the decision component, then the server transmits an indication that the data object is unknown to the mobile communications device (block 4609). Mobile communications device 3501 receives the assessment from the server (block 4611) and processes the assessment information to determine how to treat the data object (block 4604). In an embodiment, mobile communications device 3501 adds information from the assessment received from server 3551 to its local definition cache when it processes assessment information (block 4604). For example, the device may store information such as a disposition for the data object (e.g., "known good", "known bad", "malware", "spyware"), an identifier transmitted by server 3551, and definition information generated by the device or transmitted by server 3551 (e.g., hash of the data object's content, data object's package name).

In an embodiment, mobile communications device performs analysis on a data object being scanned using a local decision component on the mobile communications device before transmitting data object information to server 3551 in the case where the recognition component on the mobile communications device does not determine an assessment. In an embodiment, analysis by the local decision component and transmitting data object information to the server occur in parallel to minimize delay to a user. One skilled in the art will appreciate that a variety of configurations of the components in a combined client-server anti-malware system are possible without departing from the scope of this disclosure.

In an embodiment, mobile communications device performs analysis on a data object being scanned using a local decision component on the mobile communications device before transmitting data object information to server 3551 in the case where the recognition component on the mobile communications device does not determine an assessment. In an embodiment, analysis by the local decision component and transmitting data object information to the server occur in parallel to minimize delay to a user. One skilled in the art that a variety of configurations of the components in a combined client-server anti-malware system are possible without departing from the scope of this disclosure.

In an embodiment, mobile communications device 3501 transmits authentication information such as authentication credentials or session information to server 3551 whenever sending information about a data object so that server can associate information exchanged with a particular account on the server.

D. Application Assessment and Advisement System

E. Application Assessment and Advisement System

Previous portions of this disclosure described various systems and methods for collecting different types of data from one or more mobile communications devices and other sources as well as analyzing the collected data to produce assessments for data objects. The following is a discussion of how server 3551 can use assessments for display, exposure via API, and a variety of other purposes. Some examples of assessments that have been disclosed herein include output from one or more analysis systems (e.g., characterization data, categorization data, trust data, and distribution data) and one or more ratings for a data object (e.g., security rating, privacy rating, battery rating, performance rating, quality rating). One having ordinary skill in the art will appreciate that assessment information pertains to a wide variety of information which can be used to understand the effects of installing a given data object on a mobile communications device beyond a typical anti-malware system's assessment of whether the data object is malicious or not. In addition, this assessment information can be used to guide decisions regarding whether to download and install different types of data objects. Such information can be useful to an individual user trying to decide whether to install a certain application on his mobile communications device. Such information can also be useful to an IT administrator trying to decide whether to deploy a certain application to a plurality of mobile communications devices. In an embodiment, a user or IT administrator can use this assessment information for application policy enforcement.

Previous portions of this disclosure described various systems and methods for collecting different types of data from one or more mobile communications devices and other sources as well as analyzing the collected data to produce assessments for data objects. The following is a discussion of how server 3551 can use assessments for display, exposure via API, and a variety of other purposes. Some examples of assessments that have been disclosed herein include output from one or more analysis systems (e.g., characterization data, categorization data, trust data, and distribution data) and one or more ratings for a data object (e.g., security rating, privacy rating, battery rating, performance rating, quality rating). One having ordinary skill in the art will appreciate that assessment information pertains to a wide variety of information which can be used to understand the effects of installing a given data object on a mobile communications device beyond a typical anti-malware system's assessment of whether the data object is malicious or not. In addition, this assessment information can be used to guide decisions regarding whether to download and install of different types of data objects. Such information can be useful to an individual user trying to decide whether to install a certain application on his mobile communications device. Such information can also be useful to an IT administrator trying to decide whether to deploy a certain application to a plurality of mobile communications devices. In an embodiment, a user or IT administrator can use this assessment information for application policy enforcement.

One having skill in the art will appreciate that the data available to server 3551 and assessments produced by the server are useful beyond anti-malware purposes. For example, the assessments can detail whether a data object is known for excessively draining a mobile communications device's battery or if a data object utilizes an undesirable amount of network resources. Because server 3551 continues to gather, store, and analyze data to produce assessment information, in an embodiment, server 3551 can provide information that details how a data object is estimated to affect a mobile communications device before the data object is installed on the mobile communications device. For example, server 3551 can provide estimated battery usage information and/or network usage information for an application.

When users interact with assessments, it may be desirable that the assessments represent an appropriate level of granularity so that users do not feel that the assessments are too broad or too narrow. In an embodiment, server 3551 merges assessments for multiple data objects into a single assessment and transmits the merged assessment. For example, if an application contains multiple data objects (e.g., executable and multiple libraries), a user may wish to see an assessment for the application as a whole, not multiple assessments for its constituent data objects. Similarly, if there are multiple versions of an application (on a single platform or multiple platform) that exhibit similar characteristics, an enterprise policy administrator making a decision about the application may only wish to view a single assessment that encompasses all versions of the application.

In order to merge assessments for multiple data objects, server 3551 may use application data such as file paths, version numbers, package names, cryptographic signers, installer source, and other information to determine that a group of data objects pertain to a particular version of an application and/or that one or more data objects or group of data objects belong to different versions of an application. For example, if a set of executables are commonly seen in the same directory together, server 3551 may determine that those executables are all related to the same application. In another example, if an application package has both a package name and a version identifier embedded in it, server 3551 may determine that two data objects with the same package name and human-readable application name but different version identifiers are multiple versions of the same application.

Because it may be desirable for assessments to provide a consistent form of information between platforms, an embodiment is directed to server 3551 including some or all of the same fields in assessments for data objects that run on different platforms. For example, even though the location APIs on different smartphone operating systems are very different in their function, server 3551 may perform operating system specific analysis on data objects to produce a cross-platform assessment of whether each data object accesses the device's location. If the assessment were in the form of a list of capabilities for the data object, both a mapping application on BlackBerry and a location-based social network on Android would have the "accesses device location" capability. Similarly, battery usage may be calculated differently on each platform, but server 3551 may produce a cross-platform assessment of the estimated daily battery use measured as a percentage of total battery capacity. In an embodiment, merged assessments for multiple data objects include information about the range of characteristics and categorization for data objects. For example, an assessment may show a trend in the battery usage of multiple versions of an application. An application that used a lot of battery in an old version but has recently decreased its battery usage may be acceptable while an application that has consistently high battery usage may be unacceptable.

An embodiment is directed toward server 3551 making assessments for data objects available via a web interface. For example, users may wish to be able to learn more about the characteristics and capabilities of applications they have on their mobile devices. Server 3551 may expose, as a web interface, an index of applications for which assessments are available and an assessment for each of these applications. In order to facilitate easy location of applications, server 3551 may organize applications in a variety of ways, such as alphabetically, by their characteristics, by their categorization, and by platform. In addition, server 3551 may allow a user to search for applications using terms that match the application's name, description, or fields in the application's assessment (e.g., all applications that run on Android OS and send location to the internet). Furthermore, publicly displaying assessments may assist in the transparency of applications.

An embodiment is directed toward server 3551 making assessments for data objects available via a web interface. For example, users may wish to be able to learn more about the characteristics and capabilities of applications they have on their mobile devices. Server 3551 may expose, as a web interface, an index of applications for which assessments are available and an assessment for each of these applications. In order to facilitate easy location of applications, server 3551 may organize applications in a variety of ways, such as alphabetically, by their characteristics, by their categorization, and by platform. In addition, server 3551 may allow a user to search for applications using terms that match the application's name, description, or fields in the application's assessment (e.g., all applications that run on Android OS and send location to the interne). Furthermore, publicly displaying assessments may assist in the transparency of applications.

For example, application vendors may direct users to the assessment page generated by server 3551 as an independent third-party assessment of the capabilities of an application so that users can verify what the application is doing. In an embodiment, server 3551 generates a web interface that allows a user to view an application's conditional assessment based on device data (e.g., how much battery does this application use on a Motorola Droid, how much network data does this application use on AT&T Wireless) and compare different conditional assessments (e.g., this application's battery usage on a Motorola Droid vs. a HTC Hero, how much network data does this application use on AT&T Wireless vs. Verizon Wireless). Such conditional assessments may be helpful to identify anomalous behavior in particular circumstances—for example, the assessment page may indicate that a certain set of handsets, operating system versions, or other applications installed on a device cause a higher error rate or anomalous change in certain assessment characteristics for this application. In an embodiment, server 3551 identifies data objects having extreme values for particular assessment values. For example, server 3551 may generate a web page identifying which applications use more than 1 gigabyte of network data per month or which applications use more than 10% of a device's battery.

For example, application vendors may direct users to the assessment page generated by server 3551 as an independent third-party assessment of the capabilities of an application so that users can verify what the application is doing. In an embodiment, server generates a web interface that allows a user to view an application's conditional assessment based on device data (e.g., how much battery does this application use on a Motorola Droid, how much network data does this application use on AT&T Wireless) and compare different conditional assessments (e.g., this application's battery usage on a Motorola Droid vs. a HTC Hero, how much network data does this application use on AT&T Wireless vs. Verizon Wireless). Such conditional assessments may be helpful to identify anomalous behavior in particular circumstances—for example, the assessment page may indicate that a certain set of handsets, operating system versions, or other applications installed on a device cause a higher error rate or anomalous change in certain assessment characteristics for this application. In an embodiment, server 3551 identifies data objects having extreme values for particular assessment values. For example, server 3551 may generate a web page identifying which applications use more than 1 gigabyte of network data per month or which applications use more than 10% of a device's battery.

Because assessment data generated by server 3551 may be utilized to provide a variety of other products and services, an embodiment is directed toward server 3551 exposing assessment data via an API. All functionality exposed by a web interface, as described above, may also be exposed as an API so that a variety of products and services may be built. For example, server 3551 may provide an HTTP API by which supplying a data object's package name or content hash in the request URL will result in the server returning an assessment for the data object identified by the package name or content hash. In another example, server 3551 may generate a JavaScript file that can be included by a remote web page and displays an interactive assessment view for a particular data object.

In an embodiment, server 3551 can cause assessment data, such as a rating or disposition as to whether an application is desirable or not, to appear in an application marketplace. One will appreciate that application marketplaces may be implemented in a variety of ways, such as using a web site, using a mobile client application, using a PC-based client application, and using a messaging service such as SMS. As such, rather than subjective user-provided review information, an embodiment will provide objective assessment information for an application or other data object.

For example, server 3551 may provide an API by which it may be queried for assessment data, or server 3551 may proactively analyze all of the applications available in an application marketplace, transmitting assessment data to the marketplace provider. In an embodiment, a user can search the application marketplace for only those applications that meet certain desirable criteria, such as security, privacy, device efficiency, trustworthiness, and the like. In an embodiment, application providers can use the aggregated information in order to provide quality control measures. The application provider may only feature applications that meet certain battery efficiency criteria, a standard for an acceptable number of crashes or errors, certain network traffic limitations, privacy protections, and the like. In this fashion, an embodiment can improve the offerings on an application marketplace, thereby encouraging developers to create better applications. In an embodiment, the assessment information may be used as a certification system, wherein an application meeting certain criteria may be marked with a symbol, badge or other icon denoting the positive assessment for the application. For example, applications that have a high trust rating or applications that only access a minimal set of private information may be considered certified. In order to verify an application's certification, the certification marker may have a link or other way for a user to retrieve a full assessment from server 3551.

In an embodiment, server 3551 transmits assessment information to mobile communications device 3501 for display. For example, a mobile device may have an interface by which a user can explore assessments for all applications installed on the device. The interface may allow a user to view assessment information for a particular application as well as allow a user to view which applications match a set of assessment criteria (e.g., all applications that send the device's location to the interne, the top 10 battery users, all applications that use more than 50 megabytes of network traffic per month). In an embodiment, mobile communications device 3501 displays an interface as a part of an application marketplace, an application download process, or an application installation process on a mobile communications device so that a user browsing an application available for download or downloading/installing an application sees assessment information for the application. When browsing, downloading, or installing an application, the device transmits identification information to server 3551 and receives an assessment for the application, displaying some or all of the assessment on a user interface. For example, the interface may display the capabilities of the application or characteristics of the application. The interface may also be interactive, allowing the user to explore aspects of the assessment, requesting additional assessment information from server 3551 if necessary. In another example, the device may display an indicator of trust for an application, as determined by server 3551 and transmitted to device 3501 as part of an assessment. The indicator of trust may be displayed in a variety of ways, including as a certification seal (e.g., "Lookout™ certified") or a rating (e.g., "A+", "B–", "C+").

In an embodiment, server 3551 transmits assessment information to mobile communications device 3501 for display. For example, a mobile device may have an interface by which a user can explore assessments for all applications installed on the device. The interface may allow a user to view assessment information for a particular application as well as allow a user to view which applications match a set of assessment criteria (e.g., all applications that send the device's location to the internet, the top 10 battery users, all applications that use more than 50 megabytes of network traffic per month). In an embodiment, mobile communications device 3501 displays an interface as a part of an application marketplace, an application download process, or an application installation process on a mobile communications device so that a user browsing an application available for download or downloading/installing an application sees assessment information for the application. When browsing, downloading, or installing an application, the device transmits identification information to server 3551 and receives an assessment for the application, displaying some or all of the assessment on a user interface. For example, the interface may display the capabilities of the application or characteristics of the application. The interface may also be interactive, allowing the user to explore aspects of the assessment, requesting additional assessment information from server 3551 if necessary. In another example, the device may display an indicator of trust for an application, as determined by server 3551 and transmitted to device 3501 as part of an assessment, The indicator of trust may be displayed in a variety of ways, including as a certification seal (e.g., "Lookout™ certified") or a rating (e.g., "A+", "B−", "C+").

In an embodiment, server 3551 transmits assessment information to mobile communications device 3501 for display. For example, a mobile device may have an interface by which a user can explore assessments for all applications installed on the device. The interface may allow a user to view assessment information for a particular application as well as allow a user to view which applications match a set of assessment criteria (e.g., all applications that send the device's location to the internet, the top 10 battery users, all applications that use more than 50 megabytes of network traffic per month). In an embodiment, mobile communications device 3501 displays an interface as a part of an application marketplace, an application download process, or an application installation process on a mobile communications device so that a user browsing an application available for download or downloading/installing an application sees assessment information for the application. When browsing, downloading, or installing an application, the device transmits identification information to server 3551 and receives an assessment for the application, displaying some or all of the assessment on a user interface. For example, the interface may display the capabilities of the application or characteristics of the application. The interface may also be interactive, allowing the user to explore aspects of the assessment, requesting additional assessment information from server 3551 if necessary. In another example, the device may display an indicator of trust for an application, as determined by server 3551 and transmitted to device 3501 as part of an assessment. The indicator of trust may be displayed in a variety of ways, including as a certification seal (e.g., "Lookout™ certified") or a rating (e.g., "A+", "B−", "C+").

In some cases, users will not read lengthy security explanations, so it is important to display security information about applications in such a way that is easily understandable. In an embodiment, a mobile communications device 3501 displays a graphical assessment indication for an application. For example, notable aspects of assessments may be displayed as icons or badges for the application. Some examples include badges for being "battery efficient", being a "battery hog", "accessing location", having "spy capabilities", being a "social network", and being a "file sharing app". The badge for each notable assessment may include an illustration making the badge easy to understand and coloration indicating whether the assessment is merely informational or something potentially critical. For example an application being efficient with battery use may have a green icon showing a full battery while an application that typically uses a lot of battery may have a red icon showing an empty battery.

Because server 3551 continually gathers information and improves assessments, assessment information can be updated on application marketplaces and/or mobile communications devices that have cached the assessment information. For example, server 3551 may send a notification to the application marketplace or mobile communications device indicating that new assessment information is available. In another example, server 3551 may simply transmit the updated assessment information so that old information is overwritten.

In addition to viewing assessments on a device for data objects that are installed on that device, it may also be desirable to view assessments for data objects installed on a device from a web interface. For example, a user may wish to use his or her PC to explore assessments for applications installed on his or her device. As discussed, in an embodiment, mobile communications device 3501 transmits application data for data objects it has installed to server 3551. Because server 3551 may store which applications are currently installed on device 3501, the server can generate a user interface displaying assessments for those applications. For example, server 3551 may generate and transmit a web interface allowing a user to view a list of all applications installed on a device, view an assessment for each installed application, and explore which installed applications match particular assessment values (e.g., all applications that can access my location). To prevent disclosure of private information, server 3551 may require that a user log in using authentication credentials in order to view assessments for the applications on his or her device. Furthermore, an enterprise administrator may wish to view assessments for a group of devices from a central management console.

In an embodiment, server 3551 generates a web interface that allows a user to view assessments for applications installed on multiple devices. For example, the web interface may allow a user to explore all apps that are installed on a group of devices that match a certain assessment field (e.g., file-sharing applications), view risk rating assessments for the group of devices, view all of the capabilities for applications installed on the deployment, and determine which devices and which apps are causing certain capabilities and risk exposures. A user may start by using server 3551 to generate an overall set of security, privacy, and battery risk ratings for the group of devices then click on a rating to view the list of applications most contributing to that risk rating. A user can then view which devices have a given application. In another example, a user may start by using server 3551 to generate a list of all capabilities for applications installed on the group and then click a given capability to view all of the applications installed on the group that have that capability. From there, the user may further explore which devices in the group have a given application installed. In an embodiment, assessments for a group of devices are exposed by server 3551 in the form of an API for use by external services such as management consoles. For example, server 3551 may expose risk ratings for the group of devices to a centralized security reporting system via an HTTP API.

On mobile communications devices, battery and network data are often limited in such a way that applications can adversely affect the device's battery life and can cause network use overage charges. An embodiment is directed to using assessments to make users aware of applications' network or battery usage and alert users in the case of an abusive application. Software on the device retrieves an assessment containing battery and network usage characteristics for an application from server 3551 and displays the assessment to the user. As described above, a device requesting assessment information from server 3551 may include application data for the application. The assessment may be customized for the particular device the user is using by the device sending device data when retrieving the assessment or by sending authentication data that associates the assessment request with previously transmitted device data. For example, the assessment may indicate that an application will likely reduce a user's model of phone's battery life by 5% or 1 hour; whereas a different model phone that has different battery life characteristics may receive an assessment that the same application reduces the phone's battery life by 10% or 3 hours. The assessment display may occur as part of an on-device application marketplace or as a user interface dialog before, during, or after installation of an application.

Furthermore, after the user installs multiple applications, it may be desirable for that user to understand which applications are most contributing to network usage or battery life based on the applications' actual behavior on the device. In an embodiment, the device collects behavioral data for the battery and network usage of an application and allows a user to view the actual behavioral data from an interface on the device. For example, the interface may allow a user to view a particular application's battery and network usage as well as view the top network and battery using applications in order to identify which applications are contributing to network overage or short battery life. In an embodiment, mobile communications device 3501 reports behavioral data for applications installed on the device to server 3551 and allow the user to view the actual behavioral data via a web interface generated by the server. One having ordinary skill in the art will appreciate that other characteristics of mobile applications can be monitored and shown to users as well.

Because a single application can cause significant problems with respect to battery life, network usage, or other limited resources, it may be desirable to notify a user when an application is behaving undesirably. In an embodiment, mobile communications device 3501 monitors the network and battery usage of applications installed on the device and notifies the device's user when an application exceeds desirable limits. For example, the user may set thresholds for how much data applications may transmit and receive before he or she is notified. In another example, a user is notified when the device determines that an application will adversely affect the user's battery life or phone bill. If a user typically uses a phone for 20 hours before plugging it in and an application on the device reduces the estimated battery life to less than 20 hours, it's likely that the user will run out of battery. It may then be important to alert the user that there is an action he or she can take to avoid running out of battery, namely uninstalling or otherwise disabling high battery using applications.

Because a single application can cause significant problems with respect to battery life, network usage, or other limited resources, it may be desirable to notify a user when an application is behaving undesirably. In an embodiment, mobile communications device 3501 monitors the network and battery usage of applications installed on the device and notifies the device's user when an application exceeds desirable limits. For example, the user may set thresholds for how much data applications may transmit and receive before he or she is notified.

In another example, a user is notified when the device determines that an application will adversely affect the user's battery life or phone bill. If a user typically uses a phone for 20 hours before plugging it in and an application on the device reduces the estimated battery life to less than 20 hours, it's likely that the user will run out of battery. It may then be important to alert the user that there is an action he or she can take to avoid running out of battery, namely uninstalling or otherwise disabling high battery using applications.

In an embodiment, in order to prevent applications on a user's device from exceeding the user's data plan, device 3501 or server 3551 predicts the future data usage of a device and gathers information about the device's data plan. In order to gather information about a device's data plan, device 3501 or server 3551 connects to a network operator's servers to determine data plan information such as the data allocation per billing cycle, what their billing cycle is, and how much data has been used during the current billing cycle. Communications to the network operator's servers may occur in a variety of ways, such as via an HTTP API or SMS messaging. If software on a device uses SMS messaging to retrieve a user's data plan information, the software may automatically consume the response message sent by the network operator's servers in order to prevent the communication from showing up in the user's inbox. In order to predict future data usage, server 3551 may analyze typical data usage for applications installed on a device and actual data usage on that device. If an application is newly installed, typical data usage may be used while for an application that has been on the device for months, actual data usage may be used. If applications on device 3501 use network data at a rate that would exceed the device's data plan allocation by the end of the billing cycle, software on the device displays an alert indicating the likely overage charges. The alert may also display the applications most contributing to the data usage and give the user to uninstall or reconfigure the applications. Device 3501 may report the alert to server 3551 which may also send a notification (e.g., via email) indicating the potential for data overage. Software on device 3501 or server 3551 may display an indication of the current predicted data usage relative to the device's data allocation so that a user may adjust his or her application usage patterns accordingly. For example, if a user is worried about exceeding his or her data plan, he or she may check what the current predicted data usage is before engaging in a video chat.

Because the applications installed on a device may have a significant impact on the risk exposure of the device, it may be desirable for a user or administrator to set policy for what applications are desirable to install on a device or group of devices. The following is a discussion of how protection policy can be implemented on one or more mobile communications devices. In an embodiment, policy includes blacklists and whitelists. A blacklist is a set of applications or assessment criteria that are explicitly denied from running on a mobile communications device while a whitelist is a set of applications or assessment criteria that are explicitly allowed to run on a mobile communications device. For example, a policy may allow only applications on a whitelist or only applications not on the blacklist. In an embodiment, explicit application entries have higher priority than assessment criteria entries. For example, a policy may specify certain capabilities (e.g., sending a device's location to the internet) that are blacklisted but specify certain applications that are whitelisted. In this case, all applications that send location to the internet may be blocked unless they are explicitly on the whitelist because the explicit applications on the whitelist are of higher priority than the assessment criteria on the blacklist. One skilled in the art will appreciate that a variety of policy schemes can be implemented without departing from the scope of this disclosure.

Users may have individual preferences for the type of applications they want on their mobile devices. Some users, for example, may be sensitive to privacy issues, while other issues may want to optimize their battery life. In order to allow users to utilize application assessments to gain greater insight into the applications they use or are considering to use, an embodiment is directed to software on a mobile communications device allowing a user to set policies based on assessment criteria for applications, the software blocking applications that exceed an undesirability threshold. When a user attempts to install an application, the software requests an assessment for the application from server 3551 and receives the assessment from the server.

For example, if the user attempts to install an application that has the capability of sending location information to the internet but has a policy to disallow any applications that can send his or her location to the internet, then software on the mobile communications device will block the installation. In another example, a user may set privacy, security, and battery life policy thresholds individually on a relative scale (e.g., 0 to 10). When the user installs an application, software on the device retrieves an assessment for the application and compares the application's privacy, security, and battery ratings with the policy thresholds and alerts the user if the application exceeds the configured policy. Instead of blocking installation of an application that is undesirable, a user may want to simply be warned of the undesirability.

In an embodiment, the user can ignore the alert and choose to accept the application anyway. In an embodiment, the device displays a user interface indicating that an application is undesirable for the user. For example, a mobile device may display an indication of whether an application being viewed for possible download in an application marketplace meets the user's desirability criteria. In another example, software on a device may allow a user to view all applications that do not meet desirability criteria. Such an interface may be useful if a user changes his or her criteria and wants to view applications that are now undesirable given the new criteria.

IT administrators, parents, network operators or other people responsible for multiple mobile communications devices may wish to set policy on multiple mobile communications devices without physical access to all of the devices. In an embodiment, server 3551 allows a user or administrator to set policy for a device or group of devices. When a device 3501 attempts to install an application, the device sends a request to server 3551 for an assessment of the application. Based on policy configured on server 3551, the assessment contains an indication of whether the application is allowed or disallowed and may also contain the policy criteria for why a disallowed application was assessed to be disallowed. In an example, policy on server 3551 is configurable via a web interface.

In an embodiment, server 3551 allows policy to be configured by assessment criteria as well as on a per application basis. For example, an administrator may use server 3551 to block all applications that are in a certain category such as social networking applications or all applications that access certain capabilities such as the ability to transmit files or other sensitive data from a device. In an example, an administrator may wish to only allow particular applications by creating a whitelist, blocking all applications not on the whitelist. In a further example, an administrator may permit all applications other than particular applications that are on a blacklist because they are known to be undesirable. Because the set of applications allowed or denied under a policy may be pre-computed, an embodiment is directed to server 3551 generating a set of policy definitions and transmitting the policy definitions to one or more mobile communications devices 3501. For example, if a group of devices has a policy to only allow applications that are on a whitelist, server 3551 may transmit a list of identifying information for the whitelisted applications to a mobile device so that the device does not need to contact the server for assessments every time it encounters an application.

When configuring policy using abstract concepts such as application categorization and capabilities, it may be desirable for a user or administrator to see what applications would be allowed/denied or whether a particular application would be allowed/denied if configuration changes were to be made. In an embodiment, the policy configuration user interface on mobile communications device 3501 or server 3551 includes an interface for viewing applications that would be blocked or allowed as part of a configuration change. If the configuration change interface is displayed on mobile communications device 3501, the device may send requests for data to server 3551 to populate the interface. It may be desirable to show all of the applications allowed or blocked after the configuration change goes into effect or only the difference in applications allowed or blocked between the current configuration and the new configuration. Because the number of applications affected by a configuration change may be very large, the interface may display summary information and allow a user to search for a particular application to determine whether the configuration change affects that application and whether the configuration change would result in that application being allowed or blocked. In an embodiment, the interface displaying the effect of a configuration change indicates whether any popular applications would be blocked. For example, application popularity may be determined based on overall distribution data determined by server 3551 or by the prevalence of the application in the group of devices being managed. In an embodiment, the change result interface only displays changes that affect applications that are currently installed on at least one device in the group being managed.

In order to prevent a policy system from interfering with acceptable usage of mobile communications devices, an embodiment is directed to server 3551 maintaining sets of acceptable apps and allowing a user or IT administrator to easily add those sets to a whitelist, the whitelist automatically including changes to the sets of acceptable apps. For example, server 3551 may maintain a list of applications that are popular overall or a list of popular applications by application category. In a policy configuration interface, the server may present a way to include all popular applications or only popular applications in particular categories (e.g., games, social networks) in the policy's whitelist. In an embodiment, such dynamic list policies are of higher priority than assessment criteria entries on blacklists and whitelists but of lower priority than explicit application entries. In another example, server 3551 may maintain a list of applications with high trust. In a policy configuration interface, the server may present a way to include all high-trust applications in the policy's whitelist. Whenever the high-trust list is updated, applications with high trust are effectively considered whitelisted when making policy assessments.

Because a mobile device deployment may already have a device management server or service in place, it may be desirable for server 3551 to supply data to a device management server that actually performs the policy enforcement. In an embodiment, server 3551 interfaces with a device management server to configure application policy on the device management server. For example, the device management server may support configurable application blacklists and whitelists. If a user sets configuration on server 3551 to only allow applications that are on a whitelist or that match certain assessment criteria, server 3551 generates the list of applications to be whitelisted and transmits the list of applications to the device management server in a format and over a protocol that the device management server supports. Similarly, if a user configures a blacklist on server 3551, the server generates the list of applications that are on the blacklist and configures the device management server to enforce the blacklist. In an embodiment, server is capable of configuring multiple device management servers. For example, if an organization supports multiple mobile device operating systems and uses different mobile device management servers, an administrator can configure a cross-platform policy on server 3551 (e.g., blocking all file sharing applications). Server 3551 may then identify all of the applications across multiple platforms whose assessments match the policy and configure the appropriate application policies on device management servers. Because each device management server may only support a subset of mobile device platforms that server 3551 supports, server 3551 only transmits policy information to a device management server that corresponds to data objects that run on operating systems that are supported by the device management server. For example, if a device management server only supports Blackberry devices, server 3551 may only configure the device management server's blacklist and/or whitelist with information about Blackberry applications.

In an embodiment, policy compliance checking can be performed by either server 3551 or mobile communications device 3501. For example, if server performs compliance checking, any compliance settings are stored on server 3551 so that any configuration performed on mobile communications device 3501 results in that configuration being transmitted to the server. When the device requests an assessment for an application from server 3551, the server includes in the assessment an indication of whether the application is allowed or disallowed by policy. In another example, if mobile communications device 3501 performs compliance checking, any compliance settings are stored on mobile communications device 3501 so that any configuration performed on server 3551 results in that configuration being transmitted to the device. When the device receives an assessment for an application, it compares the assessment to the policy configuration to determine if the application is allowed.

In an embodiment, policy management is integrated with a server-coupled anti-malware system so that signatures and assessments for applications provided by server 3551 enable device 3501 to block data objects that violate policy. For example, when a device 3501 requests for an assessment from server 3551, the server's assessment indicates that an application is undesirable if the application is considered malicious or if it violates policy. In either case, the assessment produced may indicate further information about why the application was found to be malicious or policy-violating. In another example, server 3551 may pre-emptively transmit signatures for malicious or policy-violating applications to mobile communications device 3501 so that the device can recognize whether a data object is desirable or undesirable without having to contact server 3551.

If a device 3501 has installed an application that violates a protection policy in place on either the device or server 3551 or the assessment for an application has been updated to make it violate the protection policy, it may be desirable for remediation actions to be taken by the device or other systems. In an embodiment, if a device has an application installed that violates the protection policy for that device, the server or software on the device can enact remediation actions to occur. Depending on whether policy compliance is determined at the device 3551 or server 3501, either the device or server may determine what remediation actions to take.

For example, if a user installs an application and the assessment received from server 3551 indicates that the application is acceptable but at some point in the future server 3551 determines that the application is unacceptable, server 3551 transmits an updated assessment to the device including remediation actions for the device to take. In another example, if a user installs an application on a device and the device receives an assessment from server 3551 indicating that the application is acceptable but software on the device gathers behavioral data that shows that the application violates policy (e.g., the application attempts to acquire the user's location), the device may undertake pre-configured remediation actions such as removing the application. The device may also transmit this behavioral data to server 3551 and indicate the policy violation. One skilled in the art will appreciate that using behavioral data to enforce policy can protect mobile communications devices in a variety of situations such as when a vulnerability in an application is exploited, when an application only behaves undesirably on a subset of devices (e.g., a targeted attack against employees of a particular company), or when an application only behaves undesirably after a period of time (i.e., a time bomb).

For example, if a user installs an application and the assessment received from server 3551 indicates that the application is acceptable, but at some point in the future, the server determines that the application is unacceptable, server 3551 transmits an updated assessment to the device including remediation actions for the device to take. In another example, if a user installs an application on a device and the device receives an assessment from server 3551 indicating that the application is acceptable but software on the device gathers behavioral data that shows that the application violates policy (e.g., the application attempts to acquire the user's location), the device may undertake pre-configured remediation actions such as removing the application. The device may also transmit this behavioral data to server 3551 and indicate the policy violation. One skilled in the art will appreciate that using behavioral data to enforce policy can protect mobile communications device in a variety of situations such as when a vulnerability in an application is exploited, when an application only behaves undesirably on a subset of devices (e.g., a targeted attack against employees of a particular company), or when an application only behaves undesirably after a period of time (i.e., a time bomb).

When a device is detected to be violating policy, a variety of remediation actions are possible, for example, any violating applications may have their processes ended, may be uninstalled or isolated from accessing certain system functionality (e.g., internet, private data), or may be restricted from accessing certain networks (e.g., only allowed to access Wi-Fi, not the cellular network). It may also be desirable to isolate the whole device from accessing sensitive resources such as a corporate email or VPN server while it is out of compliance to prevent information leakage. Other remediation actions may include those disclosed in U.S. patent application Ser. No. 12/255,614, filed on Oct. 21, 2008 and incorporated in full herein.

When a device is detected to be violating policy, a variety of remediation actions are possible, for example, any violating applications may have their processes ended, may be uninstalled or isolated from accessing certain system functionality (e.g., internet, private data), or may be restricted from accessing certain networks (e.g., only allowed to access Wi-Fi, not the cellular network). It may also be desirable to isolate the whole device from accessing sensitive resources such as a corporate email or VPN server while it is out of compliance to prevent information leakage. Other remediation actions may include those disclosed in U.S. patent application Ser. No. 12/255,614, filed on Oct. 21, 2008 and incorporated in full herein.

If an administrator is able to set policy using server 3551, it may also be desirable for a user to use server 3551 to view the compliance status of devices that the policy applies to. In an embodiment, server 3551 determines whether a group of mobile communications devices is in compliance with application policy and which applications are installed on devices in the group. For example, if mobile communications devices report the applications they have installed and server 3551 contains policy configuration, the server can determine which devices currently violate the policy set by an administrator. To allow an administrator to view the compliance status, server 3551 may generate a web interface listing whether or not all devices are in compliance and if any devices are out of compliance, how many there are. The interface may also allow the administrator to view specific devices that are out of compliance, view which applications make the devices out of compliance, and initiate remediation actions (e.g., removing an application) remotely.

In an embodiment, server 3551 presents a one-click remediation action whereby an administrator can click a single button to remotely initiate remediation actions on all devices in the group the administrator is managing. For example, if an administrator managed 100 devices and 10 of the devices had applications that violated policy, the administrator could click the one-click remediation button on the web interface to cause the server to send indications to each of the 10 out-of-compliance devices to remove the undesirable applications without any user intervention required. Once the remediation actions completed, each device 3501 may send an indication to server 3551 indicating whether it was successful or not. During the remediation process, server 3551 may generate an interface by which the administrator can view the status of the remediation. Other methods of server exposing compliance status include server 3551 exposing an API (e.g., for use by a security management console) and server 3551 generating reports that can be downloaded.

In some cases, it may be desirable for a user or administrator to receive a notification if he or she installs an application that is considered undesirable or if a previously installed application is newly considered to be undesirable based on an updated assessment. In an embodiment, mobile communications device 3501 transmits information about the installation of a data object to server 3551. If server 3551 determines the data object to be undesirable based on universal undesirability characteristics or characteristics for the user, the server transmits a notification. For example, if a user installs an application that is assessed as desirable, but at some point in the future, the application begins to exhibit malicious or other undesirable behavior such as wasting battery, the server may change its assessment to indicate that the application is undesirable. The notification may take a variety of forms, such as an email, SMS message, or user interface dialog displayed on a web page, on a PC, or on a mobile communications device.

For an IT administrator managing a plurality of mobile communications devices, policies can be set for a specific application, even if the application is available on multiple platforms and has multiple versions. For example, it is not uncommon for an IT administrator to manage a fleet of mobile communications devices running different operating systems. The fleet of mobile communications devices can include iPhones, BlackBerry devices and Android devices. However, if a certain application is known to be undesirable on all three device operating systems, such as a social networking application that can disclose private information, then the IT administrator can block all versions of the application from installation, regardless of platform. However, if an application can share sensitive information on one platform but not others, then the IT administrator can allow installation of the application on only the platforms that don't share sensitive information. As discussed above, it may also be desirable for an IT administrator to make policy decisions about all versions of an application at once instead of having to maintain a policy that treats multiple versions of an application as separate decisions. Because there are some applications that are updated very frequently, it would quickly become a very difficult task to manage application policy if an administrator could not treat all versions of a particular application as one policy decision.

For an IT administrator managing a plurality of mobile communications devices, policies can be set for a specific application, even if the application is available on multiple platforms and has multiple versions. For example, it is not uncommon for an IT administrator to manage a fleet of mobile communications devices running different operating systems. The fleet of mobile communications devices can include iPhones, BlackBerry devices, and Android devices. However, if a certain application is known to be undesirable on all three device operating systems, such as a social networking application that can disclose private information, then the IT administrator can block all versions of the application from installation, regardless of platform. However, if an application can share sensitive information on one platform but not others, then the IT administrator can allow installation of the application on only the platforms that don't share sensitive information. As discussed above, it may also be desirable for an IT administrator to make policy decisions about all versions of an application at once instead of having to maintain a policy that treats multiple versions of an application as separate decisions. Because there are some applications that are updated very frequently, it would quickly become a very difficult task to manage application policy if an administrator could not treat all versions of a particular application as one policy decision.

Because an application may drastically change between updates, it's desirable for an administrator to be aware of any changes that could affect the administrator's decision of whether or not to allow the application. An embodiment is directed to server 3551 sending a notification in the case of an application that is present on a blacklist or whitelist changing its capabilities or characteristics significantly. For example, if a new version of an application that is on an administrator's whitelist has the capability to transmit files from a user's device while previous versions did not, then server 3551 may send an email or text message to the administrator indicating the change. The policy management interface on server 3551 may also display a list of applications that may need attention based on changed characteristics.

In order to simplify configuration, an embodiment is directed to software on mobile communications device 3501 or server 3551 may provide default policies that account for common use cases. For example, a user may be able to select that they are concerned with battery life and location privacy but they are not concerned with network usage and phone number privacy. By selecting such concerns, the device or server automatically configures policies and thresholds for undesirable applications. In an embodiment, server 3551 or device 3501 contains pre-set policies for compliance with regulations. For example, financial industry or healthcare industry workers may be required to have a particular set of application policies in place to prevent the disclosure of sensitive information. Because the set of applications allowed or denied under these regulations may change over time, server 3551 may automatically update the specific policy decisions that enforce the regulation without an administrator needing to specifically configure them. In order to allow for inspection and auditing, server 3551 may generate a list of policy decisions it is employing to comply with regulation and may notify an administrator when policy decisions will change. If an administrator rejects certain policy decisions, he or she may override the default policy set by server 3551.

As it may be desirable to simplify the policy configuration process, an embodiment is directed to server 3551 or mobile communications device 3501 presenting a series of questions to a user or administrator, the answers to the questions being used to automatically set policy. For example, when a user is first setting up application policy software on his or her device, the software may ask whether the user has an unlimited data plan, whether the user wants to allow services to access the device's location, and whether the user wants to block all tools that can be used to spy on the device. Based on the answers to the questions the device may set policy of whether to block high data usage applications, whether to alert the user in the case of a high data usage application, whether to block applications that send a user's location to the internet, and whether to block espionage applications. After this initial setup, a user may desire to tweak policy decisions, while other users may accept the automatically configured policy.

As it may be desirable to simplify the policy configuration process, an embodiment is directed to server 3551 or mobile communications device 3501 presenting a series of questions to a user or administrator, the answers to the questions being used to automatically set policy. For example, when a user is first setting up application policy software on his or her device, the software may ask whether the user has an unlimited data plan, whether the user wants to allow services to access the device's location, and whether the user wants to block all tools that can be used to spy on the device. Based on the answers to the questions the device may set policy of whether to block high data usage applications, whether to alert the user in the case of a high data usage application, whether to block applications that send a user's location to the internet, and whether to block espionage applications. After this initial setup, a user may desire to tweak policy decisions, while other users may accept the automatically configured policy.

Because abusive applications may have a substantially negative impact on wireless networks, an embodiment is directed to providing "early-warning" information about potentially abusive applications. In an embodiment, server 3551 may use information such as behavioral data and other data available to it in order to produce an assessment of whether an application has network access characteristics that may be harmful for mobile networks. For example, an application that receives or transmits a large amount of data, sends a large number of SMS messages, or opens a large number of persistent connections may adversely affect a mobile network's performance. After assessing an application to determine if it is potentially harmful to a mobile network, server 3551 stores the assessment. In an embodiment, server 3551 notifies an administrator when a potentially harmful application is identified. For example, the notification may be in the form of an email or text message that contains information about the potentially harmful data object.

In an embodiment, server 3551 generates a web interface that displays applications that have been assessed as potentially harmful to a mobile network. The web interface may be designed to support a review workflow so that potentially harmful applications can be further analyzed by an administrator. After examining an application, the administrator may want to take remediation action in some cases while, in other cases, the administrator may want to take no action. If an administrator chooses to take no action, the application will not be considered potentially harmful unless its behavior significantly changes, triggering server 3551 to identify the application for re-review. In order to prevent multiple data objects for a given application being repeatedly identified as potentially harmful, if an administrator chooses to ignore an application, all versions of that application will also be ignored, as server 3551 can determine whether multiple data objects belong to the same application or other grouping.

If an administrator is aware of a potentially harmful application, he or she can take preemptive measures to avoid serious problems if the application is installed on more devices. In an embodiment, server 3551 generates a web interface allowing an administrator to take remediation actions for an application that is considered harmful. A variety of remediation actions are possible. For example, server 3551 may present an interface allowing the network administrator to communicate with the publisher of the application and work through a resolution for the harmful behavior. Server 3551 may extract the publisher's email address from marketplace data and allow a network administrator to type in a message via the server's web interface that server 3551 sends to the publisher. When server 3551 sends the email, the reply-to address in the outgoing email is specially set so that when the publisher responds, server associates the response with the initial message and publishes the response in the web interface for administrator to view and potentially continue the conversation. In an embodiment, server 3551 generates a web interface allowing an administrator to configure security software installed on a group of devices. For example, the administrator may wish to configure the security software to block the potentially harmful application or isolate the application so that it cannot communicate via a cellular network. If the administrator desires to block the application, server 3551 may use a variety of mechanisms, such as those disclosed herein to block the application from being installed on devices or to remove the application if it is already installed on devices. Because server 3551 can identify multiple data objects that correspond to the same application, if an administrator blocks an application, all data objects for the application are considered to be blocked. If an application that was potentially harmful is fixed in a subsequent version, server 3551 may allow the administrator to specify a range of versions of the application to block.

Because it may be desirable to prevent the download of undesirable applications, an embodiment is directed to server 3551 generating network infrastructure configuration data. For example, server 3551 may store a set of blacklisted data objects and be able to generate a set of intrusion prevention system or HTTP proxy rules. The rules may attempt to match identifiers used by mobile devices to download data objects from an application marketplace or to identify the content of undesirable data objects as they are transmitted across a network.

In an embodiment, server 3551 generates network infrastructure configuration data to block network traffic associated with undesirable applications. Server 3551 generates network infrastructure configuration rules that prevent network communication associated with undesirable applications by server 3551 using behavioral data for an undesirable application to characterize the network communications associated with the application and generating rules that block similar network traffic (e.g., traffic to the same IP address, subnet, or hostname). In order to prevent legitimate traffic from being blocked, server 3551 may analyze how unique the undesirable application's network traffic is relative to desirable applications and only block network traffic that is particular to the undesirable application. For example, if an application communicates with two servers, one which is a well-known server used by a variety of legitimate applications and another which is an unknown server only communicated with by this application, server 3551 would treat the unknown server as particular to the undesirable application.

After determining the appropriate network traffic to block, server 3551 generates firewall or other network configuration rules to block undesirable applications' network traffic. For example, if a malicious application is using a particular server to exfiltrate sensitive data from peoples' phones, behavioral data for the application may indicate the IP address, port, and protocol used to transmit the sensitive data. When an administrator wishes to block the malicious application's capability to steal data, he or she may see the list of servers the application communicates with and how many other applications known to server 3551 typically communicate with that server. The administrator then has the ability to choose which servers to block. After selecting the servers to block, server 3551 generates rules that block the network traffic. In an embodiment, sever 3551 makes configuration data, such as Snort® intrusion detection and prevention system rules, available for download via a web interface. In an embodiment, server 3551 is configured to directly connect with a network infrastructure management system to deploy configuration data.

Because an administrator may be primarily concerned with a particular network, an embodiment is directed to server 3551 producing both aggregate assessments and operator-specific assessments to identify potentially harmful applications and generating a user interface containing both. For example, if an application misbehaves only when running on a device connected to a particular type of mobile network, the aggregate behavioral data may be within normal bounds; however, the behavioral data for a particular network may be harmful. A network administrator may want to view the behavior of an application on the type of network he or she is administrating. Because individual mobile networks may treat different behavior as abusive, a user on server 3551 can configure the criteria for considering an application harmful to the network.

Figure 47:
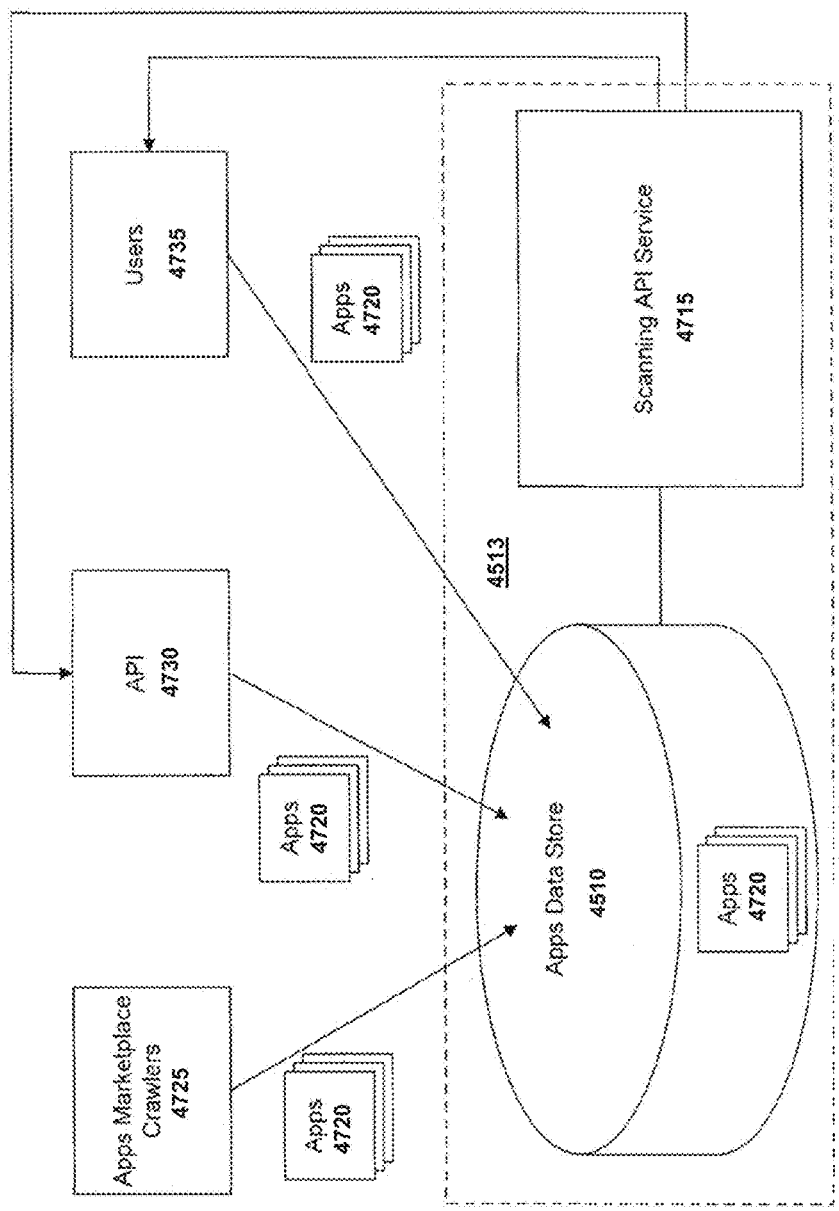
FIG. 47 is a simplified block diagram of a specific implementation of the Application Assessment and Advisement System.

FIG. 47 shows a block diagram of a specific implementation of the Application Assessment and Advisement System. In this specific implementation, a system 4705 includes a data store 4710 and a scanning application programming interface (API) service 4715. The data store stores a collection of application programs or apps 4720. The data store may receive the apps through app marketplace crawlers 4725, API submissions 4730, user submissions 4735, or combinations of these. In other words, apps in the data store or corpus can come from multiple sources, including, for example, apps submitted via API, crawling markets/web sites, submission from software on client devices, or combinations of these.

The scanning API service analyzes the apps stored in the data store and can report or otherwise make available the results of the analysis. The results may be returned programmatically or through an API interface, through a user interface, or both. Generally, having a data store or corpus that gets data from multiple sources (e.g., not only through API but also through crawlers) makes the corpus much larger and thus the system is able to provide good or better profiling results. The system is likely or more likely to have an app in the repository to avoid having to upload it when clients query the system. This can provide a faster response time and improved result data (e.g., correlations with other apps that may be similar or related, or changes in an app's characteristics over time that may tell a user whether or not to upgrade).

In various specific implementations, a submitter or requester can make an app scan request and receive result data for the app immediately in response or as a callback, or can request result data for an app. If an app has already been scanned, the scanning API service can look up the app by its identifier (e.g., hash of its contents) and provide the results. As discussed above, some examples of types of scan results data that may be provided include categorization (e.g., game, news, weather, social networking, pornographic, mapping, or file sharing), characterization (e.g., battery consumption, network consumption, etc.), metadata (e.g., where else has this app been seen, distribution data such as popularity and ratings, or authorship information), or security issues (e.g., malware, spyware, adware, vulnerabilities) detected in the app.

In a specific implementation, the scanning API service provides a technique that may be referred to as "continuous scanning." In this specific implementation, after an app is submitted, the service can "continuously" or "repeatedly" scan it (e.g., scan the app two or more times) and notify any registered callbacks if the scan result data changes. For example, if an app is good today, but references a server to control its functionality, and the app turns bad tomorrow as a result of the server changing, then the service detects this change (e.g., by running the app under dynamic analysis, by manual characterization, or both) and notifies the submitter's assessment update callback information.

The callback notification may depend on the type of scan result data change (e.g., minor change in battery use may result in no callback, new vulnerability found may trigger an email or URL callback, but an app being detected as malware may trigger a phone call, SMS message, email, and URL callback, and so forth). This helps to ensure that entities, such as app marketplace owners, do not unintentionally distribute malware. The system can provide information about an app before the app marketplace owner begins distributing the app, and can also provide a notification to the app marketplace owner when something new about the app is discovered during a scan.

Figure 48A:
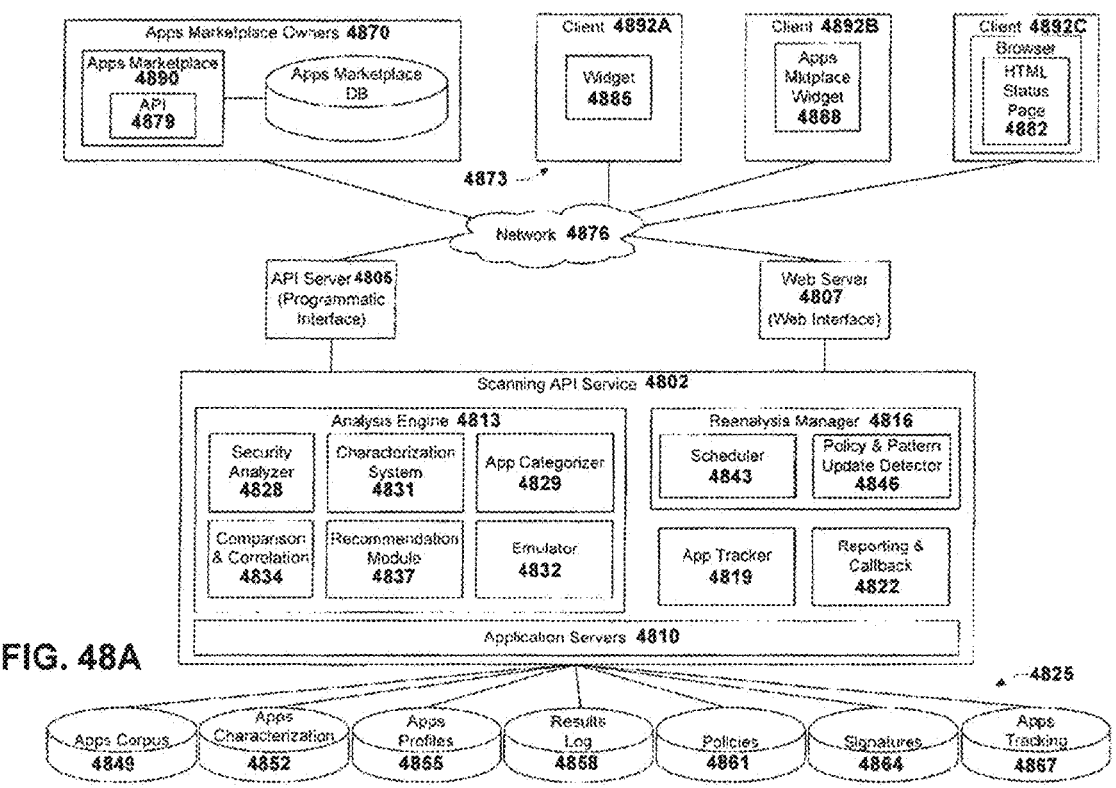
FIG. 48A is a more detailed block diagram of the system shown in FIG. 47.

FIG. 48A shows a more detailed block diagram of a system in which a scanning API service 4802 may be implemented. In a specific implementation, the system includes API servers 4805, and web servers 4807 coupled to application servers 4810 which host various components of the scanning API service. The service may include an analysis engine 4813, a reanalysis manager 4816, an app tracker 4819, and a reporting and callback engine 4820. Application servers 4810 may be coupled to database servers (not shown) to provide access to databases 4825 of the system. It is noted that the blocks in FIG. 48A are functional rather than structural so that it is possible to have many different hardware configurations that can perform the illustrated functions.

Analysis engine 4813 may include an app security analyzer 4828, an app categorizer 4829, an app characterization system 4831, an emulator 4832, a comparison and correlation module 4834, and a recommendation module 4837. Reanalysis manager 4816 may include a scheduler 4843, and a policy and pattern update detector 4846. Databases 4825 include one or more databases or repositories such as an apps corpus 4849, app characterization database 4852, app profiles database 4855, results reporting log 4858, policies database 4861, signature database 4864, and app tracking database 4867. Again, the current description is focused more on function components rather than particular instantiations.

App security analyzer 4828 may include a malware scanner to search an app in apps corpus 4849 for malware signatures. A malware signature is any matching criteria (such as a pattern of bytes present in the application, a hash or checksum of an application, an identifier for the application, identifying information for a cryptographic key used to digitally sign applications, etc.) that can determine whether an app is a certain type of malware or family of malware. These signatures may be stored in signature database 4864. If the scanner finds a match between a signature and an application, the system may categorize or classify the app as malware. If the scanner does not find such a pattern, the system may categorize the app as not malware or non-malware. Of course, the absence of these patterns is not necessarily, by itself, conclusive of whether the app is or is not malware. Similarly, other types of undesirable applications (e.g., adware, spyware) may be identified based on signatures in the signature database 4864.

App categorizer 4828 is responsible for categorizing the apps in apps corpus 4849. The app categorizer can help determine the category or categories that the app should be placed in. The app categorizer can search other data that may be associated with an app (e.g., metadata or marketplace metadata) to help categorize the app. For example, the categorizer may search a description associated with the app in order to determine whether the app should be categorized as news, entertainment, finance, sports, and so forth. The categorizer may be configured to search for key words in the description that may be indicative of the category to which the app should belong.

For example, an app description that includes words such as "stock," or "quote" may be mapped to the category "finance" and may indicate that the app should be in the finance category. The categorizer may search user behavior data associated with an app to determine what category the app should be placed in. For example, an app that, through its users, accesses servers associated with news web sites (e.g., www.nytimes.com, www.wsj.com, or www.latimes.com) as determined by the app's DNS requests or network connections may be categorized as "news." The behavior data may be determined via analysis on a server or may be gathered from devices, as described herein. Data gathered from devices may be stored anonymously to help protect and respect user privacy.

App characterization system 4831 analyzes behavioral data stored in app behavior database 4852 so that the app can be characterized. As discussed, behavioral data may include information about how an application interacts with or uses a mobile communications device's resources, such as memory, battery, network, storage, central processing unit (CPU), and the like. Behavioral data may include operations performed by an app, the degree to which an app performs an operation such as a number of times an operation is performed, the frequency with which an operation is performed, or combinations of these.

Some examples of operations that an app may perform include accessing a user's contacts or telephone directory, accessing a user's files stored on the mobile device, accessing the mobile device's global positioning system (GPS) unit to determine a location of the device, sending messages such as text or SMS messages that may include information from the contacts directory, the user's files, or the device's location, sending messages to a particular recipient, receiving messages, receiving messages from a particular sender, processing received messages, contacting internet servers or services, or accessing the mobile device's antenna. The processing of this type of behavioral data can be used to characterize particular apps.

In a specific implementation, the system gathers behavioral data by monitoring the app over a period of time (e.g., several hours, days, weeks, or months). The behavioral data may be collected from actual users of an app, from an emulator running the app, or both. Behavioral data may be collected from many users of an app such as dozens, hundreds, thousands, hundreds of thousands, or even millions of users. This allows a very accurate assessment of the behavior of an app because actual data from the field and from many different users is collected. The app characterization system can use the collected behavioral data to assess various attributes of an app such as an app's battery requirements. For example, an app's battery requirements may be determined by calculating an average battery usage across many users of the app.

Emulator 4832 represents a virtual mobile device, i.e., a software implementation of a mobile device that runs on a computer. The emulator allows an app to be analyzed in a simulated or virtual environment. Using the emulator to probe and test an app can be more cost-effective than purchasing the actual physical mobile device and installing the app onto the physical mobile device. The system can quickly provision a virtual mobile device with any desired configuration for running in the emulator. A configuration may be based a mobile device type or model (e.g., Android-based devices versus Apple iOS-based devices), operating system version, other apps installed on the virtual mobile device, and so forth.

The emulator can output a list of actions or operations that the app performed during emulation, the outcomes of the operations, events that occurred during emulation, or combinations of these. Some examples of actions or operations that an app may perform during emulation include invoking other apps, accessing the network, playing audio, playing video, making a call, sending a message, storing data, deleting data, copying data, retrieving data, or modifying data. The output from the emulator may be provided to app characterization system 4831 for characterization.

Comparison and correlation module 4834 can compare two or more apps to determine whether the apps are related, similar, or both. Apps may be similar if, for example, the apps have the same signer or package name, even though each app may be a different version. A technique to determine if two or more apps are similar include a content similarity analysis (e.g., how similar are the contents of the two files?). Content similarity can be based on static code analysis to determine program similarity. Based on the comparison and correlation module, recommendation module 4837 can provide recommendations of other apps that may be more desirable than the app for which an analysis was requested.

More particularly, in a specific implementation, a request is received for an analysis of a first app. A determination is made that the first app is similar to a second app. Based on a value of at least one attribute of the second app being different from a value of a corresponding attribute of the first app, the recommendation module recommends the second app. That is, the recommendation module may recommend or suggest that a user download, install, or purchase the second app instead of the first app, that an apps marketplace owner host the second app instead of the first app, or both.

In some cases, the second app is recommended based on the value of the at least one attribute of the second app being less than the value of the corresponding attribute of the first app. For example, in various specific implementations, the at least one attribute may be price where the price of the second app is less than the price of the first app. The at least one attribute may be app size or storage size (e.g., in megabytes) where the size of the second app is less than the size of the first app. The at least one attribute may be battery usage where the battery usage of the second app is less than the battery usage of the first app. The at least one attribute may be CPU load where the CPU load of the second app is less than the CPU load of the first app. The at least one attribute may be background CPU load where the background CPU load of the second app is less than the background CPU load of the first app. The at least one attribute may be vulnerabilities where a number of vulnerabilities of the second app is less than a number of vulnerabilities of the first app. The at least one attribute may be mobile device resource consumption where the mobile device resource consumption of the second app is less than the mobile device resource consumption of the first app. The at least one attribute may be likelihood of piracy where the likelihood of piracy of the second app is less than the likelihood of piracy of the first app. The at least one attribute may be a risk rating where the risk rating of the second app is less than the risk rating of the first app. For example, an app that has the capability to transmit a user's browser history may be determined to be more risky than an app that does not have the capability to transmit the browser history.

In other cases, the second app is recommended based on the value of the at least one attribute of the second app being greater than the value of the corresponding attribute of the first app. For example, the at least one attribute may be professionalism where the professionalism rating of the second app is greater than the professionalism rating of the first app. The at least one attribute may be popularity where the popularity rating of the second app is greater than the popularity rating of the first app. The at least one attribute may be reputation where the reputation rating of the second app is greater than the reputation rating of the first app. The at least one attribute may be application version where the version number of the second app is greater than the version number of the first app. The at least one attribute may be a stability rating (e.g., based on a number of application crashes) where the stability rating of the second app is greater than the stability rating of the first app. Further examples of app attributes are provided elsewhere in this patent application.

Some examples of specific techniques that may be used to compare two or more apps include a binary difference analysis, graph isomorphism algorithms, block comparison, symbolic execution, theorem proving, and others. Binary difference analysis measures the amount common binary code between two applications. High rates of common binary may indicate similar applications. Graph isomorphism measures how similar the structure of the possible executions graphs of two applications are. High rates of graph matching may indicate similar applications. Symbolic execution tracks the symbolic rather than actual parameters and internal values in an application. This allows simulations of the applications to understand when particular control paths will be taken. Programs that yield similar executions when presented with similar parameters may indicate similar applications.

A benefit of the comparison and correlation module is if a new app is submitted but it has not been fully analyzed (e.g., has not been run under dynamic analysis, no battery profiling data, or not enough behavioral data) such as in the case of a newly submitted app, the module can identify similar apps and use their scan result data to generate or provide substitute scan result data for the new app. Thus, scan result data can be based on similarity to other apps in the corpus. The scan result data for a given or newly submitted app may contain scan result data for that new app as well as information for a related app. For example, app security analyzer 4828 may analyze the new app and generate a list of security issues present in the new app, but characterization system 4831 may not provide battery characterization information because such characterization information may not yet be available. So, the system can provide the new app's list of security issues, but a related app's battery characterization information. If scan result data for a new app includes data for a related app, the system will note that the scan result data includes data for a different, but related app. For example, the new and related app may not be an exact match, but the two apps can be related based on being different versions, from the same developer, and so forth.

The output of the analysis engine may be included in an app profile to be stored in app profiles database 4855. In a specific implementation, each app in apps corpus 4849 is analyzed by the analysis engine to generate an app profile for the app. The analysis may include analyzing the app via app security analyzer 4828, categorizing the app via app categorizer 4829, analyzing the behavior via characterization system 4831, running and probing the app in a virtualized environment via emulator 4832, comparing the app to one or more other apps to determine relatedness via comparison and correlation module 4834, generating an alternative app recommendation via recommendation module 4837, or combinations of these.

Below is an example of an app profile that may be provided by the system. This example of the app profile is formatted as an XML document. It should be appreciated, however, that the app profile may be provided in or outputted using other formats (e.g., text format, or HTML format) .Further, an app profile may not necessarily include all of the app profile data shown below. That is, an app profile may include a subset of the app profile data shown below.

TABLE D

```
<Application name="AnApp" hash="ad3486958086868603458bc045">
<Capabilities riskRating="8">
<Capability name="ReadContacts" riskRating="3">
<Description>This application has the ability to read your contact list; however, in the past, it
has not transmitted your contact information to the Internet.
  </Description>
  </Capability>
  <Capability name="SendBrowsingHistoryToInternet" riskRating="8">
  <Description>This application has the ability to send your browser history to the internet.
  </Description>
  </Capability>
  <Capability name="SendPremiumSMS" riskRating="8">
  <Description>This application has the ability to send premium-rate SMS messages which
may result in charges to your phone bill.
  </Description>
  </Capability>
  <Capability name="SendLocationToInternet" riskRating="5">
  <Description>This application has the ability to send both your exact and approximate
location to the Internet.
  </Description>
  </Capability>
  </Capabilities>
  <Libraries riskRating="6">
  <Library name="adVendorLibrary">
  <Capabilities>
  <Capability name="SendLocationToInternet" riskRating="6">
  <Description>This application has the ability to send both your exact and approximate
location to adVendor, a mobile advertising network. adVendor states that it will only use this
location to serve relevant ads and does not archive or store it.
  </Description>
  </Capability>
  </Capabilities>
  </Library>
  <Library name="analyticsVendorLibrary">
  <Capabilities>
  <Capability name="SendIMEIToInternet" riskRating="4">
  <Description>This application has the ability to send a unique identifier for your device to
analyticsVendor. This identifier can be used to uniquely identify your device even if you
remove this application.
  </Description>
  </Capability>
  </Capabilities>
  </Library>
  </Libraries>
  <Behavior>
  <Event name="gpsLocation" frequency="10/day" averageDuration="60 secs" >
  <Description>This application uses GPS to locate your device on average 10 times per day
for about 1 minute each time.
  </Description>
  </Event>
  <Event name="notRespondingError" frequency="0.1/day" />
  <Event name="crash" frequency="0.2/day" />
  <Network>
  <Cell transmitSize="100 kB/day" receiveSize="12 kB/day"/>
  <WiFi transmitSize="190 kB/day" receiveSize="12 kB/day"/>
  </Network>
  <CPU>
  <Background always="true" time="2 min/day"/>
  <Foreground time="10 min/day"/>
  </CPU>
  <GPU time="0.2 min/day"/>
  <IO>
  <Background io="0.012 kB/sec"/>
  <Foreground io="1.3 kB/sec"/>
  </IO>
  <Memory>
  <Background pageFault="1.2/sec" contextSwitch="0.1/sec" proportionalSharedSize="10234
kB" uniqueSize="4123 kB"/>
  <Foreground pageFault="10/sec" contextSwitch="14/sec" proportionalSharedSize="12133
kB" uniqueSize="8013 kB"/>
  </Memory>
  </Behavior>
  <Privacy riskRating="8">
  <AdNetwork name="adVendor" riskRating="6" source="adVendorLibrary">
  <Description>This application displays ads provided by adVendor, a mobile advertising
```

TABLE D-continued

```
network. adVendor gathers your location in order to serve you relevant advertisements.
  </Description>
  </AdNetwork>
  <AdNetwork name="anotherAdVendor" riskRating="1" source="webview">
  <Description>This application displays ads provided by anotherAdVendor, a mobile
advertising network. anotherAdVendor does not recored any of your information in order to
serve you ads.
  </Description>
  </AnalyticsService>
  <AnalyticsService name="analyticsVendor" riskRating="4"
source="analyticsVendorLibrary">
  <Description>This application provides information to an analytics service run by
analyticsVendor. analyticsVendor records unique identifying information for your device.
  </Description>
  </AnalyticsService>
  <SharesData name="Location" riskRating="3" fromCapability="SendLocationToInternet">
  <Description>This application shares your location with Facebook, a social network. This
social network allows you to control who receives your location information.
  </Description>
  </SharesData>
  <SharesData name="BrowsingHistory" riskRating="8"
fromCapability="SendBrowsingHistoryToInternet">
  <Description>This application shares your browsing history with an unknown server on the
Internet. This server has not been evaluated for security or privacy practices.
  </Description>
  </SharesData>
  </Privacy>
  <Battery riskRating="7" backgroundCurrent="6.8 mA" foregroundCurrent="20 mA"
averageCurrent="7.5 mA">
  <Description>This application uses 10% of a typical device's battery per day.
  </Description>
  <CPU percentage="30" riskRating="5"/>
  <Network percentage="40" riskRating="7"/>
  <GPS percentage="25" riskRating="7"/>
  <GPU percentage="5" riskRating="4"/>
  </Battery>
  <Performance riskRating="3">
  <Description>This application will not noticeably affect your device's performance.
  </Description>
  <Memory riskRating="3"/>
  <CPU riskRating="2"/>
  <IO riskRating="1"/>
  </Performance>
  <Security rating="6">
  <Vulnerability severity="6" type="OutOfDateLibrary" name="libpng" cve="CVE-2011-
2690">
  <Description>This application contains an out of date library with a medium-severity
vulnerability.
  </Description>
  </Vulnerability>
  <Vulnerability severity="5" type="DataDisclosure" name="plantext_http">
  <Description>This application transmits data to a server without encryption, making it
susceptible to interception.
  </Description>
  </Vulnerability>
  </Security>
  <Quality riskRating="4">
  <Description>This application occasionally crashes.
  </Description>
  </Quality>
  <Authenticity riskRating="10">
  <Piracy likelyPirated="true" registeredAppSimilarityRating="10"/>
  </Authenticity>
  <Reputation>
  <Application averageUserRating="2.3" numberOfRatings="3123" popularityRating="2"/>
  <Developer piratesSoftware="true" writesMalware="false" numberOfApplications="200"
averageUserRating="2.1" numberOfRatings="100121" popularityRating="4"/>
  </Reputation>
  </Application>
```

Reanalysis manager 4816 is responsible for determining whether and when apps in the corpus or a particular app in the apps corpus should be reanalyzed. The reanalysis manager 4816 includes scheduler 4843 and policy and signature update detector 4846. The scheduler is responsible for selecting and scheduling apps for reanalysis and, in a specific implementation, for a dynamic analysis or emulation.

As a result of the reanalysis initiated by the reanalysis manager, an app previously categorized as non-malware may be re-categorized as malware. Without undergoing reanalysis, the app may remain categorized as non-malware or may not be categorized as malware when that is not an accurate characterization of the app at the particular moment of access by a user. Unsuspecting users may then continue to have and use these now-malicious apps on their mobile devices which may ultimately wreck havoc through identity theft, loss of information, and so forth. The reanalysis feature helps to catch malware developers who evade conventional analysis techniques by publishing benign apps which pass analysis, but then become malicious through, for example, reference changes at a server or receipt of malicious instructions. A well-managed re-analysis procedure reduces the instances where this type of evasive behavior is successful.

Figure 51:
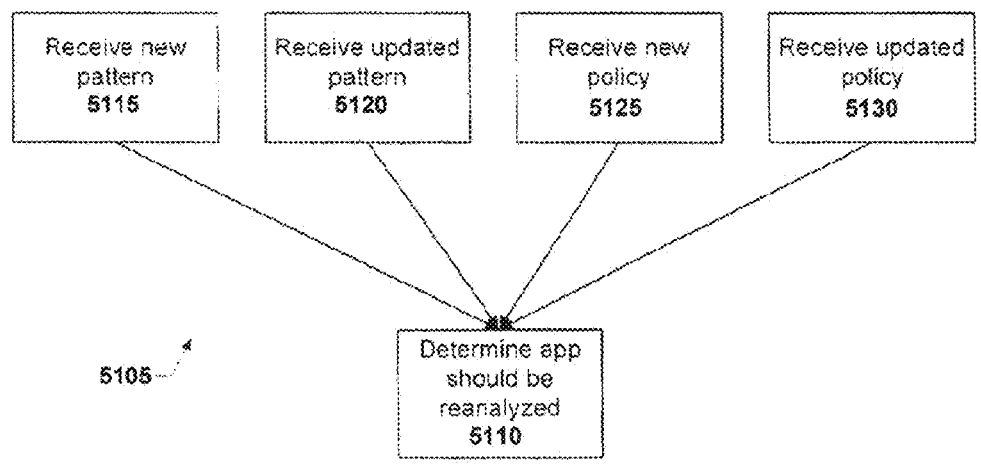
FIG. 51 is an exemplary flow diagram illustrating the steps for determining whether an application should be reanalyzed in an embodiment.

Policy and signature update detector 4846 can detect when a new malware signature has been created or added to signature database 4864, detect when an existing signature has been modified, edited, altered, or changed in the signature database, detect when a new policy has been created or added to policies database 4861, or detect when an existing policy has been modified, edited, altered, or changed in the policies database. The detector may poll the databases for changes, receive updates on changes via database triggers, or both. When, for example, a policy is changed or there is a new malware signature, the reanalysis manager can direct the analysis engine to reanalyze the apps corpus to generate new or updated app profiles. See FIG. 51 and accompanying description below for further details.

App tracker 4819 is responsible for storing in app tracking database 4867 records that can be used to identify a particular mobile device, and the apps installed on that particular mobile device. Such information may be gathered, with the mobile device user's consent, by a collection agent installed on the particular mobile device. Table E below shows an example of some information that may be stored in the app tracking database 4867.

TABLE E

| Mobile Device Number | Installed Apps |
|---|---|
| (415) 555-8675 | app A, app C, app K |
| (215) 555-0143 | app B, app F, app K |
| (650) 555-9843 | app A, app G, app Y |

As shown in Table E above, a first column lists contact information for a mobile device such as the mobile device telephone number. A second column lists the apps installed on the mobile device. Thus, the mobile device identified as or having the number "(415) 555-8675" includes apps A, C, and K. The mobile device having the number "(215) 555-0143" includes apps B, F, and K. The mobile device having the number "(650) 555-9843" includes apps A, G, and Y. The information shown in Table E above is merely an example of some of the information that may be stored. Other information that may be stored include mobile device type, operating system version, user notification preferences, and so forth.

The app tracker 4819 allows the system to send an alert or notification to the mobile device users if any of installed apps are found to be malicious. In some cases, the system may initially not have the app to analyze. For example, users 4735 (FIG. 47) may not have submitted the app to the system. When, however, the app is eventually submitted to the system, the system can analyze the app and, if a malware or other undesirable result is found, the system can send an alert to each user that may have that app installed on their mobile device.

An alert can be provided to both the entity (e.g., user) who submitted the app for analysis and to other entities (e.g., other users) who did not submit the app for analysis, but had the app installed on their mobile devices. For example, if the analysis engine discovers that app K is malware, the scanning API service can use the app tracking database to lookup which mobile devices have app K (i.e., mobile devices "(415) 555-8675" and "(215) 555-0143"). The system can then send alerts to these devices even if the system did not receive the app K from these devices to analyze. This proactive technique helps to provide protection benefits to many different users.

In a specific implementation a method includes storing a set of records, each record including contact information for a mobile device, and information identifying application programs installed on the mobile device. The method further includes after the storing step, receiving an application program to analyze, determining that the received application program includes malware, and transmitting an alert to each mobile device having the received application program installed on the mobile device. The contact information may be a mobile device phone number as shown in Table E above. Instead or additionally, the contact information may include an email address of a user of the mobile device or push notification identifier. The alert may be a text message, email, push notification, or any other type of notification. Notifications may be designed to be consumed by a user or administrator so they can take corrective action. A notification may also be designed to be consumed by software on a mobile device so the software can take corrective action with or without user intervention.

Reporting and callback module 4822 is responsible for reporting app analysis results data, logging the reporting in results reporting log 4858, and making callbacks if, for example, based on a reanalysis there is a change in an assessment of an attribute of an app.

Apps marketplace owners 4870 and clients 4873 can connect to the API scanning service through a network 4876 to receive apps analysis results. In various specific implementations, results are provided programmatically through an API interface 4879, an HTML status page 4882, a widget 4885, an apps marketplace widget 4888, or combinations of these.

An application programming interface (API) includes a set of rules and specifications that software programs can follow to communicate with each other. It serves as an interface between different software programs and facilitates their interaction, similar to the way the user interface facilitates interaction between humans and computers. Specifically, there may be an online apps marketplace 4890 (e.g., Android Marketplace, Apple App Store, GetJar, or Handango) executing on third party servers. The online apps marketplace accesses services and functions of the scanning API service via the programmatic interface provided by the API servers. In a specific implementation, the API is provided as part of an app marketplace owner dashboard. Through the dashboard, marketplace owners can see an app that they are being asked to distribute. Before the owner places the app on the marketplace, the owner requests an analysis of the app from the system. The system returns an assessment. Based on the assessment, the app marketplace owner may or may not decide to place the app in the marketplace.

As another example, clients such as clients 4892A and 4892B may include widget 4885 and apps marketplace widget 4888, respectively, which via API servers 4805 can programmatically access app analysis results provided by the scanning API service 4802. The widgets may be provided through a browser program at the clients. In another specific implementation, app analysis results are provided through a native application user interface or web page such as an HTML web page 4882 at a client 4892C. The web page may be provided by web servers 4807.

In a specific implementation, the API interface includes an HTTP API. In this specific implementation, a scan request is submitted e.g., POST/application_instance. The parameters may include an app download URL, app data, a scan completion callback URL, an assessment change email address, phone number, URL, or combinations of these. The app download URL or app data may be supplied in body raw or in a multi-part encoding. In some cases, an immediate scan result may be provided if such scan results are available. In a specific implementation, the system generates a first identifier for a previously submitted app based on, for example, a hash of the app data. The first identifier is associated with the scan results of the previously submitted app. Upon receipt of a newly submitted app, the system generates a second identifier for the newly submitted app by hashing the app data. The system compares the first and second identifiers. Matching identifiers can indicate that the previously submitted app and the newly submitted app are the same. The system can retrieve and immediately return the stored or cached scan results of the previously submitted app.

In other cases where the app has not already been scanned, there may be a callback after the scan finishes if the system is configured to operate asynchronously or the system may wait for the scan to finish before returning a result to the POST request if the system is configured to operate synchronously. The callback may be to a scan completion callback URL. The completion callback may be an HTTP POST to a user supplied URL that contains scan result data. The API can include the ability to get a scan result by an application identifier (such as a hash of the app data) e.g., GET/application_instance/abcdef01234567890. If scan result data is not immediately available because, for example, the app has yet to be analyzed, the system may provide status to indicate, for example, that the system is currently downloading the app for analysis, is currently analyzing the app, or both. The ability to get an app's scan result by its identifier allows the API to provide results for applications that have already been scanned without having to re-submit the app data (which may be large) every time.

In another specific implementation, an interface includes an HTML status page (e.g., /application_instances/abcdef01234567890). The status page may show scan result data. Some scan result data may be provided to users without cost or without requiring users to login. Other scan result data may be provided to users only after login or authorization. In other words, the service may have separate categories of data, such as a free and pro (or premium) and may require login for pro or premium data. Based on the analysis of the app by analysis engine 4813, the service may offer recommendations. For example, the service may offer an app or other purchase based on scan result data. For example, if scan result data of the app indicates that the app is malware, the service may offer an anti-malware app for download. If scan result data of the app indicates that the app consumes large amounts of battery power (e.g., is a battery abuser), the service may offer battery protection software. If scan result data of the app indicates that the app should be categorized as a game, the service may provide an advertisement for another game.

Figure 48B:
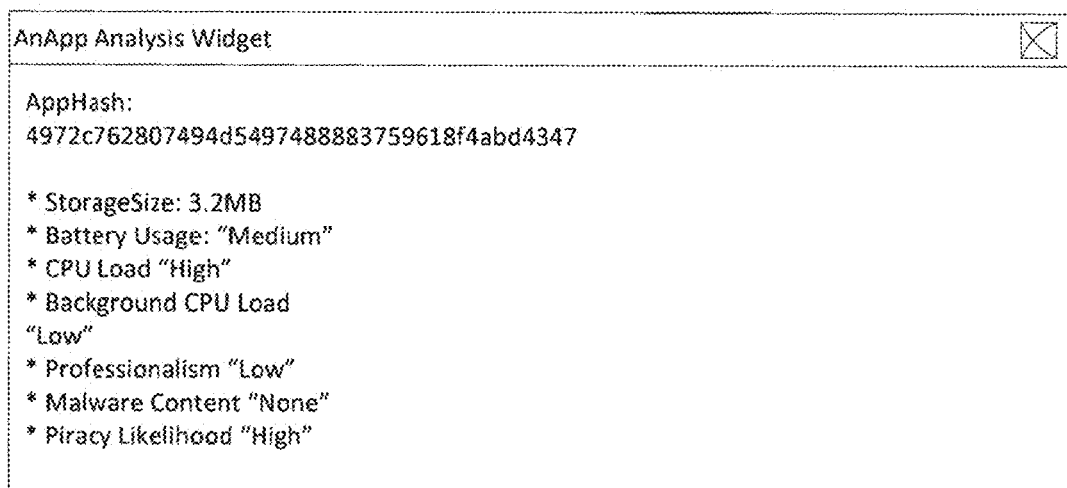
FIG. 48B shows an example of an app analysis widget.

In another specific implementation, an interface includes a widget. For example, the interface may be a web page having an integrated HTML/Javascript widget. In this specific implementation, the widget is configured to display information about a particular file hash that may be specified by a URL. A Javascript file is loaded from a URL (e.g., /application_instance/abcdef01324567890/widget) that contains the result data and code to programmatically construct the widget in the HTML pages it is loaded into. Alternatively, the result data may be provided in raw form without code to programmatically construct the widget, the calling code in the HTML page determining how to construct the widget. In either case, the browser retrieves result data associated with an application's hash or the URL where it is located and displays a widget. As an example, JSONP may be used to load the data dynamically. In another example, Javascript may dynamically augment download links (e.g., that are of a certain class being applied to links or that match a certain target URL), displaying result data about the application the link points to. In a specific implementation, the widget displays the message "Download now" and a visual representation (e.g., "Protected by Lookout"). The widget can request result data from the API (e.g., via an included Javascript file, JSONP, or just an image). If there has been no scan yet and the result data is being requested based on a target download URL, then the server may retrieve the application located at the download URL and the widget may wait for the result data to become available. A waiting indicator may show until there is a scan. FIG. 48B shows an example of an app analysis widget.

In this specific implementation, if there is a threat, the service warns a user before allowing the download by, for example, an interstitial in-window popup. This helps to offer security protection. Alternatively, clicking on the download link brings up an interface showing information about the app (e.g., permissions, security data, etc.) for a user to review. Some of the data may be "pro only" or "premium" and a user may be required to login with an account to view. Logging in may set a cookie on the user's browser so that they will see the "pro" or "premium" data across multiple download sites.

In another specific implementation, an interface includes a native mobile interface (e.g., integrated into an app store or online app marketplace). In this specific implementation, there is a UI widget that requests result data from the server or service. The server returns result data. UI widget displays result data summary (e.g., malicious/OK, or risk level). Tapping the widget displays full result information. Based on the result, the service may offer an action (e.g., purchase anti-virus, purchase battery protector, purchase a related application that is better on some result such as a different calculator app that uses less private data).

Figure 49:
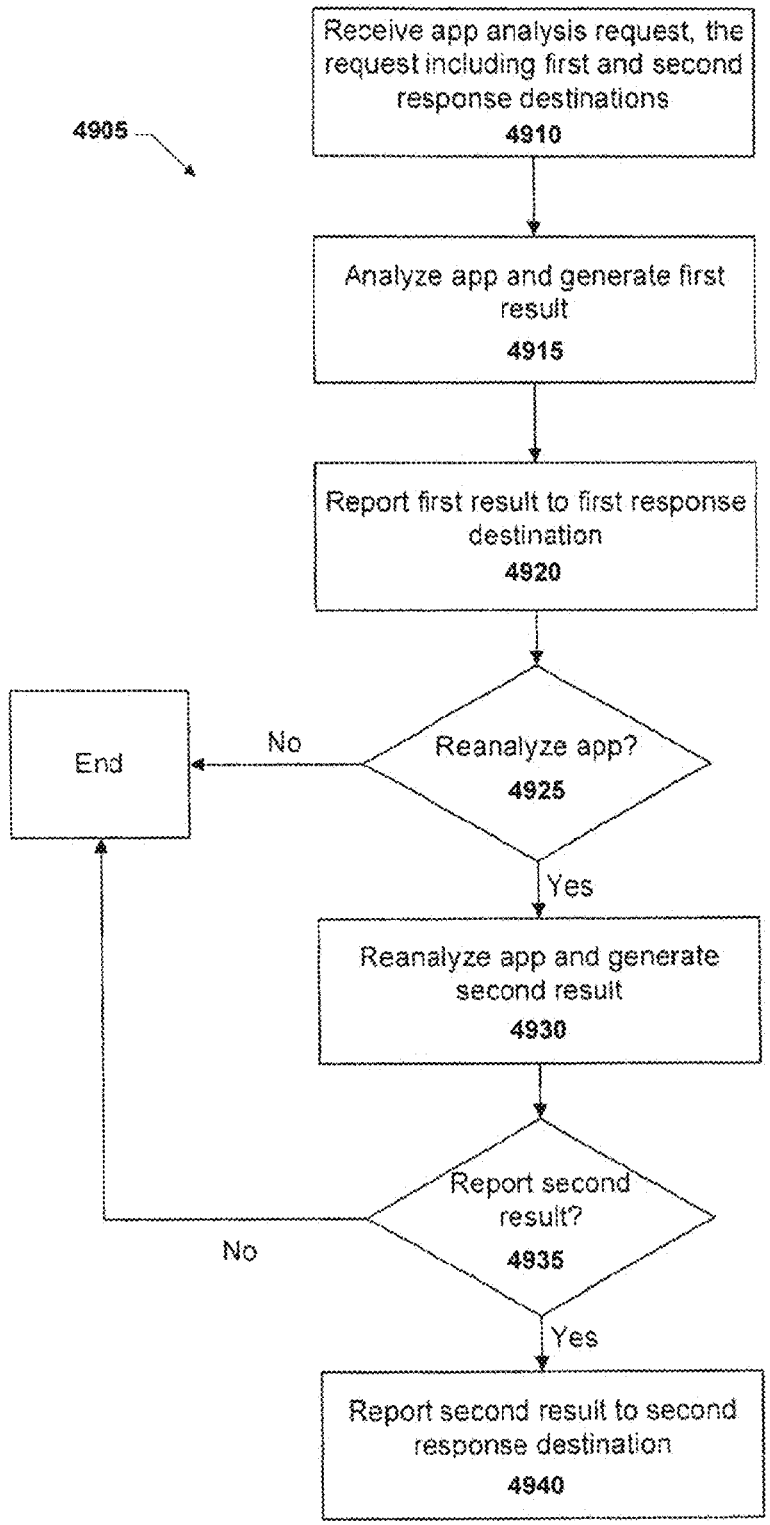
FIG. 49 is an exemplary flow diagram illustrating the steps for sending changes in assessment in an embodiment.

FIG. 49 shows an overall flow 4905 of an embodiment of the scanning API service. Some specific flows are presented in this application, but it should be understood that the techniques are not limited to the specific flows and steps presented. There can be additional steps (not necessarily described in this application), different steps which replace some of the steps presented, fewer steps or a subset of the steps presented, or steps in a different order than presented, or any combination of these. Further, the steps in other implementations may not be exactly the same as the steps presented and may be modified or altered as appropriate for a particular application or based on the data. Moreover, the functionality may also be distributed amongst hardware configurations that are different in structure from the configuration shown in the FIG. 49.

In a step 4910, the scanning API service receives a request for an analysis of an app. The request includes first and second response destinations. In a step 4915, the service analyzes the app and generates a first scan result. In a step 4920, the first scan result is reported to the first response destination specified in the request. In a specific implementation, the request is received (step 4910) before the service analyzes the app (step 4915). For example, the app may not yet be in apps corpus 4849 (FIG. 48A) for the scanning API service to analyze. In other words, in this specific implementation, after a request to analyze the app is received, the service analyzes the app.

In another specific implementation, the service analyzes the app (step 4915) before the request is received (step 4910). In other words, after the service analyzes the app, a request for an analysis of the app is received. For example, before the request to analyze is made by a user, the crawler 4725 (FIG. 47) may download the app into apps corpus 4849 for the scanning API service to analyze. This crawling allows the service to quickly return the analysis results after receiving an analysis request from a user because the app will have already been analyzed. The entity (e.g., user or requesting application) does not have to wait while the service analyzes the app because it has already done so.

An initial request for an analysis of an app may include an identifier for the app so that the app can be identified. The identifier can be any value or combination of values that helps to identify an app or distinguish one app from another app. For example, the identifier may include a package identifier or title of an app. In a specific implementation, the identifier includes a value that is a hash of the app. The value may be generated using a hash function (e.g., MD5, or SHA-1 hash function) and the app data itself may be omitted from the initial request. This allows the size of the initial request to be kept small and lightweight which can help to reduce network congestion.

The scanning API service upon receiving the initial request can use the identifier to lookup any scan result data for the app. If scan result data cannot be found (e.g., the app is not in the apps corpus), the system can include in a response to the initial request an indication for the requesting entity to supply the app or an address (e.g., URL) that identifies a location from which the service can retrieve or download the app. Thus, a request for analysis of an app may or may not include the app data or a URL where it can be downloaded from as a part of the request.

In a specific implementation, the app analysis request includes first and second response destinations. The first response destination specifies the location to which the scanning API service should return analysis results. The second response destination specifies the location to which the scanning API service should return reanalysis results (e.g., assessment changes). A response destination may include a Uniform Resource Identifier (URI), Uniform Resource Locator (URL), email address, phone number, or combinations of these. For example, a URL may reference a server that will perform actions, such as automatically removing applications identified as malware from an application market when the URL is requested. The server may be implemented in a variety of ways, including a PHP script or a Java, Ruby, or Python application server.

The first response destination may be the same or different from the second response destination. This allows the requesting entity or requester to specify the same or different destinations for receiving analysis and reanalysis results. For example, a requester's process or backend process for managing reanalysis results may be different from the process or backend process for managing first or previous analysis results. Thus, a first response destination may include a URL and the second response destination may include a phone number. A first response destination may include a first URL and the second response destination may include a second URL. The second URL may be the same or different from the first URL. In a specific embodiment the service may provide default settings for the destination information for the first response and the second response. The service may also provide as part of the user interface a series of options for delivery of the first and second responses. Alternatively (and possibly simultaneously), the system can provide the user with the capability to configure the response destination configuration for the first and second responses.

Figure 50:
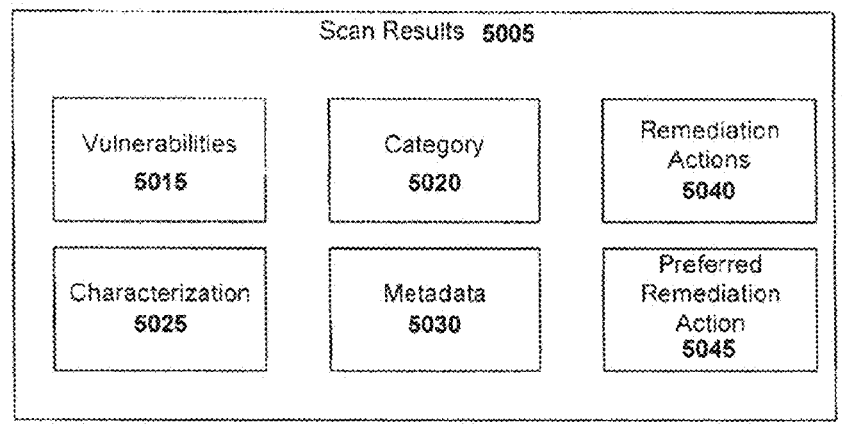
FIG. 50 is a block diagram of result types.

In step 4920, the first scan result is reported to the first response destination. As discussed above, in a specific implementation, the scan result is reported programmatically through an API to a callback URL specified in the request. In another specific implementation, the scan result is reported to a user interface such as to HTML status page 4882 (FIG. 48A). FIG. 50 shows a block diagram of various types of scan results 5005 that may be reported. A scan result may be an assessment of various attributes or properties of an app. As shown in FIG. 50, a scan result may include security issues 5015, an app category 5020, characterization 5025, and metadata 5030, a set of remediation actions 5040, or a single or preferred remediation action 5045.

In a specific implementation, the scan results are provided in an app profile. It should be appreciated, however, that a profile may not necessarily include all the scan result types shown in FIG. 50. A profile may include any combination of the scan results shown in FIG. 50. For example, a profile may include security issues 5015, and remediation actions 5040 and 5045 may be omitted from the profile. A profile may include the category 5020 that the app should belong to, and characterization 5025, metadata 5030, or both may be omitted from the profile. The amount of information present or not present in the profile may also be determined by the user's status as a subscriber or not, as a premium subscriber or not, etc.

In a specific implementation, the type of scan result provided by the scanning API service is based on factors such as whether the requesting entity is a paying or non-paying entity, whether the entity is or is not logged in, a number of previous requests made by the entity, a time of the request, the availability of the scan result data, or combinations of these. For example, an app marketplace owner who is a paying customer may receive vulnerabilities 5015 and characterization 5025. An app marketplace owner who is a non-paying customer may receive security issues, but not characterization information.

In another embodiment, the system may provide users with a certain number of complete scan results for free or without charge, provide a certain number of complete scan results for a specific time period without charge, or both. For example, an app marketplace owner who has requested less than a threshold number of requests may receive security issues 5015 and characterization 5025. An app marketplace owner who has requested more than the threshold number may receive security issues 5015, but not characterization 5025 or the more frequent user has to pay consideration for an upgrade in service. This allows the app marketplace owner to receive some trial results in order to evaluate the benefits provided by the scanning API service without making a large investment.

In some cases, such as with new apps, the system may have security issues 5015, but not characterization 5025 because characterization analysis may take longer to perform than a security analysis. So, in a specific implementation, the system may provide security issues 5015 and characterization 5025 separately. A benefit of this feature is that the requester does not have to wait for the characterization to be completed in order to receive the vulnerabilities. For example, security issues may be provided while app characterization system is analyzing behavioral data. Thus, characterization may be provided after security issues are provided. Characterization may be provided in a transmission or operation separate from the security issues. The characterization may be provided via a callback URL specified in the request. A requesting entity may receive security issues before receiving characterization. That is, the requesting entity may receive characterization 5025 after security issues 5015 have been received.

Security issues 5015 may include an identification of the security issues, a number of the security issues, coding flaws, a number of coding flaws, or combinations of these. In a specific implementation, characterization system 4828 provides a list of the app's permissions. Specifically, some apps such as Android apps can access features or data on a mobile device by declaring certain permissions. For example, an Android app that monitors incoming SMS messages would specify:

TABLE F

<manifest xmlns:android="http://schemas.android.com/apk/res/android"
package="com.android.app.myapp" >
<uses-permission android:name=
"android.permission.RECEIVE_SMS" />
...
</manifest>

As other examples: "android.permission.ACCESS_FINE_LOCATION" allows an application to access fine (e.g., GPS) location, "CALL_PHONE" allows an application to initiate a phone call without going through the Dialer user interface for the user to confirm the call being placed, "READ_CONTACTS" allows an application to read the user's contacts data—just to name a few examples. The Android Developers Reference for Android 3.2 r1, Sep. 22, 2011, available at <http://developer.android.com/reference/android/Manifest.permission.ht-ml>, which is incorporated by reference, includes an extensive list of permissions which the scanning API service may identify when analyzing an Android app.

Characterization 5025, as previously discussed, includes an analysis of app behavioral data such as measurements of app battery consumption, network consumption, and so forth.

Category 5020, as previously discussed, indicates the category in which the app should be placed in (e.g., game, news, weather, social networking, pornographic, mapping, file sharing, and so forth). In a specific implementation, a scan result includes categorization for the app such as contains a particular ad network or uses a particular analytics system. Third party ad networks and analytics systems provide features which app developers may integrate into their apps. An app having integrated ad network features may display advertisements such as text and image ads inside the app (e.g., in-app advertising).

The app developer may receive compensation or payment for including ad network features in the app. Some examples of ad networks include Madvertise, BuzzCity, Adfonic, Admoda/Adultmoda, Mojiva, InMobi, AdMob, Hunt Mobile Ads, Millennial Media, Greystripe, Madhouse, Jumptap, Mobile Theory, YOC Group, Hands, NAVTEQ Media Solutions, Microsoft Mobile Advertising, Advertising.com/AOL, and many others. Analytics systems can track how the app is being used such as how long, when, and where the user used the app. These are merely a few examples of some of the metrics that an app using an analytics system may collect. App users may be concerned about the privacy issues related to advertising and tracking of consumer data through such mobile applications. Some ad networks and analytics systems may gather more detailed and personal information than others. Thus, it is desirable to identify, if any, which ad network, analytic system, or both an app uses.

Metadata 5030, as previously discussed, may include an identification of other places (e.g., other online marketplaces) where the app is available, app distribution data such as popularity and ratings, authorship information, the cost of an app, the cost of an app in a particular marketplace, or combinations of these.

Remediation actions 5040, as previously discussed, may include dynamic network protection data (e.g., block these hosts or IPs), information about how to block the app (e.g., signatures), or both. In a specific implementation, a result includes two or more remediation actions. For example, if there are multiple options, the system can transmit all of the options with the API consumer determining which to use. In another specific implementation, a result includes a single or preferred remediation action 5045. That is, the system can determine which to send to the API consumer (sending only a preferred remediation action). For example, a system may look up a classification for the user and phone trying to load an application in a central database. The system may choose a block remediation action if the user is classified as a juvenile and a user warning otherwise. That is, the type of remediation action provided may be based on a user profile. For example, in a specific implementation, an app is analyzed and a determination is made to provide a remediation action based on the analysis. If a user profile of a user of the app indicates the user's age is less than a threshold age, a first remediation action is provided. If the user profile indicates the user's age is greater than the threshold age, a second remediation action is provided, different from the first remediation action. The user profile may be stored at the mobile device or at a location remote from the mobile device such as at a server of the system.

In a specific implementation, an app analysis result includes an overall severity or security assessment. For example, the "safeness" of an app may be ranked along a safety or severity scale. A rating of 1 on the scale may indicate that the app is very safe. A rating of 10 on the scale may indicate that the app is very dangerous (e.g., is malware). Thus, in this example, the "safeness" of the app may range from 1 to 10. A benefit of the scale is that the system can provide more accurate or detailed assessments as compared to a binary assessment where an application is considered either safe or not safe. That is, the scale can reflect that some apps may be more malicious than other apps. For example, an app that transmits a user's passwords may be considered more malicious than an app that deletes directory information. In another specific implementation, however, the system provides binary assessments because in other cases users may prefer simple or "yes/no" type answers (e.g., is this application safe or not?).

Referring now to FIG. 49, in step 4925, the scanning API service determines whether apps in the corpus or a particular app in the corpus should be reanalyzed. In a specific implementation, as shown in a flow 5105 of FIG. 51, a determination 5110 that an app should be reanalyzed is based on factors including receiving a new malware signature 5115, receiving an updated malware signature 5120, receiving a new policy 5125, receiving an updated policy 5130, or combinations of these. In a specific implementation, the app that is reanalyzed (step 4930) is the same app that was initially analyzed (step 4915). That is, the app referred to in step 4915 is the same app (or application binary) referred to in step 4930 rather than the app being a modified version. In this specific implementation, determining whether or not to reanalyze the app is based on factors that are external to or independent of the application code. In another specific implementation, reanalysis of the app (step 4930) is based on the app being a modified version of the app initially analyzed (step 4915).

As described in the discussion accompanying FIG. 48A, a malware signature can be used to identify malicious application code. Security analyzer 4828 can include a malware scanner to scan an app and compare code in the app against the malware signature. A string of bits or binary pattern found in the code that matches a pattern in the malware signature may indicate that the app includes malware. A signature may be updated, a new signature may be created, or both as new malware is discovered. Reanalyzing the apps corpus when there is an updated or new pattern helps to ensure that apps in the corpus are properly classified based on the latest malware information.

A policy can include one or more rules which specify how an app should be categorized, how an app should be characterized, or both. For example, a policy on battery characterization can specify that apps having a battery usage rate or consumption greater than a threshold value should be characterized as having heavy battery usage requirements. In some cases, such a policy may be updated. For example, it may be desirable to change the threshold value at which app is characterized as having heavy battery usage requirements because of improvements in battery capacity and technology. When the policy is updated, the reanalysis manager may direct the analysis engine to reanalyze the apps in the corpus so that the battery characterizations for the apps may be updated in accordance with the updated policy. A policy can be an arbitrary model, created by a human, or as a result of a machine learning system.

Based on the determination in step 4925, in step 4930, the app is reanalyzed and a second scan result is generated. In step 4935, the system determines whether the second scan result should be reported. In some cases, the second scan result is reported (step 4940). In other cases, the second scan result is not reported. For example, if the second scan result is the same as the first scan result, the second scan result may not be reported because there has not been any change. Alternatively, the second scan result may be reported even if the scan results are the same so that the app analysis requestor can receive a status update that there has been no change in assessment.

If the second scan result is different from the first scan result, the second scan result may or may not be reported. For example, if the difference between the first and second scan results is minor (e.g., a minor change in an app's battery usage), the second scan result may not be reported. If however, the difference between the first and second scan results is significant (e.g., first scan result indicated app does not include malware, second scan result indicates app includes malware), the second scan result may be reported.

More particularly, in a specific implementation, the system makes and reports a first assessment of an attribute associated with an app. The attribute may include application data such as behavioral data discussed above. The system reanalyzes the app and makes a second assessment of the attribute. Based on a difference between the second and first assessments, a type of the attribute, or both the second assessment is or is not reported.

For example, in a specific implementation, the type of attribute indicates whether the app is or is not malware, the first assessment of the attribute indicates the app is not malware, and the second assessment indicates the app is malware. In this specific implementation, the second assessment is reported.

In another specific implementation, the type of attribute is battery usage, the first assessment of the attribute indicates a first battery usage rate. The second assessment indicates a second battery usage rate. If the difference or absolute difference between the second and first battery usage rates is less than a threshold value, the second assessment is not reported. If the difference is greater than the threshold value, the second assessment is reported.

In another specific implementation, the type of attribute is vulnerabilities, the first assessment of the attribute indicates a first set of vulnerabilities. The second assessment indicates a second set of vulnerabilities. At least one vulnerability in the second set is not in the first set, the at least one vulnerability being a new vulnerability. The second assessment is reported.

As shown in step 4940, the system can send changed assessment results to the second response destination specified in the request. As previously discussed, the second response destination may be the same or different from the first response destination. In a specific implementation, a request includes two or more second response destinations. The system selects which of the two or more second response destinations to send the result based on the severity of the change in assessment. For example, if the change includes finding a new vulnerability in the app, a selected second response destination may be an email. If, however, the change includes finding malware in the app, a selected second response destination may be a phone call, SMS message, email, URL callback, or combinations of these. This type of notification scheme helps to provide, for example, immediate notification of critical security issues so that administrators can respond to the critical security issues first before addressing less critical security issues.

Thus, if the analysis process changes because there is a new heuristic, a new set of signatures, policy changes, or combinations of these the system can reprocess the entire apps corpus, look for any changes in assessment, and notify publishers if the assessment on something changes. For example, heuristics, signatures and policy changes may be added to the system by the organization maintaining the system. The system can be configured to rescan the corpus manually at operator request or to trigger the rescan whenever the heuristics, signatures or policies change. The rescan may or may not depend on user profile.

Figure 52:
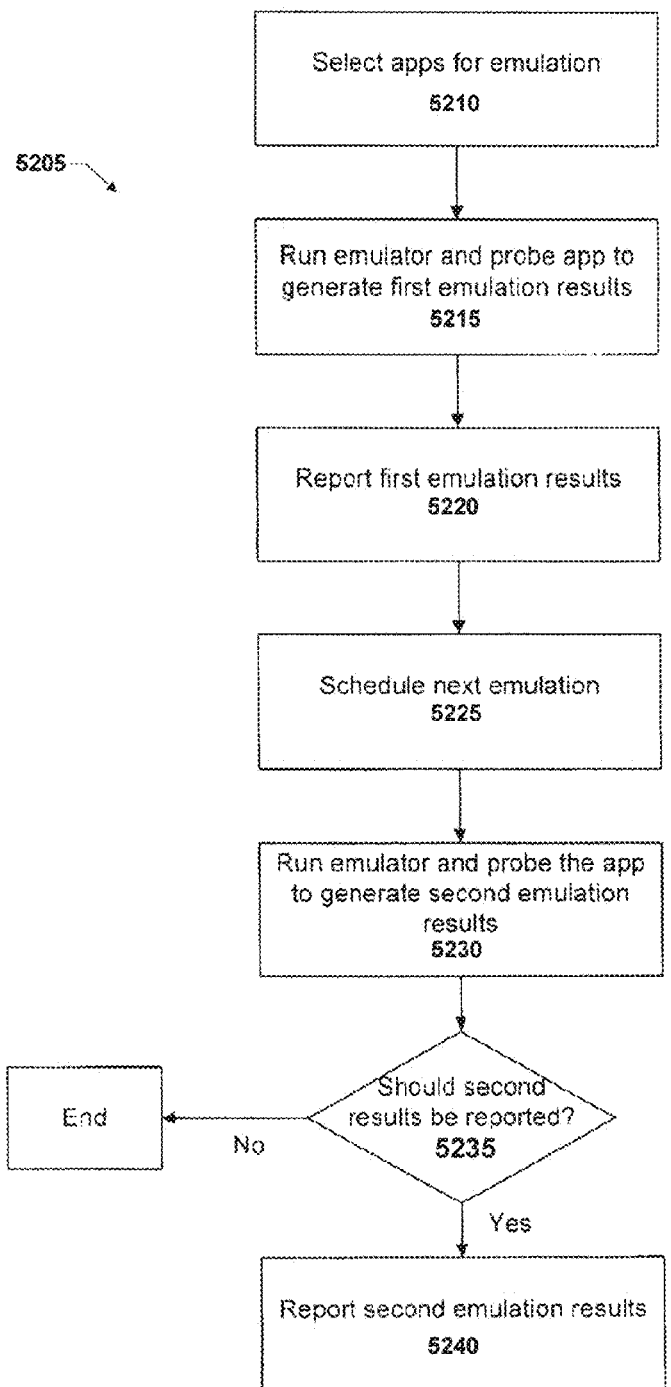
FIG. 52 is an exemplary flow diagram illustrating the steps for application emulation in an embodiment.

FIG. 52 shows a flow 5205 for analyzing apps in emulator 4832 (FIG. 48A), a process that may be referred to as dynamic analysis. As previously discussed, during emulation, the app can be probed and its operations can be monitored. Emulation can be beneficial in cases where an app includes a reference to a server which controls the functionality of the app. In some cases, a change at the server can cause the app to perform undesirable operations, e.g., send spam to all contacts in directory. As another example, a benign app may be designed to receive malicious instructions that cause the app to perform undesirable operations. By monitoring applications over time, an adverse application that manifests itself after a period of time can be detected.

In a step 5210, the system selects one or more apps from the apps corpus for emulation. In a step 5215, the emulator is run and the one or more apps are probed to generate first emulation results. Emulation durations may vary greatly depending on factors such as the particular app attribute or time-based attribute being assessed, the complexity of the app, and so forth. Generally, longer durations can provide more accurate results, but it is also desirable to provide results as soon as possible. Durations for which a particular app may be run within the emulator can range from about a few minutes to a few hours, including, for example, 1, 2, 3, 4, 5, 10, or 24 minutes or 1, 2, 3, 4, or 5 hours. In some cases the duration may be less than 1 minute or greater than 5 hours.

In a step 5220, the system reports the first emulation results. In a step 5225, a next or subsequent emulation is scheduled. In a step 5230, the emulator is rerun and at least a subset of the one or more apps is probed to generate second emulation results. In a step 5235, the system determines whether the second emulation results should be reported. Based on the determination, in a step 5240, the second emulation results are reported.

In a specific implementation, emulation is a subprocess of the app analysis and result reporting shown in FIG. 49 and described in the discussion accompanying FIG. 49. For example, analyzing the app (step 4915) may include probing the app in the emulator. Reporting first results to the first response destination (step 4920) may include reporting the first emulation results to the first response destination. Determining whether second results should be reported (step 4935) may include determining whether second emulation results should be reported. In another specific implementation, the emulation results or output from the emulator is provided as input to app characterization system 4831.

Selecting and scheduling apps for emulation may be based on factors, rules or policies including application or characterization data such as app functionality, behavior, reputation, capabilities, app popularity, app release date, or combinations of these. For example, apps having lower trust ratings than other apps may be selected over the other apps for emulation or may be scheduled for more frequent emulations than the other apps. Apps that are more popular than other apps may be selected over other apps that are less popular. Apps having later release dates may be selected over other apps that have earlier release dates or vice versa (e.g., exponential decay: when an app is initially released there may be frequent reanalyses, but as the time from the release date grows longer, the frequency of the reanalyses decreases). Apps having more extensive or dangerous permissions may be selected over other apps having less extensive or dangerous permissions. Emulations may be scheduled, for example, hourly, daily, or weekly.

Figure 53:
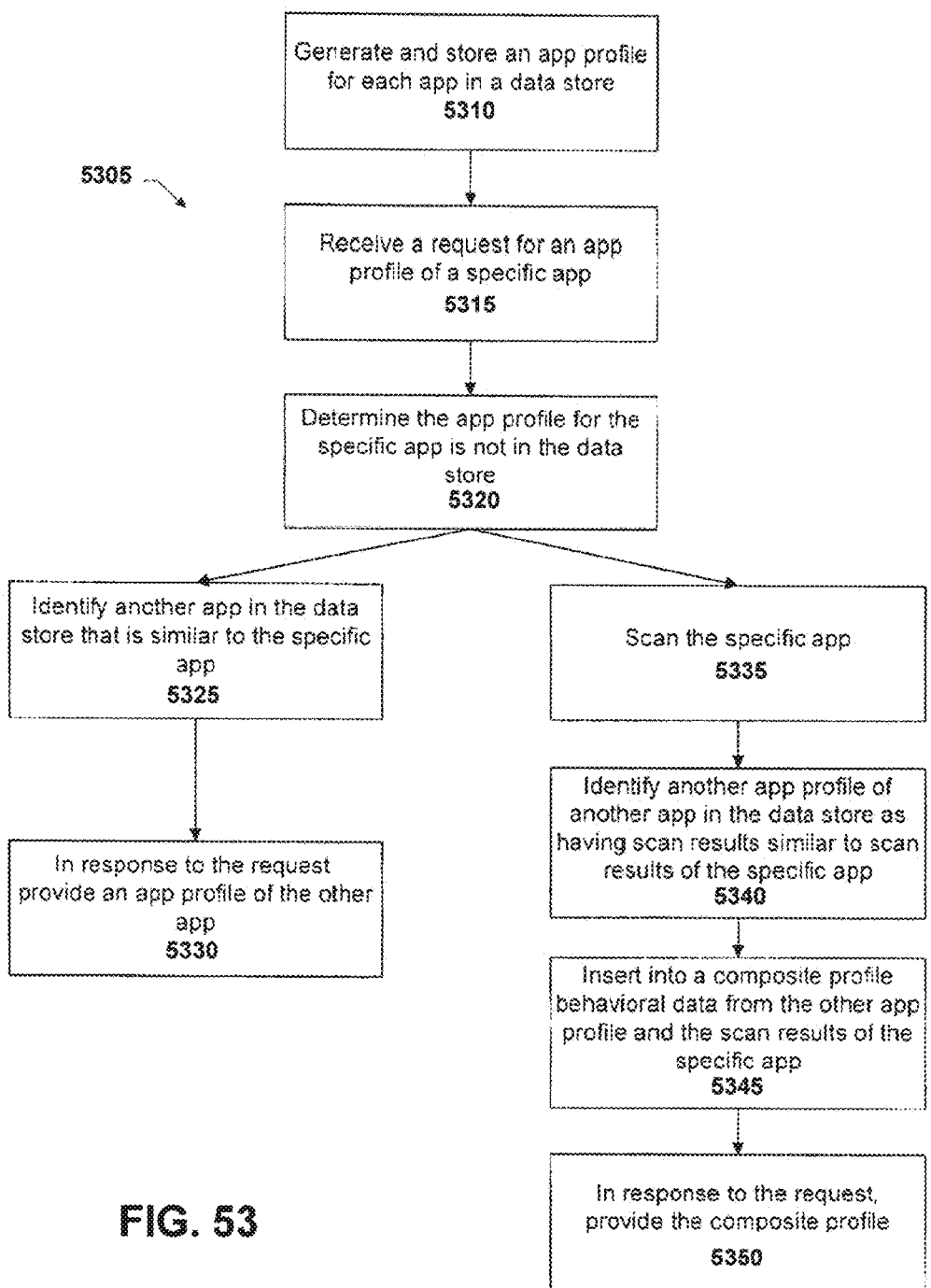
FIG. 53 is an exemplary flow diagram illustrating the steps for providing a substitute application profile.

FIG. 53 shows a flow 5305 of a specific implementation for providing a substitute app profile if the specifically requested app profile is not in app profile database 4855. In a step 5310, the system generates and stores an app profile for each app in the apps corpus. Generating the app profiles may include analyzing the apps using analysis engine 4813 (FIG. 48A). In a step 5315, the system receives a request for an app profile of a specific app. The request may be received in a manner similar to receiving an app analysis request (step 4910—FIG. 49).

In a step 5320, the system determines that the app profile for the specific app is not in the app profile database. In this specific implementation, the system can return a substitute app profile. The substitute app profile may be the profile of a similar or related app (see steps 5325-5330) or a composite profile (see steps 5335-5350). Returning a substitute app profile provides the requester with at least some relevant information concerning the specific app. If some information about the specific app is available, but other information is not available, the unavailable information may be drawn from a substitute app profile to form a composite app profile. If no relevant information about the specific app is available a substitute app profile may be returned.

Referring to the flow in steps 5325-5330, in a step 5325 the system may identify another app in the app data store that is similar to the specific app. Any suitable technique may be used for determining similarity. In a specific implementation, the system compares the app signer and package of the specific app with the app signer and package of one or more other apps. In this specific implementation, if the signers and packages match, the system determines that the apps are similar even though the apps may be of different versions. Below is an example for correlating apps based on signer and package.

TABLE G

| Application | Signer | Package | Version |
| --- | --- | --- | --- |
| App A | Cindy | Pkg5 | 3.0 |
| App B | Ben | Pkg1 | 2.6 |
| App C | Joe | Pkg6 | 2.0 |
| App B' | Ben | Pkg1 | 2.7 |

The above table G shows a few entries of app data from apps profiles database 4855. To simplify explanation, only a selected subset of data fields in each entry is shown in the table. Given a specific app "App E" having a signer "Ben" and package "Pkg1" the system can correlate App E to Apps B and B' based on each app having the same signer and package. In this example, related Apps B and B' are of different versions. In a specific implementation, the system selects the highest or latest version of a related app that has the desirable profile information. This helps to ensure that the system provides the most up-to-date profile information available. In this example, the profile for related App B' would be provided in response to the request for the App E profile (step 5330).

In another specific implementation, the system performs a content similarity analysis to determine how similar or the degree of similarity between the contents of the two files (i.e., the specific app and the other app). In a specific implementation, content similarity is based on a static code analysis to determine program similarity.

In another specific implementation, another app is related to the specific app if both apps are the same with different packaging (e.g., Amazon DRM, or resigned app), or apps correlated to malware but not actually malicious themselves.

The system can compare the specific app with a first app in the apps corpus and determine that both apps are the same even if one of the specific app or first app has been packaged with a particular app packaging tool and the other of the specific or first app has not been packaged with the tool. A package may include a license, license text to explain to a user the purpose of the license, digital rights management (DRM) objects such as controls, controllers, protectors, encryption, app usage rules or conditions, installer, publisher name, signature, and the like. Different packaging may refer to different types of installers, different publisher names, different signatures, or combinations of these.

A technique to determine relatedness may include correlation of publisher, authorship, publisher accounts, signing keys, or combinations of these. The system may compare the publisher of the specific app with the publishers of other apps in the apps corpus to determine whether there is a match. This can help to inform the results returned for the specific app. For example, there may be a case where although the specific app does not include malware, that other apps from the same publisher do include malware. The system may advise that caution be used when providing or downloading the specific app.

More particularly, in some cases, the system will provide an app profile of a related app even if there is an app profile for the specific app. The app profile of the related app may be provided in addition to or instead of the app profile for the specific app. One example of a scenario where this may occur is if the specific app is correlated to known bad apps (e.g., malware). An app may be suspect if it is correlated to known bad apps. Consider the following example, a specific app is not malware, but there is an app classified as malware that is from the same developer as the specific app. In this case, the specific app may be suspect because although it may not be classified as malware, it is from a developer who has published malware in the past. It may then be desirable to provide the app profile of the related app that is malware, a warning notification that the specific app is from a developer known for publishing malware, or both. Thus, in a specific implementation, the system may determine that although two apps are not similar, the two apps are related because they are from the same developer (or signer or publisher) where one of the apps is malware.

In a step 5330, in response to the request for the app profile of the specific app (step 5315), the system provides the app profile of the other app that is similar or related to the specific app.

Referring now to steps 5335-5350, if the app profile of the specific app is not in the app profile database or the app's profile does not contain all of the required information, the system may instead or additionally provide a composite profile. More particularly, in a step 5335, the system scans the specific app and generates scan results. For example, an analysis of the app may include scanning the app using a malware scanner of security analyzer 4828. The system compares the scan results of the specific app with scan results of one or more other apps in the apps corpus. In a step 5340, based on the comparison, the system may identify another app profile of another app in the apps corpus as having scan results similar to the scan results of the specific app. In a specific implementation, the system compares the sequence of computer calls each app program can make. If the sequences are similar enough (e.g., there is a high degree of similarity), the system may decide that the two apps are similar.

A determination of similarity may be based on results from security analyzer 4828. Instead or additionally, a determination of similarity may be based on one or more other analysis components of analysis engine 4813. In a specific implementation, there is a model to determine comparable apps. Inputs to the model can include any number of measurements such as popularity, price, size, and so forth. Below is a list of some of the inputs or factors that may be used by the model to determine whether an app is comparable (e.g., similar or related to another app).

(1) Popularity: App popularity may be based on third party ratings (e.g., Nielsen ratings), a number of "Likes" (e.g., "thumbs up"), a number of "Dislikes" (e.g., "thumbs down"), a number of app downloads, or combinations of these. Apps having similar popularity ratings may be determined to be comparable.

(2) Price: Apps having similar prices may be determined to be comparable.

(3) Size: Apps having similar sizes (e.g., similar number of megabytes) may be determined to be comparable.

(4) Signer, developer, publisher: Apps having the same signer, developer, or publisher may be determined to be comparable.

(5) App content: Apps having similar content may be determined to be comparable.

(6) App packaging: Apps having similar packaging may be determined to be comparable.

(7) App title and description (e.g., metadata): Apps having similar titles, descriptions, or both may be determined to be comparable.

(8) Scan results data: Apps having similar scan results data may be determined to be comparable.

In a step 5345, the system inserts into a composite app profile usage analysis results (e.g., behavioral data or other characterization data) from the other app profile and scan results of the specific app. That is, the composite app profile includes scan results of the specific app and usage analysis results of the other app. In a step 5350, in response to the request, the system provides the composite app profile.

Thus, a scan result for an app may draw information from other apps in the app corpus. For example, the system may receive an analysis request for version 2.0 of a particular app. Version 2.0 may have just been recently released so the system may not have app behavioral data such as the battery impact or usage requirements of version 2.0. The system, however, may have the battery usage requirements for version 1.0 of the particular app. The system can determine that versions 1.0 and 2.0 are similar and return scan results for version 1.0 (e.g., battery usage requirements for version 1.0).

As another example, scan results for other apps in the app corpus can inform the results for a particular app. More particularly, in a specific implementation, a technique to determine whether a particular app is pirated includes receiving a request for an analysis of the particular app, the request including an indication that the particular app is free or is without cost. The system examines the corpus and determines that another app is the same as the particular app. The other app is available in a marketplace different from a marketplace of the particular app, and is not free. That is, a user is required to submit a payment in order to use the other app. The system determines that that particular app is pirated.

F. Crawling Multiple Markets and Correlating System

Figure 54:
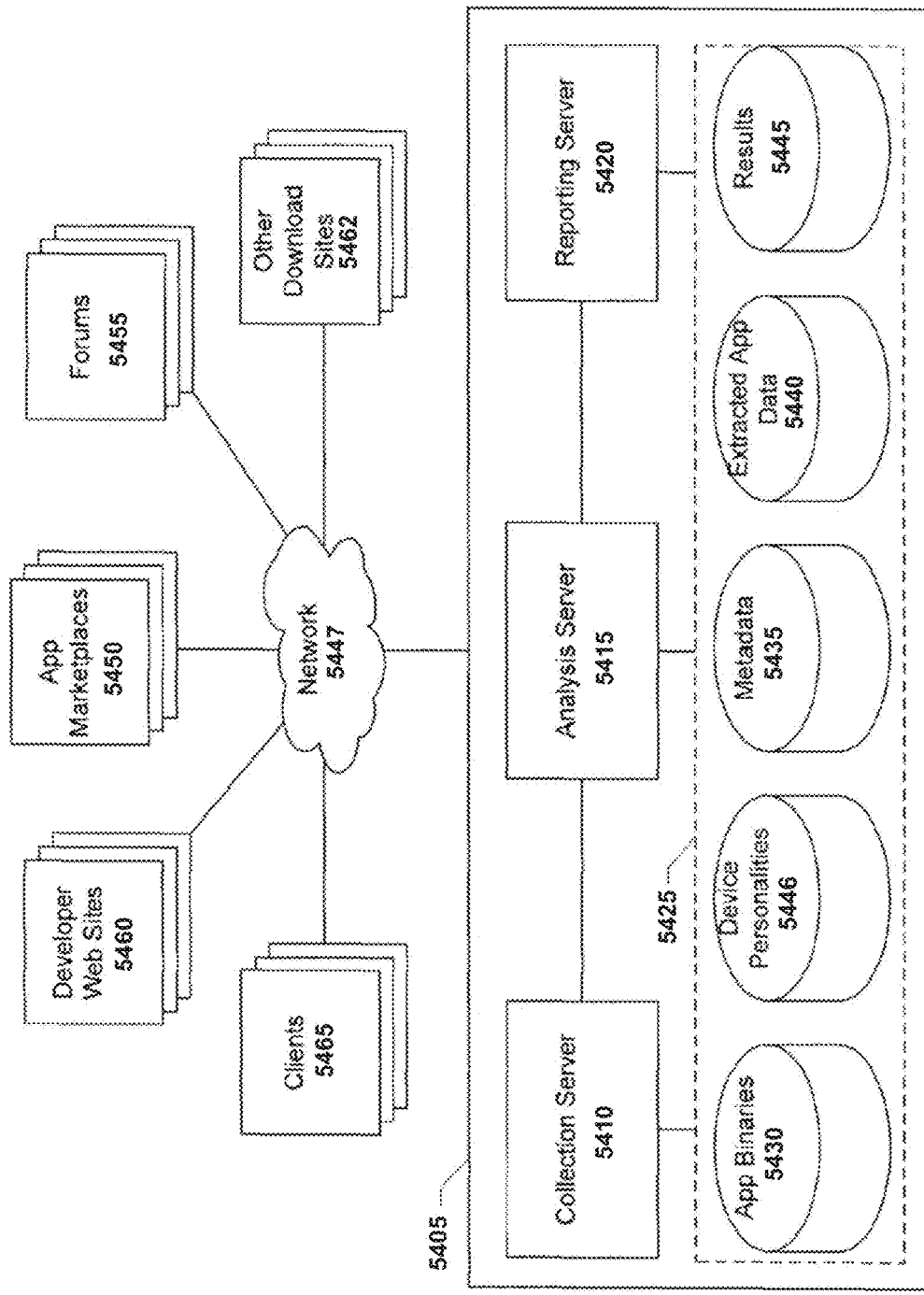
FIG. 54 is an exemplary block diagram of a system for crawling multiple markets and correlating.

FIG. 54 shows a block diagram of an overall architecture of a system 5405 for collecting application objects including application programs, and associated application metadata, and making correlations and inferences. This system includes a collection server 5410, an analysis server 5415, a reporting server 5420, and a data repository or data store 5425. The data repository includes an application program database 5430, an application program metadata database 5435, an extracted information database 5440, a results database 5445, and a client device personality database 5446. It should be appreciated that FIG. 54 is merely illustrative of an embodiment. It is noted that the blocks are functional rather than structural so that it is possible to have many different hardware configurations that can perform the illustrated functions. One of ordinary skill in the art would recognize other variations, modifications, and alternatives.

In an embodiment, the system is connected to a network 5447 through which the system collects application programs, application program metadata, or both from any number of sources. In a specific implementation, the application programs are mobile application programs which may be referred to as "apps." Mobile application programs include software designed for portable electronic devices, mobile Internet devices (MID), ultra-mobile personal computers (UMPC), or mobile communications devices such as smartphones, mobile phones, tablet computers, personal digital assistants, and the like. It should be appreciated, however, that the system may instead or additionally be adapted to collect and analyze application programs designed for non-portable electronic devices (e.g., desktop computers).

Sources of application objects (e.g., application programs, application metadata, or both) may include application marketplaces 5450, forums 5455, application developer web sites 5460, other download sites 5462, user submissions, blogs, social networking sites (e.g., Facebook), news web sites (e.g., CNET), or combinations of these. The system uses the collected applications to make correlations and inferences to determine, for example, which application programs have been pirated, have been maliciously modified, or include copyrighted or trademarked content.

For example, mobile application programs such as Android applications are typically available on many different markets. Even though multiple apps may visually and functionally appear the same, legitimate apps are sometimes pirated or modified with malicious intent. There is currently no automated mechanism to detect and warn users about pirated or maliciously modified applications.

Consider the following example, a user searching for an app finds glowing reviews for the app on the official Android market, but finds the app to be extremely expensive. The same app (i.e., an app that has exactly the same icon and claims to do exactly the same thing as the paid app) is available for free in an alternative market. The unsuspecting user downloads the app from the alternative market, but ends up installing malware that was repackaged into the free app. In a specific implementation, the system provides a mechanism to (1) crawl multiple markets, (2) extract and download app metadata information, (3) download app binaries and (4) use manually supplied metadata to (5) correlate the information available across different markets as well as (6) correlate the apps to previously identified malicious apps in order to identify malware, pirated apps, phishing attacks and other forms of attacks on mobile devices (e.g., brand hijacking, or copyright infringement).

Figure 55:
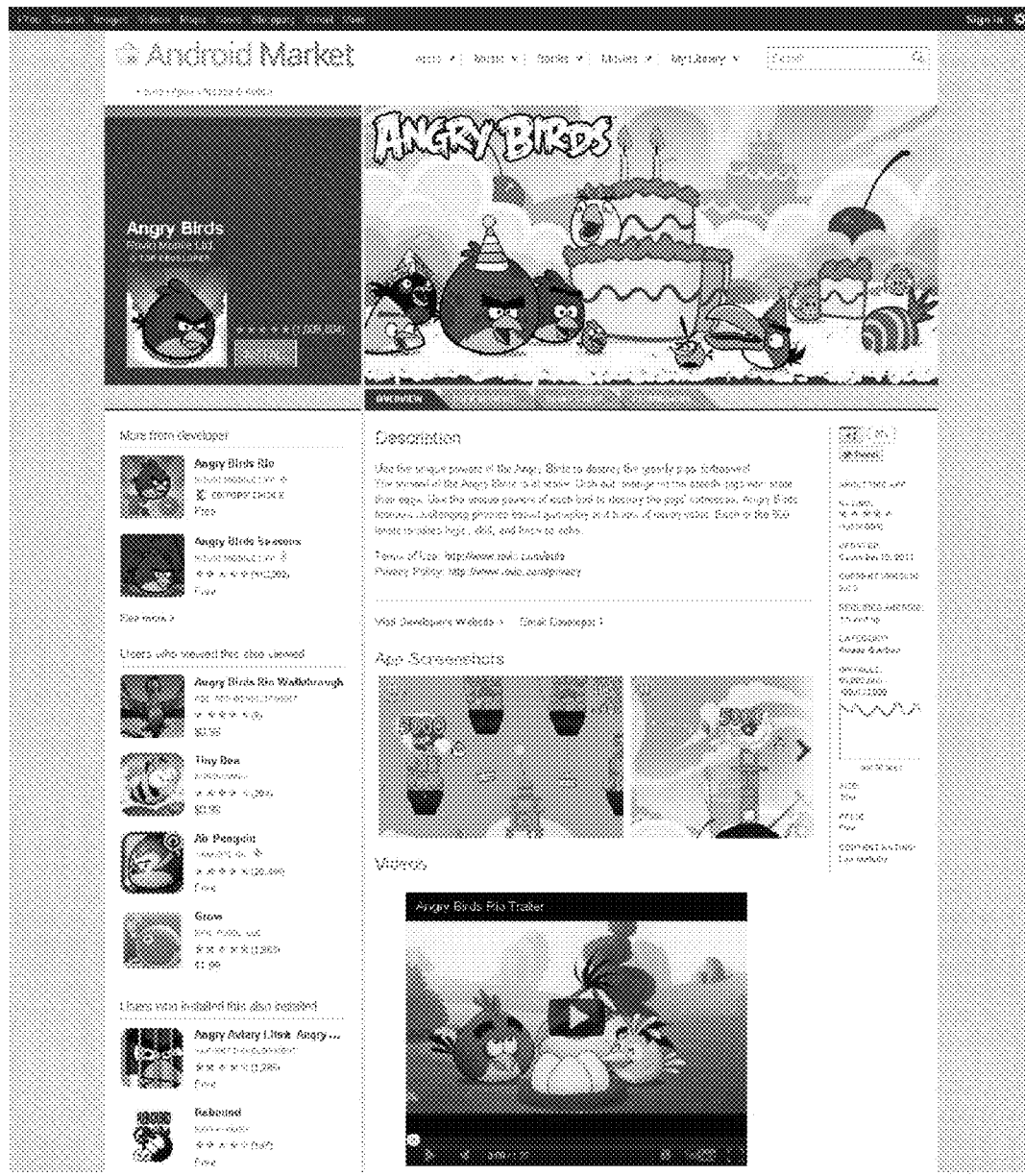
FIG. 55 shows a top portion of a screen shot of an application that is available on an application marketplace.
Figure 56:
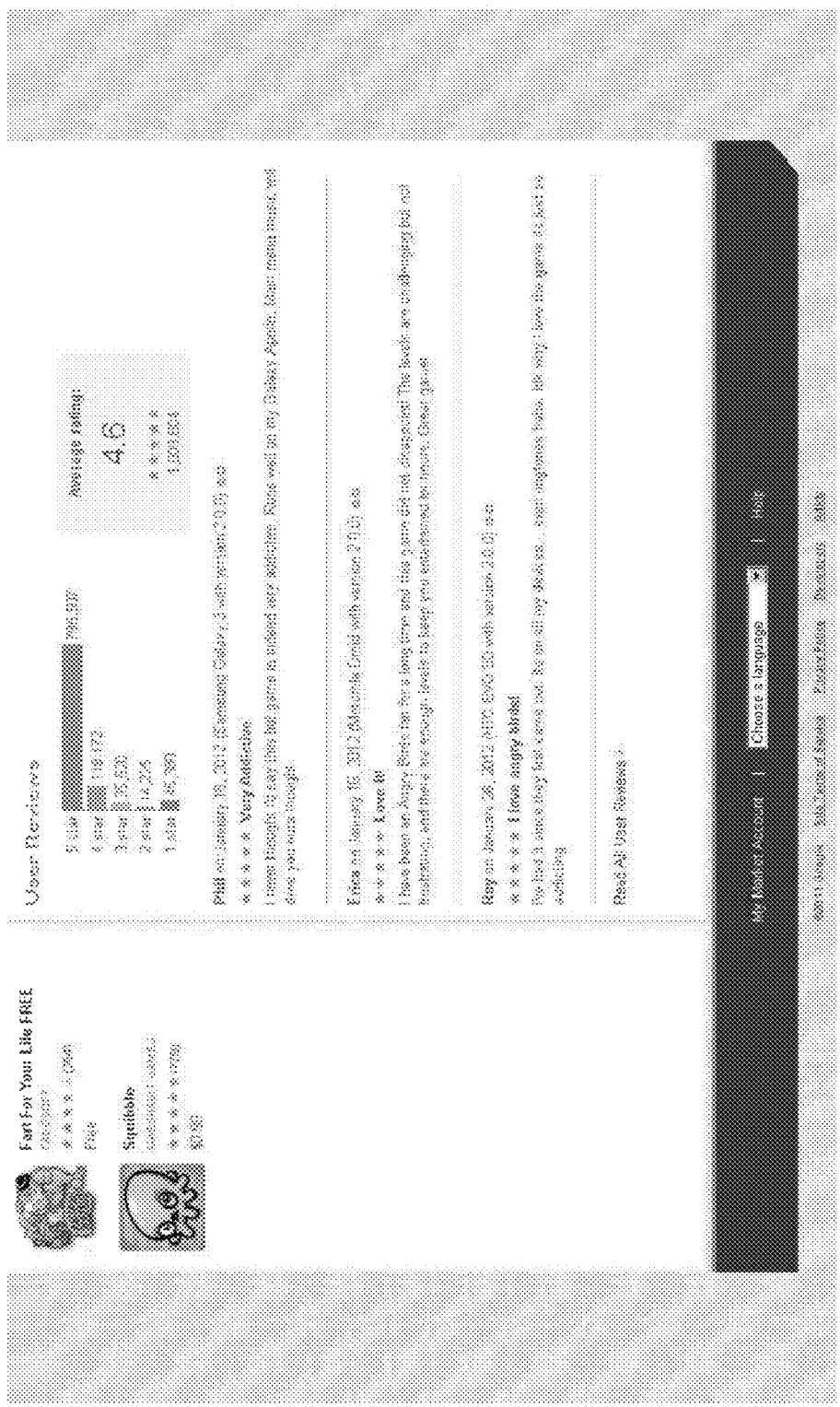
FIG. 56 shows a bottom portion of the screen shot shown in FIG. 55.

Referring to FIG. 54, mobile application program marketplaces 5450 provide an online application distribution platform for mobile devices including Android, iPhone, and Windows devices. The marketplaces allow users to browse and download application programs published by third-party developers. A specific example of a marketplace is the Android Market. The Android Market is an online software store developed by Google for Android operating system (OS) devices. FIGS. 55-56 show web page screen shots of the Android Market including a listing of a mobile application program that is available on the Android Market. FIG. 55 shows a top portion of the web page. FIG. 56 shows a bottom portion of the web page.

Another specific example of a marketplace is the App Store. The App Store is the distribution platform, developed and maintained by Apple, for distributing apps that were developed for iOS. As discussed above, other examples of marketplaces for mobile application programs include Blackberry App World, Nokia Ovi Store, HP App Catalog, and Windows Marketplace for Mobile. These marketplaces may be referred to as official marketplaces because they are maintained and owned by the respective operating system developers.

There are also third-party mobile application program marketplaces such as the Amazon Appstore, GetJar, Handango, and many others. These marketplaces may be referred to as alternative marketplaces. In some cases, mobile application programs may be available directly from the application developers' web sites 5460. Other channels through which apps may be made available include discussion boards or forums 5455.

Referring now to FIG. 54, collection server 5410 is responsible for collecting the application objects including the application binaries and application metadata from the various different application sources and storing the data in application program and application metadata databases 5430 and 5435, respectively. Client device personality database 5446 stores a set of client device profiles to allow the collection server or a collector program (e.g., app crawler program) to emulate a particular client device when accessing an application source (e.g., application marketplace). In a specific implementation, the crawler varies information being sent to the application market (e.g., User-Agent, Device Model, Country, Language, Device capabilities) to download different variations of the same app or apps only available to certain types of devices.

That is, some sources of application programs may restrict or filter the available application programs based on factors such as the client device model, manufacturer, make, version, generation, platform or operating system, geographical location, language setting, client device capabilities (e.g., processor), and so forth. The collection server, by selecting or using various client device personalities to contact the source, allows the system to build a very comprehensive collection of applications. This, in turn, helps to provide insightful correlations and inferences.

In an embodiment, the collection server extracts data from the application objects and stores the extracted data in database 5440 for analysis. Generally, an application program includes an application binary or binary file. A binary file is a computer file which may include any type of data encoded in binary form. A binary file may represent a functional computer program or may be a part of a functional computer program. Binary files are usually thought of as being a sequence of bytes. That is, the binary digits (bits) are grouped in eighths. Binary files typically contain bytes that are intended to be interpreted as something other than text characters. Compiled computer programs are typical examples of binary files and compiled applications (object files) may be referred to as binaries. Binary files may also include images, sounds, compressed versions of other files, and so forth—in short, any type of file content whatsoever.

A hex editor or viewer may be used to view file data as a sequence of hexadecimal (or decimal, binary or ASCII character) values for corresponding bytes of a binary file. If a binary file is opened in a text editor, each group of eight bits will typically be translated as a single character, and there may be unintelligible display of characters (e.g., "ùqÌ}+¬ÉD)7lü5ÜÐB×Ç 'É?éb-üå¬í Æ%ëLácÛ>çÏÃôŠtsÄ!Ÿ¡ü)¡"). If the file is opened in some other application, that application will have its own use for each byte: maybe the application will treat each byte as a number and output a stream of numbers between 0 and 255—or maybe interpret the numbers in the bytes as colors and display the corresponding picture. If the file is itself treated as an executable and run, then the operating system will attempt to interpret the file as a series of instructions in its machine language. Binary files include embedded control characters that tell the application that support that particular file type, what to display or do.

Application program metadata, as discussed above, may be data about the application program rather than the application program itself. The metadata may be visible to a user accessing the application source such as through a web browser. Referring to now to FIGS. 55-56, metadata may include, for example, a title of the application, a description of the application, a textual description, a graphical description (e.g., screenshots of the application—jpeg file format, png file format, gif file format), a trailer (e.g., video trailer of the application), terms of use, privacy policy, release notes, date of last update or release, date the application was published on the web site, version information, operating system requirements, one or more categories associated with the application, a number of times the application has been installed or downloaded, a size of the application (e.g., in megabytes), rate of installation, price, rating information (e.g., 1 star, 2 star, 3 star, 4 star, or 5 star), average rating, content rating (e.g., "high maturity," "low maturity," "graphic violence," "brief nudity," and so forth), developer, publisher, a listing of other applications from the developer, developer contact information (e.g., email address, web site address, phone number, or mailing address), a listing of other applications viewed by users who also viewed the particular application, a listing of other applications installed by users who also installed the particular application, user reviews (e.g., text of review, date of review, reviewer username, or reviewer client device), permissions, a number of "likes," a number of "dislikes," and so forth.

An application program may be capable of executing without the application program metadata. For example, the description of the application may be deleted and the application may be executed after the deletion of the description. The description of the application may be edited and the execution of the application program may be the same before and after the editing of the description. Deleting or modifying an application program binary file, however, may alter the execution of the application. For example, the application program may not execute properly after the deletion or modification. There may be an error message when trying to execute the application program.

Analysis server 5415 is responsible for correlating the application objects (e.g., application program binaries and metadata), inferring relationships among the application objects, and making assessments based on the correlations and relationships. Analysis results such as assessments, correlations, or information describing the relationship may be stored in results database 5445. Reporting server 5420 acts as an interface to database 5445 for providing results from the application analysis to clients 5465. Results may be provided programmatically such as through an application programming interface (API) as discussed in U.S. patent application Ser. No. 13/335,779, filed Dec. 22, 2011, which is incorporated by reference along with all other references cited in this application. Instead or additionally, results may be provided through a graphical user interface (GUI), such as to a dashboard or management console, HTML page, a report (e.g., PDF report), a data feed to a partner, published to a web site, an e-mail, and so forth. A client may be a mobile device user or end-user, an app developer, marketplace owner, or other entity.

Figure 57:
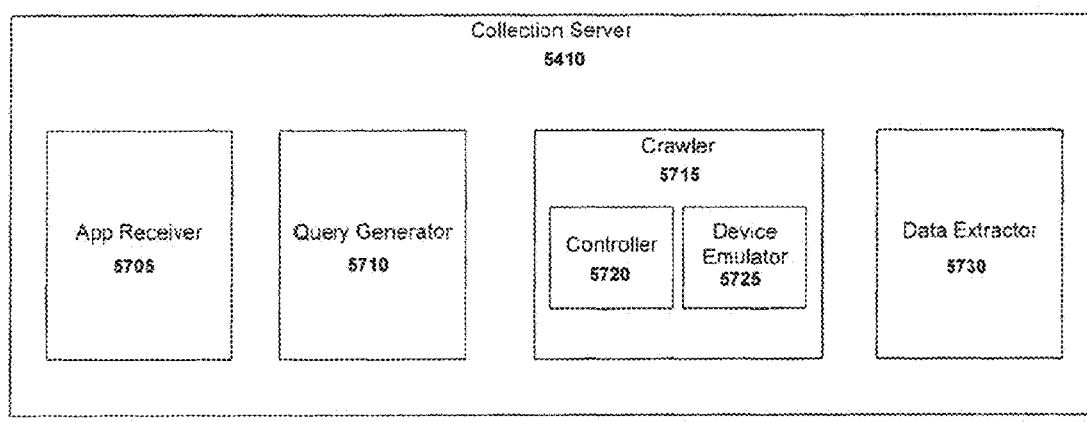
FIG. 57 is an exemplary block diagram of a collection server.

FIG. 57 shows a block diagram of modules or components that facilitate the collection and storage of application objects by collection server 5410. Such components may be one or more software programs or code modules executing on a computing machine. As shown in FIG. 57, there is an application receiver 5705, a query generator 5710, a crawler 5715, and a data extractor 5730.

The application receiver collects and stores application programs, metadata, or both that have been submitted to the system by the clients. For example, a user may upload an application program to the system for an analysis. In a specific implementation, after analyzing the application and providing the analysis results, the system continues to maintain or store the application in application program database 5430 (FIG. 54). Continuing to store the application allows the system to reanalyze the application and provide new or changed analysis results, if any, to the user. For example, a reanalysis may be performed if a new or updated virus signature pattern is received.

To help ensure an extensive collection of data, query generator 5710 generates, forms, or composes queries in order to discover new application programs, application programs that may be related to application programs discovered previously, associated application metadata (e.g., application reviews), or combinations of these. For example, the query generator can be used to find sources (e.g., web sites or marketplaces) where application programs, application metadata, or both may be found. The queries may be submitted or otherwise provided to a search engine or source of applications which returns search results. Crawler 5715 crawls the search results to retrieve or download the application and associated metadata. Crawler 5715 may include a controller 5720 to instruct the crawler to begin or stop crawling, and a client device emulator 5725.

The crawler may be referred to as a spider, robot, or app-crawler. In a specific implementation, the crawler, crawls across different markets to search and download apps for mobile devices. These markets may include official application markets (e.g., Android Market, or Apple App Store), alternative app markets (e.g., Amazon Appstore for Android), forums, download sites, or combinations of these. The app crawler can gather metadata information for each app from each market and store it in a database. The metadata information may include information related to the app's ratings, price, number of ratings, user comments, app's icon on the market page (which could be different from the app icon on the device), and so forth.

Figure 58:
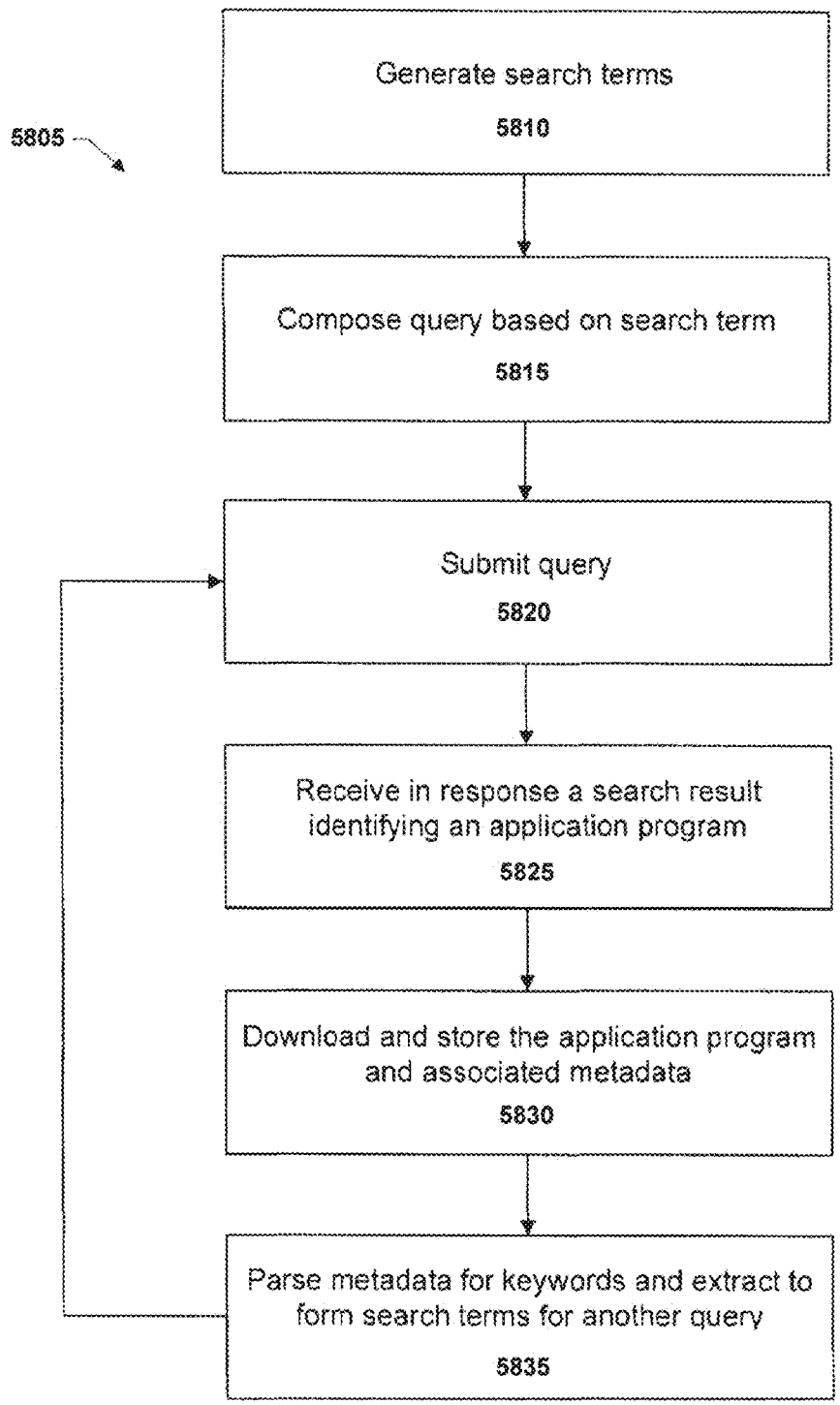
FIG. 58 is an exemplary flow diagram illustrating the steps of an embodiment.

In a specific implementation, the crawler uses a feedback loop where metadata from a search result feeds subsequent or additional searches. That is, initial results can determine future queries. FIG. 58 shows a flow 5805 for a feedback loop. In a step 5810, query generator 5710 (FIG. 57) generates search terms which are used to compose a search query (step 5815). In a specific implementation, a technique to help ensure comprehensive search term coverage and enumerate or discover app marketplaces includes obtaining a ranked list of words (e.g., top or most frequently used 50,000 words in the English language), and creating a search query for each word, combinations of words, or both.

A search query may be a structured query that includes Boolean operators, parentheses, or both. Some examples of Boolean operators include OR, AND, and NOT. A search query may be a faceted query having a conjunction of topics or facets. For example, a query such as "(flight OR airline) AND (travel OR fare OR compare OR ticket)" may find apps about purchasing airline tickets even if the app descriptions omit one of the words "travel," "fare," "compare," or "ticket." A query may include a wildcard symbol (e.g., "*," "%," or "?"), proximity operator such as NEAR, NOT NEAR, FOLLOWED BY, NOT FOLLOWED BY, SENTENCE, PARAGRAPH, FAR, or combinations of these. For example, the query syntax "keyword 1 NEAR/n keyword2", where "n" is a number, may specify that a maximum number of words between "keyword1" and "keyword2" is to be "n." There can be particular field searches, term modifiers, word stemming, wildcard searches, fuzzy searches, range searches, term boosting, field grouping, and the like.

In a step 5820, the search query is submitted or provided to a search engine. For example, the search query may be submitted to a source of application programs (e.g., an app marketplace). In a step 5825, the application collector program receives a search result responsive to the query. The search result may identify an application program, a source of application programs, or both. For example, the returned search result may list several applications (e.g., by application title) responsive to the query. The returned search result may include one or more sources of application programs such as a list of web sites or addresses (e.g., universal resource locators (URLs)) that host application programs (e.g., application marketplaces, developer web sites), provide a forum for discussing application programs, contain application program reviews and evaluations, and so forth for crawler 5715 (FIG. 57) to crawl. In a specific implementation, the crawler crawls search results from a search engine that has an indexed set of data rather than enumerating or following the links on a web page. In another specific implementation, the crawler may follow the links on the web page. For example, a web page having a review of an application may include a link to other reviews of the application. The crawler may follow or access the link to download the other reviews of the application so that the system can perform a comprehensive analysis of the application.

In a step 5830, the crawler retrieves, gets, obtains, fetches, or downloads and stores an application program, associated metadata, or both from the source. Data may be extracted from the downloaded application objects and stored in a database. In a specific implementation, each application is uniquely identified using a package name or some other mechanism such as a hash of the application contents.

In this specific implementation, the metadata information related to each application is stored against the unique application identifier as well the name of the application source or market from where it was obtained. The app crawler downloads each application from each of the different markets, stores the application, and extracts information embedded within the application itself, such as Package Name, Declared App Permissions (Entitlements), the application icon, application signing certificate, and so forth, and stores all the information in a database. The metadata extracted from the application may be stored against the same unique application identifier that was used to store the metadata information. The application binary itself may be stored such that each binary can be uniquely identified to the specific market from where it was downloaded.

Table H below shows an example of an entry or record in a database table storing an application binary, data extracted from the application binary, and application metadata.

TABLE H

| Id | Title | App Binary | Package Name | Permissions | Icon | Developer |
|---|---|---|---|---|---|---|
| 01 | Angry | appA.bin | com.boogle.angry | location, camera | launchA.png | Boogle |
| 02 | Dig | appB.bin | com.boogle.dig | contacts | launchB.png | Boogle |
| 03 | Invader | appC.bin | com.etari.invader | calendar, SMS launch | C.png | Etari |

As shown in the example above, Table H includes the fields "Id," "Title," "App Binary," "Package Name," "Permissions," "Icon," and "Developer." The "Id" field stores an identifier for the application (e.g., "01"). In a specific implementation, the identifier is a hash of the application contents. The application may be provided as input to a hash function which returns hash value or code so that the application can be identified. Instead or additionally, an application may be identified by its package name. The "Title" field stores the title or name of the application as displayed at the source (e.g., marketplace) for users to browse and see. The "App Binary" field stores the binary file of the application.

The "Package Name" field stores the package name of the application (e.g., "com.boogle.angry," "com.boogle.dig," and "com.etari.invader"), as declared inside the package file. For example, an Android application package file (APK) is the file format used to distribute and install mobile application software onto devices having Google's Android operating system. To make an APK file, a program for Android is first compiled, and then all of its parts are packaged into one file. This holds all of that program's code such as .dex files, resources, assets, certificates, and manifest file.

The "Permissions" field identifies the features of the client device that the application program can access. For example, the application "Angry" includes the permissions "location" and "camera." The "location" permission allows the application to access the client device's geographical location information such as global positioning system (GPS) coordinates, cell-id, or Wi-Fi location. The "camera" permission allows the application to access the client device camera. The application "Dig" includes the permission "contacts." With the "contacts" permission, the application can access the contacts list on the client device (e.g., telephone directory).

The application "Invader" includes the permissions "calendar" and "SMS." The "calendar" permission allows the application to access calendar appointments saved on the client device. The "SMS" permission allows the application to send text messages from the client device. The Android Developers Reference for Android 4.0 r1, Feb. 1, 2012, available at <http://developer.android.com/reference/android/Manifest.permission-.html>, which is incorporated by reference, includes an extensive list of permissions or features that an application may access. The system can analyze the application, identify the permissions or features than the application can access, and store a list of the permissions.

The "Icon" field stores the launcher icon to the application. The launcher icon is a graphic that represents the application. The Launcher icon is the graphic or image that is displayed on the home screen or electronic display of the client device. The "Developer" field stores the name of the application developer (e.g., "Boogle" and "Etari").

The database may include extracted data, i.e., data that is extracted from the application program or binary. For example, mobile application programs for the Android platform include a file called a manifest. The manifest file is an XML file that includes, among other things, the permissions or client device features that the application can access. These permissions may be specified within a permissions tag or element in the manifest file. In a specific implementation, the crawler program is configured to parse an application program file, locate a specific element within the file, extract the values or attributes listed within the specific element, and store the extracted values in the database. In a specific implementation, the parsed application file is an Android manifest file, the specific element is the permissions element, and the extracted values are permissions. It should be appreciated, however, that the crawler program can parse any file or directory of the application program to extract and store the desired data.

It should be appreciated that Table H above is merely one example of how data may be stored. Data may be stored in any number of ways that may or may not include storing in a database field.

In a step 5835, the crawler program parses the metadata for keywords to form search terms for another query. The flow loops back to step 5820 so that the other query can be submitted. This feedback loop helps to discover new application programs, new application metadata, new application sources, or combinations of these. The feedback loop of metadata acquired by a set of search terms can be used to feed additional searches that yield more data.

More particularly, extracted metadata can be used to generate search terms so that the process of searching and downloading application objects can be continuously repeated. Each search iteration may yield new applications that can be collected in order to build a comprehensive database of applications. The extracted data may include words, phrases, numbers, characters, symbols, images, video, graphics, pictures, or combinations of these. The extracted data (e.g., words) may be added to a word list that is stored at the system. The word list may include some initial seed words used to initialize the searching (i.e., words not from extracted application metadata), words from extracted application metadata, or both. Composing a search query (step 5815) may include selecting words from the word list, where at least one of the words was extracted from application metadata. In a specific implementation, a technique for building a word list includes extracting words from application metadata such as a name of a developer who was not in the word list. The developer name is added to the word list so that new search queries having the developer's name can be generated to discover new applications from the developer.

In a specific implementation, a method for finding and collecting application programs includes retrieving a first application program and first metadata associated with the first application program from a source of application programs, storing the first application program and first metadata, parsing the first metadata to identify at least one keyword in the first metadata, submitting to the source of application programs a first query including a search term based on the at least one keyword in the first metadata, receiving a first search result responsive to the first query. The first search result may identify a second application program related to the first application program. The method may further include retrieving the second application program, second metadata associated with the second application program, or both from the source of application programs.

In another specific implementation, a first query provided to a search engine includes a first search term. A first search result received from the search engine responsive to the first query identifies a first source for application programs. The crawler program accesses the first source and downloads from the first source a first application object. The first application object is parsed to identify keywords for a second search term. A second query is composed with the second search term and provided to the search engine. A second search result received from the search engine responsive to the second query identifies a second source for application programs. The crawler program access the second source and downloads from the second source a second application object.

The first source may be different from the second source. For example, the first source may be the Android Marketplace and the second source may be the Amazon Appstore. In this example, both sources are of the same type. That is, both sources are application marketplaces. Alternatively, the sources may be of different types. For example, the first source may be an application marketplace. The second source may be an Internet or online forum.

A search term may include one or more identified keywords in the first application object. For example, the first application object may include a first application program and first metadata specifying a name of a developer of the first application program. A search term may include the name of the developer so that other application programs from the developer can be found.

Instead or additionally, a search term may include a derivation of the one or more identified keywords. A search term may be generated using, for example, query broadening, stemming, conflation, lookup algorithms, suffix-stripping algorithms, lemmatization, stochastic algorithms, n-gram analysis, affix stripping, matching algorithms, multilingual stemming, morphology analysis, or combinations of these.

As a specific example, the first metadata may specify a title of the first application program. The second search term may include a variation of the title so that counterfeit, knockoff, or similar versions of the first application program may be found. For example, the mobile application program "Angry Birds" developed by Rovio Mobile has become very successful. Other developers, wishing to capitalize on the brand, may develop applications with similar titles (e.g., Angry Dogs, Angry Cats, Angry Fish, and so forth). There may be an intent to deceive consumers into thinking that they are purchasing a legitimate application or an application developed by the same developers as Angry Birds when, in fact, these applications are not legitimate (e.g., include malware or are unauthorized reproductions or derivations). It would be desirable to find these other mobile application programs so that these applications can be removed from the marketplace and users are not duped into downloading the applications. Thus, a search term based on the keyword title "Angry Birds" may include the terms "Angry Dogs," "Angry Cats," "Angry Fish," and so forth.

In another specific implementation, indexing techniques may be used to generate search terms. For example, crawler may index the description of an application program, calculate a frequency at which a word or phrase appears in the description, and compose a search query by selecting those words or phrases having a high frequency. Articles such as "a," "an," and "the" may be ignored during the indexing.

Indexing may be performed across multiple applications (or multiple descriptions of applications). In another specific implementation, a technique for collecting and discovering new applications includes comparing first metadata describing a first application program with second metadata describing a second application program to identify a keyword that is in the first and second metadata. A query is formed based on the keyword that is in the first and second metadata. The query is provided (e.g., transmitted or sent) to a search engine. The search engine returns a result responsive to the query. The search result identifies a new source for application programs. The crawler program accesses the new source to retrieve application programs, application metadata, or both.

Table I below shows an example of a forward index that may be created by the crawler program.

TABLE I

| Id | Words |
|---|---|
| 01 | angry, birds, eggs, pigs, castle |
| 02 | dig, dug, underground, monsters, tunnel |
| 03 | space, invader, aliens, laser, shoot |

The above index may be created by extracting keywords from each application description. Search terms and queries can be generated by selecting the various index words.

Figure 59:
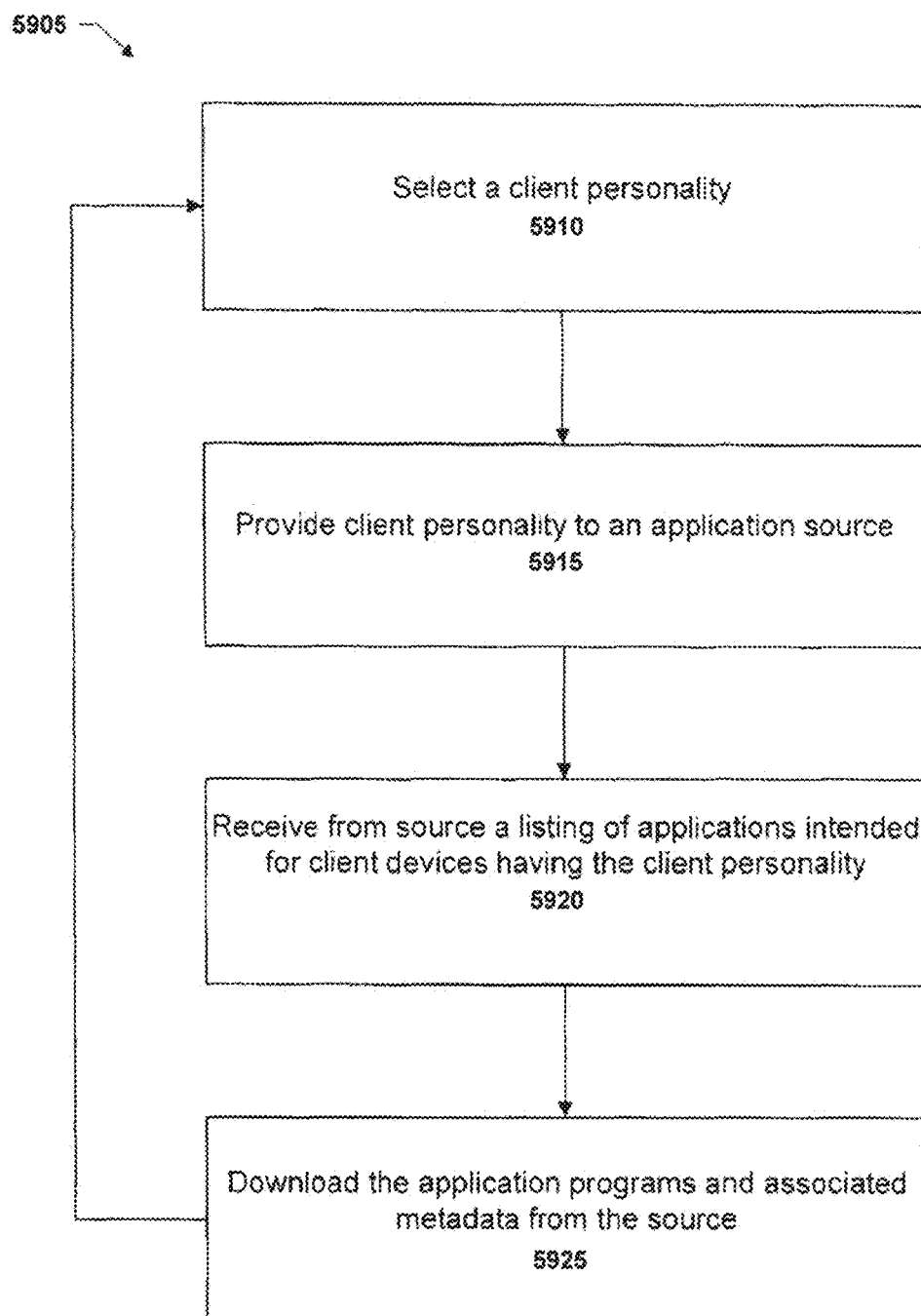
FIG. 59 is an exemplary flow diagram illustrating the steps of an embodiment.

FIG. 59 shows a flow 5905 for emulating a client device when accessing an application source. As discussed above, an application source may filter the available applications based on the client device that is requesting the applications. For example, some mobile applications may have operating system version requirements (e.g., Android version 2.1 or higher). If an application source detects that the requesting client has an incompatible operating system version (e.g., an earlier operating system version) the application source may filter the application so that the client does not download the application. As another example, an application source may filter the available applications based on user age. Application programs having a "mature" rating may be blocked for users under age 18.

Emulating various client devices allows the crawler program to obtain good data coverage of the target data source. That is, to download from the source an exhaustive set of application programs so that a comprehensive database of application programs can be created for insightful correlations and inferences.

In brief, in a step 5910, the crawler selects from client device personality database 5446 (FIG. 54) a client personality profile. In a step 5915, the client personality profile is provided to a source such as a source of mobile application programs. In a step 5920, the crawler receives from the source a listing of applications intended for client devices having the selected client personality profile. In a step 5925, the crawler retrieves from the source the application objects, e.g., application programs, associated metadata, or both that the source makes available to client devices having the selected client personality profile. The process may loop back to step 5910 to select a different client personality profile so that applications intended for the different client personality profile can be retrieved from the source.

Table J below shows some attributes of a client personality profile. A client personality profile may include a subset of attributes in any combination.

TABLE J

| Attribute | Description |
|---|---|
| User | Indicates user properties such as the user's age, date of birth, or year of birth. |
| Model | Identifies the requesting device as being of a particular make or model (e.g., iPhone, iPhone 3G, iPhone 3GS, iPhone 4, iPhone 4S, iPad, iPad 2, HTC Desire, HTC Desire HD, HTC Desire S, Samsung Galaxy Nexus, or Samsung Galaxy S). |
| Country | Identifies the requesting device as being from a particular geographical region or country (e.g., U.S., Canada, France, Germany, Spain, North America, South America, or Europe). |
| Language | Identifies the requesting device as having a particular language setting (e.g., English, French, German, or Italian). |
| Capabilities | Identifies the requesting device as having particular capabilities, specifications, or features such as screen size, resolution, processor speed, memory, supported communication or network protocols (e.g., Wi-Fi, Bluetooth, or ANT), global positioning system (GPS) capabilities, voice recognition, camera, video, and so forth. |
| Platform | Identifies the requesting device as having a particular platform or operating system (e.g., iOS 1.0, iOS 3.1.3, iOS 5.0, Windows Mobile 6.1, webOS 2.2, Windows Phone 7, Android 2.3, or Symbian 9.3). |
| Manufacturer | Identifies the requesting device as being from a particular manufacturer (e.g., Apple, HTC, or Samsung). |
| Carrier | Identifies the requesting device as using a particular network carrier (e.g., AT&T, T-Mobile, or Verizon). |

Emulating a client device by providing the source with a particular client personality profile may be performed by, for example, inserting emulation data into an API request, causing the source of data transmitted to the source to appear from a particular client personality (for example, from an IP address on a particular network or particular country), transmitting emulation data to the source (for example, as part of a signup, configuration, or other information gathering process), or inserting emulation data in the user-agent field of an HTTP request.

In a specific implementation, a method for helping to ensure a comprehensive collection of application programs includes providing to a source, a first client personality indicating that a client device having the first client personality is requesting application objects, receiving from the source a first listing of application objects that the first source makes available to client devices having the first client personality. The method further includes providing to the source a second client personality, different from the first client personality. The second client personality indicates that a client device having the second client personality is requesting the application objects. The method further includes receiving from the source a second listing of application objects that the source makes available to client devices having the second client personality. The second listing may include a second application object and may not include the first application object. The first listing may include the first application object and may not include the second application object.

In various specific implementations, the first personality specifies the client is of a first model, and the second personality specifies the client is of a second model, different from the first model. The first personality specifies the client is located in a first country, and the second personality specifies the client is located in a second country, different from the first country. The first personality specifies the client has a first set of capabilities, and the second personality specifies the client has a second set of capabilities, different from the first set of capabilities. The first personality specifies the client is from a first manufacturer, and the second client personality specifies the client is from a second manufacturer, different from the first manufacturer. The first personality specifies the client includes a first operating system, and the second personality specifies the client includes a second operating system, different from the first operating system. The first personality specifies the client is on a first carrier network, and the second personality specifies the client is on a second carrier network, different from the first carrier network.

The system can use multiple personalities to retrieve application metadata and binaries. The same query can be used across multiple personalities (e.g., top apps served to this personality). Alternatively, queries can be custom to each personality (e.g., If a personality is a language, then using language-specific search terms).

Figure 60:
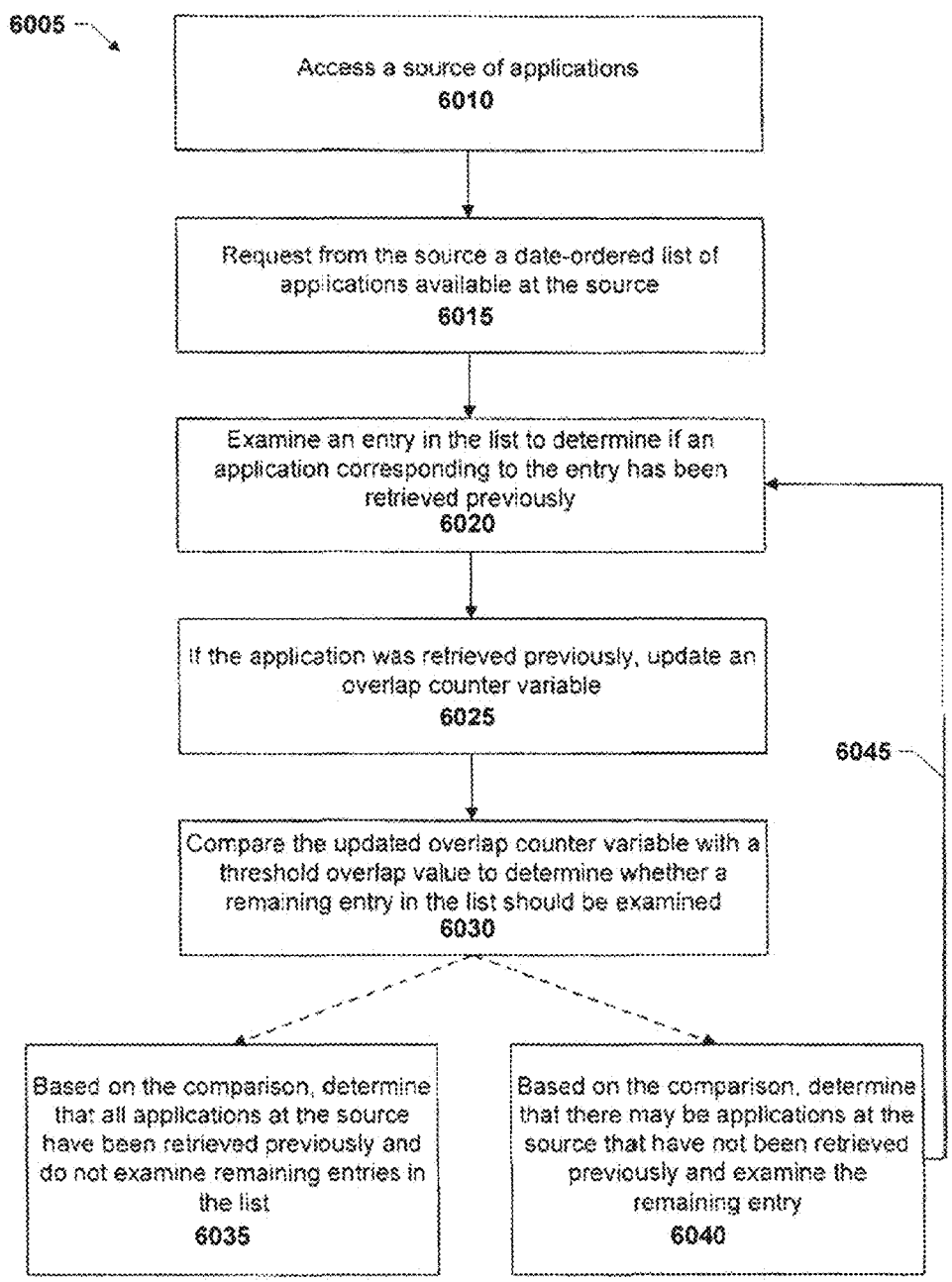
FIG. 60 is an exemplary flow diagram illustrating the steps of an embodiment.

FIG. 60 shows a flow 6005 for crawling a target application source. The flow shows a specific implementation of an overlap crawling technique that may be used to help ensure a comprehensive collection of application objects. More particularly, an application source (e.g., a web site or application marketplace) may exhibit inconsistencies due to issues such as coherency. The same query run on two different nodes in a cluster may produce two different result sets. The overlap crawling technique shown in FIG. 60 and discussed below can help to address coherency issues.

In a step 6010, the crawler program accesses a source of applications (e.g., visits a URL of a mobile application marketplace). In a step 6015, the crawler requests from the source a date-ordered listing of applications available at the source. In a specific implementation, the date-ordered listing is a reverse-chronologically ordered listing of the applications. The listing includes applications sorted by date of publication or release. In the listing, recently published applications are positioned above or before less recently published applications. Table K below shows an example of a date-ordered listing in reverse-chronological order.

TABLE K

| Application Title | Publication Date |
| --- | --- |
| Angry | Oct. 7, 2009 |
| Dig | Sep. 30, 2009 |
| Invader | Aug. 17, 2009 |
| Donkey | Aug. 10, 2009 |

As seen in Table K, the most recently published or newest application is "Angry," followed by "Dig," followed by "Invader," and so forth. In this reverse-chronologically ordered or sorted listing, the entry for "Angry" is at a top of the list because it has the most recent publication date. The entry for "Donkey" is at a bottom of the list because it has the earliest publication date. The entry for "Angry" is adjacent or next to the entry for "Dig." The entry for "Angry" is positioned or located above the entry for "Dig."

In another specific implementation, the date-ordered listing is a chronologically ordered listing of the applications. In this specific implementation, in the listing earlier published applications are in a position or order above or before recently published applications. Table L below shows an example of a date-ordered listing in chronological order.

TABLE L

| Application Title | Publication Date |
| --- | --- |
| Donkey | Aug. 10, 2009 |
| Invader | Aug. 17, 2009 |
| Dig | Sep. 30, 2009 |
| Angry | Oct. 7, 2009 |

As seen in Table L, the earliest published or oldest application is "Donkey," follows by "Invader," followed by "Dig," and so forth. In this chronologically ordered listing, the entry for "Donkey" is at the top of the list because it has the earliest publication date. The entry for "Angry" is at the bottom of the list because it has the most recent publication date. In another specific implementation, the application source may not provide a date-ordered listing of applications. In this specific implementation, the crawler program itself may perform the sorting.

In a step 6020, the crawler examines an entry in the listing to determine whether an application corresponding to the entry has been previously retrieved such as on a previous or prior visit to the source. In a specific implementation, examining the entry includes comparing a title of the application in the listing with a stored title in data repository 5425 (FIG. 54). If there is a match a determination may be made that the application has been retrieved on a previous occasion. If there is not a match a determination may be made that the application has yet to be retrieved.

Instead or additionally, version information, publication date, or both of the application in the listing may be compared with the respective stored version information, publication date, or both of an application stored in the data repository of the system. Comparing versions, publication dates, or both helps to ensure that the latest version of an application is (or has been) retrieved. For example, two applications may share the same title (e.g., "Angry") but one application may be a later version (e.g., version 2.0) of the other application (e.g., version 1.0). So, comparing version information can help to ensure that the application "Angry" version 2.0 is retrieved from the source.

In a specific implementation, an entry is examined without retrieving the corresponding application from the source. This helps to conserve computing resources such as network bandwidth and processing resources including the processing resources of the application source server.

In another specific implementation, examining an entry in the listing to determine whether an application corresponding to the entry has been retrieved previously includes downloading the corresponding application. Downloading the corresponding application and comparing the downloaded application to the stored applications in the data repository can help to provide confirmation that the application program (i.e., the same application program) has in fact been (or not been) retrieved previously.

For example, there may be errors (e.g., typographical errors) in the application version information. That is, an application having version metadata that indicates the application is version 1.0 may be incorrect and the application version may in fact be version 2.0. Retrieving and comparing the application binary with previously stored application binaries helps to protect against such errors.

In a specific implementation, the comparison includes hashing the downloaded application contents and comparing the hash value with hash values of the stored applications. If the hash values match a determination may be made that the application has been previously retrieved. If the hash values do not match a determination may be made that the application has not been previously retrieved. Application program comparisons may include comparing application binaries, application hash identifier values, application metadata (e.g., application title, or application version), or combinations of these.

In a step 6025, based on the examination of the entry (step 6020) if the corresponding application has been previously retrieved the crawler program updates an overlap counter variable. The overlap counter variable tracks a number of occurrences where an application found during a current crawl is the same application from a previous crawl of the application source.

In a step 6030, the crawler program compares the updated overlap counter variable with a threshold overlap value to determine whether a remaining entry, next to the entry, in the listing should be examined. Based on the comparison, a determination may be made that all applications at the source have been previously retrieved and remaining entries may not be examined (step 6035). Alternatively, based on the comparison, a determination may be made that there may be applications at the source that have not been previously retrieved and a remaining, next, or adjacent entry may be examined (step 6040). As shown by loop 6045, the process iterates or repeats until, based on the comparison of the updated overlap counter variable and the threshold overlap value, a determination is made that all application programs at the source have been previously retrieved (step 6035).

The overlap threshold value can be a user-configurable or user-adjustable value. For example, an administrator may change, alter, edit, or modify the threshold value from a first value to a second value, different from the first value. The threshold value may be the same for two or more different application sources. Alternatively, the threshold value may be different for two or more different application sources.

For example, a first application marketplace known to have more coherency issues than a second application marketplace may be assigned a threshold value that is greater than a threshold value assigned to the second application marketplace. Alternatively, a first application marketplace known to have fewer coherency issues than a second application marketplace may be assigned a threshold value that is less than a threshold value assigned to the second application marketplace. A threshold value can be specific to a particular application source.

In a specific implementation, updating the overlap counter variable (step 6025) includes incrementing the overlap counter variable (e.g., adding "1" to the overlap counter variable). As an example, consider Table L above. In a first iteration, the entry for the application "Angry" is examined to determine whether the application has been previously retrieved (step 6020). Assuming that the application has been previously retrieved, in this specific implementation, updating the overlap counter variable (step 6025) includes incrementing the overlap counter variable. So, for example, an increment value (e.g., "1") may be added to the overlap counter variable so that the value of the variable is "1."

The updated overlap counter variable (e.g., "1") is compared to the threshold overlap value to determine whether a remaining entry, next to the entry, in the listing should be examined (step 6030). In a specific implementation, if the overlap counter variable is less than the overlap threshold the next entry is examined. For example, if the overlap threshold value is set at "2," a next entry in the listing would be examined because the value of the updated overlap counter variable (e.g., "1") is less than the overlap threshold value (e.g., "2").

Thus, in a second iteration, a next entry for the application "Dig" is examined to determine whether the application has been previously retrieved (step 6020). Assuming that the application has been previously retrieved, in this specific implementation, the overlap counter variable is incremented so that the current or new value is "2," (i.e., "1+1=2"). In step 6030, the updated overlap counter variable (now having a value "2") is compared to the threshold overlap value (e.g., "2") to determine whether a next remaining entry in the listing should be examined. In a specific implementation, if the overlap counter variable is greater than or equal to the overlap threshold, a determination is made that all application programs at the source have been previously retrieved and remaining entries are not examined (step 6035).

In the example above, the remaining entries (e.g., "Invader," and "Donkey") would not be examined because the updated overlap counter variable is greater than or equal to the overlap threshold (e.g., "2"="2").

In another specific implementation, updating the overlap counter variable (step 6025) includes decrementing the variable (e.g., subtracting "1" from the variable). In this specific implementation, the overlap counter variable may be initialized with a user-configurable predetermined value (e.g., "2"). As an example, consider again Table L above. In a first iteration, the entry for the application "Angry" is examined to determine whether the application has been previously retrieved. Assuming that the application has been previously retrieved, in this specific implementation, updating the overlap counter variable includes decrementing the variable. So, for example, a decrement value (e.g., "1") may be subtracted from the overlap counter variable so that the value of the variable is now "1" (e.g., "2−1=1").

The updated overlap counter variable (e.g., "1") is compared to a threshold overlap value, e.g., "0" or zero, to determine whether a next remaining entry, next to the entry, in the listing should be examined. In a specific implementation, if the overlap counter variable is greater than the overlap threshold the next remaining entry is examined. In this example, the next remaining entry is examined because the updated overlap counter variable is greater than the threshold overlap value (e.g., updated overlap counter variable ("1")>threshold overlap value ("0") evaluates to "true.")

Thus, in a second iteration, a next entry for the application "Dig" is examined to determine whether the application has been previously retrieved from the source. Assuming that the application has been previously retrieved, in this specific implementation, the overlap counter variable is decremented so that the current or new value is "0," (i.e., "1-1=0"). The updated overlap counter variable (now having a value of "0") is compared to the threshold overlap value (e.g., "0" or zero) to determine whether a next remaining entry in the listing should be examined. As discussed, in this specific implementation, if the overlap counter variable is greater than the overlap threshold the next remaining entry is examined—the determination being that there may be applications at the source that have not been previously retrieved. If the overlap counter variable is less than or equal to the overlap threshold the remaining entries are not examined—the determination being that all applications at the source have been previously retrieved.

In the example above, the remaining entries (e.g., "Invader," and "Donkey") would not be examined because the updated overlap counter variable is less than or equal to the overlap threshold (e.g., "0"="0").

The crawler may be run at any desired frequency or interval. In a specific implementation, in order to have a low latency, the crawler is run or executed at a high frequency. This helps to ensure that the app data set including apps and app metadata is up-to-date. As an example, the crawler may be run at 5, 10, 30, or 60 minute intervals. The crawler may be run daily or weekly. Some web sites may be crawled more frequently than other web sites. For example, an app marketplace that often publishes new applications may be crawled more frequently than other app marketplaces that publish new applications less often or less frequently. An app marketplace that is more popular than another app marketplace may be crawled more frequently than other app marketplaces that are less popular. Although FIG. 55 shows a single crawler, it should be appreciated that there can be multiple crawlers, e.g., two or more crawlers.

In a specific implementation, a crawler downloads from an application source an application program and associated application metadata. For example, the source may be an app marketplace web site that includes both the application program and the application metadata. In another specific implementation, the crawler, on a current crawl of the source, downloads the application program, but does not download the application metadata. For example, the application metadata may have already been downloaded on a previous crawl of the web site.

The crawler, on a current crawl of the source, may download a portion of the application metadata and not download another portion of the application metadata. For example, the downloaded portion of the application metadata on the current crawl may include some new user reviews that were not downloaded on a previous crawl. In another specific implementation, a crawler, on a current crawl, downloads the application metadata, but does not download the application program. For example, the application program may have been previously submitted to the system by a user.

The crawler may download the application program and application metadata from the same source. Alternatively, the crawler may download the application program and application metadata from different sources. A crawler may download from a first web site an application program and first application metadata associated with the first application program. The crawler may download from a second web site, different from the first web site, second application metadata that is associated with the first application program. For example, the first web site may be an app marketplace having both the application program and the first application metadata. The second web site may be a forum having a discussion thread discussing the application program. The crawler can download the discussion thread, the discussion thread being the second application metadata.

Collecting data from multiple places allows the system to develop a holistic and comprehensive analysis. Thus, depending upon the situation or source encountered by the crawler, the crawler may download the application program and not download the application metadata, download the application metadata and not download the application program, download the application program before or after downloading the application metadata, or download the application metadata before or after downloading the application program. The crawler may download the application program and application metadata from different application sources.

In a specific implementation, the crawler downloads from a source first and second application programs even if application metadata indicates that the first and second application programs are the same. For example, the first and second application programs may have the same title (e.g., "Angry Birds") thus indicating that the first and second application programs are the same. However, one of the application programs may be illegitimate (e.g., a knock-off) of the other application program. So, the crawler may download both application programs and analyze both application programs to identify any differences or identify the legitimate (or illegitimate) application program. Further discussion of application analysis is provided below.

Figure 61:
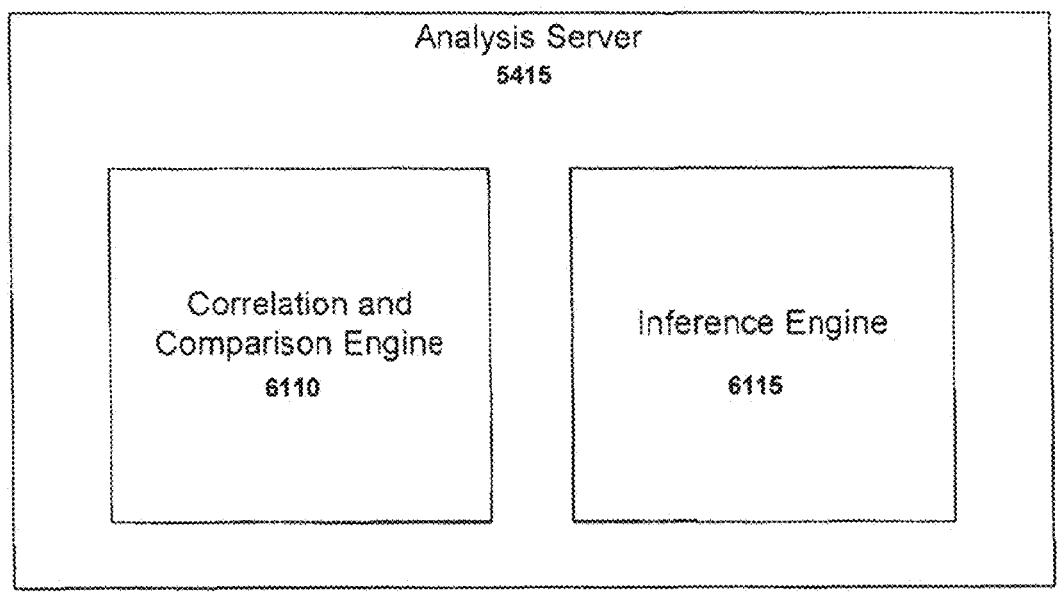
FIG. 61 is an exemplary block diagram of an analysis server.

FIG. 61 shows a simplified block diagram for analysis server 5415. As shown in FIG. 61, the analysis server can include a correlation and comparison engine 6110, and an inference engine 6115.

The correlation and comparison engine is responsible for correlating and comparing two or more application programs (e.g., application binaries), two or more associated application metadata, or both. The two or more application programs may be from a same source of application programs. For example, the two or more application programs may be from the same application marketplace (e.g., Google Android Market). The two or more application programs may be from different application sources. For example, one of the application programs may be from the Google Android Marketplace. The other application program may be from the Amazon AppStore. Likewise, the two or more associated application metadata may each be from a same or different source.

The inference engine is responsible for analysis and drawing an inference based on the correlations and comparisons. For example, although two applications may appear to be the same to a user browsing an application marketplace, the two applications may actually be different.

For example, an application binary of a first application program may be different from an application binary of a second application program. Hash values of the application binaries may be different. Signing certificates, application fingerprints, signing keys, package names, entitlements, permissions, media assets, ad network, ad network account identifiers, digital rights management (DRM) protection, publisher names, or combinations of these may be different between the two or more applications.

The inference engine can make an assessment, determination, or inference that one application is a counterfeit of the other application or that one application is illegitimate and the other application is legitimate. For example, one application may be a repackaged version of the other application. The repackaged application may include malware or other undesirable code.

More particularly, based on the metadata and binary information from the different markets, the system correlates information related to each application across different markets. Different correlation criteria may be used to determine if two applications are the same, or related.

The input used to correlate applications may include:

1) Data present in the application binaries (e.g., unique sequence of bits, either all consecutive or dispersed across different parts of an application; strings present in the application).

2) Code similarity between application binaries (e.g., based on name, structure [e.g. graph structure]).

3) The application binary containing the same or similar media assets (e.g., pictures, videos, sounds).

4) Identifiers in the application binary or metadata (e.g., package name, fingerprint of code-signing certificate, public key used to sign the app, requested entitlements/permissions).

5) Market metadata (e.g., developer name/account, icon/images, description, title, one application having replaced another application in a market).

6) Statistical properties extracted from the application binary, application metadata, market metadata, or a combination of these.

7) Extracted features that sufficiently characterize the unique properties of an application (may be any of the above).

The goal of correlation may be to determine:

1) That two applications are the same except for insignificant differences.

2) That two applications are the same except for packaging with DRM protection.

3) That one application is designed to upgrade a previous application.

4) That one application is a pirated version of another application.

5) That a third party has repackaged one application with tampered contents into another application.

6) That one application is produced by the same author as a malicious application.

7) That one application contains malicious code (that is also contained in another application).

Consider, for example, the following scenario for identifying malware. An application with the package name "com.trustme.honestapp" contains a specific bit sequence that is known to be present in previously identified malicious application. The system therefore flags such an application as malicious.

Consider, as another example, the following scenario for identifying a pirated/repackaged app. An application with a package name "com.most.famous.app" is available for a price in the official market, but it's available for free in an alternative market. However, the application is packaged with an add-on Ad SDK in the alternative market, and signed with a different code-signing certificate. In this case, based on the metadata related to price, as well as the discrepancy between package name and code-signing certificate, the system infers that the application has been pirated and repackaged with an Ad SDK.

FIG. 62 shows an overall flow 6205 for determining whether one application is a counterfeit of another application. In brief, in a step 6210, the analysis server compares first metadata associated with or describing a first application program with second metadata associated with or describing a second application program. As discussed above, the application metadata may include, for example, an application title, description, or developer name. The comparison may include measuring a degree of similarity between the first and second application metadata. If the degree of similarity is within a threshold degree of similarity, in a step 6215, the analysis server compares the first and second application programs to identify any differences. In a step 6220, at least one difference may be identified. In a step 6225, based on the identified at least one difference and the degree of similarity being within the threshold degree of similarity, a determination is made that one of the first or second application programs is a counterfeit of the other first or second application programs.

This technique can be used to identify pirated or maliciously modified application programs. In some cases, a rogue or unscrupulous developer may take an application developed by another and modify the application. The unscrupulous developer may intend that the modified application look the same as the original application so that users are lead to believe that the modified application is the same as the original application, is from the same developer as the original application, or both. For example, the modified application may have the same title as the original application.

The modified application program, however, may in fact be different from the original application program. For example, the modified application may include an ad network that is different from the ad network of the original application. The modified application may include an ad network that had not been included in the original application.

An ad network (also referred to as an advertising network) is a company that connects advertisers to web sites that want to host advertisements. An application developer may host or use an ad network with the application program. This allows the application developer to receive payment through the placement of advertisements in the application program. Typically, the ad network issues an account identifier to the developer which the developer can insert into the application. The account identifier allows the ad network to identify the developer who should receive payment when, for example, a user clicks on, views, or accesses an advertisement that is displayed with the application program. The rogue developer may modify the original application by replacing the account identifier with an account identifier associated with the rogue developer. The result is that advertising payments that should be paid to the original application developer are instead paid to the rogue developer.

As another example, the modified application may include malware, undesirable code, or otherwise cause undesirable behavior (e.g., sending text messages without user consent, deleting phone directory, copying sensitive information stored on the mobile device, and so forth). The modified application can be like a Trojan Horse—something that is presented as useful or harmless to induce the user to install and run the application. Running such a maliciously modified application can have many undesirable effects. The original developer may be deprived of payment from the would-be user or purchaser of the application, the original developer may be deprived of advertising revenue, sensitive information that the user may store on the mobile device may be stolen, the goodwill and reputation of the original developer may suffer—just to name a few examples. Systems and techniques as described in this patent application can reduce or prevent such disasters from occurring.

More particularly, in a specific implementation, in step 6210, the system measures a degree of similarity between the first and second application metadata. For example, a Levenshtein distance or edit distance may be used to measure the amount of difference between the first and second metadata (e.g., the amount of difference between the application titles or descriptions). The Levenshtein distance between two strings is defined as the minimum number of edits needed to transform one string into the other, with the allowable edit operations being insertion, deletion, or substitution of a single character. A Levenshtein distance is merely one example of a distance metric. Other distance metrics may instead or additionally be used (e.g., longest common subsequence, Damerau-Levenshtein distance, Hamming distance, or others).

Similarity may be based on text (e.g., two applications having the same or similar application titles), images (e.g., two applications having the same or similar icons), video, sound, audio data, or combinations of these. The system may use any competent image or media asset comparison technique to compare an image (e.g., icon) associated with one application program with an image associated with another application program. For example, image comparisons may be based on pixel position, color, image size, edge and boundary detection, and others. Some specific examples of image comparison techniques include Hausdorff Distance, histograms (e.g., joint histograms, color histograms), keypoint matching, and Scale-invariant feature transform (or SIFT keypoints). Acoustic fingerprinting may be used to compare application sounds. Video fingerprinting may be used to compare video.

In step 6215, if the degree of similarity is within a threshold degree of similarity, the system compares the first application program with the second application program to identify any differences between the first and second application programs. The threshold degree of similarity may be configurable such as by an administrator. As an example, the system may scan the application repository and identify applications that have a high degree of similarity between the application metadata. In other words, the applications have a low degree of difference between the application metadata. For example, the two applications may have the same title such as "Angry Birds."

An administrator may configure the threshold degree of similarity (e.g., adjust the edit distance threshold value) so that similar application titles or descriptions (though not identical) are identified. For example, based on the threshold degree of similarity, the system may identify a first application program having the title "Angry Birds." The system may identify a second application program having the title "Angry Dogs." An application program from a different developer having a similar, though not identical title, as another application program may indicate that the developer is attempting to improperly capitalize on the goodwill and reputation of the original developer.

Upon identifying two or more applications programs that may appear to users to be the same or be from the same developer, the system compares the application programs (e.g., compares the application program binaries) to identify any differences. As discussed above, a comparison can include a sequence of bits, strings present in the application, using a code similarity algorithm, using code similarity based on name, structure, or graph structure, media assets, package name, fingerprint of code-signing certificate, public key used to sign the application, requested application entitlements, requested application permissions, statistical properties extracted from the application binary, other application properties, or combinations of these. For example, a code similarity algorithm that fingerprints each component in an application (e.g. Java class, Objective-C framework, shared library) can be used to determine what types code is shared between two applications, and what code is unique. Such a code similarity algorithm may examine the structure of a given component (for example, the exposed API, the control flow or instruction contents of the component's implementation, linkage to other components, or other aspects of the component) to create a fingerprint that uniquely identifies that component as different from other components.

In step 6220, at least one difference may be identified between the first and second application programs. The at least one difference may include the first and second mobile application programs having different package names. For the Android platform, the package name may be used to identify the application. The package name may be unique on the Android Market such that there may not be two or more application programs with the same package name on the Android Marketplace.

The at least one difference may include the first and second mobile application programs having been signed with different code-signing certificates. Code signing is a mechanism whereby publishers of software and content can use a certificate-based digital signature to verify their identities to users of the code, thus allowing users to decide whether or not to install it based on whether they trust the publisher. So, for example, the original application developer may have a code-signing certificate that is different from a code-signing certificate of the rogue developer.

The at least one difference may include the first and second mobile application programs having different requested permissions. As discussed above, a platform, such as Android, provides applications with an API that includes access to device hardware (e.g., camera), communication networks (e.g., Wi-Fi, and cellular network), settings, and user data. So, for example, a rogue developer may modify the application program such that the program requests additional permissions that may not be needed for the original application to function. For example, the additional permissions may include permissions to access personal user data stored on the device.

The at least one difference may include the first and second mobile application programs having different digital rights management (DRM) protection. For example, if an application has DRM, and then it can be an indication that the application (e.g., game) has been pirated/repackaged if that DRM has either been modified or removed.

The at least one difference may include the first and second mobile application programs having different publisher names, e.g., in market metadata. The at least one difference may include the first and second mobile application programs having different account identifiers issued by an ad network. The at least one difference may include the first and second mobile application programs having different behavior when probed or analyzed by an analysis system, e.g., dynamic analysis.

The at least one difference may include the first and second applications having different code, e.g. one application having additional code. Furthermore, the at least one difference may include the first and second applications having different code, the difference in code having risky functionality. For example, when determining code in one application that is not present in another (e.g. by code fingerprinting), it is possible to analyze the functionality of that additional code using static analysis techniques. If an additional code performs benign functionality (e.g. no data access or risky behavior), it may be treated differently than if it performs risky functionality (e.g. sending text messages, accessing user data). Benign functionality in added code may not be considered a difference between the two applications, while risky functionality in added code may be considered a difference.

In step 6225, the inference engine, based on at least the identified at least one difference, and the degree of the similarity between the first and second metadata being within the threshold degree, determines that one of the first or second application programs is a counterfeit of the other first or second application programs. Factors that may be used to determine which of the first or second application programs is the counterfeit application program include the application price, application source, application release date, other factors, or combinations of these.

For example, the application with the lower price may be identified as the counterfeit application because the rogue developer may price the counterfeit application at a lower price so that users are more likely to buy the lower priced application than the higher priced application. The application from the alternative marketplace may be identified as the counterfeit application because the official application marketplaces (e.g., Android Marketplace) may have better screening procedures to block undesired applications than the alternative marketplace.

It should be appreciated, however, that the first and second application programs may be from the same source. For example, both the first and second application programs may be available on the official Android Marketplace. A rogue developer may upload a pirated application program into the same store as the legitimate application program. In this case, other factors may be used to identify which of the two application programs is the counterfeit. The application with the later release date may be identified as the counterfeit application because generally the counterfeit application will have been released after the original application is released. Instead or additionally, the ad network account identifier may be used to identify the counterfeit application.

In a specific implementation, a method includes receiving from a developer a designation of a first source authorized by the developer to host a first application program, designating the first source as the authorized source, identifying a second application program hosted on a second source having application metadata similar to the application metadata of the first application program, and determining, based on the first source being the authorized source and the application metadata being similar, that the second application program is the counterfeit.

The method may further include notifying or alerting the application developer. The notification may include sending an e-mail or other message to the application developer to inform the developer that there may be a counterfeit of their application program that is hosted on the second source. This service provided by the system allows the application developer to take steps to remove the counterfeit application program from the second source. Instead or additionally, the owner of the second source (e.g., marketplace owner) may receive the notification or alert so that the owner can remove the counterfeit application program.

It may not always be the case that an official application marketplace (e.g., Android Marketplace) is the authorized source. For example, the developer may choose to upload their application to an alternative marketplace because fees (e.g., listing fees) and commissions may be less on the alternative marketplace than the official marketplace. Thus, the alternative marketplace (e.g., a marketplace not owned by the platform developer) may be designated as the authorized distribution source. Providing the ability to designate a marketplace as the authorized or designated source helps to protect developers and consumers from counterfeit applications that may in fact be hosted on the marketplace of the platform owner (e.g., Android Market or Apple App Store).

In another specific implementation, the system provides a service to notify trademark owners if their mark is being improperly used in connection with an application program. In this specific implementation, the system receives a mark. The mark can be a name, word, phrase, logo, symbol, design, image, or a combination of these. The system scans the application repository to identify any applications having the received mark (or an object similar to the received mark). Upon identifying an application having the received mark, the system sends a notification (e.g., e-mail notification) or otherwise alerts the trademark owner. In another specific implementation, the system provides a service to notify copyright owners if their copyrighted material is being used in connection with an application program in a similar manner to notifying owners of trademarks, and may be used for any sort of copyrighted material that can be digitized (e.g. audio, video, software code, images, text).

Figure 63:
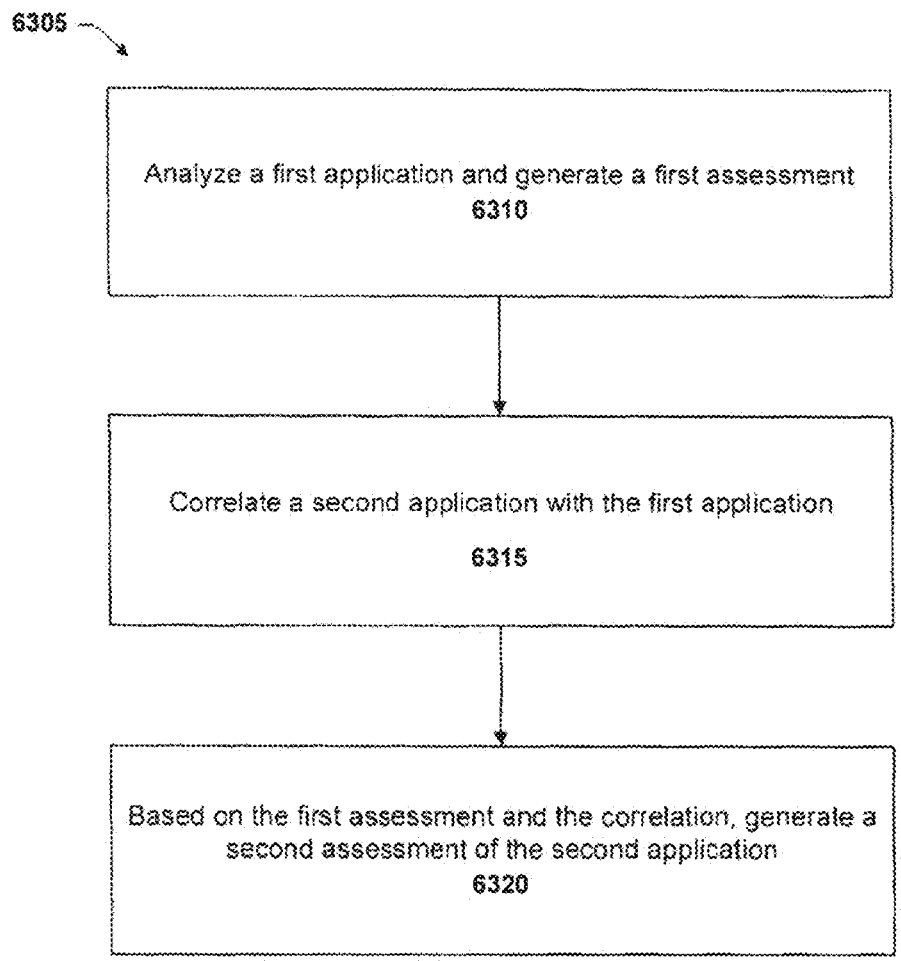
FIG. 63 is an exemplary flow diagram illustrating the steps of an embodiment.

FIG. 63 shows an overall flow 6305 for correlating applications and making assessments based on the correlation. In a step 6310, analysis server 5415 (FIG. 54) analyzes a first application program and generates a first assessment of the first application program. As discussed above, an assessment may include a security assessment such as whether or not the first application program includes malware, or a virus. An assessment may reflect the rate or amount of battery consumption by the first application program, the type of permissions requested by the first application program (e.g., whether the first application program can access a geographical location of a device, or whether the first application program can access personal information stored a device), a determination of whether the first application program is over-privileged (e.g., first application program requests permissions that are not necessary for the first application program to properly function), or combinations of these.

In a step 6315, a second application program is correlated with the first application program using one or more correlation criterion. For example, Table M below shows some of the application information that may be stored in the repository of the system.

TABLE M

| Application Title | Developer |
| --- | --- |
| Star Patrol | Terotta |
| Tac Man | Boogle |
| Ground Hogs | Macrosoft |
| Block Fighter | Terotta |

In Table M, a first column lists the application. A second column lists the developer. In this scenario, the system may correlate the application "Star Patrol" (e.g., first application program) with "Block Fighter" (e.g., second application program) based on developer name. Correlation can be applied based on any unit of data associated with an application. As discussed above, the correlation may be based on data present in the application binaries, code similarity between application binaries, media assets included in the application binaries, identifiers in the application binaries, identifiers in the application metadata, developer, author, publisher, market metadata, statistical properties, feature extraction, application source, DRM protection, or combinations of these.

In a step 6320, based on the first assessment of the first application program and the correlation of the second application program with the first application program, the system generates a second assessment of the second application program. For example, the system may make a first assessment that the application program "Star Patrol" is malicious. Based on the malware assessment and the correlation of "Block Fighter" with "Star Patrol," a second assessment is generated. For example, the second assessment may be that "Block Fighter" is malicious or is likely to be malicious. The second assessment may be the same, similar, or different from the first assessment.

In a specific implementation, the second assessment may be generated without, for example, scanning the second application program. The second application program may not be stored in the application repository. For example, the application repository may include metadata associated with the second application program such as the application title and developer name, but not the application binary. Through the correlation, however, the system can generate an assessment for the application program.

An application may be published in multiple places. In an implementation, the system provides a correlation of publishing factors to tie identities about a publisher across multiple markets. The correlated information can be used to identify distribution patterns across multiple markets, to track the spread of malware across multiple markets, to generate protection for one market based on data published in another market.

Referring now to FIG. 54, such a system offers many benefits to developers, consumers, application marketplace owners, trademark and copyright owners, and others. For example, in an implementation, the system provides a programmatic interface that is made available to marketplace owners. In this implementation, a developer submits an application to the marketplace for hosting. The application is received by the system through the programmatic interface, analyzed, and an assessment is returned. Based on the assessment, the marketplace owner may decide to host or not host the application.

In another implementation, the system provides a malware scanning service. A user may have an application installed on the device. Rather than submitting the entire application to the system, an application identifier (e.g., hash or application title) may be submitted. Not having to submit the application helps to conserve computing resources (e.g., network bandwidth). Upon receipt of the application identifier, the system matches the application identifier to the corresponding application assessment. The corresponding application assessment is returned to the user. An example of a scanning service is further described in U.S. patent application Ser. No. 13/335,779, entitled "System And Method For A Scanning API," filed Dec. 22, 2011, which is incorporated by reference.

The system may provide a graphical user interface (e.g. web page or consumer portal) for the user to enter the application identifier. The system can return an assessment including an application profile that may detail security information or privacy concerns about the application, sources or marketplaces where the application is hosted, and the like.

In another implementation, the system provides a brand protection service. For example, in this implementation, a trademark owner may be notified by the system if a mark (e.g., logo) is used in an application program. This helps trademark owner to enforce their intellectual property rights and helps to prevent consumer confusion over the source of goods and services.

In a specific implementation, a method includes crawling mobile app metadata and binaries from different sources to build, organize, and store a holistic view of each app for each market. In another specific implementation, a method includes creating contextual views of markets (e.g., language, device type, etc.) by emulating particular types of clients when crawling. In another specific implementation, a method includes using the crawled information to correlate apps based on the crawled data in one market or across multiple markets (for many uses, e.g., malicious, pirated, repackaged apps).

It is noted that at least one fundamental difference between generic web-crawlers and the current disclosure is that generic-crawlers organize the data to facilitate quick end user search and retrieval—not to make inferences about other data items on the Internet itself. In a specific implementation, the system in this disclosure, however, makes targeted downloads of mobile apps and its associated metadata, and organizes the data to make inferences about other mobile apps on the web. Even focused web-crawlers, like a generic crawler, organize their data for efficient query and retrieval and do not use the information to make inferences about other data items (mobile apps) on the Internet itself.

Further, none of the crawlers (1) make a distinction between the crawled data itself (mobile app) and the metadata associated with the data (e.g., user comments, app ratings, etc.); (2) combine metadata information extracted from the data itself as well as other sources of metadata (e.g., user ratings etc., which are typically available from a very different source) into a holistic view; or (3) use the data as well as the metadata to make correlation and inferences about other data items on the Internet. In the context of information retrieval, the correlation is done against the query-term that the end user has provided, not against the crawled data itself.

Figure 64:
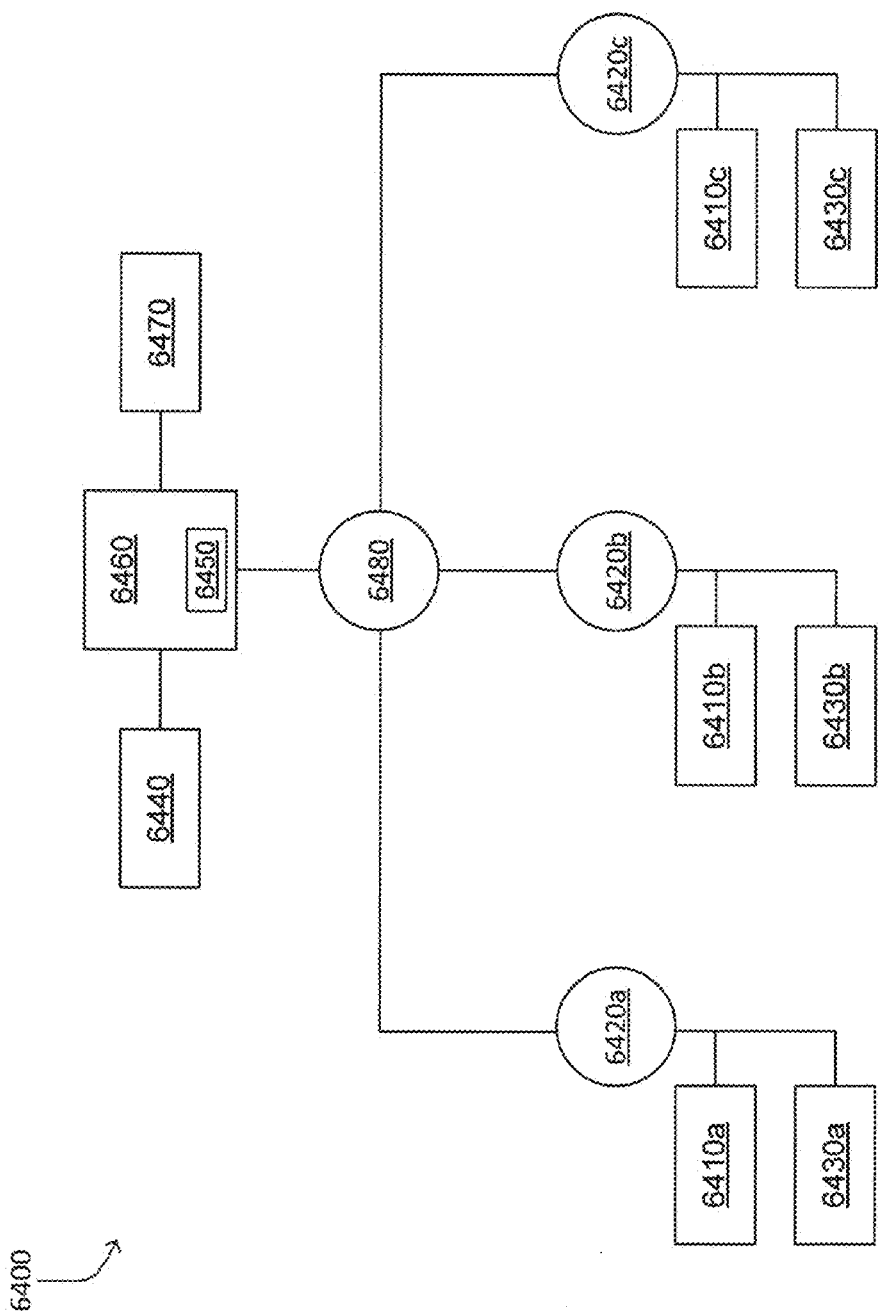
FIG. 64 is an exemplary block diagram illustrating an embodiment of a system.

FIG. 64 is an exemplary block diagram illustrating an embodiment of a system 6400 for sharing risk information and responses through a form of social networking between administrators 6410a, 6410b, and 6410c who each may be responsible for the security of an enterprise's network 6420a, 6420b, and 6430c and fleet of computing devices 6430a, 6430b, and 6430c. Administrators 6410a-c may be, for example, network administrators, enterprise security administrators, and chief internet security officers (CISOs).

Fleets 6430*a-c* may each be, for example, a fleet of mobile communications devices associated with the respective administrator and enterprise (e.g., enterprises 6510, 6520, and 6530 (FIG. 65)). Administrators 6410*a-c* may be in communication with each other through their respective networks and a common network 6480. Common network 6480 may be in communication with a server 6460 with a security component 6450 that has access to a relationship database 6440 and a security database 6470. In the embodiment, an administrator (e.g., administrator 6410*a*) may be provided information about what other administrators (e.g., administrators 6410*b-c*) are deciding for a given risk or type of risk, which the administrator may find beneficial in determining how to respond to the given risk or type of risk and thereby improve the functioning of that administrator's fleet of computing devices. In the embodiment, to determine the information one administrator shares with another, administrators may create relationship profiles for their respective enterprises.

Figure 65:
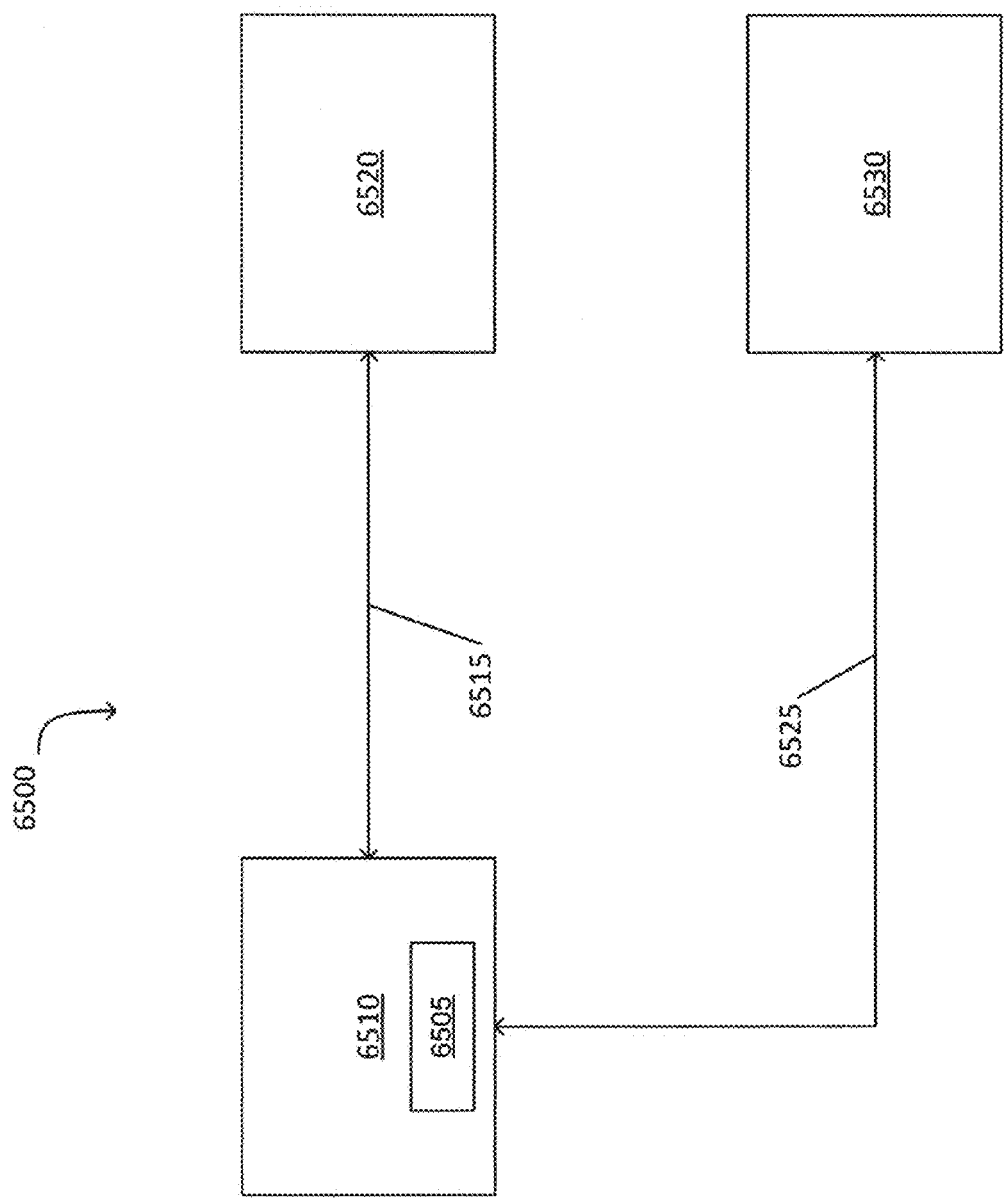
FIG. 65 is a graphical depiction of an exemplary relationship profile according to an embodiment.

FIG. 65 is a graphical depiction of an example of a relationship profile 6500 for an enterprise 6510. In FIG. 65, enterprise 6510 is shown with relationships 6515 and 6525 with other enterprises 6520 and 6530, respectively. Enterprises 6510, 6520, and 6530 may be the respective enterprises of administrators 6410*a-c*, networks 6420*a-c*, and fleets 6430*a-c*, of FIG. 64. Administrator 6410*a* (FIG. 64) may have created profile 6500 for enterprise 6510. In FIG. 65, relationships 6515 and 6525 indicate whether enterprise 6510 is willing to share information 6505 (e.g., information related to risks, risk events, or types of risks, and risk responses) with enterprises 6520 and 6530. Relationship profile 6500 with relationships 6515 and 6525 may be stored in relationship database 6440 (FIG. 64). Information 6505 may be stored in security database 6470 (FIG. 64). Risk information 6505 shared between enterprises 6510, 6520, and 6530 may be used by the respective administrators 6410*a-c* (FIG. 64) to improve the functioning of the networks 6420*a-c* (FIG. 64) and fleets 6430*a-c* (FIG. 64) of computing devices associated with enterprises 6510, 6520, and 6530. Risk information 6505 may be, for example, provided by administrators 6410*a-c* (FIG. 64) and also obtained by security database 6470 (FIG. 64) from device security components (e.g., local security component 105 (FIG. 1) running on devices, e.g., the devices of fleets 6430*a-c* (FIG. 64) associated with enterprises 6510, 6520, and 6530. Such device security components may be considered "sensors" that supply data to security database 6470 (FIG. 64).

In the embodiments, administrators may be thought of as a special set of users. Various embodiments provide methods for these special users to receive contextualized (and therefore more likely to be relevant) information from other administrators on what the other administrators are doing in response to certain risks. Various embodiments address how to provide risk information to an administrator that matches the context of the administrator's enterprise. Embodiments may provide such administrators with information relating to different risks, risk events, and types of risks that other enterprises are experiencing and how the other enterprises respond to such risk issues. The information provided may allow the administrator to make more informed decisions regarding how to protect the administrator's own enterprise. The decisions may relate to a network, an entire fleet of computing devices, and to specific devices. For example, an administrator may be provided with information indicating that a particular application on the CEO's mobile communications device is suspect. The specificity of the information may allow the administrator to request that the CEO refrain from using the suspect application, avoiding a potential need to lock the CEO's device.

Enterprises 6510, 6520, and 6530 may include other types of collections of users, such as businesses, organizations, departments, groups, or families. Any of the different types of collections may have an associated network and fleet of computing devices, such as mobile communications devices. And any of the different types of collections may have an administrator responsible for the security of the networks and fleets associated with the collection. In an embodiment, a collection may be considered to be a group with an administrator who is responsible for the networks and fleets of computing devices associated with the group.

An enterprise or other collection may also include within it a number of sub-divisions, which may be considered enterprises or other collections in their own right. For example, first and second enterprises may be different units or departments in the same company and the systems and methods of embodiments may be used to facilitate sharing across intra-company boundaries and other types of organization boundaries. Thus, in embodiments, a collection may also be thought of as encompassing subsets of the networks and fleets of computing devices for which an administrator is responsible. For example, if an administrator is responsible for an enterprise with first and second divisions, the first division may be considered a collection with its own fleet of mobile computing devices.

In addition to protecting the enterprise's network and fleet, an administrator may need to account for an employee's use of their own mobile communications device to access enterprise resources (e.g., a bring-your-own device (BYOD)). In other words, an enterprise or other type of collection may own, operate, control, or otherwise be monitoring a number of mobile communications devices that have access to the enterprise's network and the administrator may be responsible for putting in place network, device, or other policies designed to protect or bring about and ensure the proper functioning of the network and fleet of computing devices.

To improve the sharing of information, attributes of these enterprises and their networks and associated fleets may be stored in relationship database 6440 (FIG. 64) as well as security database 6470 (FIG. 64). Thus attributes may link relationship database information 6440 with security database 6470 information as readily as the identity of an enterprise. Therefore, the attributes of an enterprise may be used by server security component 6450 (FIG. 64) to filter, aggregate, categorize, or otherwise process data from both the relationship and security databases. In an embodiment, the relationship and security databases could be combined into a single database.

Embodiments of the method for sharing risk information and responses generally address risks that have been detected in some way, either through an enterprise detecting a risk, e.g., based on its own data from its own mobile communications devices, or through the risk information system detecting a risk based on, e.g., an analysis of data from the security database and the relationship database.

Information relating to the different risks, risk events, or types of risks may be stored in a security database also accessible to the server security component. Such risk information may be supplied directly by administrators or obtained by the security database from device security components running on devices, e.g., mobile communications devices, associated with an enterprise.

Embodiments may refer to enterprises, businesses, organizations, groups, or other types of collections as performing an action, such as instituting a security policy and sharing a risk response, but this should be understood to include situations in which a particular actor, such as an administrator or a computer program, has performed the action as the representative of the collection. In embodiments a computer program may be given authority to act without requiring the approval of an administrator.

In FIG. 65, the administrator for enterprise 6510 has created a collection profile 6500 in which enterprise 6510 has relationship 6515 with enterprise 6520. Enterprise 6510 has an additional relationship 6525 with enterprise 6530. In the embodiment, relationship 6515 may indicate that enterprise 6510 wishes to share information 6505 with enterprise 6520, and relationship 6525 may indicate that enterprise 6510 does not wish to share information 6505 with enterprise 6530.

In an embodiment, information, such as information related to risks, risk events, and risk responses may be categorized into information of different levels with the administrator further defining relationships 6515, 6525 to differentiate between levels of information that enterprise 6510 is willing to share with enterprises 6520, 6530. For example, relationship 6515 may indicate that enterprise 6510 is willing to share level 1 information (e.g., proprietary information) with enterprise 6520, while relationship 6525 may indicate that enterprise 6510 is only willing to share level 3 information (e.g., administrative procedures) with enterprise 6530.

In an embodiment, relationships 6515, 6525 may be defined by the administrator based on an attribute of enterprise 6520 or 6530, rather than on their identities. For example, the administrator for enterprise 6510 may have created relationship 6525 and limited enterprise 6530 to receiving level 3 information because of a known affiliation enterprise 6530 has with a competitor of enterprise 6510. In such a case, enterprise 6530 was limited to receiving level 3 information because of the attribute of having an affiliation with a particular enterprise, and not because of the identity of enterprise 6530. Thus, in an embodiment, rather than defining a relationship based solely on the knowledge an administrator has of another entity, an administrator may create rules to define relationships with known and unknown entities. That is, enterprise 6530 may have been entirely unknown to the administrator for enterprise 6510, yet the administrator may have created a rule where level 3 information is shared with any enterprise that had an affiliation with a competitor of enterprise 6510. In the case of such rules, the server security component may access the relationship or security databases to retrieve enterprise attributes and determine which enterprises, such as enterprise 6530, are limited to receiving level 3 information because of an affiliation with a competitor of enterprise 6510.

In an embodiment, an administrator may create hierarchical relationships between relationship rules. For example, relationship 6525 could depend on, or be the function of, three rules. Rule 1 could state that enterprise 6530 is to receive level 1 information. Rule 2 could state that enterprises with an affiliation with a particular competitor of enterprise 6510 are limited to level 3 information. And Rule 3 could state that Rule 2 takes priority over Rule 1. If the attributes for enterprise 6530 indicate that enterprise 6530 has an affiliation with a competitor to enterprise 6510, then regardless of whether the administrator for enterprise 6510 knew of this relationship, the rules the administrator created would work to limit enterprise 6530 to receiving level 3 information. Furthermore, the creation by enterprise 6530 of a relationship with a competitor of enterprise 6510 could by itself be considered an "affiliation with the particular competitor" and, according to Rules 2 and 3 work to limit enterprise 6530 to level 3 information.

In an embodiment, administrators for enterprises 6510, 6520 could share information regarding a specific risk, or risk event, or query each other regarding such risk issues. In the embodiment, should one of the enterprises have already addressed the issue, that enterprise could share their risk response with other enterprises. Thus, the embodiment creates a forum in which administrators may share information.

Figure 66:
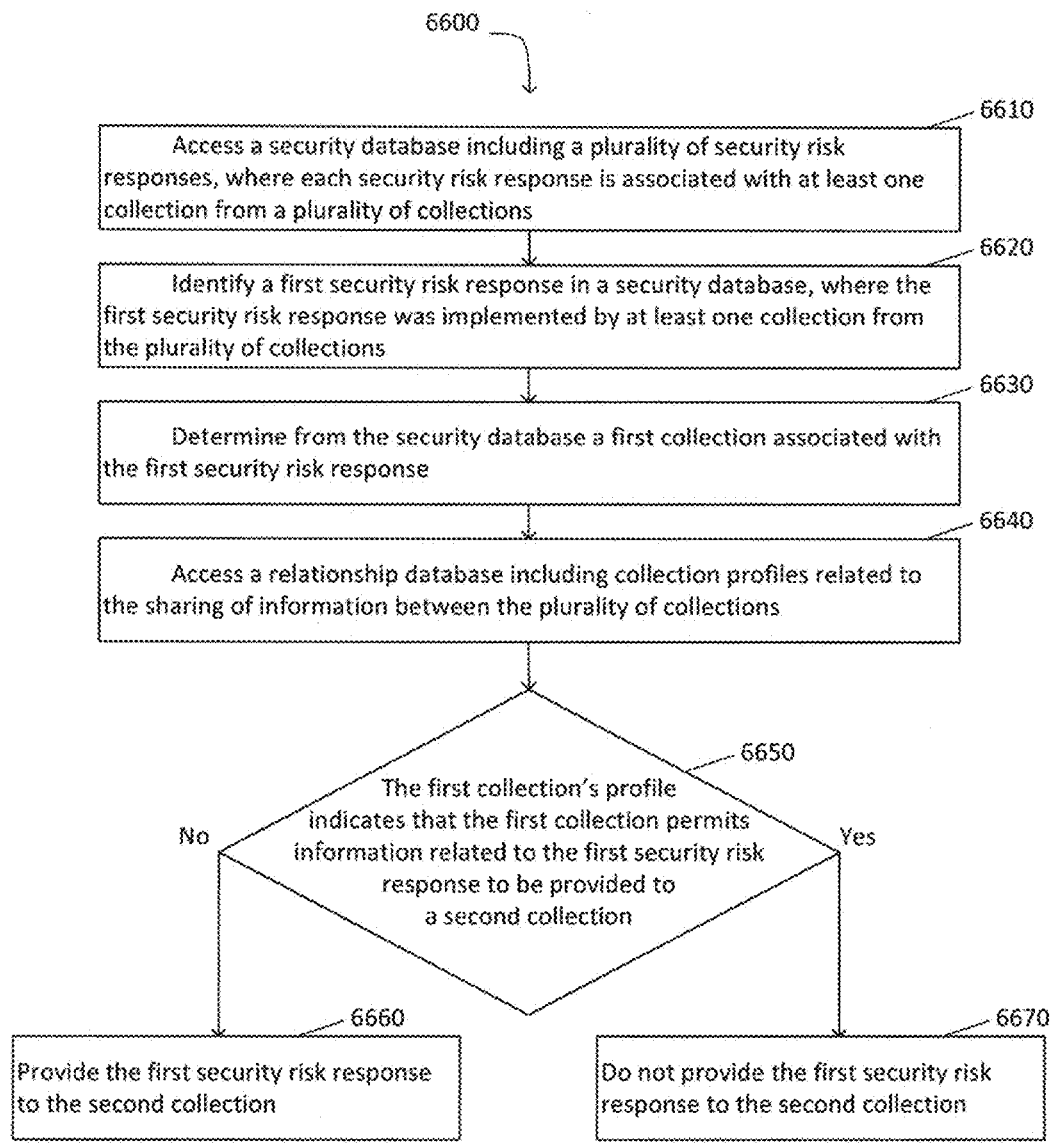
FIG. 66 is an exemplary flow diagram illustrating the steps of an embodiment.

FIG. 66 depicts an embodiment of a method 6600 for sharing information related to risk responses. In step 6610, a server security component access a security database including a plurality of security risk responses, where each security risk response is associated with at least one collection from a plurality of collections. In step 6620, the server security component identifies a first security risk response in a security database, where the first security risk response was implemented by at least one collection from the plurality of collections. For example, a risk response may be implemented by a collection when an administrator for the collection adopts the security risk response and directs that computing devices associated with the collection implement the security risk response. In other words, when referring to a collection implementing a security risk response (or a collection "acting" in any manner, such as "permitting" information related to the first security risk response to be shared, mentioned below) it includes the case where an administrator directs the collection to implement the risk response (the administrator directs the collection to "act") and the case where the administrator directs the collection to adopt the risk response as a policy. Furthermore, cases where an administrator directs an act also include a server security component acting for the administrator. In step 6630, the server security component determines from the security database a first collection associated with the first security risk response. In step 6640, the server security component accesses a relationship database that includes collection profiles related to the sharing of information between the plurality of collections. In step 6650, it is determined whether the first collection's profile indicates that the first collection permits information related to the first security risk response to be provided to a second collection. If so, in step 6660 the first security risk response is provided to the second collection. If not, in step 6670, the first security risk response is not provided to the second collection.

In embodiments, a risk, risk event, or risk type may impact an enterprise in a number of ways. For example, the risk may affect or potentially affect a network, an application, an operating system, or a file. Risk information generally includes all information regarding risks, risk events, risk types, and peripheral information that might be useful for processing and interpreting the data, e.g., enterprise attributes, responses to risks, network data, mobile communications device data, application data, operating system data, and file data. Risk information could also include statistical information regarding the prevalence or propagation of a risk within an enterprise's own mobile communications devices or within an industry vertical market. Such information could also be divided or categorized into information levels, which an administrator may treat differently when sharing as discussed previously.

In an embodiment, the shared information for an application may be correlated by attributes other than or in addition to code similarity. For example, the shared information may be correlated according to an industry vertical market. The correlation may show that an application or software component may be more prevalent in the banking industry than in another industry, for example, insurance. The correlation of the application to banking industry may be of interest to an administrator of a banking enterprise because the correlation may indicate that the software is targeting the banking industry, and therefore may warrant further inspection. Conversely, a lack of correlation may provide some relief as an indication that the application does not target the banking industry. If there is a correlation with the banking industry, and if there is a further correlation with communications with an IP address is a particular foreign country, then that may be a strong indication that the application warrants further investigation or even quarantine. Furthermore, correlation may be enterprise-specific. A particular bank may be sending communications at twice the rate of its industry vertical market when correlated to the presence of an application. To that bank's system administrator such a targeted correlation might be a trigger to quarantine the application.

Thus, in embodiments risk information may be correlated to (i.e., be determined to be relevant to) an enterprise (or not) in a number of ways, including the following examples: by the content of application code; by where an application focuses (e.g., industry, location, enterprise, and function); by where an application sends communications (e.g.: Does the application send communications to an IP address outside the enterprise's firewall? Does the application send communications to a foreign government? Such communications may be an indication of malware.); by how an application behaves or is behaving in comparison to other enterprise applications. Furthermore, correlation is potentially more interesting when it does not exist. That is, an inverse correlation can be interesting, since outliers of any sort may be illuminating.

As a result, various embodiments provide an administrator with a lens for viewing or analyzing an enterprise's risk information (e.g., risk tolerance and measures of the detected risks, risk events, risk types, and risk responses) in a variety of contexts ranging from society in general, to a relevant industry vertical market, to a direct comparison with another enterprise.

In an embodiment, when an administrator is alerted to a risk (e.g., by being notified by the server security component of a risk detected upon analysis of the security database, or by being informed of a risk by a participating administrator) the administrator has a number of options. The administrator may broadcast the risk according to his enterprise relationships. The administrator may directly query other enterprises (through their administrators) to get information. For example, the administrator may wish to know how prevalent the issue is elsewhere, or how the other administrators dealt with the issue. The administrator may query other enterprises based on enterprise attributes that the administrator thinks are relevant, such as directing the query to enterprises within an industry vertical market. This would allow the administrator to obtain relevant information from enterprises with which the administrator does not have an existing relationship, so long as they participate in the relationship and security databases. In this manner, embodiments leverage the collective knowledge of the combined enterprises or other types of collections to improve the ability of an individual enterprise to response to a risk. By way of this leveraging, embodiments improve the functioning of the networks and devices associated with the combined enterprises. The administrator could direct similar queries directly to the security component itself, which would then process the data in the security database or relationship database or both to provide a response.

A query directed to determining the prevalence of a risk elsewhere is an example of a query that may be distributed according to enterprise attributes rather than enterprise identities. More specifically, the query may be distributed based on attributes or categories according to the interests of the administrator. For example, a request for a measure of the prevalence in enterprises of a certain size could be directed to the server security component, which would in turn process enterprise data in the relationship and security databases to provide an response. In addition to size, other categories might include, e.g.: industry vertical market, industry technology, and enterprise size, or location, etc. In an embodiment, an administrator may create conditions that must be fulfilled before a relationship with another enterprise is created. For example, with reference to FIG. 65, should the administrator of enterprise 6510 wish to share information with enterprise 6520 only if the information and the sharing of information was kept secret, then enterprise 6510 could make these conditions a pre-condition that enterprise 6520 must accept before relationship 6515 is created.

In an embodiment, with the creation of the relationship database (including relationship profiles such as relationship profile 6500) and the security database, and with the server security component having access to both databases, server security component, the server security component, relationship database, and security database provide a risk information system. The risk information system may itself detect risks in addition to allowing enterprises to request or share information regarding risks. For example, by having access to the security and relationship databases, the server security component has access to data across enterprise boundaries. Such global access to data may allow the server security component to detect risks, risk events, or risk types before systems with access to more limited data sets. Furthermore, based on a risk detected by the system or based on a risk detected by an enterprise and brought to the system's attention via an alert or similar notice, the risk information system provides the ability for the server security component to process relationship and security database information and determine what enterprises the detected risk is likely to affect. In this manner, the risk information system provides vectors by which it may be discovered who is affected by or subject to a particular risk. In other words, the volume of data received as more enterprises, businesses, organizations, and other collections that create relationship profiles and provide data to the security database should enable the risk information system to detect risks, distribute responses, and improve the functioning of the networks and associated collections of mobile communications devices for the participating groups. In time, the influx of data will establish a massive database (relationship database and security database) that allows a high degree of correlation of risk or degree of risk from the known risks (about which the system has massive data) to new potential risks based on machine learning and using the massive established data set.

This would be an incentive for enterprises that are competitors on a commercial level to participate in the risk information system—namely, such collaboration with industry competitors would provide a net benefit to the enterprise. And, as stated, an enterprise may put conditions on their participation in the risk information system regarding with which other participants they share information, on the levels of information shared, and on participation being anonymous, with these being examples of the many such conditions. For example, a further condition might include a reciprocity clause and the reciprocity clause may further define reciprocity above or below a certain level of information. In sum, such sharing of risk information provides a true network effect in which a participant receives substantially more benefit when its peers also participate in comparison to when peers opt out.

As an example of how the server security component might provide a risk alert, the server security component may correlate a risk event with a source application used by an affected enterprise or an affected group of affected mobile communications devices, or in a particular industry. All such attributes may provide a vector of correlation, or, which is often as important, uncorrelation. Subsequently, the server security component could also determine that the source application shares a significant amount of code, e.g., 30%, with a now-suspect application. In turn, the security component could determine from data in the security database or relationship database that the now-suspect application is used by one mobile communications device associated with another enterprise in the particular industry. The server security component may then alert the user of the now-suspect application to the potential that the now-suspect application will exhibit the same risk behavior that was correlated to the source application. The server security component could also condition the alert notice on further attributes. For example, in addition to the code similarity, the server security component may also alert an enterprise only if the enterprise is also in the same industry vertical market in which the source application was found. Other attributes from the relationship and security databases may be similarly used to filter which participating enterprises are alerted by the server security component.

In an embodiment, risk information data may be acquired by the security database from instances of device security components ("sensors") instantiated on, e.g., mobile communications devices. Such sensors may supply the security database with information about the device on which it resides. For example, the sensor may provide information about the applications running on the device and the general functioning of the device, and the sensor may provide information about the risk responses the device has implemented, presumably at the direction of an enterprise administrator. Information from any sensor associated with a particular enterprise, business, organization, or other collection, is shared by the server security component according to the relationship information provided to the relationship database by the collection's corresponding administrator.

In an embodiment, risk responses to a risk event or risk type may be contributed by collections and stored in a security database along with risk information associated with the risk response. A security component may access the security database and determine, from stored risk responses and associated risk information, that a particular risk response may be relevant information related to a detected security event. The security component may then share the particular risk response to other collections that may be affected by the detected security event, or otherwise according to embodiments.

In an embodiment, a net benefit of the risk information system is that an administrator may decide to permit or not permit applications based, not only on a component level analysis of risk from the application and on the decisions and policies of the single administrator, but also based on risk information shared by other administrators who participate in the risk information system.

In an embodiment, the server security component may deploy or execute risk responses based on, e.g., rules provides in the relationship database.

In an embodiment, the risk information system may be leveraged to analyze one or more mobile communications devices from a "new" enterprise or other type of collection whose mobile communications devices are not generally running instances of the device security component. The embodiment may be particularly useful for "instant responders," people who may be the first to be presented with a device issue in any given new organization. In the embodiment, the instant responder may install the device security component on a number of devices in the new enterprise or other type of collection. For some time after installation, the device security components may send device data to the security database. The server security component may analyze the newly-acquired data and report risk-related information to the instant responder, including, e.g., risks, detected risk events, and risk types. The server security component may also provide the instant responder with risk responses associated with the risk-related information. Since these risk responses would come from the security database, in the embodiment the originators of the response would need to have given permission for the risk response to be shared with such new organizations. The embodiment provides a powerful method for demonstrating the benefit of participating in the risk information system to the administrator of the new enterprise. For example, the analysis may tell the instant responder than the problem with a particular mobile communications device is new to the instant responder's industry vertical market, but that the same problem has occurred in another industry vertical market. The analysis may also be followed by how the problem was addressed elsewhere.

An embodiment that is similar to the preceding embodiment provides a method for onboarding a new enterprise into the group of participating collections. For this embodiment, it is assumed that one or more devices of the new enterprise have previously been equipped with instances of the device security component. For example, risk information data may be collected by the security database from mobile communications devices that have been using resources (such as IP addresses) that are themselves associated in the security database with the new enterprise. Such resource-specific risk information may then be associated with the new enterprise based on the use of the new enterprise's resources. In this way, device security components may supply the security database with risk information relating to the "new" enterprise and with the new enterprise's attributes. For example, the device security components may have already provided information to the security database regarding all the applications running by the new enterprise's devices. It is also assumed that the server security component has analyzed the supplied risk information and enterprise attributes and has prepared a corresponding report. However, because the new enterprise has not yet become a participant and has not yet created relationship information, any data supplied by device security components from the new enterprise's devices has not yet been shared. In the embodiment, should a non-participating-but-curious administrator wish a demonstration of the benefits of participation in the risk information system, the curious administrator is shown a demonstration. The demonstration may be based on the risk information and enterprise attribute information already received by the security database and on the results already generated by the server security component. For example, the curious administrator may be asked to scan a Quick Response (QR) code with a mobile communications device. The QR may link the curious administrator to the report from the server security component with full forensic detail on the applications known to be used by the new enterprise. The link may allow the curious administrator to inspect the report in more detail and it may allow the curious administrator to download the report so that the administrator may retain the report as an example of what might be an ongoing benefit should the administrator choose to participate in the risk information system.

In an embodiment, the server security component may analyze risk information and enterprise attributes from the security database to determine an objective measure of a level of risk tolerance for a particular enterprise. That is, the sever security component may compare, e.g., enterprise applications, enterprise security settings, and enterprise traffic over the enterprise network using data supplied by device security components on each participating enterprise's mobile communications devices to develop an objective measure of risk tolerance for each enterprise. That objective measure of risk tolerance may then become another enterprise attribute, which like any enterprise attribute or attributes may be used when formulating relationships for the sharing of risk information. For example, each enterprise may have its own internal policy on risk tolerance. With the embodiment, an administrator may compare that internal policy to how the administrator's enterprise ranks against other participating enterprises. Furthermore, that administrator may, for example, not choose to share risk information with a prospective enterprise based on the prospective enterprise exhibiting an unreasonably high tolerance for risk based on the ranking. Such a decision not to share may be based on an assumption that the administrator's enterprise has nothing to gain with sharing response information with the prospective enterprise because the prospective enterprise will not likely have anything to share in return. The label of "unreasonably" risk tolerant may be conferred based on the objective measure of risk tolerance for the prospective enterprise and a comparison with an average risk tolerance of, e.g., peers in the same industry. An unreasonable risk tolerance may be some number of standard deviations from the norm. Within particular community, if one enterprise is more risk tolerant, this may provide a motive for other administrators to adopt policies when dealing with risky enterprise. For example, personal data may be encrypted when it is supplied to a risk-tolerant enterprise.

In an embodiment, the attributes of enterprises (or other collections) may be used to determine whether any similarities between two enterprises are great enough that information from a first enterprise is likely to be relevant to a second, and, therefore, whether to share information from the first to the second enterprise. That is, in FIG. 66, step 6640 may include accessing, by a server security component, a relationship database including collection profiles related to the sharing of information between the plurality of collections. These collection profiles could include collection attributes. From information related to the first security risk response, the server security component could identify a set of attributes of the first security risk response. And from the profile information, the server security component could identify a set of attributes of the second collection that are similar to (or "match") attributes of the first security risk response. Then, the server security component could provide the first security risk response to the second collection when the number of attributes of the second collection that are similar to or match attributes of the first security risk response is equal to or exceeds a threshold number. Though this may still require that the first collection profile indicates that the first collection permits information related to the first security risk response to be provided to the second collection, it may also be that above a certain number of similar attributes, or for an elevated risk or risk type, the first security risk response information will be shared regardless of the first collection profile.

That is, in embodiments, the sharing of information may be based on factors other than the sharing information in a collection profile. For example, a determination on whether certain information is shared may be based on decisions that favor the plurality of collections over the privacy settings of any individual collection. In this example, should a risk or risk type be prioritized as "exceptional," a risk response from one collection might be shared with the plurality even if the one collection profile did not specifically authorize sharing information with the entire plurality.

In the embodiment, the server security component may provide an alert to any particular enterprise should that enterprise become significantly more exposed to risk for any reason, e.g., as a result of a change to the configurations of the enterprise's mobile communications devices.

In an embodiment, suspicious applications may be quarantined and tested with results delivered to participating enterprises. In the embodiment, when the server security component detects a potential risk associated with a particular application, the server security component may trigger the analysis of the application. For example, upon detecting what appears to be an emerging problem with an application, the server security component may activate a real or virtual test device, install on the test device an instance of the suspicious application, and monitor the test device as it exercises the suspicious application. The server security component may then provide the test results to relevant administrators, or broadcast an alert, depending on the test results and the controlling relationship information from the relationship database.

In an embodiment, a method is provided for allowing an administrator to receive an analysis of a potential application from an enterprise or individual. In the embodiment, a market approval process is disclosed in which analysts ("vetters") provide their analyses of applications to administrators (or the general public) who subscribe to receive the particular analyst's product, or otherwise seek out the analyst's opinion for a more specific reason. In the embodiment, an administrator may subscribe to see analyses from particular sources up to an including the public in general. It may be preferable to a particular administrator to subscribe to analyses from a peer (e.g., an administrator from Bank X subscribing to analyses from Bank Y). But the embodiment envisions that public comment on an application may be useful, and, in addition, public comment on an analysis from an industry source may also prove useful—though the embodiment provides for both the analyses and subsequent commentary to be contributed anonymously.

In a similar embodiment, an administrator or even an individual may delegate security or other permissions decisions to another administrator, enterprise, or individual. It is generally thought that most people blindly approve permissions questions. The embodiment would allow the delegation of such security or permissions decisions to another where that other is known to be more discerning when making security or permissions decisions. In doing so, the embodiment would leverage the knowledge and effort of the delegate. In an embodiment, the actual decisions are not delegated, but the opinions of certain administrators, enterprises, or individuals are provided to the interested administrator when presented with such a security or permissions decision. For example, a certain reviewer may achieve "celebrity" status through effective analyses. And, for example, the celebrity reviewer may maintain a list of "bad" applications and a list of "good" applications. An administrator may direct that relevant analyses from the celebrity reviewer be presented along with any request related to a decision on security or permissions. Similarly, the administrator may direct that they be alerted when the celebrity reviewer posts a new review, such as a review recommending for or against installing an application.

Figure 67:
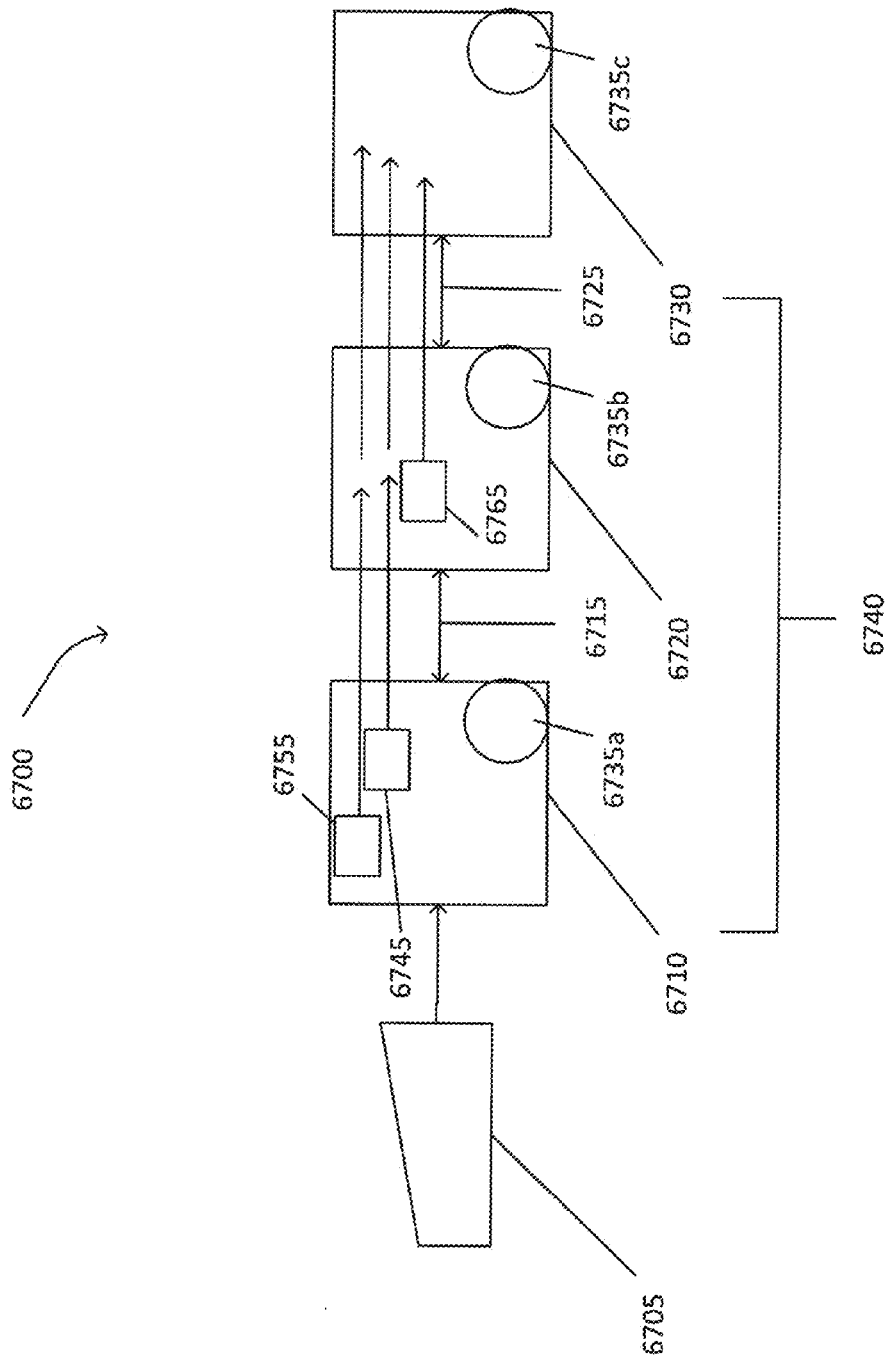
FIG. 67 is an exemplary block diagram illustrating an embodiment of a system.

FIG. 67 is an exemplary block diagram illustrating an embodiment of a system 6700 and method for determining whether to allow or deny an access request 6745. The embodiment is directed to a situation in which the source of an access request may be difficult to determine. In the embodiment, an initiating device may remotely control the originating device and initiate the sending of the request from the originating device. Between the initiating device and the originating device there may be other computing devices that create a chain or series of devices, each remotely controlling the next until the last controls the originating device. Between the originating device and the destination computing device there may be another series of computing devices that, as a group, transmit (or relay) the request from the originating device to the destination computing device. Computing devices in the series may perform one or more of the functions: initiate the request, control another computing device, originate the request, and transmit the request to the destination computing device.

For example, an enterprise employee visiting London, England on vacation with a sudden, urgent business issue may use free Wi-Fi in a coffee shop to VPN from her iPhone into her enterprise computer, which she left up and running in California. The employee may use that VPN access to command the enterprise computer to access enterprise resources. Typically, the enterprise backend would not know that the enterprise computer is projecting its display and sending enterprise data all the way to London. The enterprise would also not know the security status of the Wi-Fi connection or the iPhone.

In an embodiment, each of the computing devices involved in transmitting an access request may run an instance of a device security component, such as the "sensor" described with respect to FIGS. 64-66. The device security component may monitor the computing device and determine whether the device is "trusted." That is, the device security component may determine whether the state of the computing device is such that it meets the device security component's requirements for the "trusted" label, which may be that the computing device is functioning normally correctly and is secure. The device security component may also determine whether the computing device is being remotely controlled (e.g., using a Telnet or SSH session or other application allowing the remote control from a remote computing device of the monitored computing device). If so, the device security component may still label the device as "trusted," (or not), but the device security may add to that "trusted" label the additional information that the device is being remotely controlled. In the embodiment, a security component on the destination computing device receives information about each computing device involved in transmitting the access request from security components on the computing devices (e.g., a "handshake"), and based on the received information the security component on the destination computing device may determine whether or not to allow the access request.

FIG. 67 illustrates a system 6700 employing a method for determining whether to allow or deny an access request 6745 based on a destination security component 6735c being able to evaluate source information from any computing device involved in the transmission of access request 6745. In FIG. 67, a user 6705 initiates access request 6745 using a computing device 6710. Computing device 6710 transmits access request 6745 to a computing device 6720 using a network connection 6715, which in turn relays access request 6745 to a destination computing device 6730 using a network connection 6725. Computing device 6710 is both an initiating computing device and an originating computing device. Computing device 6710 is the initiating computing device because the user used it to initiate access request 6745. Computing device 6710 is also the originating computing device because the actual request was transmitted from computing device 6710 to destination computing device 6730. Computing device 6720 is a terminal device, i.e., computing device 6720 is the device that transmits access request 6745 to destination computing device 6730. Computing device 6720 is also an intermediate computing device in that it is between the initial computing device 6710 and destination computing device 6730 along the route of access request 6745. Computing devices 6710, 6720 create a series 6740 of computing devices by which access request 6745 is initiated, originated, and transmitted to destination computing device 6730. In a series of one computing device the single computing device performs the functions of initiating the request, originating the request, and transmitting the request to the destination computing device.

Computing devices 6710, 6720, and 6730 are running instances of a security component 6735a, 6735b, and 6735c, respectively. Security components 6735a, 6735b, and 6735c monitor the respective computing device and determine if the device is secure ("trusted") or not, according to policies under which the security components are operating. Security components 6735a, 6735b, and 6735c monitor, e.g., the inputs, outputs, communications, applications, and network connections of their respective devices. Security components 6735a, 6735b, and 6735c are thereby able to determine, for example, whether their respective computing devices initiated access request 6745, originated access request 6745, or transmitted (or "relayed") access request 6745 received from another computing device. In monitoring a device, security components 6735a, 6735b, and 6735c may identify computing devices that communicate with the monitored computing device and associate those identities with any communications from or to the identified computing device. Additionally, security components 6735a, 6735b, and 6735c may communicate with each other regarding the security state and other information regarding their monitored computing devices. Furthermore, security components 6735a, 6735b, and 6735c may communicate to each other information relating to access request 6745, such as whether the monitored device initiated access request 6745, whether the monitored device originated access request 6745, whether the monitored device transmitted access request 6745 received from another device, the identity of any device that controlled the monitored device to cause the monitored device either originate access request 6745 or to control another device, and the identity of any device that transmitted access request 6745 to the monitored device. For example, security component 6735a may communicate with security components 6735b and 6735c, sending source information 6755 to security component 6735b in parallel with access request 6745. Source information 6755 may include that computing device 6710 is trusted (or not), that computing device 6710 initiated access request 6745 (i.e., was not being controlled by another device), and that computing device 6710 originated access request 6745 (i.e., created and sent access request 6745). Security component 6735*b* may receive this information and may itself communicate to security component 6735*c*, sending source information 6765 to security component 6735*c* in parallel with access request 6745. Source information 6765 may include that computing device 6720 is trusted (or not) and that computing device 6720 received access request 6745 from computing device 6710. Security component 6735*b* may also forward source information 6755 to security component 6735*c* in parallel with access request 6745.

Upon destination computing device 6730 receiving access request 6745, destination computing device security component 6735*c* then determines whether to allow or deny access request 6745 based on the information received from security components 6735*a* and 6735*b* regarding series 6740. In an embodiment, destination computing device security component 6735*c* allows access request 6745 if every computing device in series 6740 is trusted, and if access request 6745 originated within series 6740, and if access request 6745 was initiated within the series 6740. In an embodiment, destination computing device security component 6735*c* allows access request 6745 if every computing device in series 6740 is trusted, and if access request 6745 originated within series 6740, and if access request 6745 was initiated within the series 6740, and if no computing device within series 6740 was being controlled by a computing device not included in series 6740.

FIG. 67 illustrates a type of chaining in which a request is initiated using a first computing device and is transmitted through one or more intervening computing device to a destination computing device. Computing devices 6710, 6720, and 6730 may be any type of computing device, e.g., mobile communications devices, tablets, and desktops. Because the function they perform in series 6740 does not require user input, computing device 6720 and destination computing device 6730 may also be computing devices that are not typically configured to accept user input, such as servers. Network connections 6715, 6725 may be any network connection, such as LAN, Wi-Fi, or Internet.

In an embodiment, communications between security components 6735*a*, 6735*b*, and 6735*c* are separate from access request 6745. That is, security component 6735*c* may receive the communication from security component 6735*b* before or after access request 6745. And the communication from security component 6735*b* may follow a path that is different from access request 6745. Also, communications from security components 6735*a* and 6735*b* may be forwarded in parallel with access request 6745 without being requested (e.g., "pushed"), or communications may be delayed until requested by a security component later in the series. For example, security component 6735*b* may initiate sending source information 6755, 6765 to destination computing device 6730 without being requested to do so. Or, security component 6735*c* may request source information from security component 6735*b* upon receiving access request 6745 from computing device 6720. Furthermore, in an embodiment, the communication from security component 6735*b* to security component 6735*c* may aggregate source information 6755 and source information 6765. In the embodiment, the aggregated source information is included with access request 6745 (e.g., added or attached to the request) as access request 6745 is transmitted from originating computing device 6710 to destination computing device 6730.

Or, in an embodiment, the communication from security component 6735*b* may include only source information 6765 (i.e., information regarding monitored computing device 6720) from which security component 6735*c* may obtain the identity of computing device 6710. With the identity of computing device 6710, security component 6735*c* may then request source information 6755 (i.e., information regarding access request 6745 and monitored computing device 6710) from security component 6735*a* on computing device 6710.

In an embodiment, "trust" may be established by the security components on each computing device reporting that their threat profile is within acceptable limits or alternatively characterized as, e.g., SAFE, SECURE, or PROTECTED. The absence of a security component on a computing device results in an inference that the computing device is not trusted, e.g., UNSAFE, INSECURE, or UNPROTECTED. If every computing device in a chain, series, or system is SAFE or alternatively has a threat profile within the acceptable limits, then trust is established in the chain, series, or system. In an embodiment, trust in a chain, series, or system is established when every computing device in the chain, series, or system is SAFE or alternatively has a threat profile within the acceptable limits and when the security components on each computing device in the chain, series, or system have bi-laterally authenticated each other and have also reported their threat profile to each other. Thus, the embodiment may protect against a "man-in-the-middle" attack.

In an embodiment, individual computing devices in a series may be treated differently. For example, a security component may determine that source information may be allowed to flow into an "untrusted" computing device associated with the component, but not out of it. And a group of security components may impose the same effect on a single untrusted component based on source information received from a security component on that untrusted computing device.

In an embodiment, responses to an access request other than or in addition to "allow" and "deny" are allowed. For example, if the access request related to running an application on the destination computing device and the associated source information indicted that a computing device in the series was untrusted, security component 6735*c* may allow the request in a limited fashion (e.g., run with output quarantined), or deny the request and initiate or suggest to the user the uninstallation of the target application.

In an embodiment, a computing device may be used to supply a second factor for authentication and a security component on the computing device may supply source information to confirm whether the computing device is trusted and is, therefore, allowed to provide the second factor for authentication. In this sense, the embodiment extends the concepts of authorization and authentication from the user to the computing devices involved. For example, in FIG. 67, source information 6755 would verify that computing device 6710 is not being remotely controlled and is the originating device for access request 6745. Such source information could also include information that the receiving security component may use to determine whether the sending computing device is compromised or not, or is possibly compromised, such as information collected about the OS and firmware on the device, dynamic information about processes running on the device, and device configuration tables (e.g., iptables (a Linux on-device firewall)). In the embodiment, a computing device that has an indicator of compromise might be considered unsafe and not allowed to supply a second factor in a multi-factor authentication.

In an embodiment, a security component may use application component analysis to correlate unknown applications with known remote access applications. And a particular remote-control application, even if known, may result in the security component labeling the associated computing device "untrusted" according to a security policy. Source information from remotely-controlled computing devices may include both the identity of the controlling device, e.g., the device's GUID, and the controlling application.

In an embodiment, in establishing trust, a security policy may extend to the user, the device, the application, and the properties of the application. That is, a security policy may actually be a tree of security policies directed to different aspects of a communication.

Figure 68:
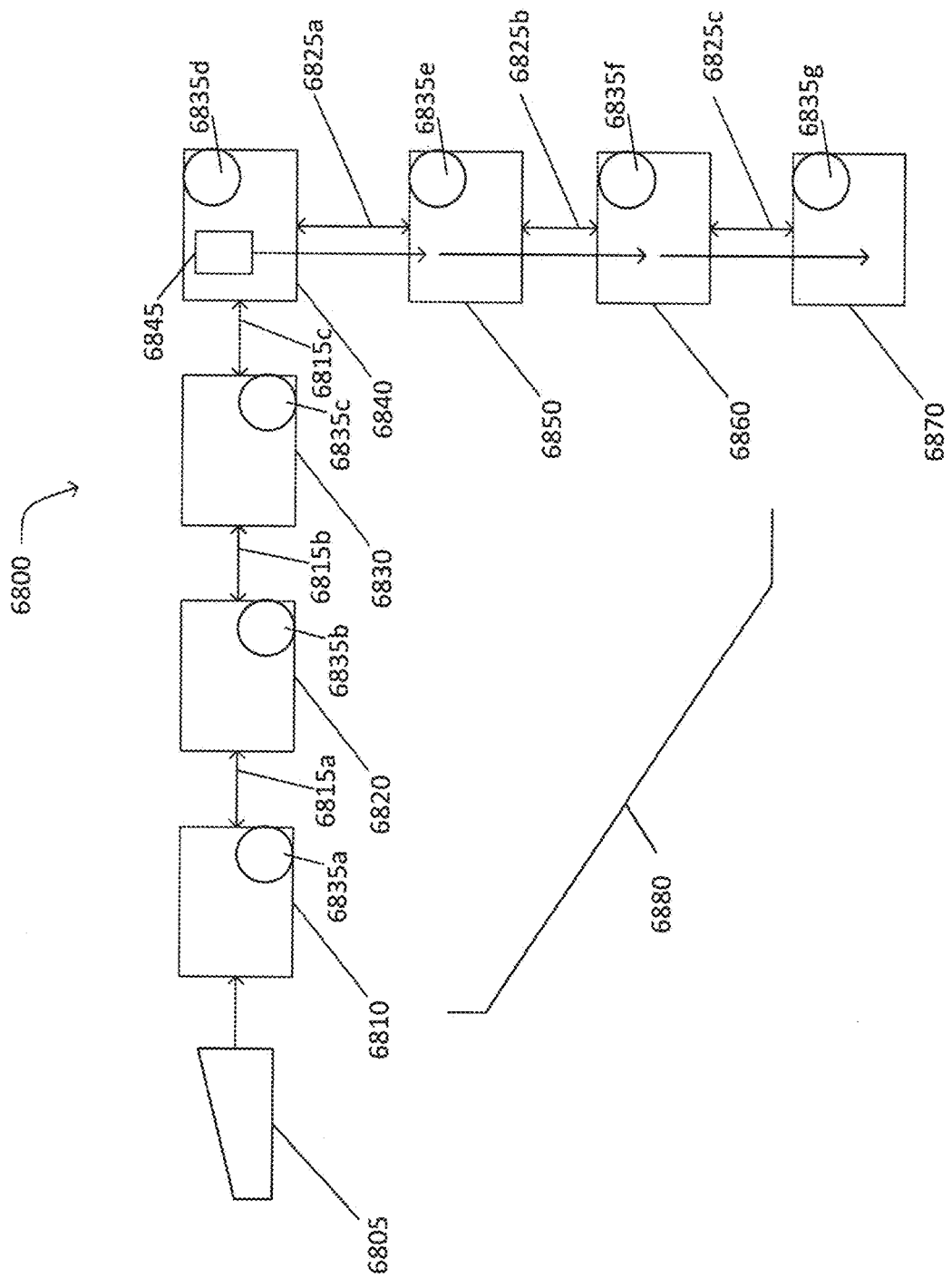
FIG. 68 is an exemplary block diagram illustrating an embodiment of a system.

FIG. 68 is an exemplary block diagram illustrating an embodiment of a system 6800 for determining whether to allow or deny an access request 6845. In FIG. 68, a user 6805 uses a computing device 6810 to remotely control a computing device 6840, by remotely controlling intermediate computing devices 6820 and 6830, using each remotely controlled computing device to remotely control the next. User 6805 then may use remotely controlled computing device 6840 to send an access request 6845 to a destination computing device 6870. Computing devices 6820, 6830 and 6840 are a chain of remotely controlled computing devices connected via network connections 6815a, 6815b, and 6815c. Computing device 6840 is the device that originates access request 6845. The chain could include an arbitrary number of remotely-controlled intermediate computing devices between the initial computing device 6810 and originating computing device 6840.

Computing device 6840 is directed to transmit access request 6845 to destination computing device 6870. Computing device 6840 may transmit access request 6845 through intermediate computing devices 6850 and 6860 using network connections 6825a, 6825b, and 6825c. This chain could also include an arbitrary number of computing devices between originating computing device 6840 and destination computing device 6870. Computing devices 6810, 6820, 6830, 6840, 6850, and 6860 create a series 6880 of computing devices involved in transmitting access request 6845 to destination computing device 6870. Computing devices 6810, 6820, 6830, 6840, 6850, and 6860 and destination computing device 6870 are running instances of a security component 6835a, 6835b, 6835c, 6835d, 6835e, 6835f, and 6835g, respectively.

System 6800 is more complicated that system 6700 (FIG. 67), but the descriptions related to series 6740, access request 6745, and source information 6755, 6765 apply to series 6880, access request 6845, and source information (not shown, as it would unduly clutter the figure). That is, security components 6835a-g monitor the respective computing device and determine if the device is secure ("trusted") or not, according to policies under which the security components are operating. Security components 6835a-g monitor, e.g., the inputs, outputs, communications, applications, and network connections of their respective devices. Security components 6835a-g are thereby able to determine, for example, whether their respective computing devices initiated access request 6845, originated access request 6845, were used to control a computing device, were controlled by a computing device, and transmitted (or "relayed") access request 6845 received from another computing device. In monitoring a device, security components 6835a-g may identify computing devices that communicate with the monitored computing device and associate those identities with any communications from or to the identified computing device. Additionally, security components 6835a-g may communicate with each other regarding state of their monitored computing device. Furthermore, security components 6835a-g may communicate to each other information relating to access request 6845, such as whether the monitored device initiated access request 6845, whether the monitored device originated access request 6845, whether the monitored device transmitted access request 6845 received from another device, the identity of any device that controlled the monitored device to cause the monitored device to either originate access request 6845 or to control another device, the identity of any application used to control the monitored device, and the identity of any device that transmitted access request 6845 to the monitored device. For example, security component 6835a may communicate with security components 6835b-g, sending source information (not shown) to security component 6835b in parallel with access request 6845. Similar to the description of computing device 6710 (FIG. 67), source information from device 6810, may include that computing device 6810 is trusted (or not), that computing device 6810 initiated access request 6845, and that computing device 6810 was not being controlled by another device. However, the source information would not include, for example, that computing device 6810 originated access request 6845. Intermediate computing device security components 6835b and 6835c may receive and relay source information from security component 6835a and send source information of their own. Security component 6835d may receive this information and forward it in parallel with access request 6845. Security component 6835d may itself send source information in parallel with access request 6845 including that computing device 6840 is trusted (or not), that computing device 6840 was controlled by computing device 6830, and that computing device 6840 originated access request 6845. Thus, the embodiment may provide for controlling a gateway allowing access to destination computing device 6870.

Upon destination computing device 6870 receiving access request 6845, destination computing device security component 6835g then determines whether to allow or deny access request 6845 based on the information received from security components 6835a-f regarding series 6880. In an embodiment, destination computing device security component 6835g allows access request 6845 if every computing device in series 6880 is trusted, if access request 6845 originated within series 6880, and if access request 6845 was initiated within the series 6880. In an embodiment, destination computing device security component 6835g allows access request 6845 if every computing device in series 6880 is trusted, if access request 6845 originated within series 6880, if access request 6845 was initiated within the series 6880, and if no computing device within series 6880 was being controlled by a computing device not included in series 6880.

FIG. 68 illustrates a type of chaining in which a request is initiated using a first computing device and is transmitted through one or more intervening computing device to a destination computing device. Computing devices 6810-70 may be any type of computing device, e.g., mobile communications devices, tablets, and desktops. Because the function they perform in series 6880 does not require user input, computing device 6820-60 and destination computing device 6870 may also be computing devices that are not typically configured to accept user input, such as servers.

For example, computing device 6850 could be a web server and computing device 6860 could be an application server. Network connections 6815*a-c*, and 6825*a-c* may be any network connection, such as LAN, Wi-Fi, or Internet.

In an embodiment, communications between security components are separate from an access request. That is, a destination security component may receive source information from a terminal security component before or after the access request. Also, source information from security components may be forwarded in parallel with an access request without being requested (e.g., "pushed"), or source information may be delayed until requested by a security component later in the series. For example, security component 6835*f* may initiate sending source information to destination computing device 6870 without being request to do so. Or, security component 6835*g* may request source information from security component 6835*f* upon receiving access request 6845 from computing device 6860. In an embodiment, the communication from a terminal security component may include only source information from the terminal security component, from which a destination computing device security component may obtain the identity of an intermediate computing device that transmitted the access request to the terminal computing device. The destination computing device security component may then request source information from the intermediate computing device. For example, security component 6835*g* could request source information regarding access request 6845, from security component 6835*e* on computing device 6850. In an embodiment, the communication of source information from one security component to a next security component may aggregate source information from each security component. And, in an embodiment, the aggregated source information may be included with an access request (e.g., added or attached to the request) as the access request is transmitted from an originating computing device to a destination computing device.

In an embodiment, initial computing device 6810 has remotely controlled intermediate computing devices 6820 and 6830 and set up tunnels to originating device 6840. In the embodiment, security component 6835*a* may monitor the downstream tunnels in addition to monitoring computing device 6810. Thus, source information from security component 6835*a* may be substituted for source information from security components 6835*b* and 6835*c* when security component 6835*g* eventually determines whether to allow or deny an access request from computing device 6810

Figure 69:
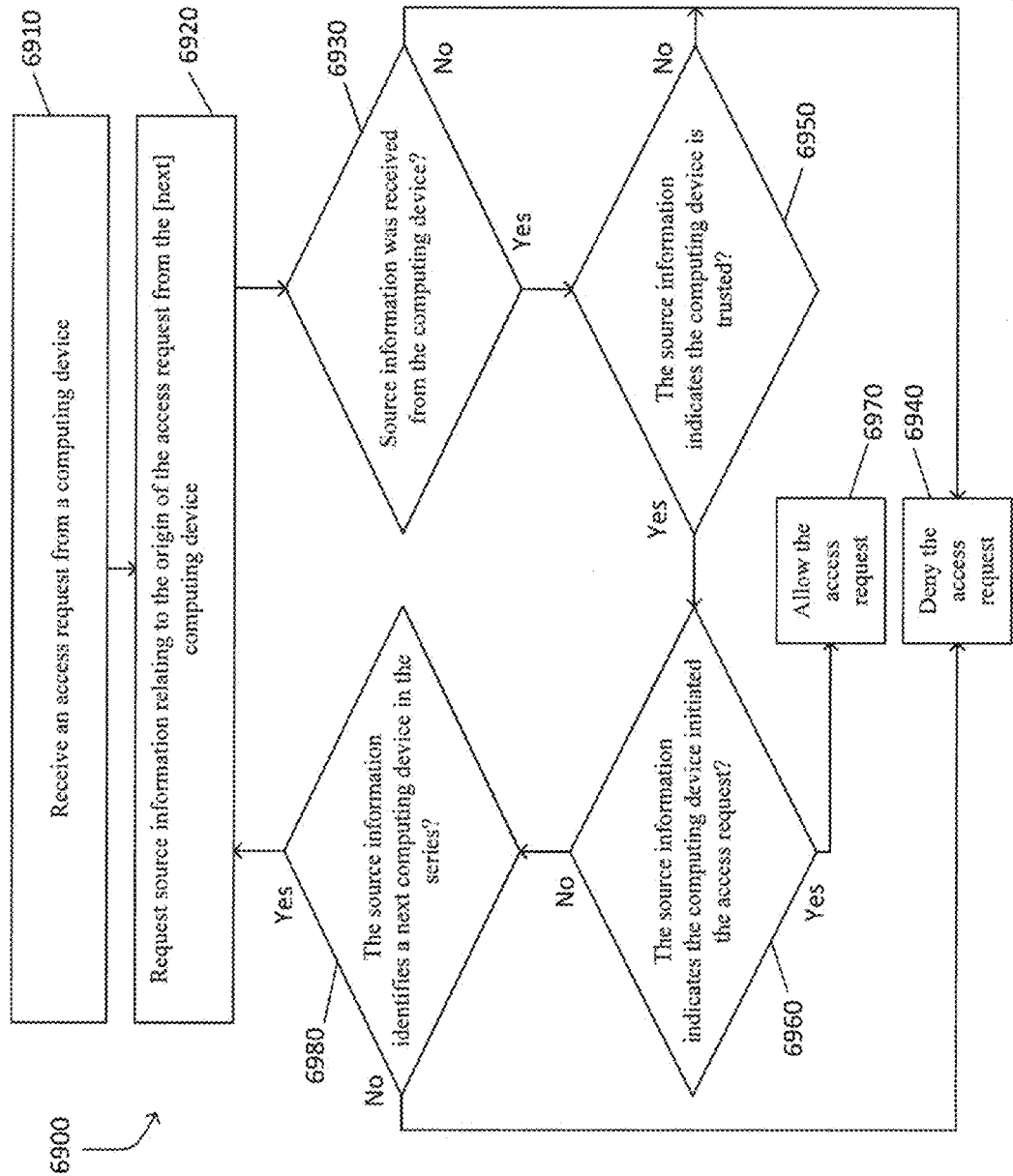
FIG. 69 is an exemplary flow diagram illustrating the steps of an embodiment.

FIG. 69 is an exemplary flow diagram illustrating the steps of an embodiment of a method 6900 for determining whether to allow or deny an access request. In FIG. 69, in step 6910, a destination computing device running a security component receives an access request from a terminal computing device. In step 6920, the security component on the destination computing device requests source information from a security component that may be running on the terminal computing device. In step 6930, the destination computing device security component determines whether it has received the requested source information. If source information was not received from a terminal computing device security component, then in step 6940 the request is denied. If source information was received from a terminal computing device security component, then in step 6950, the destination computing device security component determines whether the source information indicates that the terminal computing device is trusted. If the terminal computing device is not trusted, then in step 6940 the request is denied. If the terminal computing device is trusted, then in step 6960, the destination computing device determines whether the source information indicates that the terminal computing device is the initiating computing device. If the terminal computing device is the initiating computing device, then in step 6970 the request is allowed. If the terminal computing device is not the initiating computing device, then in step 6980, the destination computing device determines whether the source information identifies a next computing device. If the source information does not identify a next computing device, then in step 6940, the request is denied. If the source information identifies a next computing device, then in step 6920, the security component on the destination computing device requests source information from a security component that may be running on the identified next computing device. The steps of the method are then repeated until the request is either allowed or denied.

In an embodiment of a method for determining whether to allow or deny a network access request the source information for each computing device in the series is aggregated. That is, as with the method 6900: in a first step a destination computing device running a security component receives an access request from a terminal computing device; in a second step the security component on the destination computing device requests source information from a security component that may be running on the terminal computing device; in a third step the destination computing device security component determines whether it has received the requested source information; and in a fourth step, if source information was not received from a terminal computing device security component then the request is denied. However, this embodiment differs from the method 6900 because in this embodiment, if source information is received the source information is the aggregate of source information from the computing devices in the series. That is, the source information includes information on each device in the series and whether the computing device was running an instance of the security component, is trusted, and is remotely controlled. With the receipt of such aggregate source information, in this embodiment the destination device security component then allows the request when the aggregate source information: indicates that every computing device in the series is trusted (i.e., every computing device in the series was running the device security component and each device security component indicated that the corresponding computing device was trusted), and indicates that the initiation computing device is one of the series. In an embodiment, the aggregated source information is transmitted at the same time the access request is transmitted, i.e., the destination computing device security component does not need to request the aggregated source information. Note that for any series in an embodiment, the series may actually loop back on itself, thus a computing device may occupy more than one location in the series.

Figure 70:
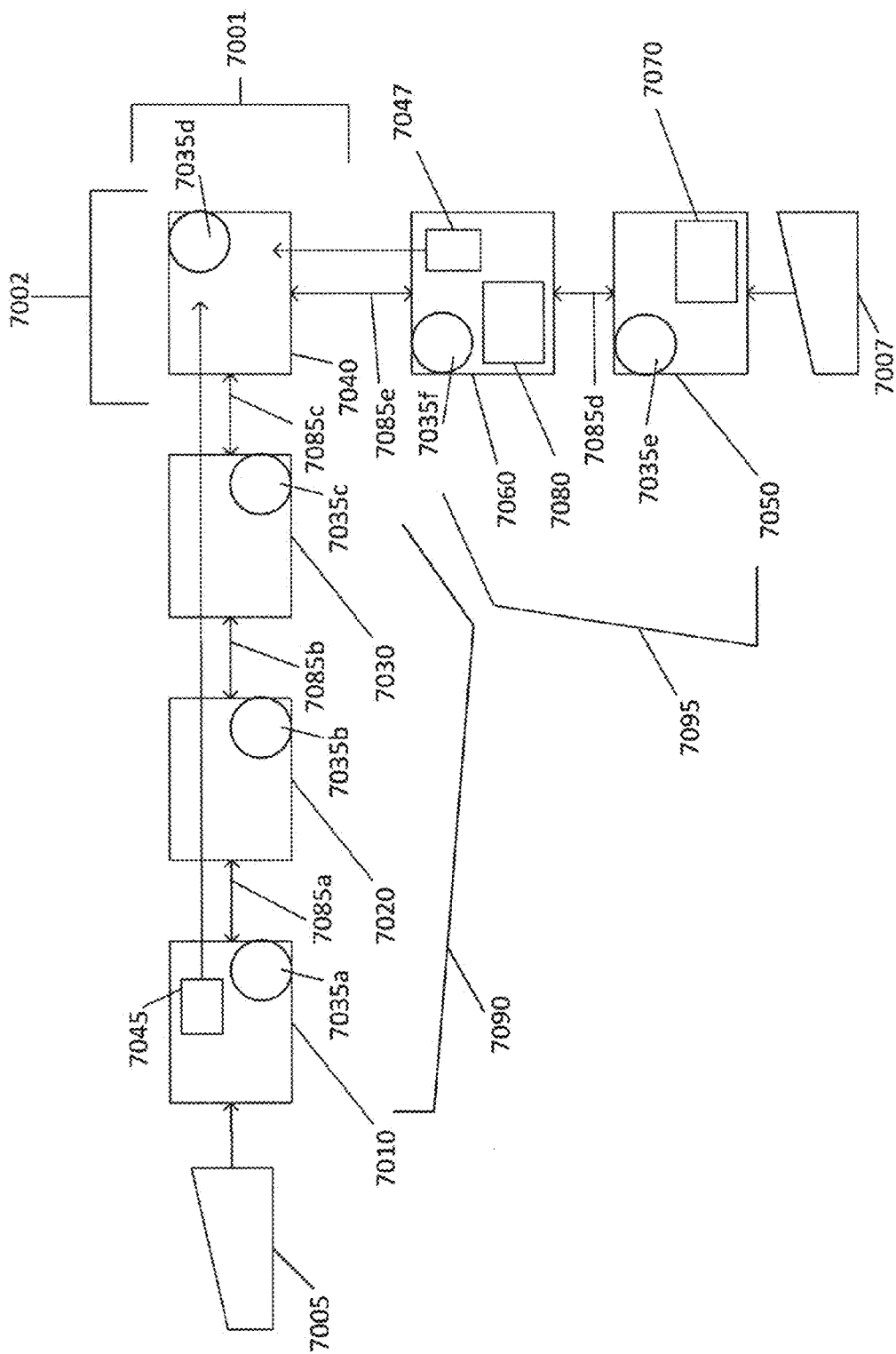
FIG. 70 is an exemplary block diagram illustrating two embodiments of systems.

FIG. 70 is an exemplary block diagram illustrating an embodiment of a system 7001 and an embodiment of a system 7002 for determining whether to allow or deny access requests. In system 7001, a user 7005 uses a computing device 7010 to initiate and originate the sending of an access request 7045 to a destination computing device 7040 via intermediate computing devices 7020 and 7030. Computing devices 7010, 7020, and 7030 are a series 7090 of computing devices communicating with each other via network connections 7085*a*, 7085*b*, and 7015*c*. Terminal computing device 7030 transmits access request 7045 to destination computing device 7040 and transmits source information (not shown) from security components 7035*a*, 7035*b*, and 7035*c* to a destination computing device security component 7035*d*. Initial computing device 7010 may be a client computing device. Intermediate computing device 7020 may be a load balancing proxy. Intermediate computing device 7030 may be an application server. And destination computing device 7040 may be a database server. The description of system 6700 (FIG. 67) relating to access request 6745 originating from computing device 6710 applies to system 7001 with the addition of a second intermediate computing device. The description of system 6700 (FIG. 67) relating to source information also applies to system 7001 with the addition of a second intermediate computing device.

With system 7001, upon destination computing device 7040 receiving access request 7045, destination computing device security component 7035*d* determines whether to allow or deny access request 7045 based on the information received from security components 7035*a-c* regarding series 7040. In an embodiment, destination computing device security component 7035*d* allows access request 7045 if every computing device in series 7090 is trusted, if access request 7045 originated within series 7090, and if access request 7045 was initiated within the series 7090. In an embodiment, destination computing device security component 7035*d* allows access request 7045 if every computing device in series 7090 is trusted, if access request 7045 originated within series 7090, if access request 7045 was initiated within the series 7090, and if no computing device within series 7090 was being controlled by a computing device not included in series 7090.

In FIG. 70, in system 7002, a user 7007 uses a client computing device 7050 to initiate the sending of an access request 7047 to the destination computing device 7040 (e.g., a database server). Client computing device initiates access request 7047, which originates on a jump host 7060. Client computing devices 7050 and jump host 7060 are a series 7095 of computing devices in communication with each other via network connection 7085*d*. The terminal computing device, jump host 7060 transmits access request 7047 to destination computing device 7040 and transmits source information (not shown) from security components 7035*e* and 7035*f* to destination computing device security component 7035*d*. Jump Host 7060 is running an application 7080. Application 7080 is performing the access, i.e., application 7080 originates access request 7047 on jump host 7080. Application 7080 may be, for example, a shell interface invoked from a VNC application (a remote desktop application). Application 7080 is connected via network 7085*d* to client computing device 7050. Client computing device 7050 may be running an application 7070, which may be, for example, the client-side of a VNC application that invoked application 7080. In the embodiment, destination security component 7035*d* determines whether to allow or deny access request 7047 based on an evaluation of whether the computing devices 7050, 7060, network connections 7085*d*, 7085*e*, and applications 7070, 7080 are trusted. That is, as with systems 6700 (FIG. 67), 6800 (FIG. 68), and 7001, all security components in the chain from initiating computing device 7050 to destination computing device 7040 provide source information to destination computing device security component 7035*d*, which evaluates the source information to determine whether to allow or deny access request 7047.

Upon destination computing device 7040 receiving access request 7047, destination computing device security component 7035*d* then determines whether to allow or deny access request 7047 based on the information received from security components 7035*e-f* regarding series 7095. In an embodiment, destination computing device security component 7035*d* allows access request 7047 if every computing device in series 7095 is trusted, if access request 7047 originated within series 7095, and if access request 7047 was initiated within the series 7095. In an embodiment, destination computing device security component 7035*d* allows access request 7047 if every computing device in series 7095 is trusted, if access request 7047 originated within series 7095, if access request 7047 was initiated within the series 7095, and if no computing device within series 7095 was being controlled by a computing device not included in series 7095. In an embodiment, security component 7035*d* further requires that infrastructure devices of network connections 7085*d* and 7085*e* be trusted and not be under the control of a computing device not included in series 7095.

In the embodiment, application 7080 may have been invoked on jump host 7060 to allow, for example, maintenance on destination computing device 7040, which may be, for example, a database server. Without more, i.e., without security components 7035*e-f*, destination computing device 7040 would have limited information beyond the identity of jump host 7060. For example, without security components 7035*e-f*, destination computing device 7040 may be limited to information contained in network communications between destination computing device 7040 and initial computing device 7050, e.g., an IP address, and information in the protocol data units, or in header information. In the embodiment, an instance of the security component is instantiated on every computing device between user 7007 and destination computing device 7040, and also on destination computing device 7040 and these may provide security component 7035*d* with source information from each computing device in the series.

In an example, jump host 7060 is accessing destination computing device 7040 and application 7080 is an SSH application. Without security components 7035*e* and 7035*f* destination computing device security component 7035*d* would not have source information regarding the SSH session, or the device on the other side of the SSH session. Thus, without security components 7035*e* and 7035*f*, the SSH application (or SSH daemon) would allow user 7007 to be on computing device 7050 (which may be compromised), using application 7070 (which may be compromised), connected over network 7085*d* (which may not meet policy requirements for a secure connection).

In an embodiment, in addition to instances of the security component being on every computing device between user 7007 and destination computing device 7040, and also being on destination computing device 7040, instances of the security component are instantiated on pieces of network infrastructure that are part of the route from the physical location of user 7007 to destination computing device 7040. That is, in the embodiment, instances of the security component are also instantiated on computing devices that are part of network connections 7085*d* and 7085*e* and these network connection security components provide source information just like any computing device in series 7090 and 7095. Thus when destination computing device security component 7035*d* evaluates source information to determine whether to allow or deny access request 7047, the decision is based also on source information from the network connection security components, e.g., the access request is denied if source information indicates that a network connection is not trusted.

An embodiment provides a method for passing aggregated information, such as source information, along with an access request. In the embodiment, aggregated information may be used to determine whether to allow an attempt to access a resource. The aggregated information may include, for example, user authentication information and source information, and source information may include, for example, information about the state of the initiating and originating computing devices, attributes or identifies of applications being used in the access attempt, and similar information from any intermediate ("intervening" or "chained") application or computing device that is part of the access attempt.

The aggregated information may be passed with the access request in a number of ways, including, for example: as SAML security assertion extensions, as additional HTTP headers, or via a separate flow. In an further example, a single sign-on (SSO) provider (or Identity Services Provider) may piggyback the aggregated information onto an access request (or responses), and security components on computing devices in the access request chain may add their contributions to the aggregated information in the SSO information flow.

Information may be aggregated at each device in an access request chain. For example, a first security component on a first computing device running a first application may develop first source information containing the security state of the first computing device and an identifier of the first application and parameter information for the first application. This first source information may be passed with an access request to a second security component on a second computing device running a second application. The second security component may aggregate the first source information with similar second source information and with the access request and pass the aggregate to a destination computing device. A destination computing device security component may then use the aggregated first and second source information to determine whether to allow or deny the access request. Furthermore, the aggregated information may be evaluated by any security component on any computing device or intervening network infrastructure as the aggregated information is transmitted between the first computing device and the destination computing device. In addition, such security components can reside as local device proxies (LDPs) on: the first computing device, the second computing device, the destination computing device, and the intervening network infrastructure (e.g., router, firewall, appliance, etc.).

Figure 71:
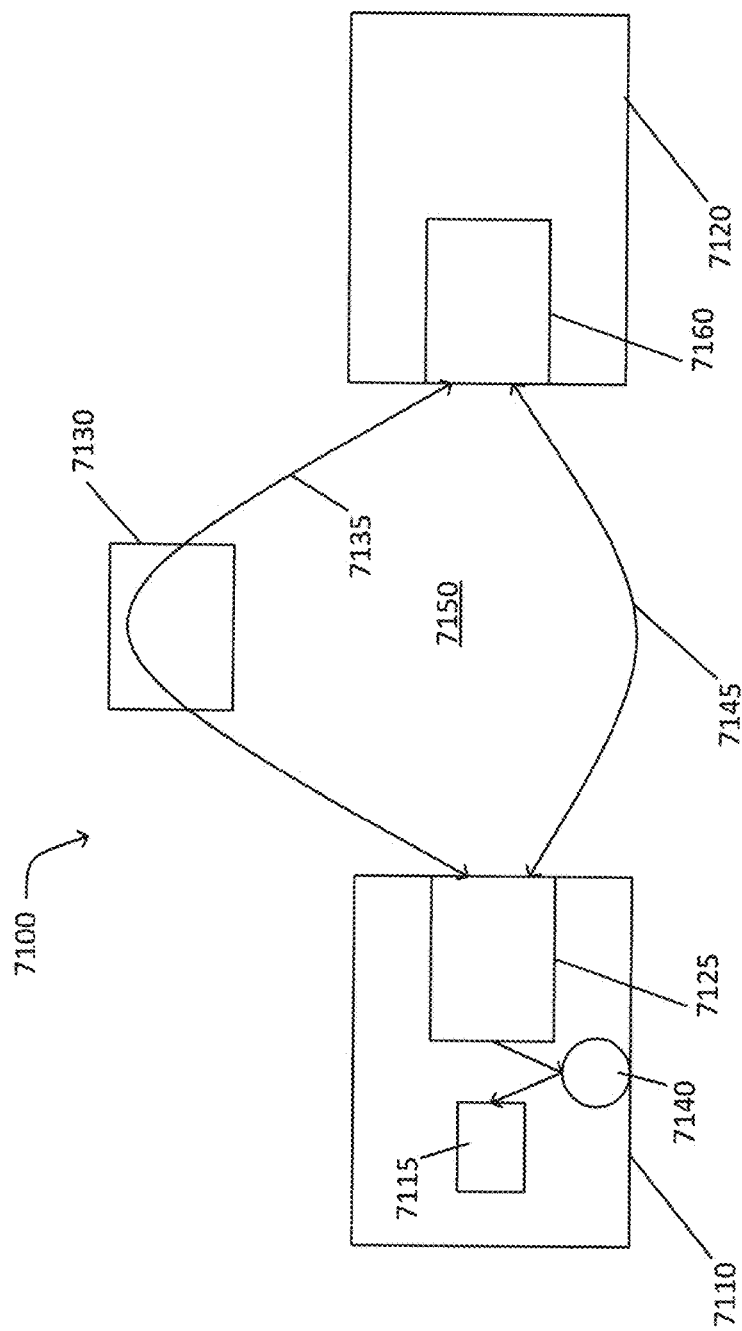
FIG. 71 is an exemplary block diagram illustrating an embodiment of a system.

FIG. 71 is an exemplary block diagram illustrating an embodiment of a system and method for determining whether to allow or deny a multi-path connection. An example of a multi-path connection is a multi-path transmission control protocol (MPTCP) connection. Applications of MPTCP involve tying together multiple network interfaces to communicate with, for example, a single application. MPTCP may present problems for security analysis and protection because security solutions that rely on observing or intercepting communications may fail when the security solution only gets to observe or intercept some of the packets involved in a communication. In response to MPTCP-based issues an enterprise may have enacted policies or protocols. However, the enterprise may have to address devices (e.g., bring-your-own devices (BYODs)) that are used for personal activities. And the user of such a device might prefer that the policy or protocol did not get applied to the user's personal business or activities. Thus, the enterprise may have to address devices (e.g., bring-your-own-devices (BYODs)) that are used for personal business or activities, and enterprise related activities, and potentially both simultaneously.

In the embodiment, in a system 7100, a local device proxy 7125 is used to integrate multiple data flows into a single flow that may be observed and intercepted, and thereby secured, by a security component 7140. In the embodiment, multiple protocols are managed (e.g., integrated and secured) by a computing device 7110 using local device proxy (LDP) 7125 and security component 7140. Computing device 7110 may receive a request from a second computing device 7120 to use both a first path TCP connection 7135 through a virtual private network (VPN) 7130 and a second path TCP connection 7145 to create a MPTCP connection 7155 to an application 7115. MPTCP connection 7155 is initiated from an application 7160 on second computing device 7120. LDP 7125 may be in communication with security component 7140 on computing device 7110, either via networking communications or via inter-process communications or both. LDP 7125 and security component 7140 may determine the identity of application 7160. Security program 7140 may then consult a database and determine whether application 7160 is an enterprise application or a personal use application. If application 7160 is a dual-use application (e.g., application 7160 has both personal and enterprise utility), before MPTCP connection 7155 is allowed or completed, security component 7140 determines from the request whether enterprise data is involved, or determines whether enterprise or personal credentials are being used.

To determine whether connection 7150 would or would not result in enterprise-related activity, security component 7140 may, for example, consult lists (on a database that is self-contained on computing device 7110 or server located) of applications that are enterprise applications and of applications that are personal-use applications. In addition, it may be determined that an application is running in an enterprise container, which would make the application an enterprise application. In addition, it may be determined that an application reads from enterprise data sources on the mobile device or is connected to enterprise cloud or network services, which would also make the application an enterprise application. In contrast, a dual use application may be used for personal or enterprise activity, and determining whether a particular use is enterprise or personal may, for example, result from a determination of whether enterprise or personal login credentials were used. For example, the e-mail application on a device may have both personal and enterprise accounts that are used with the same application. If so, a determination of "enterprise-related activity" would result from a determination that the enterprise account was currently active.

If security component 7140, or LDP 7125 or a combination of the two determine that connection 7150 would not result in enterprise-related activity (e.g., application 7160 is a personal-use application, or both enterprise data is not involved and enterprise credentials are not being used), then LDP 7125 allows completion of MPTCP connection 7150 (i.e., via TCP option 30) and a related communication may be allowed to flow through LDP 7125.

If security component 7140, or LDP 7125, or a combination of the two determine that connection 7150 would results in enterprise-related activity, then LDP 7125 may apply an enterprise policy regarding whether to: allow the connection, allow and monitor the connection, force no-MPTCP, or disallow the connection. As a local device proxy, LDP 7125 may remove the multipath option from the originating TCP SYN packet to force no-MPTCP. Or, LDP 7125 may completely block the connection attempt. Or, LDP 7125 may allow MPTCP, but, because LDP 7125 has access to the data for all TCP sub-flows of the MPTCP connection, may choose to forward the data that is being sent or received on TCP subflows that do not traverse the enterprise infrastructure to a local or remote security program for possible security analysis, data loss prevention (DLP), or intrusion detection or prevention (IDP) activity. For example, LDP 7125 may determine that connection 7150 would result in enterprise-related activity based on information received from security component 7140 regarding application 7160 or the context of usage of application 7160.

In an example, computing device 7110 is a mobile communications device and second computing device 7120 is a server. First path TCP connection 7135 through VPN 7130 may allow TCP connection 7135 to be monitored or intercepted, which second path TCP connection 7145 (in this example a direct connection) does not. And, not being a VPN connection, TCP connection 7145 is likely to not be fully encrypted. Computing device (for this example, mobile communications device) 7110 may be operating under an enterprise policy that allows certain communications only when the connection may be determined to be secure, for example, by being encrypted or by being monitored or intercepted by security component 7140, thus such communications are allowed on TCP connection 7135 but not TCP connection 7145. Upon LDP 7125 determining that combined flows from TCP connections 7135 and 7145 are being used by single application 7115, LDP 7125 and security component 7140 are used to integrate and secure the data flows over TCP connections 7135 and 7145 so that they appear to mobile communications device 7110 as one single, secure data flow as one data flow to application 7115.

In an embodiment, an LDP is a component with access to every packet flowing in a communication, in either direction. The LDP may inspect the packets. The LDP may determine which packets are allowed to flow through. The LDP may modify or terminate the connection. LDPs may be implemented using VPN APIs on, for example, a mobile communications device, or using other components that are hooking or replacing parts of a network protocol stack in an application or in the operating system. And an application may be unaware that it received data from an LDP that arrived using two different flows (e.g., VPN, and not VPN). In an embodiment, a security component may be directing the LDP's actions. And a client may direct a first proxy manager and a second proxy manager on two types of data input flow.

In embodiments, computing devices and mobile communications devices may include devices that are part of what has been called "the internet of things." In the internet of things there are multiple devices which operate on their own, without accompanying and attendant users. Such devices may be mobile or sessile; they may have various sensors and computing and communication capabilities and may run applications; schematically they can be considered substantially similar to a mobile communications devices 901 and 3501. "Things" in the internet of things themselves have context information, and can participate in a variety of ways in a context management system, as mobile devices 101 or as an external environment resource. They can be managed with active context policies. Such "things" may have occasional interactions with their owners or administrators, who may monitor the things or modify settings on these things. Such owners or administrators play the role of users with respect to the "thing" devices as far as the context management system is concerned.

In the description above and throughout, numerous specific details are set forth in order to provide a thorough understanding of the disclosure. It will be evident, however, to one of ordinary skill in the art, that the embodiments may be practiced without these specific details. In other instances, well-known structures and devices are shown in block diagram form to facilitate explanation. The description of the preferred an embodiment is not intended to limit the scope of the claims appended hereto. Further, in the methods disclosed herein, various steps are disclosed illustrating some of the functions of the embodiments. One will appreciate that these steps are merely exemplary and are not meant to be limiting in any way. Other steps and functions may be contemplated without departing from this disclosure.

What is claimed is:

1. A method of for blocking an application from being installed on a mobile communications device, the method comprising:
   receiving at a server computer from the mobile communications device, the mobile communications device not having installed the application:
      (i) data pertaining to the application, and
      (ii) information pertaining to the mobile communications device including one or more of device data, device operating system, firmware version, memory capacity, available communication ports, battery limitations, hardware characteristics, default specifications, service provider and IP address;
   processing, by the server computer, the data and the information to determine an assessment for the application, the assessment being based upon an analysis of an instance of the application or a similar application in a virtual or physical device using data and information received by the server computer from sources other than the mobile communications device, the assessment including an assessment value from a graduated series of assessment values; and
   providing the assessment to the mobile communications device, the assessment value causing the installation of the application to be blocked when:
      (i) the mobile communications device compares the assessment value to a permitted range of assessment values, the permitted range being set by a user or an administrator of the mobile communications device before the assessment is provided to the mobile communications device; and
      (ii) the mobile communications device determines that the assessment value is not in the permitted range.

2. The method of claim 1, further comprising:
   when the assessment includes an indication that the application is harmful, displaying the assessment and an alert on the mobile communications device.

3. The method of claim 1, wherein the data pertaining to the application is from a group consisting of application name, application size, application SHA1 value, application version, application metadata, application traffic IP address, application communication port and URL associated with the application.

4. The method of claim 1, wherein the application is side-loaded onto the mobile communications device.

5. The method of claim 1, wherein the application is provided to the mobile communications device by an application marketplace.

6. The method of claim 1, wherein the assessment is further based upon data and information received by the server computer from other devices, the other devices being the same type of device as the mobile communications device.

7. A non-transitory, non-printed, computer readable storage medium for use with a server computer, the non-transitory, non-printed, computer readable storage medium containing computer readable instructions, which when executed by a processor cause the processor to perform the steps of a method for blocking an application from being installed on a mobile communications device, the method comprising:
- receiving at a server computer from the mobile communications device, the mobile communications device not having installed the application:
  - (i) data pertaining to the application, and
  - (ii) information pertaining to the mobile communications device including one or more of device data, device operating system, firmware version, memory capacity, available communication ports, battery limitations, hardware characteristics, default specifications, service provider and IP address;
- processing, by the server computer, the data and the information to determine an assessment for the application, the assessment being based upon an analysis of an instance of the application or a similar application in a virtual or physical device using data and information received by the server computer from sources other than the mobile communications device, the assessment including an assessment value from a graduated series of assessment values; and
- providing the assessment to the mobile communications device, the assessment value causing the installation of the application to be blocked when:
  - (i) the mobile communications device compares the assessment value to a permitted range of assessment values, the permitted range being set by a user or an administrator of the mobile communications device before the assessment is provided to the mobile communications device; and
  - (ii) the mobile communications device determines that the assessment value is not in the permitted range.

8. The non-transitory, non-printed, computer readable storage medium of claim 7, further comprising:
- when the assessment includes an indication that the application is harmful, displaying the assessment and an alert on the mobile communications device.

9. The non-transitory, non-printed, computer readable storage medium of claim 7, wherein the data pertaining to the application is from a group consisting of application name, application size, application SHA1 value, application version, application metadata, application traffic IP address, application communication port and URL associated with the application.

10. The non-transitory, non-printed, computer readable storage medium of claim 7, wherein when application is side-loaded onto the mobile communications device.

11. The non-transitory, non-printed, computer readable storage medium of claim 7, wherein the application is provided to the mobile communications device by an application marketplace.

12. The non-transitory, non-printed, computer readable storage medium of claim 7, wherein the assessment is further based upon data and information received by the server computer from other devices, the other devices being the same type of device as the mobile communications device.

13. A method for allowing an application to be installed on a mobile communications device, the method comprising:
- receiving at a server computer from the mobile communications device, the mobile communications device not having installed the application:
  - (i) data pertaining to the application, and
  - (ii) information pertaining to the mobile communications device including one or more of device data, device operating system, firmware version, memory capacity, available communication ports, battery limitations, hardware characteristics, default specifications, service provider and IP address;
- processing, by the server computer, the data and the information to determine an assessment for the application, the assessment being based upon an analysis of an instance of the application or a similar application in a virtual or physical device using data and information received by the server computer from sources other than the mobile communications device, the assessment including an assessment value from a graduated series of assessment values; and
- providing the assessment to the mobile communications device, the assessment value causing the initiation of the installation of the application on the mobile communications device when:
  - (i) the mobile communications device compares the assessment value to a permitted range of assessment values, the permitted range being set by a user or an administrator of the mobile communications device before the assessment is provided to the mobile communications device; and
  - (ii) the mobile communications device determines that the assessment value is in the permitted range.

14. The method of claim 13, the assessment, when processed by the mobile communications device, causing a message to be displayed on the mobile communications device.

15. The method of claim 13, wherein the data pertaining to the application is from a group consisting of application name, application size, application SHA1 value, application version, application metadata, application traffic IP address, application communication port and URL associated with the application.

16. The method of claim 13, wherein the assessment is further based upon data and information received by the server computer from other devices, the other devices being the same type of device as the mobile communications device.

17. A non-transitory, non-printed, computer readable storage medium for use with a server computer, the non-transitory, non-printed, computer readable storage medium containing computer readable instructions, which when executed by a processor cause the processor to perform the steps of a method for allowing an application to be installed on a mobile communications device, the method comprising:
- receiving at a server computer from the mobile communications device, the mobile communications device not having installed the application:
  - (i) data pertaining to the application, and
  - (ii) information pertaining to the mobile communications device including one or more of device data, device operating system, firmware version, memory capacity, available communication ports, battery limitations, hardware characteristics, default specifications, service provider and IP address;
- processing, by the server computer, the data and the information to determine an assessment for the application, the assessment being based upon an analysis of an instance of the application or a similar application in a virtual or physical device using data and information received by the server computer from sources other than the mobile communications device, the assessment including an assessment value from a graduated series of assessment values; and providing the assessment to the mobile communications device, the assessment value causing the initiation of the installation of the application on the mobile communications device when:

(i) the mobile communications device compares the assessment value to a permitted range of assessment values, the permitted range being set by a user or an administrator of the mobile communications device before the assessment is provided to the mobile communications device; and (ii) the mobile communications device determines that the assessment value is in the permitted range.

18. The non-transitory, non-printed, computer readable storage medium of claim 17, the assessment, when processed by the mobile communications device, causing a message to be displayed on the mobile communications device.

19. The non-transitory, non-printed, computer readable storage medium of claim 17, wherein the data pertaining to the application is from a group consisting of application name, application size, application SHA1 value, application version, application metadata, application traffic IP address, application communication port and URL associated with the application.

20. The non-transitory, non-printed, computer readable storage medium of claim 17, wherein the assessment is further based upon data and information received by the server computer from other devices, the other devices being the same type of device as the mobile communications device.

* * * * *